(12) United States Patent
Tang et al.

(10) Patent No.: US 12,540,341 B2
(45) Date of Patent: Feb. 3, 2026

(54) BIOSYNTHETIC PLATFORM FOR THE PRODUCTION OF OLIVETOLIC ACID AND ANALOGUES OF OLIVETOLIC ACID

(71) Applicant: The Regents of the University of California, Oakland, CA (US)

(72) Inventors: Yi Tang, Arcadia, CA (US); Mengbin Chen, Los Angeles, CA (US); Ikechukwu Okorafor, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 665 days.

(21) Appl. No.: 17/791,854

(22) PCT Filed: Jan. 9, 2021

(86) PCT No.: PCT/US2021/012866
§ 371 (c)(1),
(2) Date: Jul. 8, 2022

(87) PCT Pub. No.: WO2021/142393
PCT Pub. Date: Jul. 15, 2021

(65) Prior Publication Data
US 2023/0051453 A1 Feb. 16, 2023

Related U.S. Application Data

(60) Provisional application No. 62/959,849, filed on Jan. 10, 2020.

(51) Int. Cl.
| | | |
|---|---|---|
| *C12P 7/22* | (2006.01) | |
| *C12N 9/00* | (2006.01) | |
| *C12N 9/16* | (2006.01) | |
| *C12N 15/81* | (2006.01) | |

(52) U.S. Cl.
CPC ............... *C12P 7/22* (2013.01); *C12N 9/16* (2013.01); *C12N 9/93* (2013.01); *C12N 15/815* (2013.01); *C12N 2800/102* (2013.01)

(58) Field of Classification Search
CPC .............. C12P 7/42; C12N 15/52; C12N 9/93
See application file for complete search history.

(56) References Cited

U.S. PATENT DOCUMENTS

2019/0300888 A1* 10/2019 Keasling ................. C07C 63/04

FOREIGN PATENT DOCUMENTS

| CN | 103562398 A | 2/2014 |
| CN | 110651047 A | 1/2020 |
| JP | 2006-141276 A | 6/2006 |
| WO | 2012129450 A1 | 9/2012 |
| WO | 2018/20088 A1 | 2/2018 |
| WO | 2018/209143 A1 | 11/2018 |
| WO | 2019190945 A1 | 10/2019 |

OTHER PUBLICATIONS

Okorafor et al., "High-Titer Production of Olivetolic Acid and Analogs in Engineered Fungal Host Using a Nonplant Biosynthetic Pathway", ACS Synthetic Biology, Sep. 17, 2021, vol. 10, No. 9, pp. 2159-2166.
Salminen, Aaro, Search Report, European Patent Office, Application No. 21738010.4, Dec. 15, 2023.
Yang et al., "Structural basis for olivetolic acid formation by a polyketide cyclase from *Cannabis sativa*", The FEBs Journal, Feb. 2, 2016, vol. 283, No. 6, pp. 1088-1106.
Zhou et al., "Enzymatic Synthesis of Resorcyclic Acid Lactones by Cooperation of Fungal Iterative Polyketide Synthases Involved in Hypothemycin Biosynthesis", Journal of the American Chemical Society, Mar. 11, 2010, vol. 132, No. 13, pp. 4530-4531.
Zhou et al., "A fungal ketoreductase domain that displays substrate-dependent sterospecificity", Nature Chemical Biology, Mar. 11, 2012, vol. 8, No. 4, pp. 331-333.
UniProtKB entry B1Q286 "Olivetol synthase", Sep. 18, 2019 (online), <URL:https://www.ncbi.nlm.nig.gov/protein/449061840?sat=48&satkey=65207585>.
UniProtKB entry A0A0B4GLH9 "Beta-ketoacyl synthase", Mar. 2, 2015 (online), <URL:https://www.uniprot.org/uniprot/A0A0B4GLH3.txt>.
UniProtKB entry A0A0B4F4U5 "Polyketide synthase", Mar. 4, 2015 (online), <URL:https://www.uniprot.org/uniprot/A0A0B4F4U5.txt>.
UniProtKB entry A0A0B4GLH4 "Beta-ketoacyl synthase", Mar. 4, 2015 (online), <URL:https://www.uniprot.org/uniprot/A0A0B4GLH4.txt>.
Lee Young, International Search Report and Written Opinion, PCT/US2021/012866, United States Patent & Trademark Office, May 25, 2021.
Chen et al., "Genome mining and biosynthesis of a polyketide from a biofertilizer fungus that can facilitate reductive iron assimilation in plant", PNAS, Mar. 19, 2019, vol. 116, No. 12, pp. 5499-5504.
Fukuzawa, Hiromitsu, Office Action, Japan Patent Office, Application No. 2022-540635, Jan. 6, 2025.
Baharlou, Simin, International Preliminary Report on Patentability and Written Opinion, PCT/US2021/012866, The International Bureau of WIPO, Jul. 21, 2022.
Guo, Jiahui, Office Action, China National Intellectual Property Administration, Application No. 2021800163632, Jul. 25, 2025.
Liu et al., "Advance in producing higher alcohols by microbial cell factories", Chinese Journal of Biotechnology, Sep. 23, 2013, vol. 29, No. 10, pp. 1421-1430.

* cited by examiner

*Primary Examiner* — Tekchand Saidha
(74) *Attorney, Agent, or Firm* — Gavrilovich, Dodd & Lindsey LLP

(57) ABSTRACT

The disclosure provides biosynthetic platforms that generate olivetolic acid and its analogues at high titers from microbes, and in cell free systems.

24 Claims, 2 Drawing Sheets

Specification includes a Sequence Listing.

A
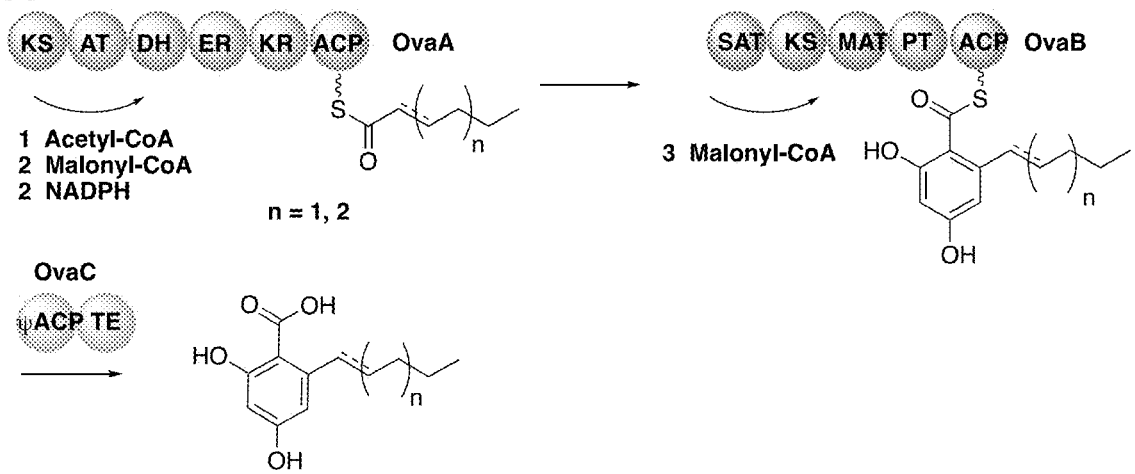
B
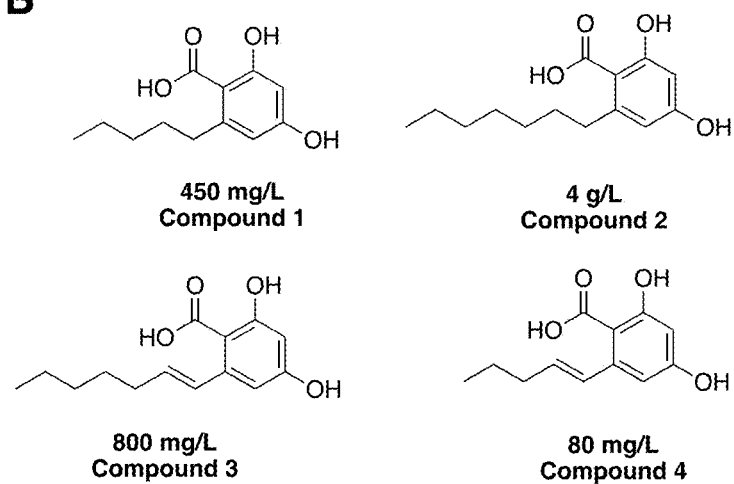
FIG. 2A-B
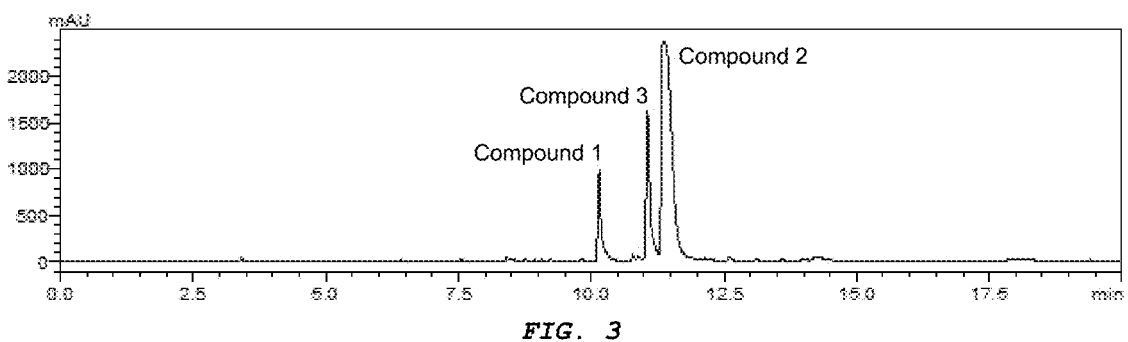
FIG. 3

BIOSYNTHETIC PLATFORM FOR THE PRODUCTION OF OLIVETOLIC ACID AND ANALOGUES OF OLIVETOLIC ACID

CROSS REFERENCE TO RELATED APPLICATIONS

This application is a U.S. National Phase Application filed under 35 U.S.C. § 371 and claims priority to International Application No. PCT/US2021/012866 filed Jan. 9, 2021, which application claims priority under 35 U.S.C. § 119 from Provisional Application Ser. No. 62/959,849, filed Jan. 10, 2020, the disclosures of which are incorporated herein by reference.

STATEMENT OF GOVERNMENT SUPPORT

This invention was made with government support under GM118056 awarded by the National Institutes of Health. The Government has certain rights in the invention.

TECHNICAL FIELD

The disclosure provides biosynthetic platforms that generate olivetolic acid and its analogues at high titers from microbes, and in cell free systems.

INCORPORATION BY REFERENCE OF SEQUENCE LISTING

Accompanying this filing is a Sequence Listing entitled, "Sequence-Listing_ST25" created on Jan. 7, 2021 and having 350,174 bytes of data, machine formatted on IBM-PC, MS-Windows operating system. The sequence listing is hereby incorporated by reference in its entirety for all purposes.

BACKGROUND

Cannabinoids are a large class of bioactive plant derived natural products that regulate the cannabinoid receptors (CB1 and CB2) of the human endocannabinoid system as well as modulating other biological systems. Cannabinoids are promising pharmacological agents with over 100 ongoing clinical trials investigating their therapeutic benefits as anticancer agents, antiemetics, anticonvulsants, analgesics and antidepressants. Further, three cannabinoid therapies have been FDA approved to treat chemotherapy induced nausea, MS spasticity and seizures associated with severe epilepsy. Despite its important role in medicine, the low abundance in the native plant as well as the legal scheduling of *Cannabis* has hindered in-depth studies to unravel the biology of cannabinoids and hence wider medicinal applications.

SUMMARY

The disclosure provides a biosynthetic platform comprising a series of enzymes that produce olivetolic acid and analogues thereof from simpler metabolites, the series of enzymes comprising: a non-reducing polyketide synthase (NRPKS) that converts a set of metabolites comprising hexanoyl-CoA, hexanoic acid, octanoyl-CoA, octanoic acid, and/or analogs thereof to an aromatic diol metabolite; and a thioesterase that converts the aromatic diol metabolite to olivetolic acid and analogues thereof. In one embodiment, the platform further comprises a highly-reducing polyketide synthase (HRPKS) that utilizes acetyl-CoA, malonyl-CoA, and NADPH to synthesize the set of metabolites selected from hexanoyl-CoA, hexanoic acid, octanoyl-CoA, octanoic acid, and/or analogs thereof (e.g., butyric acid, hexenoic acid, octenoice acid, decanoic acid, decenoic acid, lauric acid, nanonoic acid and related co-A equivalents etc.). In one embodiment the analogs of hexanoyl-CoA, hexanoic acid, octanoyl-CoA, octanoic acid vary in the C6 or C8 acyl chains. In another or further embodiment, the analogues of olivetolic acid comprise 2-heptyl-4,6-dihydroxybenzoic acid, (E)-2-(hept-1-en-1-yl)-4,6-dihydroxybenzoic acid, and (E)-2,4-dihydroxy-6-(pent-1-en-1-yl) benzoic acid. In still another or further embodiment, one or more of the enzymes making up the biosynthetic platform are from fungi. In yet another embodiment of any of the foregoing the series of enzymes making up the up the biosynthetic platform are from *Metarhizium anisopliae*. In still another embodiment of any of the foregoing the NRPKS has a sequence that is at least 50%, 60%, 70%, 80%, 90%, 95%, 98%, or 99% identical to the sequence of SEQ ID NO:4. In a further embodiment, the NRPKS has a sequence that is at least 95%, 98%, or 99% identical to the sequence of SEQ ID NO:2, and which contains from 1 to 20 conservative amino acid substitutions. In still a further embodiment, the NRPKS comprises the sequence of SEQ ID NO:4. In another embodiment of any of the foregoing, the TE has a sequence that is at least 50%, 60%, 70%, 80%, 90%, 95%, 98%, or 99% identical to the sequence of SEQ ID NO:3. In a further embodiment, the TE has a sequence that is at least 95%, 98%, or 99% identical to the sequence of SEQ ID NO:6, and which contains from 1 to 20 conservative amino acid substitutions. In yet a further embodiment, the TE comprises the sequence of SEQ ID NO:6. In still another embodiment of any of the foregoing embodiments, the HRPKS has a sequence that is at least 50%, 60%, 70%, 80%, 90%, 95%, 98%, or 99% identical to the sequence of SEQ ID NO:2. In a further embodiment, the HRPKS has a sequence that is at least 95%, 98%, or 99% identical to the sequence of SEQ ID NO:2, and which contains from 1 to 20 conservative amino acid substitutions. In still a further embodiment, the HRPKS comprises the sequence of SEQ ID NO:2.

The disclosure also provides a linear expression template (LET) for expressing the biosynthetic platform in a cell-free system comprising polynucleotide sequences that encode the series of enzymes making up the biosynthetic platform of any of the foregoing embodiments. In yet another embodiment, the LET comprises: a polynucleotide sequence that encodes a polypeptide having HRPKS activity and having a sequence that is at least 95%, 98%, or 99% identical to the sequence of SEQ ID NO:2; a polynucleotide sequence that encodes a polypeptide having NRPKS activity and a sequence that is at least 95%, 98%, or 99% identical to the sequence of SEQ ID NO:4; a polynucleotide sequence that encodes a polypeptide having TE activity and having a sequence that is at least 95%, 98%, or 99% identical to the sequence of SEQ ID NO:6.

The disclosure also provides a plasmid(s) or vector(s) which comprises polynucleotide sequences that encode the series of enzymes making up the biosynthetic platform as described herein. In one embodiment, a first plasmid comprises a polynucleotide sequence that encodes a polypeptide having HRPKS activity and having a sequence that is at least 95%, 98%, or 99% identical to the sequence of SEQ ID NO:2; a second plasmid comprises a polynucleotide sequence that encodes a polypeptide having NRPKS activity and a sequence that is at least 95%, 98%, or 99% identical to the sequence of SEQ ID NO:4; and wherein a third plasmid comprises a polynucleotide sequence that encodes a polypeptide having TE activity and having a sequence that is at least 95%, 98%, or 99% identical to the sequence of SEQ ID NO:6.

The disclosure also provides a recombinant microorganism comprising the plasmid(s) or vector(s) of the disclosure. In one embodiment, the recombinant microorganism is a bacterium, an archaeum, or a fungus. In a further embodiment, the recombinant microorganism is a bacterium selected from the group consisting of *Escherichia coli*, *Rodhobacter sphaeroides*, *Pseudoalteromonas haloplanktis*, *Shewanella* sp. strain Ac10, *Pseudomonas fluorescens*, *Pseudomonas putida*, *Pseudomonas aeruginosa*, *Halomonas elongata*, *Chromohalobacter salex'igens*, *Streptomyces lividans*, *Streptomyces griseus*, *Nocardia lactamdurans*, *Mycobacterium smegmatis*, *Corynebacterium glutamicum*, *Corynebacterium ammoniagenes*, *Brevibacterium lactofermentum*, *Bacillus subtilis*, *Bacillus brevis*, *Bacillus megaterium*, *Bacillus licheniformis*, *Bacillus amyloliquefaciens*, *Lactococcus lactis*, *Lactobacillus plantarum*, *Lactobacillus casei*, *Lactobacillus reuteri*, and *Lactobacillus gasseri*. In another embodiment, the recombinant microorganism is *Escherichia* or *Pseudomonas putida*. In still another embodiment, the recombinant microorganism is a bacterium selected from the group consisting of *Saccharomyces cerevisiae*, *Kluyveromyces lactis*, *Pichia pastoris*, *Hansenula polymorpha*, *Yarrowia lipolytica*, *Aspergillus nidulans*, *Trichoderma reesei*, *Fusarium oxysporum*, *Phanerochaete chrysosporium*, *Ashbya gossypii*, *A. oryzae*, and *Chrysosporium lucknowense*. In another embodiment, the recombinant microorganism is *Aspergillus nidulans* or *Saccharomyces cerevisiae*.

The disclosure also provides a method to produce olivetolic acid and analogues thereof comprising culturing a recombinant microorganism of the disclosure. In one embodiment, the method further comprises isolating and purifying the olivetolic acid and analogues thereof.

For example, in the studies presented herein, a biosynthetic platform or cluster originating from, for example, the fungus *Metarhizium anisopliae* afforded olivetolic acid and its analogues at high yields. The biosynthetic platform comprises: (1) a highly-reducing polyketide synthase (HRPKS), (2) a non-reducing polyketide synthase (NRPKS), and (3) a thioesterase (TE). The HRPKS utilizes acetyl-CoA, malonyl-CoA, and NADPH to synthesize the C6 or C8 acyl chains tethered on acyl-carrier protein (ACP). The ACP domain of the HRPKS shuttles the acyl thioester to starter unit acyl-carrier protein transacylase (SAT) domain of NRPKS. After three decarboxylative condensations catalyzed by ketosynthase (KS) domain and aromatization by product template (PT) domain, the TE hydrolyzes the product from NRPKS to start the next catalytic cycle. Due to the synthetic capability of HRPKS and relaxed substrate selectivity of the NRPKS SAT domain, high-titer olivetolic acid and three analogues differing in acyl chain lengths and saturation degrees can be accessed. The aforementioned enzymes were heterologously expressed in *Aspergillus nidulans* and olivetolic acid and its analogues were obtained with a total titer of >4 g/L without any metabolic optimization. In practice, the biosynthetic platform can also be expressed in other microbial systems to produce olivetolic acid and its analogues, including in *E. coli* and yeast.

DESCRIPTION OF DRAWINGS

FIG. 2A-B provides an embodiment of a biosynthetic pathway of the disclosure used to produce olivetolic acid and its analogues. (A) A biosynthetic pathway of the disclosure comprising OVA from *Metarhizium anisopliae* ARSEF23. (B) Heterologous expression of the biosynthetic pathway affords olivetolic acid and its analogues.

FIG. 3 provides a liquid chromatography (LC) trace of production of olivetolic acid and its analogues from a liquid flask culture.

DETAILED DESCRIPTION

Figure 1:
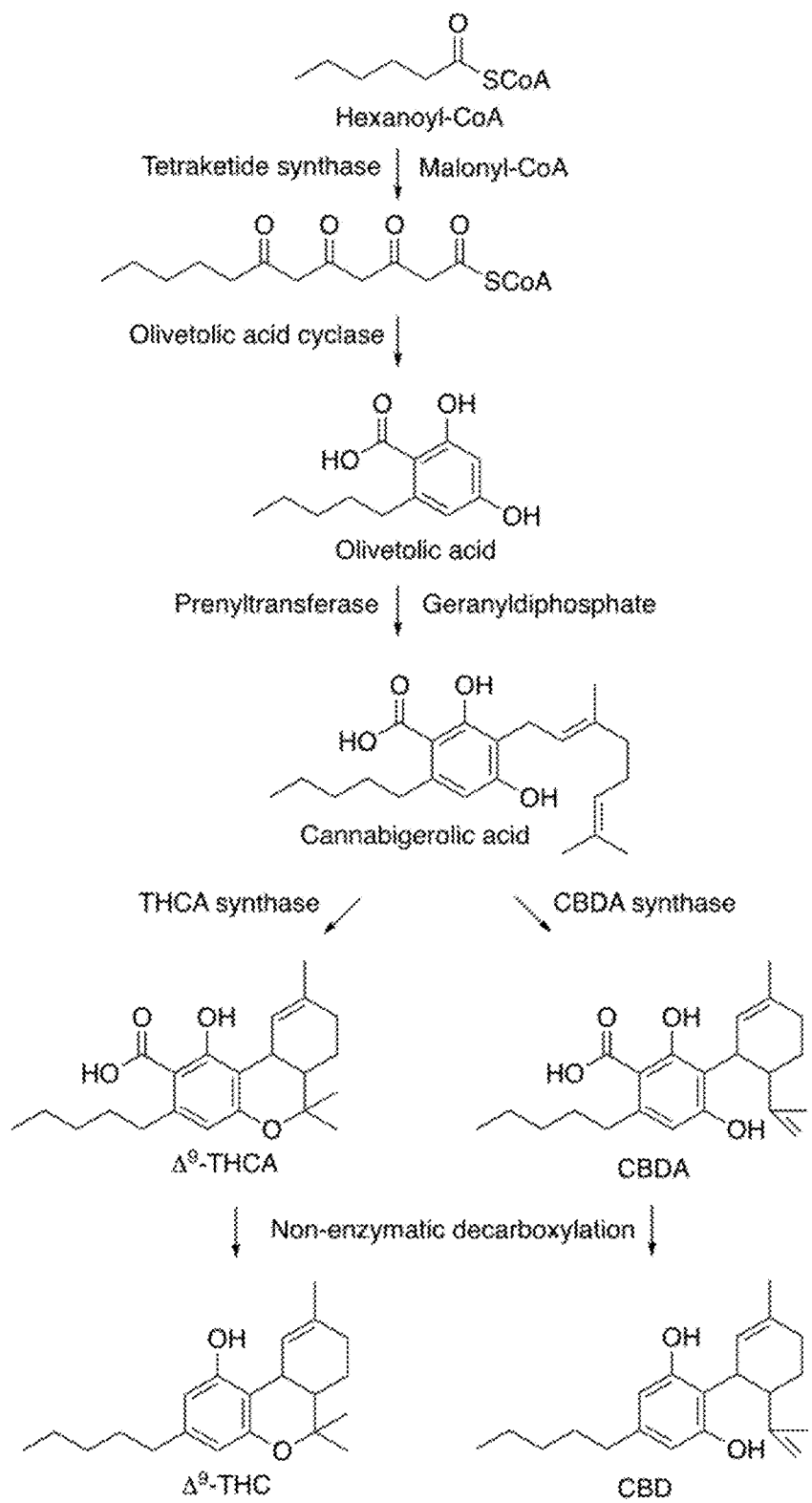
FIG. 1 demonstrates that for the biosynthesis of cannabinoids, olivetolic acid plays a central role.

As used herein and in the appended claims, the singular forms "a," "an," and "the" include plural referents unless the context clearly dictates otherwise. Thus, for example, reference to "a polyketide synthase" includes a plurality of such polyketide synthases and reference to "the cannabinoid intermediate" includes reference to one or more cannabinoid intermediates and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although many methods and reagents are similar or equivalent to those described herein, the exemplary methods and materials are disclosed herein.

All publications mentioned herein are incorporated herein by reference in full for the purpose of describing and disclosing the methodologies, which might be used in connection with the description herein. Moreover, with respect to any term that is presented in one or more publications that is similar to, or identical with, a term that has been expressly defined in this disclosure, the definition of the term as expressly provided in this disclosure will control in all respects.

It should be understood that this invention is not limited to the particular methodology, protocols, and reagents, etc., described herein and as such may vary. The terminology used herein is for the purpose of describing particular embodiments only and is not intended to limit the scope of the present invention, which is defined solely by the claims.

Other than in the operating examples, or where otherwise indicated, all numbers expressing quantities of ingredients or reaction conditions used herein should be understood as modified in all instances by the term "about." The term "about" when used to described the present invention, in connection with percentages means±1%.

As used herein, an "activity" of an enzyme is a measure of its ability to catalyze a reaction resulting in a metabolite, i.e., to "function", and may be expressed as the rate at which the metabolite of the reaction is produced. For example, enzyme activity can be represented as the amount of metabolite produced per unit of time or per unit of enzyme (e.g., concentration or weight), or in terms of affinity or dissociation constants.

The term "biosynthetic pathway", refers to a multi-step, enzyme-catalyzed process where substrates are converted into more complex products or degraded in a stepwise manner. The prerequisite elements for biosynthetic pathways typically include: precursor compounds (substrates), optionally chemical energy (e.g., ATP), and catalytic enzymes which may require coenzymes (e.g., NADH, NADPH). The disclosure provides biosynthetic pathways to produce olivetolic acid and analogues of olivetolic acid from simpler precursor compounds, such as, acetyl-CoA and malonyl-CoA. The disclosure also provides for a recombinant microorganism that expresses a biosynthetic pathway disclosed herein for the production of olivetolic acid and analogues of olivetolic acid. In a particular embodiment, the biosynthetic pathway disclosed herein comprises one or more polyketide synthases. In a further embodiment, the biosynthetic pathway disclosed herein comprises one or more thioesterases. In certain embodiments, an engineered microorganism comprising a biosynthetic pathway of the disclosure comprises at least one enzyme selected from a polyketide synthase or a thioesterase that is heterologous to the engineered microorganism.

An "enzyme" means any substance, typically composed wholly or largely of amino acids making up a protein or polypeptide that catalyzes or promotes, more or less specifically, one or more chemical or biochemical reactions.

The term "expression" with respect to a gene or polynucleotide refers to transcription of the gene or polynucleotide and, as appropriate, translation of the resulting mRNA transcript to a protein or polypeptide. Thus, as will be clear from the context, expression of a protein or polypeptide results from transcription and translation of the open reading frame.

A "metabolite" refers to any substance produced by metabolism or a substance necessary for or taking part in a particular metabolic process that gives rise to a desired metabolite, chemical, alcohol or polyketide etc. A metabolite can be an organic compound that is a starting material (e.g., a carbohydrate, a sugar phosphate, pyruvate etc.), an intermediate (e.g., acetyl-coA), or an end product (e.g., olivetolic acid) of metabolism. Metabolites can be used to construct more complex molecules, or they can be broken down into simpler ones. Intermediate metabolites may be synthesized from other metabolites, perhaps used to make more complex substances, or broken down into simpler compounds, sometimes with the release of chemical energy.

As used herein, the term "metabolically engineered" or "metabolic engineering" involves rational pathway design and assembly of biosynthetic genes, genes associated with operons, and control elements of polynucleotides, for the production of a desired metabolite, such as hexanoyl-CoA, or end products, like olivetolic acid or analogues thereof, in a microorganism, or in a cell-free system. The rational pathway design and assembly of a biosynthetic pathway can include co-factors for the production of a desired metabolite. "Metabolically engineered" can further include optimization of metabolic flux by regulation and optimization of transcription, translation, protein stability and protein functionality using genetic engineering and appropriate culture condition including the reduction of, disruption, or knocking out of, a competing metabolic pathway that competes with an intermediate leading to a desired pathway. For example, in a cell free system a host cell expressing one or more enzymes used in the cell-free system can be further engineered to eliminate or remove competing pathway enzymes thereby removing contaminants or enzymes that may be present in a disrupted or cell-free preparation.

A biosynthetic gene can be heterologous to the host microorganism, either by virtue of being foreign to the host, or being modified by mutagenesis, recombination, and/or association with a heterologous expression control sequence in an endogenous host cell. In one embodiment, where the polynucleotide is xenogenetic to the host organism, the polynucleotide can be codon optimized.

The term "polynucleotide," "nucleic acid" or "recombinant nucleic acid" refers to polynucleotides such as deoxyribonucleic acid (DNA), and, where appropriate, ribonucleic acid (RNA). It should be recognized that, unless clearly indicated otherwise, any sequence that includes "T", the sequence can be modified by replacing "T" with "U".

A "protein" or "polypeptide", which terms are used interchangeably herein, comprises one or more chains of chemical building blocks called amino acids that are linked together by chemical bonds called peptide bonds. A protein or polypeptide can function as an enzyme.

The term "recombinant microorganism" and "recombinant host cell" are used interchangeably herein and refer to microorganisms that have been genetically modified to express heterologous polynucleotides or over-express endogenous polynucleotides, or to express non-expressed endogenous polynucleotides. The polynucleotide generally encodes a target enzyme involved in a metabolic pathway for producing a desired metabolite as described herein, but may also include protein factors necessary for regulation or activity or transcription. Accordingly, recombinant microorganisms described herein have been genetically engineered to express or over-express target enzymes not previously expressed or over-expressed by a parental microorganism. It is understood that the terms "recombinant microorganism" and "recombinant host cell" refer not only to the particular recombinant microorganism but to the progeny or potential progeny of such a microorganism. It should also be understood that the recombinant microorganism can be used as a source of the polypeptide and that the recombinant microorganism need not have the full pathway for the generation of a desired metabolite. Rather, a plurality of recombinant microorganisms each having one or more, but not all, of the polypeptide for a metabolic pathway can be cocultured to produce the desired metabolite or can be disrupted and the cell-free milieu used or the expressed polypeptide isolated from each of the recombinant microorganisms.

The term "substrate" or "suitable substrate" refers to any substance or compound that is converted or meant to be converted into another compound by the action of an enzyme. The term includes not only a single compound, but also combinations of compounds, such as solutions, mixtures and other materials which contain at least one substrate, or derivatives thereof. Further, the term "substrate" encompasses not only compounds that provide a carbon source suitable for use as a starting material, but also intermediate and end product metabolites used in a pathway as described herein. In addition, a substrate can be an oxidized or reduced co-factor or a factor that is phosphorylated or de-phosphorylated.

Scalable chemical synthesis of cannabinoids remains a challenging task due to the complex structures of cannabinoids. However, in view of the unprecedented demand for cannabinoids as a treatment option for any number of disorders, a sustainable approach to obtain cannabinoids at high titers would have great utility. Cannabinoids are derived from a combination of fatty acid, polyketide, and terpene biosynthetic pathways that generate the key building blocks geranyl pyrophosphate (GPP) and olivetolic acid (OA). A bottleneck in microbial fermentation of cannabinoids is olivetolic acid (OA), a central intermediate that links simple building blocks to complex later-stage compounds (e.g., see FIG. 1). To date, many fermentation-based processes for the synthesis of olivetolic acid have been developed. For example, starting from hexanoyl-CoA, construction of olivetolic acid by the tandem action of a polyketoacyl-CoA thiolase and olivetolic acid cyclase (OAC) has been proposed. Additional proposals have suggested that certain geranyl transferases can be used to convert olivetolic acid to cannabigerolic acid. For both proposals, there is a reliance on the tandem usage of two enzymes—tetraketide synthase (TKS) and olivetolic acid cyclase (OAC), both of which originate from *Cannabis sativa*. The disadvantages of using such a strategy are two-fold: (i) the availability of starting unit hexanoyl-CoA is usually low in microbial hosts, which limits the final yield of cannabinoids; and (ii) the tandem usage of TKS and OAC only affords one product, olivetolic acid, however, generation of additional cannabinoid analogues would be especially beneficial in determining structure/activity of minor changes in the cannabinoid base structure.

The disclosure provides an objective technical solution for the above problem by providing biosynthetic platforms/clusters that can generate hexanoyl-CoA in situ, and further, exhibit product flexibility by producing not only olivetolic (OA), but also close structural analogs thereof. Further, the biosynthetic pathways described herein can utilize OA synthases and OA cyclases derived from non-plant organisms, facilitating the production of OA and OA analogs from microbial production systems.

In a particular embodiment, the disclosure provides for a cell-free biosystem to produce olivetolic acid and analogues thereof, comprising a biosynthetic platform disclosed herein. Microbial systems can be hampered by a variety of technical challenges that make it hard to achieve cost competitiveness, including poor yields due to competing pathways; low productivity caused by slow growth rates or difficulties in pathway optimization; contaminating microbial growth; product toxicity; and expensive product isolation. In contrast, cell-free biosystems can avoid many of these problems. For example, cell-free biosystems have several advantages suitable in industrial applications: a higher level of flexibility in pathway design; greater control over component optimization; more rapid design-build-test cycles; and freedom from cell toxicity of intermediates or products. In vitro biosystems can implement biological reactions that living microbes or chemical catalysts cannot implement. Enzymatic systems, without the barrier of cellular membrane, typically have faster reaction rates than microbial systems. For instance, enzymatic fuel cells usually have much higher power outputs than microbial fuel cells. Enzyme cocktails also tolerate toxic compounds better than microorganisms. Enzyme mixtures usually work under broad reaction conditions, such as high temperature, low pH, the presence of organic solvents or ionic liquids. Building single, dedicated pathways in vitro can eliminate side reactions that occur in the cell, so that nearly 100% yields and fast reaction times are possible.

Common components of cell-free biosystems include a cell extract, an energy source, a supply of amino acids, cofactors such as magnesium, and the DNA with the desired genes. A cell extract is obtained by lysing the cell of interest and centrifuging out the cell walls, DNA genome, and other debris. The remains are the necessary cell machinery including ribosomes, aminoacyl-tRNA synthetases, translation initiation and elongation factors, nucleases, etc.

Two types of DNA are commonly used in cell-free biosystems: plasmids and linear expression templates (LETS). Plasmids are circular, and only made inside cells. LETs can be made much more effectively via PCR, which replicates DNA much faster than raising cells in an incubator. While LETs are easier and faster to make, plasmid yields are usually much higher in cell free preparations. Because of this, more research has been focused on optimizing cell-free preparation LET-yields to approach the yields of cell-free preparations with plasmids. An energy source is typically part of a cell-free reaction. Usually, a separate mixture containing the needed energy source, along with a supply of amino acids, is added to the extract for the reaction. Common sources are phosphoenolpyruvate, acetyl phosphate, and creatine phosphate.

In one embodiment, the disclosure provides for use of plasmid-based cell free biosystems comprising a biosynthetic platform disclosed herein that is used to produce olivetolic acid and analogues. The plasmids or vectors used for such a system can be the same vectors used in the Examples presented below or constructs comprising the polynucleotides encoding the HRPKS, NRPKS and WAC-TE polypeptides described more fully below. In another embodiment, a cell free-system is generated by cell free extracts. In this embodiment, the various enzymes of the biosynthesis platform of disclosure, e.g., HRPKS, NRPKS, and WAC-TE, are expressed in a microbe, extracted and used as a crude extract in a cell-free biosystem. Alternatively, the various enzymes may be further purified prior to use in the cell-free biosystem. Any number of techniques known in the art may be used to purify the enzymes of the biosystem disclosed herein, including use of affinity chromatography (e.g., metal binding, immunoaffinity, protein tags, etc.); electrophoresis; HPLC and LC chromatography based methods (e.g., size exclusion chromatography, ion-exchange chromatography, reverse-phase chromatography, cation exchange chromatography); filtration techniques (e.g., gel filtration); immunoblotting; and centrifugation.

The disclosure provides for use of LET-based cell free biosystems comprising a biosynthetic platform disclosed herein that is used to produce olivetolic acid and analogues. Linear expression templates can be rapidly generated by PCR, allowing multiple constructs to be screened quickly and easily. Expression vectors enable protein production to be up-scaled. Either the genes of interest are directly inserted into an expression vector or linear templates are generated first by PCR and subsequently cloned. Protein yields achieved are sufficient for extended functional and structural analysis, or production of labeled proteins for NMR spectroscopic or X-ray crystallographic studies. LET kits can be purchased commercially from various vendors, like biotechrabbit.

The disclosure further provides for engineered microorganisms that comprise and/or are used to express a biosynthetic platform of the disclosure.

The term "microorganism" includes prokaryotic and eukaryotic microbial species from the Domains Archaea, Bacteria and Eucarya, the latter including yeast and filamentous fungi, protozoa, algae, or higher Protista. The terms "microbial cells" and "microbes" are used interchangeably with the term microorganism.

The term "prokaryotes" is art recognized and refers to cells which contain no nucleus or other cell organelles. The prokaryotes are generally classified in one of two domains, the Bacteria and the Archaea. The definitive difference between organisms of the Archaea and Bacteria domains is based on fundamental differences in the nucleotide base sequence in the 16S ribosomal RNA.

The term "Archaea" refers to a categorization of organisms of the division Mendosicutes, typically found in unusual environments and distinguished from the rest of the procaryotes by several criteria, including the number of ribosomal proteins and the lack of muramic acid in cell walls. On the basis of ssrRNA analysis, the Archaea consist of two phylogenetically-distinct groups: Crenarchaeota and Euryarchaeota. On the basis of their physiology, the Archaea can be organized into three types: methanogens (prokaryotes that produce methane); extreme halophiles (prokaryotes that live at very high concentrations of salt ([NaCl]); and extreme (hyper) *thermophilus* (prokaryotes that live at very high temperatures). Besides the unifying archaeal features that distinguish them from Bacteria (i.e., no murein in cell wall, ester-linked membrane lipids, etc.), these prokaryotes exhibit unique structural or biochemical attributes which adapt them to their particular habitats. The Crenarchaeota consists mainly of hyperthermophilic sulfur-dependent prokaryotes and the Euryarchaeota contains the methanogens and extreme halophiles.

"Bacteria", or "eubacteria", refers to a domain of prokaryotic organisms. Bacteria include at least 11 distinct groups as follows: (1) Gram-positive (gram+) bacteria, of which there are two major subdivisions: (1) high G+C group (Actinomycetes, Mycobacteria, *Micrococcus*, others) (2) low G+C group (*Bacillus, Clostridia, Lactobacillus*, Staphylococci, Streptococci, Mycoplasmas); (2) Proteobacteria, e.g., Purple photosynthetic+non-photosynthetic Gram-negative bacteria (includes most "common" Gram-negative bacteria); (3) *Cyanobacteria*, e.g., oxygenic phototrophs; (4) Spirochetes and related species; (5) *Planctomyces*; (6) *Bacteroides, Flavobacteria*; (7) *Chlamydia*; (8) Green sulfur bacteria; (9) Green non-sulfur bacteria (also anaerobic phototrophs); (10) Radioresistant micrococci and relatives; and (11) *Thermotoga* and *Thermosipho thermophiles*.

"Gram-negative bacteria" include cocci, nonenteric rods, and enteric rods. The genera of Gram-negative bacteria include, for example, *Neisseria, Spirillum, Pasteurella, Brucella, Yersinia, Francisella, Haemophilus, Bordetella, Escherichia, Salmonella, Shigella, Klebsiella, Proteus, Vibrio, Pseudomonas, Bacteroides, Acetobacter, Aerobacter, Agrobacterium, Azotobacter, Spirilla, Serratia, Vibrio, Rhizobium, Chlamydia, Rickettsia, Treponema*, and *Fusobacterium*.

"Gram positive bacteria" include cocci, nonsporulating rods, and sporulating rods. The genera of gram positive bacteria include, for example, *Actinomyces, Bacillus, Clostridium, Corynebacterium, Erysipelothrix, Lactobacillus, Listeria, Mycobacterium, Myxococcus, Nocardia, Staphylococcus, Streptococcus*, and *Streptomyces*.

Accordingly, the disclosure provides "engineered" or "modified" microorganisms that are produced via the introduction of genetic material into a host or parental microorganism of choice thereby modifying or altering the cellular physiology and biochemistry of the microorganism. Through the introduction of genetic material, the parental microorganism acquires new properties, e.g., the ability to produce a new, or greater quantities of, an intracellular metabolite. The genetic material introduced into the parental microorganism contains gene(s), or parts of gene(s), coding for one or more of the enzymes involved in a biosynthetic platform and include gene(s), or parts of gene(s), coding for one or more of the enzymes involved in producing olivetolic acid and analogues thereof, and may also include additional elements for the expression and/or regulation of expression of these genes, e.g., promoter sequences. Microorganisms that can be engineered to express a biosynthetic pathway disclosed herein include, bacteria, archaea, algal, and fungi. Examples of suitable bacteria that can be engineered to express a biosynthetic pathway disclosed herein, include *Escherichia coli., Rodhobacter sphaeroides, Pseudoalteromonas haloplanktis, Shewanella* sp. strain Ac10, *Pseudomonas fluorescens, Pseudomonas putida, Pseudomonas aeruginosa, Halomonas elongata, Chromohalobacter salexigens, Streptomyces lividans, Streptomyces griseus, Nocardia lactamdurans, Mycobacterium smegmatis, Corynebacterium glutamicum, Corynebacterium ammoniagenes, Brevibacterium lactofermentum, Bacillus subtilis, Bacillus brevis, Bacillus megaterium, Bacillus licheniformis, Bacillus amyloliquefaciens, Lactococcus lactis, Lactobacillus plantarum, Lactobacillus casei, Lactobacillus reuteri*, and *Lactobacillus gasseri*. Examples of suitable archaea that can be engineered to express a biosynthetic pathway disclosed herein, *Methanocaldococcus (Methanococcus) jannaschii*, and *Sulfolobus solfataricus*. Examples of suitable fungi that can be engineered to express a biosynthetic pathway disclosed herein, include *Saccharomyces cerevisiae, Kluyveromyces lactis, Pichia pastoris, Hansenula polymorpha, Yarrowia lipolytica, Aspergillus nidulans, Trichoderma reesei, Fusarium oxysporum, Phanerochaete chrysosporium, Ashbya gossypii, A. oryzae*, and *Chrysosporium lucknowense*.

An engineered or modified microorganism can also include in the alternative or in addition to the introduction of a genetic material into a host or parental microorganism, the disruption, deletion or knocking out of a gene or polynucleotide to alter the cellular physiology and biochemistry of the microorganism. Through the reduction, disruption or knocking out of a gene or polynucleotide the microorganism acquires new or improved properties (e.g., the ability to produce a new or greater quantity of an intracellular metabolite, improve the flux of a metabolite down a desired pathway, and/or reduce the production of undesirable by-products). For example, it may be desirable to engineer an organism to express a desired set for enzymes in a metabolic pathway while eliminating enzymes of competing pathways. This engineering can be applicable for both in vitro (where upon disruption or purification undesirable enzymes are not present) or in vivo.

A "native" or "wild-type" protein, enzyme, polynucleotide, gene, or cell, means a protein, enzyme, polynucleotide, gene, or cell that occurs in nature.

A "parental microorganism" refers to a cell used to generate a recombinant microorganism. The term "parental microorganism" describes, in one embodiment, a cell that occurs in nature, i.e. a "wild-type" cell that has not been genetically modified. The term "parental microorganism" further describes a cell that serves as the "parent" for further engineering. In this latter embodiment, the cell may have been genetically engineered, but serves as a source for further genetic engineering.

For example, a wild-type microorganism can be genetically modified to express or over express a first target enzyme such as a HRPKS. This microorganism can act as a parental microorganism in the generation of a microorganism modified to express or over-express a second target enzyme. As used herein, "express" or "over express" refers to the phenotypic expression of a desired gene product. In one embodiment, a naturally occurring gene in the organism can be engineered such that it is linked to a heterologous promoter or regulatory domain, wherein the regulatory domain causes expression of the gene, thereby modifying its normal expression relative to the wild-type organism. Alternatively, the organism can be engineered to remove or reduce a repressor function on the gene, thereby modifying its expression. In yet another embodiment, a cassette comprising the gene sequence operably linked to a desired expression control/regulatory element is engineered in to the microorganism.

Accordingly, a parental microorganism functions as a reference cell for successive genetic modification events. Each modification event can be accomplished by introducing one or more nucleic acid molecules in to the reference cell. The introduction facilitates the expression or overexpression of one or more target enzyme or the reduction or elimination of one or more target enzymes. It is understood that the term "facilitates" encompasses the activation of endogenous polynucleotides encoding a target enzyme through genetic modification of e.g., a promoter sequence in a parental microorganism. It is further understood that the term "facilitates" encompasses the introduction of exogenous polynucleotides encoding a target enzyme in to a parental microorganism.

Polynucleotides that encode enzymes for producing olivetolic acid and analogues thereof, include homologs, variants, fragments, related fusion proteins, or functional equivalents thereof, are used in recombinant nucleic acid molecules that direct the expression of such polypeptides in appropriate host cells, such as bacterial or yeast cells.

It is understood that a polynucleotide described herein include "genes" and that the nucleic acid molecules described above include "vectors" or "plasmids." Accordingly, the term "gene", also called a "structural gene" refers to a polynucleotide that codes for a particular polypeptide comprising a sequence of amino acids, which comprise all or part of one or more proteins or enzymes, and may include regulatory (non-transcribed) DNA sequences, such as promoter region or expression control elements, which determine, for example, the conditions under which the gene is expressed. The transcribed region of the gene may include untranslated regions, including introns, 5'-untranslated region (UTR), and 3'-UTR, as well as the coding sequence.

Those of skill in the art will recognize that, due to the degenerate nature of the genetic code, a variety of codons differing in their nucleotide sequences can be used to encode a given amino acid. A particular polynucleotide or gene sequence encoding a biosynthetic enzyme or polypeptide described herein (e.g., SEQ ID NO:2) are referenced herein merely to illustrate an embodiment of the disclosure, and the disclosure includes polynucleotides of any sequence that encode a polypeptide comprising the same amino acid sequence of the polypeptides and proteins of the enzymes utilized in the methods of the disclosure or polypeptide sequences that are at least 50%-99% identical thereto and have the same biological activity as a sequence having 100% identity. For example, a polypeptide can typically tolerate one or more amino acid substitutions, deletions, and insertions in its amino acid sequence without loss or significant loss of a desired activity. The disclosure includes such polypeptides with alternate amino acid sequences, and the amino acid sequences shown herein merely illustrate exemplary embodiments of the disclosure.

The disclosure provides polynucleotides in the form of recombinant DNA expression vectors or plasmids, as described in more detail elsewhere herein, that encode one or more target enzymes. Generally, such vectors can either replicate in the cytoplasm of the host microorganism or integrate into the chromosomal DNA of the host microorganism or can be used in cell-free systems. In either case, the vector can be a stable vector (i.e., the vector remains present over many cell divisions, even if only with selective pressure) or a transient vector (i.e., the vector is gradually lost by host microorganisms with increasing numbers of cell divisions). The disclosure provides DNA molecules in isolated (i.e., not pure, but existing in a preparation in an abundance and/or concentration not found in nature) and purified (i.e., substantially free of contaminating materials or substantially free of materials with which the corresponding DNA would be found in nature) form.

A polynucleotide of the disclosure can be amplified using cDNA, mRNA or, alternatively, genomic DNA, as a template and appropriate oligonucleotide primers according to standard PCR amplification techniques and those procedures described in the Examples section below. The nucleic acid so amplified can be cloned into an appropriate vector and characterized by DNA sequence analysis. Furthermore, oligonucleotides corresponding to nucleotide sequences can be prepared by standard synthetic techniques, e.g., using an automated DNA synthesizer.

It is also understood that an isolated polynucleotide molecule encoding a polypeptide homologous to the enzymes described herein can be created by introducing one or more nucleotide substitutions, additions or deletions into the nucleotide sequence encoding the particular polypeptide, such that one or more amino acid substitutions, additions or deletions are introduced into the encoded protein. Mutations can be introduced into the polynucleotide by standard techniques, such as site-directed mutagenesis and PCR-mediated mutagenesis. In contrast to those positions where it may be desirable to make a non-conservative amino acid substitution, in some positions it is preferable to make conservative amino acid substitutions.

As will be understood by those of skill in the art, it can be advantageous to modify a coding sequence to enhance its expression in a particular host. The genetic code is redundant with 64 possible codons, but most organisms typically use a subset of these codons. The codons that are utilized most often in a species are called optimal codons, and those not utilized very often are classified as rare or low-usage codons. Codons can be substituted to reflect the preferred codon usage of the host, a process sometimes called "codon optimization" or "controlling for species codon bias."

Optimized coding sequences containing codons preferred by a particular prokaryotic or eukaryotic host (see also, Murray et al. (1989) Nucl. Acids Res. 17:477-508) can be prepared, for example, to increase the rate of translation or to produce recombinant RNA transcripts having desirable properties, such as a longer half-life, as compared with transcripts produced from a non-optimized sequence. Translation stop codons can also be modified to reflect host preference. For example, typical stop codons for *S. cerevisiae* and mammals are UAA and UGA, respectively. The typical stop codon for monocotyledonous plants is UGA, whereas insects and *E. coli* commonly use UAA as the stop codon (Dalphin et al. (1996) Nucl. Acids Res. 24: 216-218).

"Transformation" refers to the process by which a vector is introduced into a host cell. Transformation (or transduction, or transfection), can be achieved by any one of a number of means including electroporation, microinjection, biolistics (or particle bombardment-mediated delivery), or *agrobacterium* mediated transformation.

A "vector" generally refers to a polynucleotide that can be propagated and/or transferred between organisms, cells, or cellular components. Vectors include viruses, bacteriophage, pro-viruses, plasmids, phagemids, transposons, and artificial chromosomes such as YACs (yeast artificial chromosomes), BACs (bacterial artificial chromosomes), and PLACs (plant artificial chromosomes), and the like, that are "episomes," that is, that replicate autonomously or can integrate into a chromosome of a host cell. A vector can also be a naked RNA polynucleotide, a naked DNA polynucleotide, a polynucleotide composed of both DNA and RNA within the same strand, a poly-lysine-conjugated DNA or RNA, a peptide-conjugated DNA or RNA, a liposome-conjugated DNA, or the like, that are not episomal in nature, or it can be an organism which comprises one or more of the above polynucleotide constructs such as a bacterium or a fungus.

The various components of an expression vector can vary widely, depending on the intended use of the vector and the host cell(s) in which the vector is intended to replicate or drive expression. Expression vector components suitable for the expression of genes and maintenance of vectors in bacteria, yeast, filamentous fungi, and other commonly used cells are widely known and commercially available. For example, suitable promoters for inclusion in the expression vectors of the disclosure include those that function in eukaryotic or prokaryotic host microorganisms. Promoters can comprise regulatory sequences that allow for regulation of expression relative to the growth of the host microorganism or that cause the expression of a gene to be turned on or off in response to a chemical or physical stimulus. For *E. coli* and certain other bacterial host cells, promoters derived from genes for biosynthetic enzymes, antibiotic-resistance conferring enzymes, and phage proteins can be used and include, for example, the galactose, lactose (lac), maltose, tryptophan (trp), beta-lactamase (bla), bacteriophage lambda PL, and T5 promoters. In addition, synthetic promoters, such as the tac promoter (U.S. Pat. No. 4,551,433, which is incorporated herein by reference in its entirety), can also be used. For *E. coli* expression vectors, it is useful to include an *E. coli* origin of replication, such as from pUC, p1P, p1, and pBR.

Thus, recombinant expression vectors contain at least one expression system for a biosynthetic platform disclosed herein, which, in turn, is composed of at least a portion of a gene coding sequences operably linked to a promoter and optionally termination sequences that operate to effect expression of the coding sequence in compatible host cells. The host cells are modified by transformation with the recombinant DNA expression vectors of the disclosure to contain the expression system sequences either as extrachromosomal elements or integrated into the chromosome.

Examples of protocols sufficient to direct persons of skill through in vitro amplification methods, including the polymerase chain reaction (PCR), the ligase chain reaction (LCR), Qβ-replicase amplification and other RNA polymerase mediated techniques (e.g., NASBA), e.g., for the production of the homologous nucleic acids of the disclosure are found in Berger, Sambrook, and Ausubel, as well as in Mullis et al. (1987) U.S. Pat. No. 4,683,202; Innis et al., eds. (1990) PCR Protocols: A Guide to Methods and Applications (Academic Press Inc. San Diego, Calif.) ("Innis"); Arnheim & Levinson (Oct. 1, 1990) C&EN 36-47; The Journal Of NIH Research (1991) 3: 81-94; Kwoh et al. (1989) Proc. Natl. Acad. Sci. USA 86: 1173; Guatelli et al. (1990) Proc. Nat'l. Acad. Sci. USA 87: 1874; Lomell et al. (1989) J. Clin. Chem 35: 1826; Landegren et al. (1988) Science 241: 1077-1080; Van Brunt (1990) Biotechnology 8: 291-294; Wu and Wallace (1989) Gene 4:560; Barringer et al. (1990) Gene 89:117; and Sooknanan and Malek (1995) Biotechnology 13:563-564.

Improved methods for cloning in vitro amplified nucleic acids are described in Wallace et al., U.S. Pat. No. 5,426,039.

Improved methods for amplifying large nucleic acids by PCR are summarized in Cheng et al. (1994) Nature 369: 684-685 and the references cited therein, in which PCR amplicons of up to 40 kb are generated. One of skill will appreciate that essentially any RNA can be converted into a double stranded DNA suitable for restriction digestion, PCR expansion and sequencing using reverse transcriptase and a polymerase. See, e.g., Ausubel, Sambrook and Berger, all supra.

In addition, and as mentioned above, homologs of enzymes (e.g., HRPKS, NRPKS, and TE) of the biosynthetic platform of disclosure that are useful for producing are encompassed by the microorganisms and methods provided herein. The term "homologs" used with respect to an original enzyme or gene of a first family or species refers to distinct enzymes or genes of a second family or species which are determined by functional, structural or genomic analyses to be an enzyme or gene of the second family or species which corresponds to the original enzyme or gene of the first family or species. Most often, homologs will have functional, structural or genomic similarities. Techniques are known by which homologs of an enzyme or gene can readily be cloned using genetic probes and PCR. Identity of cloned sequences as homolog can be confirmed using functional assays and/or by genomic mapping of the genes.

A protein has "homology" or is "homologous" to a second protein if the nucleic acid sequence that encodes the protein has a similar sequence to the nucleic acid sequence that encodes the second protein. Alternatively, a protein has homology to a second protein if the two proteins have "similar" amino acid sequences. (Thus, the term "homologous proteins" is defined to mean that the two proteins have similar amino acid sequences).

As used herein, two proteins (or a region of the proteins) are substantially homologous when the amino acid sequences have at least about 50% 60%, 65%, 70%, 75%, 80%, 85%, 90%, 91%, 92%, 93%, 94%, 95%, 96%, 97%, 98%, or 99% identity. To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). In one embodiment, the length of a reference sequence aligned for comparison purposes is at least 30%, typically at least 40%, more typically at least 50%, even more typically at least 60%, and even more typically at least 70%, 80%, 90%, 100% of the length of the reference sequence. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "identity" is equivalent to amino acid or nucleic acid "homology"). The percent identity between the two sequences is a function of the number of identical positions shared by the sequences, taking into account the number of gaps, and the length of each gap, which need to be introduced for optimal alignment of the two sequences.

Sequence homology for polypeptides, which can also be referred to as percent sequence identity, is typically measured using sequence analysis software. See, e.g., the Sequence Analysis Software Package of the Genetics Computer Group (GCG), University of Wisconsin Biotechnology Center, 910 University Avenue, Madison, Wis. 53705. Protein analysis software matches similar sequences using measure of homology assigned to various substitutions, deletions and other modifications, including conservative amino acid substitutions. For instance, GCG contains programs such as "Gap" and "Bestfit" which can be used with default parameters to determine sequence homology or sequence identity between closely related polypeptides, such as homologous polypeptides from different species of organisms or between a wild type protein and a mutein thereof. See, e.g., GCG Version 6.1.

A typical algorithm used for comparing a molecule sequence to a database containing a large number of sequences from different organisms is the computer program BLAST (Altschul, 1990; Gish, 1993; Madden, 1996; Altschul, 1997; Zhang, 1997), especially blastp or tblastn (Altschul, 1997). Typical parameters for BLASTp are: Expectation value: 10 (default); Filter: seg (default); Cost to open a gap: 11 (default); Cost to extend a gap: 1 (default); Max. alignments: 100 (default); Word size: 11 (default); No. of descriptions: 100 (default); Penalty Matrix: BLOWSUM62.

When searching a database containing sequences from a large number of different organisms, it is typical to compare amino acid sequences. Database searching using amino acid sequences can be measured by algorithms other than blastp known in the art. For instance, polypeptide sequences can be compared using FASTA, a program in GCG Version 6.1. FASTA provides alignments and percent sequence identity of the regions of the best overlap between the query and search sequences (Pearson, 1990, hereby incorporated herein by reference). For example, percent sequence identity between amino acid sequences can be determined using FASTA with its default parameters (a word size of 2 and the PAM250 scoring matrix), as provided in GCG Version 6.1, hereby incorporated herein by reference.

When "homologous" is used in reference to proteins or peptides, it is recognized that residue positions that are not identical often differ by conservative amino acid substitutions. A "conservative amino acid substitution" is one in which an amino acid residue is substituted by another amino acid residue having a side chain (R group) with similar chemical properties (e.g., charge or hydrophobicity). In general, a conservative amino acid substitution will not substantially change the functional properties of a protein. In cases where two or more amino acid sequences differ from each other by conservative substitutions, the percent sequence identity or degree of homology may be adjusted upwards to correct for the conservative nature of the substitution. Means for making this adjustment are well known to those of skill in the art (see, e.g., Pearson et al., 1994, hereby incorporated herein by reference).

A "conservative amino acid substitution" is one in which the amino acid residue is replaced with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine). The following six groups each contain amino acids that are conservative substitutions for one another: 1) Serine (S), Threonine (T); 2) Aspartic Acid (D), Glutamic Acid (E); 3) Asparagine (N), Glutamine (Q); 4) Arginine (R), Lysine (K); 5) Isoleucine (I), Leucine (L), Methionine (M), Alanine (A), Valine (V), and 6) Phenylalanine (F), Tyrosine (Y), Tryptophan (W).

In some instances, "isozymes" can be used that carry out the same functional conversion/reaction, but which are so dissimilar in structure that they are typically determined to not be "homologous".

The disclosure provides a system and/or recombinant microorganism that includes a highly-reducing polyketide synthase (HRPKS). This enzyme may be combined with other enzymes in the biosynthetic platform disclosed herein for the production of olivetolic acid and analogues thereof as described herein above and below. The enzyme produces a metabolite that includes hexanoyl-CoA, hexanoic acid, and/or an analog thereof. The highly-reducing polyketide synthase can be encoded by a HRPKS gene, polynucleotide or homolog thereof. The HRPKS gene or polynucleotide can be derived from various microorganisms including *Metarhizium anisopliae*.

In addition to the foregoing, the terms "highly-reducing polyketide synthase" or "HRPKS" refer to proteins that are capable of catalyzing the formation of hexanoyl-CoA, hexanoic acid, and/or an analog thereof from acetyl-CoA and malonyl-CoA, and which share at least about 50%, 55%, 60%, 65%, 70%, 75%, 80%, 85%, 90%, 95%, 96%, 97%, 98%, 99% or greater sequence identity to SEQ ID NO:2, or at least about 50%, 60%, 70%, 80%, 90%, 95%, 96%, 97%, 98%, 99% or greater sequence similarity, as calculated by NCBI BLAST, using default parameters. Additional homologs include those homologous sequences to the HRPKS having the sequence of SEQ ID NO:2 presented in Table 1. The sequences associated with the presented accession numbers are incorporated herein by reference.

TABLE 1

Homologs to *Metarhizium anisopliae* HRPKS (SEQ ID NO: 2).

| Protein type | Species | Accession number | % identity to SEQ ID NO: 2 |
|---|---|---|---|
| Acyl carrier protein-like protein | *Metarhizium robertsii* ARSEF 23 | XP_007824743.1 | 98.61% |
| Beta-ketoacyl synthase | *Metarhizium brunneum* ARSEF 3297 | XP_014543365.1 | 97.57% |
| Beta-ketoacyl synthase | *Metarhizium guizhouense* ARSEF 977 | KID84050.1 | 97.46% |
| Beta-ketoacyl synthase | *Metarhizium majus* ARSEF 297 | KID97531.1 | 96.82% |
| protein H634G_09892 | *Metarhizium anisopliae* BRIP 53293 | KJK74848.1 | 97.02% |
| t1pks | *Metarhizium rileyi* | TWU71323.1 | 85.61% |
| Beta-ketoacyl synthase | *Metarhizium rileyi* RCEF 4871 | OAA35189.1 (SEQ ID NO: 8) | 85.57% |
| polyketide synthase | *Drechmeria coniospora* | KYK61100.1 | 74.70% |
| RJ55_03827 protein | *Drechmeria coniospora* | ODA80867.1 | 74.00% |
| Enoyl-[acyl-carrier-protein] reductase (NADH) | *Rasamsonia emersonii* CBS 393.64 | XP_013328256.1 | 58.93% |
| Nonribosomal peptide synthetase 14 | *Talaromyces islandicus* | CRG92673.1 (SEQ ID NO: 14) | 52.03% |
| Beta-ketoacyl synthase | *Metarhizium album* ARSEF 1941 | KHN94379.1 | 69.94% |
| protein CDD81_5803 | *Ophiocordyceps australis* | PHH63522.1 | 69.12% |

TABLE 1-continued

Homologs to *Metarhizium anisopliae* HRPKS (SEQ ID NO: 2).

| Protein type | Species | Accession number | % identity to SEQ ID NO: 2 |
|---|---|---|---|
| protein CDD82_1123 | *Ophiocordyceps australis* | PHH81292.1 | 68.76% |
| putative polyketide synthase | *Periconia macrospinosa* | PVH97124.1 | 52.45% |
| putative polyketide synthase | *Chalara longipes* BDJ | KAE9372739.1 | 51.06% |
| polyketide synthase | *Aspergillus ustus* | KIA76017.1 | 50.38% |

In another embodiment, a system or recombinant microorganism provided herein includes a non-reducing polyketide synthase (NRPKS). This enzyme may be combined with other enzymes in a biosynthetic platform disclosed herein for the production of olivetolic acid and analogues thereof as described herein above and below. The enzyme produces a metabolite that includes an aromatic diol metabolite from hexanoyl-CoA, hexanoic acid, and/or an analog thereof. The non-reducing polyketide synthase can be encoded by a NRPKS gene, polynucleotide or homolog thereof. The NRPKS gene or polynucleotide can be derived from various microorganisms including *Metarhizium anisopliae*.

In addition to the foregoing, the terms "non-reducing polyketide synthase" or "NRPKS" refer to proteins that are capable of catalyzing the formation of an aromatic diol metabolite from hexanoyl-CoA, hexanoic acid, or an analog thereof, and which share at least about 50%, 55%, 60%, 65%, 70%, 75%, 80%, 85%, 90%, 95%, 96%, 97%, 98%, 99% or greater sequence identity to SEQ ID NO:4, or at least about 50%, 60%, 70%, 80%, 90%, 95%, 96%, 97%, 98%, 99% or greater sequence similarity, as calculated by NCBI BLAST, using default parameters. Additional homologs include those homologous sequences to the HRPKS having the sequence of SEQ ID NO:4 presented in Table 2. The sequences associated with the foregoing accession numbers are incorporated herein by reference.

TABLE 2

Homologs to *Metarhizium anisopliae* NRPKS (SEQ ID NO: 4).

| Protein type | Species | Accession number | % identity to SEQ ID NO: 4 |
|---|---|---|---|
| protein H634G_09886 | *Metarhizium anisopliae* BRIP 53293 | KJK74842.1 | 99.13% |
| Beta-ketoacyl synthase | *Metarhizium brunneum* ARSEF 3297 | XP_014543370.1 | 98.37% |
| 3-oxoacyl synthase | *Metarhizium robertsii* ARSEF 23 | XP_007824738.2 | 98.37% |
| Beta-ketoacyl synthase | *Metarhizium guizhouense* ARSEF 977 | KID84045.1 | 98.19% |
| Beta-ketoacyl synthase | *Metarhizium majus* ARSEF 297 | KID97526.1 | 96.16% |
| t1pks | *Metarhizium rileyi* | TWU71327.1 | 84.26% |
| Beta-ketoacyl synthase | *Metarhizium rileyi* RCEF 4871 | OAA35185.1 (SEQ ID NO: 10) | 84.20% |
| polyketide synthase | *Drechmeria coniospora* | KYK61102.1 | 75.07% |
| Beta-ketoacyl synthase | *Metarhizium album* ARSEF 1941 | KHN94383.1 | 76.94% |
| protein CDD81_1594 | *Ophiocordyceps australis* | PHH60504.1 | 65.71% |
| protein CDD82_1118 | *Ophiocordyceps australis* | PHH81287.1 | 65.75% |
| Polyketide synthase | *Rasamsonia emersonii* CBS 393.64 | XP_013331718.1 | 60.36% |
| Conidial yellow pigment biosynthesis polyketide synthase | *Talaromyces islandicus* | CRG92675.1 (SEQ ID NO: 16) | 51.43% |
| protein RJ55_03829 | *Drechmeria coniospora* | ODA80869.1 | 71.23% |

In another embodiment, a system or recombinant microorganism provided herein includes a thioesterase (TE). This enzyme may be combined with other enzymes in a biosynthetic platform disclosed herein for the production of olivetolic acid and analogues thereof as described herein above and below. The enzyme produces olivetolic acid and analogues from an aromatic diol metabolite. The thioesterase can be encoded by a TE gene, polynucleotide or homolog thereof. The TE gene or polynucleotide can be derived from various microorganisms including *Metarhizium anisopliae*.

In addition to the foregoing, the terms "thioesterase" or "TE" of "ΨACP-TE" refer to proteins that are capable of catalyzing the formation of olivetolic acid and analogues thereof from an aromatic diol metabolite, and which share at least about 50%, 55%, 60%, 65%, 70%, 75%, 80%, 85%, 90%, 95%, 96%, 97%, 98%, 99% or greater sequence identity to SEQ ID NO:6, or at least about 50%, 60%, 70%, 80%, 90%, 95%, 96%, 97%, 98%, 99% or greater sequence similarity, as calculated by NCBI BLAST, using default parameters. Additional homologs include those homologous sequences to the ΨACP-TE having the sequence of SEQ ID NO:6 presented in Table 3. The sequences associated with the foregoing accession numbers are incorporated herein by reference.

TABLE 3

Homologs to *Metarhizium anisopliae* TE (SEQ ID NO: 6).

| Protein type | Species | Accession number | % identity to SEQ ID NO: 6 |
|---|---|---|---|
| protein H634G_09891 | *Metarhizium anisopliae* BRIP 53293 | KJK74847.1 | 99.73% |
| Acyl carrier protein-like protein | *Metarhizium robertsii* ARSEF | XP_007824742.1 | 99.47% |
| protein H633G_04792 | *Metarhizium anisopliae* BRIP | KJK91378.1 | 99.20% |

TABLE 3-continued

Homologs to *Metarhizium anisopliae* TE (SEQ ID NO: 6).

| Protein type | Species | Accession number | % identity to SEQ ID NO: 6 |
|---|---|---|---|
| polyketide synthase | *Metarhizium brunneum* ARSEF 3297 | XP_014543366.1 | 98.67% |
| polyketide synthase | *Metarhizium majus* ARSEF 297 | KID97530.1 | 96.83% |
| polyketide synthase | *Metarhizium guizhouense* ARSEF 977 | KID84049.1 | 96.83% |
| polyketide synthase | *Metarhizium rileyi* RCEF 4871 | OAA35188.1 (SEQ ID NO: 12) | 83.29% |
| polyketide synthase | *Metarhizium album* ARSEF 1941 | KHN94380.1 | 77.15% |
| polyketide synthase | *Drechmeria coniospora* | KYK61099.1 | 75.20% |
| protein RJ55_03826 | *Drechmeria coniospora* | ODA80866.1 | 76.92% |
| protein CDD82_1122 | *Ophiocordyceps australis* | PHH81291.1 | 63.98% |
| protein CDD81_1588 | *Ophiocordyceps australis* | PHH60498.1 | 61.39% |
| hypothetical protein PISL3812_09738 | *Talaromyces islandicus* | CRG92674.1 (SEQ ID NO: 18) | 45.58% |

In the studies presented herein, it was discovered that a biosynthetic platform originating from the fungus *Metarhizium anisopliae* afforded olivetolic acid and its analogues at high yields. In particular, the aforementioned biosynthetic platform was heterologously expressed in *Aspergillus nidulans* and olivetolic acid and its analogues were obtained with a total titer of >4 g/L without any metabolic optimization. In practice, the biosynthetic platform can also be expressed in *E. coli*, yeast and other heterologous microbial hosts for production of olivetolic acid and its analogues.

In another embodiment, the disclosure demonstrates the production of olivetolic acid and its analogues using a biosynthetic platform of the disclosure. The biosynthetic platform comprises the expression or over expression of one or more heterologous polynucleotides comprising: (i) a polypeptide that catalyzes the production of hexanoyl-CoA, hexanoic acid, and/or an analog thereof from acetyl-CoA and malonyl-CoA; (ii) a polypeptide that catalyzes the production of an aromatic diol metabolite from hexanoyl-CoA, hexanoic acid, or an analog thereof; (iii) a polypeptide that catalyzes the production of olivetolic acid and analogues thereof from an aromatic diol. In one embodiment, the biosynthetic platform comprising (i) a cell-free system comprising a set of polypeptides comprising (1) a polypeptide having at least 50-100% sequence identity to SEQ ID NO:2, (2) a polypeptide having at least 50-100% sequence identity to SEQ ID NO:4, and (3) a polypeptide having at least 45-100% sequence identity to SEQ ID NO:6, such that the cell-free system can convert acetyl-CoA and Malonyl-CoA to olivetolic acid or an analogue thereof; or (ii) at least one recombinant cell that expresses a heterologous polypeptide selected from the group consisting of (1) a polypeptide having at least 50-100% sequence identity to SEQ ID NO:2, (2) a polypeptide having at least 50-100% sequence identity to SEQ ID NO:4, (3) a polypeptide having at least 45-100% sequence identity to SEQ ID NO:6 and (4) any combination of (1)-(3) such that the microorganism can convert acetyl-CoA and Malonyl-CoA to olivetolic acid or an analogue thereof.

In one embodiment, the cell-free system comprises a first polypeptide having a sequence selected from the group consisting of SEQ ID NO:2, 8, and 14; a second polypeptide having a sequence selected from the group consisting of SEQ ID NO:4, 10 and 16; and a third polypeptide having a sequence selected from the group consisting of SEQ ID NO:6, 12 and 18, wherein the cell free system can convert acetyl-CoA and malonyl-CoA to olivetolic acid.

In another embodiment, the at least one recombinant microorganism express a first heterologous polypeptide having a sequence selected from the group consisting of SEQ ID NO:2, 8, and 14; a second heterologous polypeptide having a sequence selected from the group consisting of SEQ ID NO:4, 10 and 16; and/or a third heterologous polypeptide having a sequence selected from the group consisting of SEQ ID NO:6, 12 and 18, wherein a culture comprising the at least one recombinant microorganism expresses the first, second and third heterologous polypeptides can convert acetyl-CoA and malonyl-CoA to olivetolic acid.

It will be recognized by one of skill in the art that the various metabolites identified above can serve as substrate for other catabolic or anabolic pathways.

It will be recognized that subsystems or organism that have one or more (but not all) of the foregoing enzymes can be utilized and then combined with an organism or other subsystems comprising remaining enzymatic members of the pathway.

As previously noted, the target enzymes described throughout this disclosure generally produce metabolites. In addition, the target enzymes described throughout this disclosure are encoded by polynucleotides.

Accordingly, in one embodiment, a system or recombinant microorganism provided herein comprises a highly-reducing polyketide synthase (HRPKS) or homolog or variant thereof. This expression may be combined with enzymes of the biosynthetic pathway and may further include additional downstream enzymes for the production of olivetolic acid or additional metabolites. The HRPKS can be derived from *Metarhizium anisopliae, Tolypocladium inflatum, Metarhizium rileyi*, and/or *Talaromyces isolandicus* (or other organisms identified in Table 1 above). In another embodiment, an engineered variant of HRPKS can be used so long as it has highly-reducing polyketide synthase activity and can convert acetyl-CoA and malonyl-CoA to hexanoyl-CoA, hexanoic acid, and/or an analog thereof. Such engineered variants can be obtained by site-directed mutagenesis, directed evolutions and the like. Thus, included within the disclosure are polypeptides that are at least 85-99% identical to the sequence of a HRPKS from *Metarhizium anisopliae* and having highly-reducing polyketide synthase activity (e.g., 85-100% identical to SEQ ID NO:2). Thus, included within the disclosure are polypeptides that are at least 85-99% identical to the sequence of a HRPKS from *Tolypocladium inflatum* and having highly-reducing polyketide synthase activity. Thus, included within the disclosure are polypeptides that are at least 85-99% identical to the sequence of a HRPKS from *Metarhizium rileyi* and having highly-reducing polyketide synthase activity (e.g., 85-100% identical to SEQ ID NO:8). Thus, included within the disclosure are polypeptides that are at least 85-99% identical to the sequence of a HRPKS from *Talaromyces islandicus* and having highly-reducing polyketide synthase activity (e.g., 85-100% identical to SEQ ID NO:14).

In another or further embodiment, a system or recombinant microorganism provided herein includes expression of a non-reducing polyketide synthase or homolog or variants thereof. This expression may be combined with enzymes of the biosynthetic pathway and may further include additional downstream enzymes for the production of olivetolic acid or additional metabolites. The NRPKS can be derived from *Metarhizium* anisopliae, *Tolypocladium inflatum*, *Metarhizium rileyi*, and/or *Talaromyces isolandicus* (or other organisms identified in Table 2 above). In another embodiment, an engineered variant of NRPKS can be used so long as it has non-reducing polyketide synthase activity and can convert hexanoyl-CoA, hexanoic acid, and/or an analog thereof to an aromatic diol metabolite. Such engineered variants can be obtained by site-directed mutagenesis, directed evolutions and the like. Thus, included within the disclosure are polypeptides that are at least 85-99% identical to a sequence of a NRPKS from *Metarhizium anisopliae* and having non-reducing polyketide synthase activity (e.g., 85-100% identical to SEQ ID NO:4). Thus, included within the disclosure are polypeptides that are at least 85-99% identical to the sequence of a NRPKS from *Tolypocladium inflatum* and having non-reducing polyketide synthase activity. Thus, included within the disclosure are polypeptides that are at least 85-99% identical to the sequence of a NRPKS from *Metarhizium rileyi* and having non-reducing polyketide synthase activity (e.g., 85-100% identical to SEQ ID NO:10). Thus, included within the disclosure are polypeptides that are at least 85-99% identical to the sequence of a NRPKS from *Talaromyces islandicus* and having non-reducing polyketide synthase activity (e.g., 85-100% identical to SEQ ID NO:16).

In another or further embodiment, a system or recombinant microorganism provided herein includes expression of a thioesterase or homolog or variants thereof. This expression may be combined with enzymes of the biosynthetic pathway and may further include additional downstream enzymes for the production of olivetolic acid or additional metabolites. The TE can be derived from *Metarhizium anisopliae*, *Tolypocladium inflatum*, *Metarhizium rileyi*, and/or *Talaromyces isolandicus* (or other organisms identified in Table 3 above). In another embodiment, an engineered variant of TE can be used so long as it has thioesterase activity and can convert an aromatic diol metabolite to olivetolic acid and its analogs. Such engineered variants can be obtained by site-directed mutagenesis, directed evolutions and the like. Thus, included within the disclosure are polypeptides that are at least 85-99% identical to a sequence of a TE from *Metarhizium anisopliae* and having non-reducing polyketide synthase activity (e.g., 85-100% identical to SEQ ID NO:6). Thus, included within the disclosure are polypeptides that are at least 85-99% identical to a sequence of a TE from *Tolypocladium inflatum* and having non-reducing polyketide synthase activity. Thus, included within the disclosure are polypeptides that are at least 85-99% identical to a sequence of a TE from *Metarhizium rileyi* and having non-reducing polyketide synthase activity (e.g., 85-100% identical to SEQ ID NO:12). Thus, included within the disclosure are polypeptides that are at least 85-99% identical to a sequence of a TE from *Talaromyces isolandicus* and having non-reducing polyketide synthase activity (e.g., 85-100% identical to SEQ ID NO:18).

As indicated above, the disclosure further provides for creating variants of enzymes making up the biosynthetic platform disclosed herein. Such enzyme variants can expand substrate specificity, change substrate specificity, improve reaction kinetics, improve enzyme stability etc. For example, variants of enzymes making up the biosynthetic platform disclosed herein can alter the ratio of these product, such as more C6 than C8 OA. Variants of enzymes can be based upon making changes in the sequence of the enzymes (e.g., SEQ ID NO:2, 4, 6, 8, 10, 12, 14, 16, or 18) using mutational methods or directed evolution methods.

Mutational methods of generating enzyme variants include, for example, site-directed mutagenesis (Ling et al. (1997) "Approaches to DNA mutagenesis: an overview" Anal Biochem. 254(2): 157-178; Dale et al. (1996) "Oligonucleotide-directed random mutagenesis using the phosphorothioate method" Methods Mol. Biol. 57:369-374; Smith (1985) "In vitro mutagenesis" Ann. Rev. Genet. 19:423-462; Botstein & Shortle (1985) "Strategies and applications of in vitro mutagenesis" Science 229:1193-1201; Carter (1986) "Site-directed mutagenesis" Biochem. J. 237:1-7; and Kunkel (1987) "The efficiency of oligonucleotide directed mutagenesis" in Nucleic Acids & Molecular Biology (Eckstein, F. and Lilley, D. M. J. eds., Springer Verlag, Berlin)); mutagenesis using uracil containing templates (Kunkel (1985) "Rapid and efficient site-specific mutagenesis without phenotypic selection" Proc. Natl. Acad. Sci. USA 82:488-492; Kunkel et al. (1987) "Rapid and efficient site-specific mutagenesis without phenotypic selection" Methods in Enzymol. 154, 367-382; and Bass et al. (1988) "Mutant Trp repressors with new DNA-binding specificities" Science 242:240-245); oligonucleotide-directed mutagenesis (Methods in Enzymol. 100: 468-500 (1983); Methods in Enzymol. 154: 329-350 (1987); Zoller & Smith (1982) "Oligonucleotide-directed mutagenesis using M13-derived vectors: an efficient and general procedure for the production of point mutations in any DNA fragment" Nucleic Acids Res. 10:6487-6500; Zoller & Smith (1983) "Oligonucleotide-directed mutagenesis of DNA fragments cloned into M13 vectors" Methods in Enzymol. 100:468-500; and Zoller & Smith (1987) "Oligonucleotide-directed mutagenesis: a simple method using two oligonucleotide primers and a single-stranded DNA template" Methods in Enzymol. 154: 329-350); phosphorothioate-modified DNA mutagenesis (Taylor et al. (1985) "The use of phosphorothioate-modified DNA in restriction enzyme reactions to prepare nicked DNA" Nucl. Acids Res. 13: 8749-8764; Taylor et al. (1985) "The rapid generation of oligonucleotide-directed mutations at high frequency using phosphorothioate-modified DNA" Nucl. Acids Res. 13: 8765-8787; Nakamaye & Eckstein (1986) "Inhibition of restriction endonuclease Nci I cleavage by phosphorothioate groups and its application to oligonucleotide-directed mutagenesis" Nucl. Acids Res. 14: 9679-9698; Sayers et al. (1988) "Y-T Exonucleases in phosphorothioate-based oligonucleotide-directed mutagenesis" Nucl. Acids Res. 16:791-802; and Sayers et al. (1988) "Strand specific cleavage of phosphorothioate-containing DNA by reaction with restriction endonucleases in the presence of ethidium bromide" Nucl. Acids Res. 16: 803-814); mutagenesis using gapped duplex DNA (Kramer et al. (1984) "The gapped duplex DNA approach to oligonucleotide-directed mutation construction" Nucl. Acids Res. 12: 9441-9456; Kramer & Fritz (1987) Methods in Enzymol. "Oligonucleotide-directed construction of mutations via gapped duplex DNA" 154:350-367; Kramer et al. (1988) "Improved enzymatic in vitro reactions in the gapped duplex DNA approach to oligonucleotide-directed construction of mutations" Nucl. Acids Res. 16: 7207; and Fritz et al. (1988) "Oligonucleotide-directed construction of mutations: a gapped duplex DNA procedure without enzymatic reactions in vitro" Nucl. Acids Res. 16: 6987-6999) (each of which is incorporated by reference).

Additional suitable methods include point mismatch repair (Kramer et al. (1984) "Point Mismatch Repair" Cell 38:879-887), mutagenesis using repair-deficient host strains (Carter et al. (1985) "Improved oligonucleotide site-directed mutagenesis using M13 vectors" Nucl. Acids Res. 13: 4431-4443; and Carter (1987) "Improved oligonucleotide-directed mutagenesis using M13 vectors" Methods in Enzymol. 154: 382-403), deletion mutagenesis (Eghtedarzadeh & Henikoff (1986) "Use of oligonucleotides to generate large deletions" Nucl. Acids Res. 14: 5115), restriction-selection and restriction-purification (Wells et al. (1986) "Importance of hydrogen-bond formation in stabilizing the transition state of subtilisin" Phil. Trans. R. Soc. Lond. A 317: 415-423), mutagenesis by total gene synthesis (Nambiar et al. (1984) "Total synthesis and cloning of a gene coding for the ribonuclease S protein" Science 223: 1299-1301; Sakamar and Khorana (1988) "Total synthesis and expression of a gene for the α-subunit of bovine rod outer segment guanine nucleotide-binding protein (transducin)" Nucl. Acids Res. 14: 6361-6372; Wells et al. (1985) "Cassette mutagenesis: an efficient method for generation of multiple mutations at defined sites" Gene 34:315-323; and Grundstrom et al. (1985) "Oligonucleotide-directed mutagenesis by microscale 'shot-gun' gene synthesis" Nucl. Acids Res. 13: 3305-3316); double-strand break repair (Mandecki (1986); Arnold (1993) "Protein engineering for unusual environments" Current Opinion in Biotechnology 4:450-455; and "Oligonucleotide-directed double-strand break repair in plasmids of *Escherichia coli*: a method for site-specific mutagenesis" Proc. Natl. Acad. Sci. USA, 83:7177-7181) (each of which is incorporated by reference). Additional details on many of the above methods can be found in Methods in Enzymology Volume 154, which also describes useful controls for trouble-shooting problems with various mutagenesis methods.

Additional details regarding various diversity generating methods can be found in the following U.S. patents, PCT publications, and EPO publications: U.S. Pat. No. 5,605,793 to Stemmer (Feb. 25, 1997), "Methods for In vitro Recombination;" U.S. Pat. No. 5,811,238 to Stemmer et al. (Sep. 22, 1998) "Methods for Generating Polynucleotides having Desired Characteristics by Iterative Selection and Recombination;" U.S. Pat. No. 5,830,721 to Stemmer et al. (Nov. 3, 1998), "DNA Mutagenesis by Random Fragmentation and Reassembly;" U.S. Pat. No. 5,834,252 to Stemmer, et al. (Nov. 10, 1998) "End-Complementary Polymerase Reaction;" U.S. Pat. No. 5,837,458 to Minshull et al. (Nov. 17, 1998), "Methods and Compositions for Cellular and Metabolic Engineering;" WO 95/22625, Stemmer and Crameri, "Mutagenesis by Random Fragmentation and Reassembly;" WO 96/33207 by Stemmer and Lipschutz "End Complementary Polymerase Chain Reaction;" WO 97/20078 by Stemmer and Crameri "Methods for Generating Polynucleotides having Desired Characteristics by Iterative Selection and Recombination;" WO 97/35966 by Minshull and Stemmer, "Methods and Compositions for Cellular and Metabolic Engineering;" WO 99/41402 by Punnonen et al. "Targeting of Genetic Vaccine Vectors;" WO 99/41383 by Punnonen et al. "Antigen Library Immunization;" WO 99/41369 by Punnonen et al. "Genetic Vaccine Vector Engineering;" WO 99/41368 by Punnonen et al. "Optimization of Immunomodulatory Properties of Genetic Vaccines;" EP 752008 by Stemmer and Crameri, "DNA Mutagenesis by Random Fragmentation and Reassembly;" EP 0932670 by Stemmer "Evolving Cellular DNA Uptake by Recursive Sequence Recombination;" WO 99/23107 by Stemmer et al., "Modification of Virus Tropism and Host Range by Viral Genome Shuffling;" WO 99/21979 by Apt et al., "Human Papillomavirus Vectors;" WO 98/31837 by del Cardayre et al. "Evolution of Whole Cells and Organisms by Recursive Sequence Recombination;" WO 98/27230 by Patten and Stemmer, "Methods and Compositions for Polypeptide Engineering;" WO 98/13487 by Stemmer et al., "Methods for Optimization of Gene Therapy by Recursive Sequence Shuffling and Selection;" WO 00/00632, "Methods for Generating Highly Diverse Libraries;" WO 00/09679, "Methods for Obtaining in vitro Recombined Polynucleotide Sequence Banks and Resulting Sequences;" WO 98/42832 by Arnold et al., "Recombination of Polynucleotide Sequences Using Random or Defined Primers;" WO 99/29902 by Arnold et al., "Method for Creating Polynucleotide and Polypeptide Sequences;" WO 98/41653 by Vind, "An in vitro Method for Construction of a DNA Library;" WO 98/41622 by Borchert et al., "Method for Constructing a Library Using DNA Shuffling;" WO 98/42727 by Pati and Zarling, "Sequence Alterations using Homologous Recombination;" WO 00/18906 by Patten et al., "Shuffling of Codon-Altered Genes;" WO 00/04190 by del Cardayre et al. "Evolution of Whole Cells and Organisms by Recursive Recombination;" WO 00/42561 by Crameri et al., "Oligonucleotide Mediated Nucleic Acid Recombination;" WO 00/42559 by Selifonov and Stemmer "Methods of Populating Data Structures for Use in Evolutionary Simulations;" WO 00/42560 by Selifonov et al., "Methods for Making Character Strings, Polynucleotides & Polypeptides Having Desired Characteristics;" WO 01/23401 by Welch et al., "Use of Codon-Varied Oligonucleotide Synthesis for Synthetic Shuffling;" and WO 01/64864 "Single-Stranded Nucleic Acid Template-Mediated Recombination and Nucleic Acid Fragment Isolation" by Affholter (each of which is incorporated by reference).

Directed evolution may also be used to generate enzyme variants of the biosynthetic platform disclosed herein. Directed evolution (DE) is a method used in protein engineering that mimics the process of natural selection to steer proteins or nucleic acids toward a user-defined goal. It consists of subjecting a gene to iterative rounds of mutagenesis (creating a library of variants), selection (expressing those variants and isolating members with the desired function) and amplification (generating a template for the next round). In DE, a single gene is evolved by iterative rounds of mutagenesis, selection or screening, and amplification. Rounds of these steps are typically repeated, using the best variant from one round as the template for the next to achieve stepwise improvements. The first step in performing a cycle of directed evolution is the generation of a library of variant genes. The starting gene can be mutagenized by random point mutations (by chemical mutagens or error prone PCR) and insertions and deletions (by transposons). Gene recombination can be mimicked by DNA shuffling of several sequences (usually of more than 70% sequence identity) to jump into regions of sequence space between the shuffled parent genes. Finally, specific regions of a gene can be systematically randomized for a more focused approach based on structure and function knowledge.

The disclosure further provides for making additional forms of the enzymes making up the biosynthetic pathway disclose herein, including, but not limited to, (i) dissecting HRPKS and NRPKS; (ii) fusing enzymes such as NRPKS and TE; (iii) reshuffling domains, such as parts of one enzyme fused to parts of another, etc. (e.g., see Kolkman et al. "Directed evolution of proteins by exon shuffling". *Nature Biotechnology* 19(5): 423-8 (2001); Morgante et al., "Gene duplication and exon shuffling by helitron-like transposons generate intraspecies diversity in maize". Nature Genetics. 37(9):997-1002 (2005); *Van Rijk*, "Molecular mechanisms of exon shuffling: Illegitimate recombination". *Genetica* 118(2-3): 245-9 (2003)); Elluche, S. "Bringing functions together with fusion enzymes—from nature's inventions to biotechnological applications." *Appl Microbiol Biotechnol.* 99(4):1545-56 (2015); Aalbers et al. "Enzyme Fusions in Biocatalysis: Coupling Reactions by Pairing Enzymes." Chembiochem. 20(1):20-28 (2019)).

Polynucleotide encoding the polypeptides of the disclosure are provided in SEQ ID NOs: 1, 3, 5, 7, 9, 11, 13, 15, and 17. It should be readily recognized that the sequences are set forth at DNA, however, RNA is contemplated which would include substiting "U" or "T" in the sequence listing accompanying this disclosure. As mentioned above, the polynucleotides of the disclosure can be cloned into vectors for expression. Vectors suitable for expression are known in the art and are described elsewhere herein. In some embodiments a cell or vector of the disclosure can comprise at least one polynucleotide selected from the group consisting of SEQ ID NO:1, 3, 5, 7, 9, 11, 13, 15, and 17. In another embodiment, the cell or vector comprises a first polynucleotide selected from the group consisting of 1, 7 and 13; a second polynucleotide selected from the group consisting of 3, 9 and 15; and a third polynucleotide selected from the group consisting of 5, 11 and 17. In another embodiment, the disclosure contemplates a polynucleotide that hybridizes under moderately stringent to stringent conditions with a polynucleotide consisting of a sequence selected from SEQ ID NO:1, 3, 5, 7, 9, 11, 13, 15, and 17. Hybridization stringency conditions are well known in the art. Moreover, the disclosure also contemplates polynucleotides that are at least 70%, 80%, 85%, 90%, 92%, 95%, 97%, or 99% identical to any one of SEQ ID NO:1, 3, 5, 7, 9, 11, 13, 15 or 17 and which encodes a polypeptide having a sequence of SEQ ID NO:2, 4, 6, 8, 10, 12, 14, 16 or 18, respectively.

As previously discussed, general texts which describe molecular biological techniques useful herein, including the use of vectors, promoters and many other relevant topics, include Berger and Kimmel, Guide to Molecular Cloning Techniques, Methods in Enzymology Volume 152, (Academic Press, Inc., San Diego, Calif.) ("Berger"); Sambrook et al., Molecular Cloning—A Laboratory Manual, 2d ed., Vol. 1-3, Cold Spring Harbor Laboratory, Cold Spring Harbor, N.Y., 1989 ("Sambrook") and Current Protocols in Molecular Biology, F. M. Ausubel et al., eds., Current Protocols, a joint venture between Greene Publishing Associates, Inc. and John Wiley & Sons, Inc., (supplemented through 1999) ("Ausubel") (each of which is incorporated by reference). Examples of protocols sufficient to direct persons of skill through in vitro amplification methods, including the polymerase chain reaction (PCR), the ligase chain reaction (LCR), Qb-replicase amplification and other RNA polymerase mediated techniques (e.g., NASBA), e.g., for the production of the homologous nucleic acids of the invention are found in Berger, Sambrook, and Ausubel, as well as in Mullis et al. (1987) U.S. Pat. No. 4,683,202; Innis et al., eds. (1990) PCR Protocols: A Guide to Methods and Applications (Academic Press Inc. San Diego, Calif.) ("Innis"); Arnheim & Levinson (Oct. 1, 1990) C&EN 36-47; The Journal Of NIH Research (1991) 3: 81-94; Kwoh et al. (1989) Proc. Natl. Acad. Sci. USA 86: 1173; Guatelli et al. (1990) Proc. Nat'l. Acad. Sci. USA 87: 1874; Lomell et al. (1989) J. Clin. Chem 35: 1826; Landegren et al. (1988) Science 241: 1077-1080; Van Brunt (1990) Biotechnology 8: 291-294; Wu and Wallace (1989) Gene 4:560; Barringer et al. (1990) Gene 89:117; and Sooknanan and Malek (1995) Biotechnology 13: 563-564 (each of which is incorporated by reference). Improved methods for cloning in vitro amplified nucleic acids are described in Wallace et al., U.S. Pat. No. 5,426,039. Improved methods for amplifying large nucleic acids by PCR are summarized in Cheng et al. (1994) Nature 369: 684-685 and the references cited therein (incorporated by reference herein), in which PCR amplicons of up to 40 kb are generated. One of skill will appreciate that essentially any RNA can be converted into a double stranded DNA suitable for restriction digestion, PCR expansion and sequencing using reverse transcriptase and a polymerase. See, e.g., Ausubel, Sambrook and Berger, all supra.

The following examples are intended to illustrate but not limit the disclosure. While they are typical of those that might be used, other procedures known to those skilled in the art may alternatively be used.

EXAMPLES

Plasmid Construction and Expression:

Plasmids pYTU, pYTP, and pYTR were digested with Pad and Swal. These restriction sites were used to insert the genes encoding HRPKS, NRPKS and ΨACP-TE (i.e., HRPKS (SEQ ID NO:2), NRPKS (SEQ ID NO:4), and ΨACP-TE (SEQ ID NO:6)) into the plasmids. The genes were amplified through PCR using genomic DNA of *Metarhizium anisopliae* ARSEF23 as a template. A glaA promoter and trpC terminator were amplified through PCR using pYTR as a template. The PCR fragments were transformed in yeast, and through homologous recombination, the plasmids pYTU-glaA-NRPKS-trpC, pYTP-glaA-ΨACP-TE, and pYTR-glaA-HRPKS-trpC were generated. Yeast transformation was done using Frozen-EZ Yeast Transformation II Kit™ (Zymo Research). The plasmids were extracted from yeast and transformed into *E. coli* TOP10 by electroporation to isolate single plasmids. After extraction from *E. coli*, plasmid sequences were confirmed by sequencing. All three plasmids (pYTU-glaA-NRPKS-trpC, pYTP-glaA-ΨACP-TE, pYTR-glaA-HRPKS-trpC) were transformed into *A. nidulans* using the methods described in Liu et al. (*Org Lett.* 19:3560-3563 (2017)) to form the olivetolic acid producing strain.

The strain was then cultured in 10 mL of CD-ST medium (20 g/L starch, 20 g/L casein, 50 mL/L nitrate salts and 1 mL/L trace elements) in a 50 mL falcon tube and kept in a shaker at 28° C. and 250 rpm overnight. The next day 25 µL of the culture was inoculated in 25 mL of CD-ST medium in a 125 mL flask and kept in a shaker at 28° C. and 250 rpm.

Three other clusters homologous to the *Metarhizium anisopliae* cluster that all contain a HRPKS, NRPKS, and ΨACP-TE gene were identified. Although the clusters all have these same three genes, their sequence identities are different, indicating that there is diversity of products generated. Due to the genes of the homologous clusters differing in sequence identity from the genes in the *Metarhizium anisopliae* cluster, expanded diversity of the products can therefore be envisioned through differing methyltransferase and enoyl reductase domain activity.

Plasmids as described above for *M. anisopliae* were generated from the genes of these homologous clusters and were heterologously expressed them in *A. nidulans*. The product profiles were then analyzed.

Detection and Isolation:

LC-MS analyses were performed using a Shimadzu 2020 EVLC-MS (Phenomenex® Kinetex, 1.7 µm, 2.0×100 mm, C-18 column) using positive and negative mode electrospray ionization. The elution method comprised a linear gradient of 5-95% (v/v) acetonitrile/water in 13.25 min, followed by 95% (v/v) acetonitrile/water for 4.75 min with a flow rate of 0.3 mL/min. The LC mobile phases were supplemented with 0.1% formic acid (v/v).

Large-scale production of compounds was carried out by cultivating transformants in 1 liter of solid CD-ST agar split into 20 petri dishes. After 4-5 days of growth at 28° C., the agar was extensively extracted with acetone. The extract was concentrated under reduced pressure and further extracted with acidified ethyl acetate three times. Olivetolic acid and derivatives remain in the ethyl acetate layer, which was subsequently dried under reduced pressure. The residue was loaded to a Redisep Rf Gold Reversed-phase C18 column on a Teledyne Combi-Flash system. After which, HPLC purifications were performed with a Phenomenex® Kinetex column (5p, 10.0×250 mm, C18) using a Shimadzu UFLC system. For HPLC purification, a flow-rate of 4 mL/min with solvent A (0.1% formic acid in water) and B (0.1% formic acid in acetonitrile) was used.

Biosynthetic Pathway to Produce Olivetolic Acid and Analogues.

As shown in FIG. 2A, *Aspergillus nidulans* was recombinantly engineered to express various heterologous genes (i.e., HRPKS (SEQ ID NO:2, 8, or 14), NRPKS (SEQ ID NO:4, 10, or 16), and ΨACP-TE (SEQ ID NO:6, 12 or 18)) from *Metarhizium anisopliae, Metarhizium rileyi* and *Talaromyces islandicus*, respectively, to afford olivetolic acid (OA) and OA analogues at high yields. HRPKS utilizes acetyl-CoA, malonyl-CoA, and NADPH to synthesize the C6 or C8 acyl chains tethered on acyl-carrier protein (ACP). The ACP domain of HRPKS then shuttles the acyl thioester to starter unit acyl-carrier protein transacylase (SAT) domain of non-reducing polyketide synthase (NRPKS). After three decarboxylative condensations catalyzed by ketosynthase (KS) domain and aromatization by product template (PT) domain, the thioesterase (TE) hydrolyzes the product from NRPKS to start the next catalytic cycle. Due to the synthetic capability of HRPKS and relaxed substrate selectivity of NRPKS SAT domain, high-titer olivetolic acid and three analogues differing in acyl chain lengths and saturation degrees are accessed (see FIG. 2B).

Heterologous expressing the above biosynthetic pathway in *Aspergillus nidulans* obtained olivetolic acid and its analogues with a total titer of >4 g/L without any metabolic optimization. As shown in the liquid chromatography (LC) trace presented FIG. 3, Compound 2 was produced in higher amounts than the other compounds, with minimal to no other contaminating product formation. The actual yields are presented in FIG. 2B, and are as follows: Compound 2 (~4 g/L)>Compound 3 (~800 mg/L)>Compound 1 (~450 mg/L)>>Compound 4 (80 mg/L). Compound 1: olivetolic acid; Compound 2: 2-heptyl-4,6-dihydroxybenzoic acid; Compound 3: (E)-2-(hept-1-en yl)-4,6-dihydroxybenzoic acid; and Compound 4: (E)-2,4-dihydroxy (pent-1-en-1-yl) benzoic acid.

Similar LC traces were obtained for genes cloned from *T. inflatum, M. rileyi* and *T. islandicus*. For the *Tolypocladium inflatum* cluster, when the genes were heterologously expressed in *Aspergillus nidulans*, review of the LC showed the same profile as when genes from the *Metarhizium anisopliae* were expressed, with titers that were comparable. For the *Talaromyces islandicus* cluster, when heterologously expressed in *Aspergillus nidulans*, the LC predominately showed olivetolic acid.

It will be understood that various modifications may be made without departing from the spirit and scope of this disclosure. Accordingly, other embodiments are within the scope of the following claims.

What is claimed is:

1. A biosynthetic platform comprising a series of isolated enzymes that produce olivetolic acid and analogues thereof from simpler metabolites, the series of enzymes comprising:
   a non-reducing polyketide synthase (NRPKS) that converts a set of metabolites comprising hexanoyl-CoA, hexanoic acid, octanoyl-CoA, octanoic acid, and/or an analog thereof to an aromatic diol metabolite, wherein the NRPKS comprises a sequence that is at least 98% identical to SEQ ID NO:4, 10 or 16; and
   a thioesterase (TE) that converts the aromatic diol metabolite to olivetolic acid and analogues thereof, wherein the TE comprises a sequence that is at least 98% identical to the sequence of SEQ ID NO:6, 12, or 18.

2. The biosynthetic platform of claim 1, further comprising:
   a highly-reducing polyketide synthase (HRPKS) that utilizes acetyl-CoA, malonyl-CoA, and NADPH to synthesize the set of metabolites selected from hexanoyl-CoA, hexanoic acid, octanoyl-CoA, octanoic acid, and/or analog thereof, wherein the HRPKS comprises a sequence that is at least 98% identical to the sequence of SEQ ID NO: 2, 8, or 14, and which contains from 1 to 20 conservative amino acid substitutions.

3. The biosynthetic platform of claim 1, wherein the analogues of olivetolic acid are selected from the group consisting of 2-heptyl-4,6-dihydroxybenzoic acid, (E)-2-(hept-1-en-1-yl)-4,6-dihydroxybenzoic acid, and (E)-2,4-dihydroxy-6-(pent-1-en-1-yl) benzoic acid.

4. The biosynthetic platform of claim 1, wherein one or more of the enzymes making up the biosynthetic platform are from fungi.

5. The biosynthetic platform of claim 1, wherein the series of enzymes making up the up the biosynthetic platform are from *Metarhizium anisopliae, Tolypocladium inflatum, Metarhizium rileyi* and/or *Talaromyces islandicus*.

6. The biosynthetic platform of claim 1, wherein the NRPKS has a sequence that is at least 99% identical to the sequence of SEQ ID NO:4.

7. The biosynthetic platform of claim 1, wherein the NRPKS has a sequence that is at least 98% identical to the sequence of SEQ ID NO:4, 10, or 16, and which contains from 1 to 20 conservative amino acid substitutions.

8. The biosynthetic platform of claim 6, wherein the NRPKS comprises the sequence of SEQ ID NO:4, 10 or 16.

9. The biosynthetic platform of claim 1, wherein the TE has a sequence that is at least 99% identical to the sequence of SEQ ID NO:6.

10. The biosynthetic platform of claim 1, wherein the TE has a sequence that is at least 98% identical to the sequence of SEQ ID NO: 6, 12, or 18, and which contains from 1 to 10 conservative amino acid substitutions.

11. The biosynthetic platform of claim 9, wherein the TE comprises the sequence of SEQ ID NO:6, 12 or 18.

12. The biosynthetic platform of claim 2, wherein the HRPKS has a sequence that is at least 99% identical to the sequence of SEQ ID NO:2.

13. The biosynthetic platform of claim 2, wherein the HRPKS has a sequence that is at least 99% identical to the sequence of SEQ ID NO: 2, 8, or 14, and which contains from 1 to 20 conservative amino acid substitutions.

14. The biosynthetic platform of claim 2, wherein the HRPKS comprises the sequence of SEQ ID NO: 2, 8, or 14.

15. A plasmid(s) or vector(s) which comprises polynucleotide sequences that encode the series of enzymes making up the biosynthetic platform of claim 1.

16. The plasmid(s) or vector(s) of claim 15, wherein:
   a first plasmid comprises a polynucleotide sequence that encodes a polypeptide having highly-reducing polyketide synthase (HRPKS) activity and wherein the polypeptide has a sequence that is at least 95%, 98%, or 99% identical to the sequence of SEQ ID NO:2, 8 or 14;
   wherein a second plasmid comprises a polynucleotide sequence that encodes a polypeptide having non-reducing polyketide synthase (NRPKS) activity and wherein the polypeptide has a sequence that is at least 95%, 98%, or 99% identical to the sequence of SEQ ID NO:4, 10 or 16;
   and wherein a third plasmid comprises a polynucleotide sequence that encodes a polypeptide having thioesterase (TE) activity and wherein the polypeptide has a sequence that is at least 95%, 98%, or 99% identical to the sequence of SEQ ID NO:6, 12 or 18.

17. A recombinant microorganism comprising the plasmid(s) or vector(s) of claim 15.

18. The recombinant microorganism of claim 17, wherein the recombinant microorganism is a bacterium, an archaeum, or a fungus.

19. The recombinant microorganism of claim 18, wherein the recombinant microorganism is a bacterium selected from the group consisting of *Escherichia coli, Rodhobacter sphaeroides, Pseudoalteromonas haloplanktis, Shewanella* sp. strain Ac10, *Pseudomonas fluorescens, Pseudomonas putida, Pseudomonas aeruginosa, Halomonas elongata, Chromohalobacter salex'igens, Streptomyces lividans, Streptomyces griseus, Nocardia lactamdurans, Mycobacterium smegmatis, Corynebacterium glutamicum, Corynebacterium ammoniagenes, Brevibacterium lactofermentum, Bacillus subtilis, Bacillus brevis, Bacillus megaterium, Bacillus licheniformis, Bacillus amyloliquefaciens, Lactococcus lactis, Lactobacillus plantarum, Lactobacillus casei, Lactobacillus reuteri,* and *Lactobacillus gasseri.*

20. The recombinant microorganism of claim 19, wherein the recombinant microorganism is *Escherichia* or *Pseudomonas putida.*

21. The recombinant microorganism of claim 18, wherein the recombinant microorganism is a bacterium selected from the group consisting of *Saccharomyces cerevisiae, Kluyveromyces lactis, Pichia pastoris, Hansenula polymorpha, Yarrowia lipolytica, Aspergillus nidulans, Trichoderma reesei, Fusarium oxysporum, Phanerochaete chrysosporium, Ashbya gossypii, A. oryzae,* and *Chrysosporium lucknowense.*

22. The recombinant microorganism of claim 21, wherein the recombinant microorganism is *Aspergillus nidulans* or *Saccharomyces cerevisiae.*

23. A method to produce olivetolic acid and analogues thereof comprising:
   culturing the recombinant microorganism of claim 17.

24. The method of claim 23, further comprising:
   isolating and purifying the olivetolic acid and analogues thereof.

* * * * *

SEQUENCE LISTING

```
<160> NUMBER OF SEQ ID NOS: 18

<210> SEQ ID NO 1
<211> LENGTH: 7548
<212> TYPE: DNA
<213> ORGANISM: Metarhizium anisopliae
<220> FEATURE:
<221> NAME/KEY: CDS
<222> LOCATION: (1)..(7548)

<400> SEQUENCE: 1 atg caa gcg cca gca cca tca aga gac gac att gcc gtc gtc ggc ttg      48
Met Gln Ala Pro Ala Pro Ser Arg Asp Asp Ile Ala Val Val Gly Leu
1               5                   10                  15 tcg tgc cgc ttc ccg ggc gaa gca gat acc gcc gag cac ttt tgg gat      96
Ser Cys Arg Phe Pro Gly Glu Ala Asp Thr Ala Glu His Phe Trp Asp
                20                  25                  30 ttc atc tgc aat gga cgt aat gca tac tct gag aat ccg gat cgg tgg     144
Phe Ile Cys Asn Gly Arg Asn Ala Tyr Ser Glu Asn Pro Asp Arg Trp
            35                  40                  45 acg ccg gat gct ttt cac tac ggt gag aaa aaa atc aac acc agt ctg     192
Thr Pro Asp Ala Phe His Tyr Gly Glu Lys Lys Ile Asn Thr Ser Leu
        50                  55                  60 ccc cgg gga ggg cat ttt atg aag caa gat gtg gcc gcc ttt gac gcc     240
Pro Arg Gly Gly His Phe Met Lys Gln Asp Val Ala Ala Phe Asp Ala
65                  70                  75                  80 aac ttc ttc aac ctc tcc aag gtc gag gcc gag tcc atg gac ccc cag     288
Asn Phe Phe Asn Leu Ser Lys Val Glu Ala Glu Ser Met Asp Pro Gln
                85                  90                  95 cag cgc atc atg atg gag gtg acg tac gag tcc atg gag agc gcc ggc     336
```

```
        Gln Arg Ile Met Met Glu Val Thr Tyr Glu Ser Met Glu Ser Ala Gly
                        100                 105                 110 ctc cgc gtc gac cag ctc gcg ggc tcg cgg acg ggc gtc ttc atg gcc        384
Leu Arg Val Asp Gln Leu Ala Gly Ser Arg Thr Gly Val Phe Met Ala
            115                 120                 125 agc ttc acg agc gac tac cgc gag atg ctg tac cgc gat gcc gag acg        432
Ser Phe Thr Ser Asp Tyr Arg Glu Met Leu Tyr Arg Asp Ala Glu Thr
130                 135                 140 gcg cct ctc tac acc gca acg ggc acc agc aac acg tcg acg tcg aac        480
Ala Pro Leu Tyr Thr Ala Thr Gly Thr Ser Asn Thr Ser Thr Ser Asn
145                 150                 155                 160 cgc gtc tcg tgg ttc ttc gac ctg cgc ggg ccc agc ttc acc gtc aac        528
Arg Val Ser Trp Phe Phe Asp Leu Arg Gly Pro Ser Phe Thr Val Asn
                165                 170                 175 acg gcc tgc tcg tcc agt ctg gtc gcc tgc cat ctc gcc tgc caa agc        576
Thr Ala Cys Ser Ser Ser Leu Val Ala Cys His Leu Ala Cys Gln Ser
            180                 185                 190 cta tgg agc ggc gag acg gag agc gcc att gtc ggc ggc acc agc ctg        624
Leu Trp Ser Gly Glu Thr Glu Ser Ala Ile Val Gly Gly Thr Ser Leu
        195                 200                 205 ctg ctg aac ccc gac atg ttc ctg tac ctt tcc aac cag cag ttc ctg        672
Leu Leu Asn Pro Asp Met Phe Leu Tyr Leu Ser Asn Gln Gln Phe Leu
210                 215                 220 gcc ccc gac ggc cag tgc aag agc ttt gac gag tcg ggc gac ggc tac        720
Ala Pro Asp Gly Gln Cys Lys Ser Phe Asp Glu Ser Gly Asp Gly Tyr
225                 230                 235                 240 gcc agg ggc gac ggc atc ggc gtc gtc att ctg aag cga gtt gcc gac        768
Ala Arg Gly Asp Gly Ile Gly Val Val Ile Leu Lys Arg Val Ala Asp
                245                 250                 255 gcc ctc cgc gac ggc gac ccg atc cgc gcc gtc atc cgt ggc agc gga        816
Ala Leu Arg Asp Gly Asp Pro Ile Arg Ala Val Ile Arg Gly Ser Gly
            260                 265                 270 tgc aac cag gac ggc cat aca aag ggc ttc acc atc ccc agc gtc gac        864
Cys Asn Gln Asp Gly His Thr Lys Gly Phe Thr Ile Pro Ser Val Asp
        275                 280                 285 gcg caa gcc tcc ctc att gca gaa acg tac cgc aac gcc ggc ctc tca        912
Ala Gln Ala Ser Leu Ile Ala Glu Thr Tyr Arg Asn Ala Gly Leu Ser
290                 295                 300 ctt gcg gag aca cgc tac gtc gag gct cac gga acg ggc acc cag gcc        960
Leu Ala Glu Thr Arg Tyr Val Glu Ala His Gly Thr Gly Thr Gln Ala
305                 310                 315                 320 ggc gac acg cgt gag atg gaa ggc att gcc cgc aca ttc agc cag cac       1008
Gly Asp Thr Arg Glu Met Glu Gly Ile Ala Arg Thr Phe Ser Gln His
                325                 330                 335 cgc acg gcg tcg gac gag ctg ctg gtg gga tca gtc aag gca aat atc       1056
Arg Thr Ala Ser Asp Glu Leu Leu Val Gly Ser Val Lys Ala Asn Ile
            340                 345                 350 ggg cat ctc gaa gcc tgc gcg gga ctg gcc tcg ctc ata aag tgc gtc       1104
Gly His Leu Glu Ala Cys Ala Gly Leu Ala Ser Leu Ile Lys Cys Val
        355                 360                 365 tac atc ctg gaa acg ggc gtg ata ccc ccg acg ccg agc gtc cgc gtc       1152
Tyr Ile Leu Glu Thr Gly Val Ile Pro Pro Thr Pro Ser Val Arg Val
370                 375                 380 ctg aac ccc aag atc cgc tgg gag gaa tgg cat ctc aag gtg cct gcg       1200
Leu Asn Pro Lys Ile Arg Trp Glu Glu Trp His Leu Lys Val Pro Ala
385                 390                 395                 400 aca caa aca act tgg ccg acc gag ggc ctg cgg cgg atc agc acc caa       1248
Thr Gln Thr Thr Trp Pro Thr Glu Gly Leu Arg Arg Ile Ser Thr Gln
                405                 410                 415
```

```
ggt ttt gga tat ggc ggt aca aac gcg cat ctg att ctc gac gac gcg    1296
Gly Phe Gly Tyr Gly Gly Thr Asn Ala His Leu Ile Leu Asp Asp Ala
            420                 425                 430 gcc cat tat ctc gag gca cgc aaa ctc agg ggc cac cac tat acc cgt    1344
Ala His Tyr Leu Glu Ala Arg Lys Leu Arg Gly His His Tyr Thr Arg
            435                 440                 445 aca cat ccc cag aca cag aga ctt ttg acc tcg gca atg cag gaa gac    1392
Thr His Pro Gln Thr Gln Arg Leu Leu Thr Ser Ala Met Gln Glu Asp
        450                 455                 460 gtg tca aac gac cat ccg cca cgg tta ttt ctg ttc cgc gca aat gat    1440
Val Ser Asn Asp His Pro Pro Arg Leu Phe Leu Phe Arg Ala Asn Asp
465                 470                 475                 480 cgc gag ggc ctg gga cgc gtc cgc tcg tcg ctg gcc cag cat ctc gag    1488
Arg Glu Gly Leu Gly Arg Val Arg Ser Ser Leu Ala Gln His Leu Glu
                485                 490                 495 cag ctc ctc aag tcg tgg ccg cag gat tcg aga gac ggc ggc gca tac    1536
Gln Leu Leu Lys Ser Trp Pro Gln Asp Ser Arg Asp Gly Gly Ala Tyr
            500                 505                 510 cta cac aat ctg gcc ttc acc cta gcc agt cga cgg tcc cat ctc caa    1584
Leu His Asn Leu Ala Phe Thr Leu Ala Ser Arg Arg Ser His Leu Gln
            515                 520                 525 tgg cag acg tac gcc acg gcc tcg acg ccc tcg gag ctg ctc caa gcg    1632
Trp Gln Thr Tyr Ala Thr Ala Ser Thr Pro Ser Glu Leu Leu Gln Ala
        530                 535                 540 ctc cag cac gag ggc agc gcg tgg gcg gct ccc gag act cgc ctc gcc    1680
Leu Gln His Glu Gly Ser Ala Trp Ala Ala Pro Glu Thr Arg Leu Ala
545                 550                 555                 560 gcc tcg ccc ccc cgg ctc ggc ttc atc ttc acc ggc cag ggc gcg cag    1728
Ala Ser Pro Pro Arg Leu Gly Phe Ile Phe Thr Gly Gln Gly Ala Gln
                565                 570                 575 tgg gct cgc atg ggc gtc gag ctg atg gcg tac ccc gtg ttc cgc cag    1776
Trp Ala Arg Met Gly Val Glu Leu Met Ala Tyr Pro Val Phe Arg Gln
            580                 585                 590 agc gtc gag gcg tcg gac ggg ttt ctg cgc agc gcc ctc ggg tgc ccc    1824
Ser Val Glu Ala Ser Asp Gly Phe Leu Arg Ser Ala Leu Gly Cys Pro
            595                 600                 605 tgg tct gcc gtc gac gag ctg gcc cag ccg cag gct acg tcg cgg ctc    1872
Trp Ser Ala Val Asp Glu Leu Ala Gln Pro Gln Ala Thr Ser Arg Leu
        610                 615                 620 tcc gag gcg gcc tac agc cag acg ctc tgc acg gtg ctc caa atc gcc    1920
Ser Glu Ala Ala Tyr Ser Gln Thr Leu Cys Thr Val Leu Gln Ile Ala
625                 630                 635                 640 acc gtc gac ctg ctc gag gac tgg aac gtc tgt ccc acg cgc gtg gcc    1968
Thr Val Asp Leu Leu Glu Asp Trp Asn Val Cys Pro Thr Arg Val Ala
                645                 650                 655 ggg cac tcg agc ggc gag atc gcc gcc gcc tac tgc ctg ggc gcc ctg    2016
Gly His Ser Ser Gly Glu Ile Ala Ala Ala Tyr Cys Leu Gly Ala Leu
            660                 665                 670 agc aag cac gac agt ctg cgg gtg gcc tac tac cgc ggg att ctg tcc    2064
Ser Lys His Asp Ser Leu Arg Val Ala Tyr Tyr Arg Gly Ile Leu Ser
            675                 680                 685 tcg gag atg cag cag aca cac gcg gat cgc agg gga gcc atg atg gcc    2112
Ser Glu Met Gln Gln Thr His Ala Asp Arg Arg Gly Ala Met Met Ala
        690                 695                 700 gtc ggg gct tcc ccc gaa gag gtc gag gcg tgg ctg gcc aag ctg acc    2160
Val Gly Ala Ser Pro Glu Glu Val Glu Ala Trp Leu Ala Lys Leu Thr
705                 710                 715                 720 cgg gga cga gtc gtc gtc gcc tgc atc aac tcg ccg acc agc gtc acg    2208
Arg Gly Arg Val Val Val Ala Cys Ile Asn Ser Pro Thr Ser Val Thr
                725                 730                 735
```

-continued

| | |
|---|---|
| gca tcc ggg gac gcc gcg ggc gtc gac gag ctt ctc gcc atg gtc caa<br>Ala Ser Gly Asp Ala Ala Gly Val Asp Glu Leu Leu Ala Met Val Gln<br>740                          745                        750 | 2256 |
| cag gcc ggc gtg ttt ggg cgc aag ctg cag gtg gac gtg gcc tat cac<br>Gln Ala Gly Val Phe Gly Arg Lys Leu Gln Val Asp Val Ala Tyr His<br>      755                        760                        765 | 2304 |
| tct cac cac atg cag tcg gtt tct tcc gcg tac tct gag ctc ctc aag<br>Ser His His Met Gln Ser Val Ser Ser Ala Tyr Ser Glu Leu Leu Lys<br>770                          775                        780 | 2352 |
| gat ctt gcg ccg ctg ccg gcg cgt ccg gga cgc acc atg cac tcg agc<br>Asp Leu Ala Pro Leu Pro Ala Arg Pro Gly Arg Thr Met His Ser Ser<br>785                          790                        795                        800 | 2400 |
| gtc ttg ggc cgt gtc att gac gcc gcg gag ctc ggc gcc tcc aac tgg<br>Val Leu Gly Arg Val Ile Asp Ala Ala Glu Leu Gly Ala Ser Asn Trp<br>                        805                        810                        815 | 2448 |
| gtg caa aac ctc gtc tcc ccg gtg cgc ttc tcc gaa gcc gtg tcg agc<br>Val Gln Asn Leu Val Ser Pro Val Arg Phe Ser Glu Ala Val Ser Ser<br>                  820                        825                        830 | 2496 |
| ctc ctc tcc gcc ggg gac aag ccg gcc gtc gat gtg ctc gtc gag att<br>Leu Leu Ser Ala Gly Asp Lys Pro Ala Val Asp Val Leu Val Glu Ile<br>      835                        840                        845 | 2544 |
| gga ccg cac gcc gcg ctc aag ggg ccc gtc cag cag atc ctc cag gcc<br>Gly Pro His Ala Ala Leu Lys Gly Pro Val Gln Gln Ile Leu Gln Ala<br>850                          855                        860 | 2592 |
| cag ggc gtg tcc gcg gtc aag tac acg agt gtc ctc tcc cgg gga cag<br>Gln Gly Val Ser Ala Val Lys Tyr Thr Ser Val Leu Ser Arg Gly Gln<br>865                          870                        875                        880 | 2640 |
| agc gcc gta aag acg gct ctg gcg tgc gcc ggc gag ctc gtc ctg tcg<br>Ser Ala Val Lys Thr Ala Leu Ala Cys Ala Gly Glu Leu Val Leu Ser<br>                  885                        890                        895 | 2688 |
| agt gtg ccc gtc gcc gtg tct cgc gta aac ttg gag tcc ggg ccg ccg<br>Ser Val Pro Val Ala Val Ser Arg Val Asn Leu Glu Ser Gly Pro Pro<br>                    900                        905                        910 | 2736 |
| ccg agt ccg ttg gtc gac ctg ccc ccc tat ccc tgg aac cga tca act<br>Pro Ser Pro Leu Val Asp Leu Pro Pro Tyr Pro Trp Asn Arg Ser Thr<br>      915                        920                        925 | 2784 |
| cga ttc tgg gcc gag tcg cgt ctt tcc cga gag tat cgg ctt cgc aag<br>Arg Phe Trp Ala Glu Ser Arg Leu Ser Arg Glu Tyr Arg Leu Arg Lys<br>930                          935                        940 | 2832 |
| cac gcc cgc ctg ccg ctg ctg gga agt ccg tgt ccc acg atg ggc gcc<br>His Ala Arg Leu Pro Leu Leu Gly Ser Pro Cys Pro Thr Met Gly Ala<br>945                          950                        955                        960 | 2880 |
| cgc gag aga tac tgg cgc ggc atg gtg agg ttg gag gag gag ccc tgg<br>Arg Glu Arg Tyr Trp Arg Gly Met Val Arg Leu Glu Glu Glu Pro Trp<br>                  965                        970                        975 | 2928 |
| atc cgg gac cat gag atc cag ggg tcc atc ctg tat ccc ggg gcc ggc<br>Ile Arg Asp His Glu Ile Gln Gly Ser Ile Leu Tyr Pro Gly Ala Gly<br>                  980                        985                        990 | 2976 |
| ttc ttg atc atg gcc att gaa gct gcc tcc cag cag gca ggc gag cag<br>Phe Leu Ile Met Ala Ile Glu Ala Ala Ser Gln Gln Ala Gly Glu Gln<br>      995                        1000                      1005 | 3024 |
| cgc aaa gta agc gca ttc cga ctg cgc gac gtg cac ctc gac gcc<br>Arg Lys Val Ser Ala Phe Arg Leu Arg Asp Val His Leu Asp Ala<br>      1010                      1015                      1020 | 3069 |
| gcc ttg gtg gtg acc gag gac agc acc gcc gag gcc att ctg caa<br>Ala Leu Val Val Thr Glu Asp Ser Thr Ala Glu Ala Ile Leu Gln<br>      1025                      1030                      1035 | 3114 |
| ctc cga ccg cat ctt ctc gcg ccg ggc agc agc cag tcg tcc tgg<br>Leu Arg Pro His Leu Leu Ala Pro Gly Ser Ser Gln Ser Ser Trp | 3159 |

-continued

```
                    1040                1045                1050
atg gag ttt acc gtc aat tca tct att gac ggc ggt gac ttg cgt      3204
Met Glu Phe Thr Val Asn Ser Ser Ile Asp Gly Gly Asp Leu Arg
    1055                1060                1065 cag aac tgc tcc ggc ctc atc atg atc gag tat gcc gcc gac gcc      3249
Gln Asn Cys Ser Gly Leu Ile Met Ile Glu Tyr Ala Ala Asp Ala
    1070                1075                1080 gac tcg gcc atg gac cgc gag cgt gcc ctg gag tcg gac atg gtt      3294
Asp Ser Ala Met Asp Arg Glu Arg Ala Leu Glu Ser Asp Met Val
    1085                1090                1095 tgt gac tgg tac aag aaa acg tac gtc tct tgc cag cag tct gtc      3339
Cys Asp Trp Tyr Lys Lys Thr Tyr Val Ser Cys Gln Gln Ser Val
    1100                1105                1110 gat gtg ggc aaa ttc tac tcg cgc ctt gct tct ctc ggc ctt gtt      3384
Asp Val Gly Lys Phe Tyr Ser Arg Leu Ala Ser Leu Gly Leu Val
    1115                1120                1125 tac gga cca acc ttt gca aac gtg acg gag att cgg agg acg ggc      3429
Tyr Gly Pro Thr Phe Ala Asn Val Thr Glu Ile Arg Arg Thr Gly
    1130                1135                1140 cag ggc cag tgt atc ggt gcc gtc cgt atc ccg gcc gtg gac agc      3474
Gln Gly Gln Cys Ile Gly Ala Val Arg Ile Pro Ala Val Asp Ser
    1145                1150                1155 ctc gtg ccg ccc gca tac cgc agc cat cct cac gtc atc cat ccg      3519
Leu Val Pro Pro Ala Tyr Arg Ser His Pro His Val Ile His Pro
    1160                1165                1170 ggg acg ttg gat gcc gtc ttc cac ctc gcc ttt gcg gcg ctc gag      3564
Gly Thr Leu Asp Ala Val Phe His Leu Ala Phe Ala Ala Leu Glu
    1175                1180                1185 gac tcg ttg ctt ccg ggc ccc atg gtc cca acg aca atc gac gag      3609
Asp Ser Leu Leu Pro Gly Pro Met Val Pro Thr Thr Ile Asp Glu
    1190                1195                1200 ctg gtc gtg gca gca gat aca cca aac acc cct ggc act ctg ctt      3654
Leu Val Val Ala Ala Asp Thr Pro Asn Thr Pro Gly Thr Leu Leu
    1205                1210                1215 cgg gga gtc tca cgc tct tct cct cac ggc ttc aga gag ctc atc      3699
Arg Gly Val Ser Arg Ser Ser Pro His Gly Phe Arg Glu Leu Ile
    1220                1225                1230 tcc gac att gac atg ctg gac gac caa agc agc aga gca ctt gtg      3744
Ser Asp Ile Asp Met Leu Asp Asp Gln Ser Ser Arg Ala Leu Val
    1235                1240                1245 caa atc aag ggg ttc cgt tgc gcc gac gta tcc ggg ggg cgc atg      3789
Gln Ile Lys Gly Phe Arg Cys Ala Asp Val Ser Gly Gly Arg Met
    1250                1255                1260 acg tcg tcg gag gcg gcg tca gca gag agc cgg ccg att ggc ttc      3834
Thr Ser Ser Glu Ala Ala Ser Ala Glu Ser Arg Pro Ile Gly Phe
    1265                1270                1275 cgt ctc gag tgg aag ccg gca atc gac ttg ctg acc ggt gag cag      3879
Arg Leu Glu Trp Lys Pro Ala Ile Asp Leu Leu Thr Gly Glu Gln
    1280                1285                1290 cta cgg aca cat ctt gac cgt cgt gtc aag cag gag ggt gcg tcc      3924
Leu Arg Thr His Leu Asp Arg Arg Val Lys Gln Glu Gly Ala Ser
    1295                1300                1305 aac gtc gcc cgc gcc aca gag ctg aac aat cat gtc cat cac ctt      3969
Asn Val Ala Arg Ala Thr Glu Leu Asn Asn His Val His His Leu
    1310                1315                1320 gaa gaa act tta cct cgc gtt gcc gtg gat cct gcc atg gca aac      4014
Glu Glu Thr Leu Pro Arg Val Ala Val Asp Pro Ala Met Ala Asn
    1325                1330                1335 ttg tct gac tgg ctg tcg gcc aag tct gca aaa ctc acg aat ggt      4059
```

```
Leu Ser Asp Trp Leu Ser Ala Lys Ser Ala Lys Leu Thr Asn Gly
    1340             1345                 1350 act act tca tca tcc aaa cgt cta tcc cca ggg ggt gac atg ctc       4104
Thr Thr Ser Ser Ser Lys Arg Leu Ser Pro Gly Gly Asp Met Leu
    1355             1360                 1365 gca atg aga gac gcc ttg acc gcc gtg cga gca ggg agc att cca       4149
Ala Met Arg Asp Ala Leu Thr Ala Val Arg Ala Gly Ser Ile Pro
    1370             1375                 1380 tca cca gaa caa caa gac agg atg ctg aga gag gtg gag caa aac       4194
Ser Pro Glu Gln Gln Asp Arg Met Leu Arg Glu Val Glu Gln Asn
    1385             1390                 1395 ggc gct ctg tcc att cta ttc aag ccg ctc gac gca tat atc gac       4239
Gly Ala Leu Ser Ile Leu Phe Lys Pro Leu Asp Ala Tyr Ile Asp
    1400             1405                 1410 ctt cgc cat cat gcc aag ccc aac ctg tcg att ctt gag ctg agc       4284
Leu Arg His His Ala Lys Pro Asn Leu Ser Ile Leu Glu Leu Ser
    1415             1420                 1425 ctg gat tcg gtg cca tac tct gtc ttt gca gcc ctg ccc agt cga       4329
Leu Asp Ser Val Pro Tyr Ser Val Phe Ala Ala Leu Pro Ser Arg
    1430             1435                 1440 cac aag att ctc cag aca gcg cag tac gcc att aga gta tcg caa       4374
His Lys Ile Leu Gln Thr Ala Gln Tyr Ala Ile Arg Val Ser Gln
    1445             1450                 1455 gag ggc gtc gcc gac cga gtc agg gcc cag ttt ggg tct cag gct       4419
Glu Gly Val Ala Asp Arg Val Arg Ala Gln Phe Gly Ser Gln Ala
    1460             1465                 1470 tcc gac att gac gtc tcc gtc aca gac ttt aca aag aaa ctc gac       4464
Ser Asp Ile Asp Val Ser Val Thr Asp Phe Thr Lys Lys Leu Asp
    1475             1480                 1485 gag ggc ttg gga aag cat gat gtc att ctc ata ttt gac cct ggc       4509
Glu Gly Leu Gly Lys His Asp Val Ile Leu Ile Phe Asp Pro Gly
    1490             1495                 1500 ttc gta cac gca aag cta gag gtc gtt ttg cgc aac gcg cgc aag       4554
Phe Val His Ala Lys Leu Glu Val Val Leu Arg Asn Ala Arg Lys
    1505             1510                 1515 ctg ttg aac cca ggg ggc agg atc gtc gtc gca gaa gtc agc gac       4599
Leu Leu Asn Pro Gly Gly Arg Ile Val Val Ala Glu Val Ser Asp
    1520             1525                 1530 cct ggg ctc tac ttg ggc aca gca ctg ggc tgt ctt cag tgg aca       4644
Pro Gly Leu Tyr Leu Gly Thr Ala Leu Gly Cys Leu Gln Trp Thr
    1535             1540                 1545 aga aac cta gac gtt gcc cag agc agc agc agc tgg aca tcg tgt       4689
Arg Asn Leu Asp Val Ala Gln Ser Ser Ser Ser Trp Thr Ser Cys
    1550             1555                 1560 ctc gcg cgc tcg gga ctg acg cct gct ctc aaa ctc atc gac atg       4734
Leu Ala Arg Ser Gly Leu Thr Pro Ala Leu Lys Leu Ile Asp Met
    1565             1570                 1575 gac aca gag tcc gcc gtt cac gga cac ttc cgc ctg agt ctc aca       4779
Asp Thr Glu Ser Ala Val His Gly His Phe Arg Leu Ser Leu Thr
    1580             1585                 1590 ggc aat gcc gcc gag tcg acc aac agt gac aat cgc cag ccg cag       4824
Gly Asn Ala Ala Glu Ser Thr Asn Ser Asp Asn Arg Gln Pro Gln
    1595             1600                 1605 caa gtc acc ctc ata gaa gcc gcc aat cca tct gcc acg gcg caa       4869
Gln Val Thr Leu Ile Glu Ala Ala Asn Pro Ser Ala Thr Ala Gln
    1610             1615                 1620 gat atc gcg gca gcc gtg gcc cag aat ctt gac aag gcg tcg att       4914
Asp Ile Ala Ala Ala Val Ala Gln Asn Leu Asp Lys Ala Ser Ile
    1625             1630                 1635
```

```
ccc aca aag cgc atc cgt tgg ggc tcc gac gtg tcg cag ctc aag    4959
Pro Thr Lys Arg Ile Arg Trp Gly Ser Asp Val Ser Gln Leu Lys
    1640            1645                1650 ggc cag cct tgc atc gtc ctg acg gac ttg gag tct gcg ctt ctc    5004
Gly Gln Pro Cys Ile Val Leu Thr Asp Leu Glu Ser Ala Leu Leu
    1655            1660                1665 aag gac ccg gca cca gag gat ctc gcg gcc ctg cag tcg ctg ttc    5049
Lys Asp Pro Ala Pro Glu Asp Leu Ala Ala Leu Gln Ser Leu Phe
    1670            1675                1680 gcg cat gcc gag agc acc ctc tgg gtc agt ggc ccc ctg gga cct    5094
Ala His Ala Glu Ser Thr Leu Trp Val Ser Gly Pro Leu Gly Pro
    1685            1690                1695 gat gct gct ctg atc acg ggc ctg tct cgc agc gtt tgc aac gag    5139
Asp Ala Ala Leu Ile Thr Gly Leu Ser Arg Ser Val Cys Asn Glu
    1700            1705                1710 gcg gcc gac gtc cat ata cgc acg ctt gag gtg act gat ctg cct    5184
Ala Ala Asp Val His Ile Arg Thr Leu Glu Val Thr Asp Leu Pro
    1715            1720                1725 ggc ccc ggg gcc gac agc tac gcc gac ctg gtc act cgc gtc ttc    5229
Gly Pro Gly Ala Asp Ser Tyr Ala Asp Leu Val Thr Arg Val Phe
    1730            1735                1740 cgg tat agc ggt ccc gat aca gag ttt cgg tgg cat tca gac gcg    5274
Arg Tyr Ser Gly Pro Asp Thr Glu Phe Arg Trp His Ser Asp Ala
    1745            1750                1755 ctg ctt gtc agc cgc ctg gtc gag gat gag gcc cga aac aag gag    5319
Leu Leu Val Ser Arg Leu Val Glu Asp Glu Ala Arg Asn Lys Glu
    1760            1765                1770 att gca cag ctg ctg ggc cag gga gaa aag gcc gcg gtt gcg act    5364
Ile Ala Gln Leu Leu Gly Gln Gly Glu Lys Ala Ala Val Ala Thr
    1775            1780                1785 acg cta cag gag aag cca gag gga ctg aag cta tgc atg cgc cag    5409
Thr Leu Gln Glu Lys Pro Glu Gly Leu Lys Leu Cys Met Arg Gln
    1790            1795                1800 att ggc atg ctg gac tct gtt tgc ttt gag ccc gac ttg ttg gct    5454
Ile Gly Met Leu Asp Ser Val Cys Phe Glu Pro Asp Leu Leu Ala
    1805            1810                1815 ttg gag cca ctg gaa gca ggc gag gtg gaa gtc gac gtc aag gcc    5499
Leu Glu Pro Leu Glu Ala Gly Glu Val Glu Val Asp Val Lys Ala
    1820            1825                1830 tcc gga gtc aac ttc cga gat gtc atg gtc gcc ttg gga cag att    5544
Ser Gly Val Asn Phe Arg Asp Val Met Val Ala Leu Gly Gln Ile
    1835            1840                1845 cca gac cgg gca ttc ggg ttc gag ggc gct ggt gtc gtt cgc cgt    5589
Pro Asp Arg Ala Phe Gly Phe Glu Gly Ala Gly Val Val Arg Arg
    1850            1855                1860 gta cat gct tca gag acg cgc ctc cgc cca gga gac cga gtc gtc    5634
Val His Ala Ser Glu Thr Arg Leu Arg Pro Gly Asp Arg Val Val
    1865            1870                1875 ttc ctc gct cac gga gca cac cgt aca gtc cat cgc gta cgc gcc    5679
Phe Leu Ala His Gly Ala His Arg Thr Val His Arg Val Arg Ala
    1880            1885                1890 gac tac gcc atg cct atg cct gat acc atg agc ttt gaa gag ggc    5724
Asp Tyr Ala Met Pro Met Pro Asp Thr Met Ser Phe Glu Glu Gly
    1895            1900                1905 gcg gcc att ctc ctc gtc cac acg aca gct tgg tac gca ctc gtc    5769
Ala Ala Ile Leu Leu Val His Thr Thr Ala Trp Tyr Ala Leu Val
    1910            1915                1920 aag tcg gcg cgc gca aca gcc ggc cag tca gtc ctc gtt cac gct    5814
Lys Ser Ala Arg Ala Thr Ala Gly Gln Ser Val Leu Val His Ala
    1925            1930                1935
```

```
gcc gca ggt ggt gtt ggc cag gcc gtc ctc atg ctt gct cga cat    5859
Ala Ala Gly Gly Val Gly Gln Ala Val Leu Met Leu Ala Arg His
    1940            1945                1950 cta ggt cta cag gtt ttc gcg acg gtt ggt tcc gag gag aag agg    5904
Leu Gly Leu Gln Val Phe Ala Thr Val Gly Ser Glu Glu Lys Arg
    1955            1960                1965 aag ctt gtg cac gaa acg tac ggg gtt ccc cac gac cac atc ttc    5949
Lys Leu Val His Glu Thr Tyr Gly Val Pro His Asp His Ile Phe
    1970            1975                1980 aac tcg cga gac gcc agc ttt gcc atg ggc gtg aag cgc atg acc    5994
Asn Ser Arg Asp Ala Ser Phe Ala Met Gly Val Lys Arg Met Thr
    1985            1990                1995 aaa ggc cgc ggg gtc gat att gtt gtc aat tcg ctg gct ggg gaa    6039
Lys Gly Arg Gly Val Asp Ile Val Val Asn Ser Leu Ala Gly Glu
    2000            2005                2010 gct ctc cgg cag acg tgg cac tgc ctg gcc ccc ttt ggc acc ttt    6084
Ala Leu Arg Gln Thr Trp His Cys Leu Ala Pro Phe Gly Thr Phe
    2015            2020                2025 gtc gag ctc ggc atg aag gac atc ttg gac aac gca cgc ctg gac    6129
Val Glu Leu Gly Met Lys Asp Ile Leu Asp Asn Ala Arg Leu Asp
    2030            2035                2040 atg aag ccc ttc ctc cag gat gcc aca ttc gtc ttc ttt aac ctg    6174
Met Lys Pro Phe Leu Gln Asp Ala Thr Phe Val Phe Phe Asn Leu
    2045            2050                2055 aac cgt gtc caa aag gag cgg cca gac ctc atg gga gag gct ctc    6219
Asn Arg Val Gln Lys Glu Arg Pro Asp Leu Met Gly Glu Ala Leu
    2060            2065                2070 cga gag aca atg gcc ctt gta cgc tcc ggc gct ctc aag ccc gcg    6264
Arg Glu Thr Met Ala Leu Val Arg Ser Gly Ala Leu Lys Pro Ala
    2075            2080                2085 acg ccg ctc acc tcg tat ccc gcc tct cag gtg gaa gcg gca ttc    6309
Thr Pro Leu Thr Ser Tyr Pro Ala Ser Gln Val Glu Ala Ala Phe
    2090            2095                2100 cgc aag att caa acg ggc cag cac cta ggg aag ctc gtg ctg aca    6354
Arg Lys Ile Gln Thr Gly Gln His Leu Gly Lys Leu Val Leu Thr
    2105            2110                2115 ttc cag gag gga gat gtt gtc ccc gtc gtc aga cca gac ctc agc    6399
Phe Gln Glu Gly Asp Val Val Pro Val Val Arg Pro Asp Leu Ser
    2120            2125                2130 cta agt gac tct ggc acc tac ctt ctc gtc gga gga ctc ggc ggc    6444
Leu Ser Asp Ser Gly Thr Tyr Leu Leu Val Gly Gly Leu Gly Gly
    2135            2140                2145 ttg ggc cgg agt ctt gca cgg ctc ctg gtg cag ctt ggg gcg cgc    6489
Leu Gly Arg Ser Leu Ala Arg Leu Leu Val Gln Leu Gly Ala Arg
    2150            2155                2160 cgg ctg tgc ttc ctc tct cgc tcc ggc gca gca agc agc gag gcg    6534
Arg Leu Cys Phe Leu Ser Arg Ser Gly Ala Ala Ser Ser Glu Ala
    2165            2170                2175 cgc gcc ctc gtc aag gaa ctg gag atg cag cat cga gta cgc gtc    6579
Arg Ala Leu Val Lys Glu Leu Glu Met Gln His Arg Val Arg Val
    2180            2185                2190 ctc gtc tgc aaa ggg gac gtg tcc gac gcc gac acc gta tcc cgc    6624
Leu Val Cys Lys Gly Asp Val Ser Asp Ala Asp Thr Val Ser Arg
    2195            2200                2205 gtc gtc cag caa tgc cgg gcg gct ctg ggg ccc atc cgg ggc gtc    6669
Val Val Gln Gln Cys Arg Ala Ala Leu Gly Pro Ile Arg Gly Val
    2210            2215                2220 att cag tgt gcc atg gtc ctc cgt gac ggt ctc ttt gag agg atg    6714
Ile Gln Cys Ala Met Val Leu Arg Asp Gly Leu Phe Glu Arg Met
```

```
                        2225                2230                2235
gct cac gat cag tgg acc gaa agc acg cgg ccc aag gtg cag ggc      6759
Ala His Asp Gln Trp Thr Glu Ser Thr Arg Pro Lys Val Gln Gly
2240                2245                2250 acg tgg aac ctg cac gag cag atc cca gtg tcc gac ttt ttc atc      6804
Thr Trp Asn Leu His Glu Gln Ile Pro Val Ser Asp Phe Phe Ile
        2255                2260                2265 acg ctg agt tcc ttt gcg ggc gtc ttt gga agc cgt ggg cag agc      6849
Thr Leu Ser Ser Phe Ala Gly Val Phe Gly Ser Arg Gly Gln Ser
2270                2275                2280 aac tac gcc gct gcg ggt gcg tac gag gat gcc atg gca cac cat      6894
Asn Tyr Ala Ala Ala Gly Ala Tyr Glu Asp Ala Met Ala His His
        2285                2290                2295 cgg gag tct ctg ggc cag agg gcc atc acc atc gac ttg ggc atc      6939
Arg Glu Ser Leu Gly Gln Arg Ala Ile Thr Ile Asp Leu Gly Ile
2300                2305                2310 atg cga gac gtg ggt gtt ctc gcc gag aac ggc atc acc gac tat      6984
Met Arg Asp Val Gly Val Leu Ala Glu Asn Gly Ile Thr Asp Tyr
        2315                2320                2325 ctc cgc gag tgg gag gag ccg ttt gga atc cgc gag ccc gag ttc      7029
Leu Arg Glu Trp Glu Glu Pro Phe Gly Ile Arg Glu Pro Glu Phe
2330                2335                2340 cat gcg ctc atc aag tca gcc atc atg tcg acg acg cag ccc ctg      7074
His Ala Leu Ile Lys Ser Ala Ile Met Ser Thr Thr Gln Pro Leu
        2345                2350                2355 act gaa cgc tcc gtg gtg cag atc cca acc ggc ctg gcc acg gcc      7119
Thr Glu Arg Ser Val Val Gln Ile Pro Thr Gly Leu Ala Thr Ala
2360                2365                2370 cgg tct gcg cag gca gcc ggt ata agc aca ccg ttc tac ttt gat      7164
Arg Ser Ala Gln Ala Ala Gly Ile Ser Thr Pro Phe Tyr Phe Asp
        2375                2380                2385 gat gcc cgt ttc tcc atc ctg gcc cag aca cgc gcc tcg gcc ggt      7209
Asp Ala Arg Phe Ser Ile Leu Ala Gln Thr Arg Ala Ser Ala Gly
2390                2395                2400 gcc tcg tct gca gct ggg tct ggt gac gcc gat gcc ggc aag gtt      7254
Ala Ser Ser Ala Ala Gly Ser Gly Asp Ala Asp Ala Gly Lys Val
        2405                2410                2415 tct gtg cgg acg cag ctt tcc cag gct cat tcc gtg gct gaa gcc      7299
Ser Val Arg Thr Gln Leu Ser Gln Ala His Ser Val Ala Glu Ala
2420                2425                2430 gcc gcc gcc gtc cag acg gtg ctt ctt gag cgc gtg gca agg acc      7344
Ala Ala Ala Val Gln Thr Val Leu Leu Glu Arg Val Ala Arg Thr
        2435                2440                2445 ctt cag agc tcc gtg gcg gaa atc gat ccc tcc cgg cca ctg cac      7389
Leu Gln Ser Ser Val Ala Glu Ile Asp Pro Ser Arg Pro Leu His
2450                2455                2460 tcg tac ggt gta gat tcc ttg gtg gcc gtg gaa acg gtc aag tgg      7434
Ser Tyr Gly Val Asp Ser Leu Val Ala Val Glu Thr Val Lys Trp
        2465                2470                2475 atg ttt aag acg ctg gac gct aag atg acg gtg ttt gat gtt ctt      7479
Met Phe Lys Thr Leu Asp Ala Lys Met Thr Val Phe Asp Val Leu
2480                2485                2490 tcc aac gtg tcc atc acg gcg ctg tgc gag aag att gca tcc atg      7524
Ser Asn Val Ser Ile Thr Ala Leu Cys Glu Lys Ile Ala Ser Met
        2495                2500                2505 tct act ttg gtg aaa ttg aac tag                                  7548
Ser Thr Leu Val Lys Leu Asn
2510                2515
```

<210> SEQ ID NO 2
<211> LENGTH: 2515
<212> TYPE: PRT
<213> ORGANISM: Metarhizium anisopliae

<400> SEQUENCE: 2

```
Met Gln Ala Pro Ala Pro Ser Arg Asp Asp Ile Ala Val Val Gly Leu
1               5                   10                  15

Ser Cys Arg Phe Pro Gly Glu Ala Asp Thr Ala Glu His Phe Trp Asp
            20                  25                  30

Phe Ile Cys Asn Gly Arg Asn Ala Tyr Ser Glu Asn Pro Asp Arg Trp
        35                  40                  45

Thr Pro Asp Ala Phe His Tyr Gly Glu Lys Lys Ile Asn Thr Ser Leu
    50                  55                  60

Pro Arg Gly Gly His Phe Met Lys Gln Asp Val Ala Ala Phe Asp Ala
65                  70                  75                  80

Asn Phe Phe Asn Leu Ser Lys Val Glu Ala Glu Ser Met Asp Pro Gln
                85                  90                  95

Gln Arg Ile Met Met Glu Val Thr Tyr Glu Ser Met Glu Ser Ala Gly
            100                 105                 110

Leu Arg Val Asp Gln Leu Ala Gly Ser Arg Thr Gly Val Phe Met Ala
        115                 120                 125

Ser Phe Thr Ser Asp Tyr Arg Glu Met Leu Tyr Arg Asp Ala Glu Thr
    130                 135                 140

Ala Pro Leu Tyr Thr Ala Thr Gly Thr Ser Asn Thr Ser Thr Ser Asn
145                 150                 155                 160

Arg Val Ser Trp Phe Phe Asp Leu Arg Gly Pro Ser Phe Thr Val Asn
                165                 170                 175

Thr Ala Cys Ser Ser Ser Leu Val Ala Cys His Leu Ala Cys Gln Ser
            180                 185                 190

Leu Trp Ser Gly Glu Thr Glu Ser Ala Ile Val Gly Gly Thr Ser Leu
        195                 200                 205

Leu Leu Asn Pro Asp Met Phe Leu Tyr Leu Ser Asn Gln Gln Phe Leu
    210                 215                 220

Ala Pro Asp Gly Gln Cys Lys Ser Phe Asp Glu Ser Gly Asp Gly Tyr
225                 230                 235                 240

Ala Arg Gly Asp Gly Ile Gly Val Val Ile Leu Lys Arg Val Ala Asp
                245                 250                 255

Ala Leu Arg Asp Gly Asp Pro Ile Arg Ala Val Ile Arg Gly Ser Gly
            260                 265                 270

Cys Asn Gln Asp Gly His Thr Lys Gly Phe Thr Ile Pro Ser Val Asp
        275                 280                 285

Ala Gln Ala Ser Leu Ile Ala Glu Thr Tyr Arg Asn Ala Gly Leu Ser
    290                 295                 300

Leu Ala Glu Thr Arg Tyr Val Glu Ala His Gly Thr Gly Thr Gln Ala
305                 310                 315                 320

Gly Asp Thr Arg Glu Met Glu Gly Ile Ala Arg Thr Phe Ser Gln His
                325                 330                 335

Arg Thr Ala Ser Asp Glu Leu Leu Val Gly Ser Val Lys Ala Asn Ile
            340                 345                 350

Gly His Leu Glu Ala Cys Ala Gly Leu Ala Ser Leu Ile Lys Cys Val
        355                 360                 365

Tyr Ile Leu Glu Thr Gly Val Ile Pro Pro Thr Pro Ser Val Arg Val
    370                 375                 380
```

```
Leu Asn Pro Lys Ile Arg Trp Glu Glu Trp His Leu Lys Val Pro Ala
385                 390                 395                 400

Thr Gln Thr Thr Trp Pro Thr Glu Gly Leu Arg Arg Ile Ser Thr Gln
            405                 410                 415

Gly Phe Gly Tyr Gly Gly Thr Asn Ala His Leu Ile Leu Asp Asp Ala
        420                 425                 430

Ala His Tyr Leu Glu Ala Arg Lys Leu Arg Gly His His Tyr Thr Arg
        435                 440                 445

Thr His Pro Gln Thr Gln Arg Leu Leu Thr Ser Ala Met Gln Glu Asp
    450                 455                 460

Val Ser Asn Asp His Pro Pro Arg Leu Phe Leu Phe Arg Ala Asn Asp
465                 470                 475                 480

Arg Glu Gly Leu Gly Arg Val Arg Ser Leu Ala Gln His Leu Glu
                485                 490                 495

Gln Leu Leu Lys Ser Trp Pro Gln Asp Ser Arg Asp Gly Gly Ala Tyr
            500                 505                 510

Leu His Asn Leu Ala Phe Thr Leu Ala Ser Arg Ser His Leu Gln
    515                 520                 525

Trp Gln Thr Tyr Ala Thr Ala Ser Thr Pro Ser Glu Leu Leu Gln Ala
530                 535                 540

Leu Gln His Glu Gly Ser Ala Trp Ala Ala Pro Glu Thr Arg Leu Ala
545                 550                 555                 560

Ala Ser Pro Pro Arg Leu Gly Phe Ile Phe Thr Gly Gln Gly Ala Gln
                565                 570                 575

Trp Ala Arg Met Gly Val Glu Leu Met Ala Tyr Pro Val Phe Arg Gln
            580                 585                 590

Ser Val Glu Ala Ser Asp Gly Phe Leu Arg Ser Ala Leu Gly Cys Pro
    595                 600                 605

Trp Ser Ala Val Asp Glu Leu Ala Gln Pro Gln Ala Thr Ser Arg Leu
610                 615                 620

Ser Glu Ala Ala Tyr Ser Gln Thr Leu Cys Thr Val Leu Gln Ile Ala
625                 630                 635                 640

Thr Val Asp Leu Leu Glu Asp Trp Asn Val Cys Pro Thr Arg Val Ala
                645                 650                 655

Gly His Ser Ser Gly Glu Ile Ala Ala Ala Tyr Cys Leu Gly Ala Leu
            660                 665                 670

Ser Lys His Asp Ser Leu Arg Val Ala Tyr Tyr Arg Gly Ile Leu Ser
    675                 680                 685

Ser Glu Met Gln Gln Thr His Ala Asp Arg Arg Gly Ala Met Met Ala
690                 695                 700

Val Gly Ala Ser Pro Glu Glu Val Glu Ala Trp Leu Ala Lys Leu Thr
705                 710                 715                 720

Arg Gly Arg Val Val Val Ala Cys Ile Asn Ser Pro Thr Ser Val Thr
                725                 730                 735

Ala Ser Gly Asp Ala Ala Gly Val Asp Glu Leu Leu Ala Met Val Gln
            740                 745                 750

Gln Ala Gly Val Phe Gly Arg Lys Leu Gln Val Asp Val Ala Tyr His
    755                 760                 765

Ser His His Met Gln Ser Val Ser Ser Ala Tyr Ser Glu Leu Leu Lys
770                 775                 780

Asp Leu Ala Pro Leu Pro Ala Arg Pro Gly Arg Thr Met His Ser Ser
785                 790                 795                 800

Val Leu Gly Arg Val Ile Asp Ala Ala Glu Leu Gly Ala Ser Asn Trp
```

```
                    805                 810                 815
Val Gln Asn Leu Val Ser Pro Val Arg Phe Ser Glu Ala Val Ser Ser
                820                 825                 830

Leu Leu Ser Ala Gly Asp Lys Pro Ala Val Asp Val Leu Val Glu Ile
                835                 840                 845

Gly Pro His Ala Ala Leu Lys Gly Pro Val Gln Gln Ile Leu Gln Ala
        850                 855                 860

Gln Gly Val Ser Ala Val Lys Tyr Thr Ser Val Leu Ser Arg Gly Gln
865                 870                 875                 880

Ser Ala Val Lys Thr Ala Leu Ala Cys Ala Gly Glu Leu Val Leu Ser
                885                 890                 895

Ser Val Pro Val Ala Val Ser Arg Val Asn Leu Glu Ser Gly Pro Pro
        900                 905                 910

Pro Ser Pro Leu Val Asp Leu Pro Pro Tyr Pro Trp Asn Arg Ser Thr
            915                 920                 925

Arg Phe Trp Ala Glu Ser Arg Leu Ser Arg Glu Tyr Arg Leu Arg Lys
    930                 935                 940

His Ala Arg Leu Pro Leu Leu Gly Ser Pro Cys Pro Thr Met Gly Ala
945                 950                 955                 960

Arg Glu Arg Tyr Trp Arg Gly Met Val Arg Leu Glu Glu Pro Trp
                965                 970                 975

Ile Arg Asp His Glu Ile Gln Gly Ser Ile Leu Tyr Pro Gly Ala Gly
            980                 985                 990

Phe Leu Ile Met Ala Ile Glu Ala  Ala Ser Gln Gln Ala  Gly Glu Gln
        995                 1000                1005

Arg Lys Val Ser Ala Phe Arg  Leu Arg Asp Val His  Leu Asp Ala
    1010                1015                1020

Ala Leu Val Val Thr Glu Asp  Ser Thr Ala Glu Ala  Ile Leu Gln
    1025                1030                1035

Leu Arg Pro His Leu Leu Ala  Pro Gly Ser Ser Gln  Ser Ser Trp
    1040                1045                1050

Met Glu Phe Thr Val Asn Ser  Ile Asp Gly Gly  Asp Leu Arg
    1055                1060                1065

Gln Asn Cys Ser Gly Leu Ile  Met Ile Glu Tyr Ala  Ala Asp Ala
    1070                1075                1080

Asp Ser Ala Met Asp Arg Glu  Arg Ala Leu Glu Ser  Asp Met Val
    1085                1090                1095

Cys Asp Trp Tyr Lys Lys Thr  Tyr Val Ser Cys Gln  Gln Ser Val
    1100                1105                1110

Asp Val Gly Lys Phe Tyr Ser  Arg Leu Ala Ser Leu  Gly Leu Val
    1115                1120                1125

Tyr Gly Pro Thr Phe Ala Asn  Val Thr Glu Ile Arg  Arg Thr Gly
    1130                1135                1140

Gln Gly Gln Cys Ile Gly Ala  Val Arg Ile Pro Ala  Val Asp Ser
    1145                1150                1155

Leu Val Pro Pro Ala Tyr Arg  Ser His Pro His Val  Ile His Pro
    1160                1165                1170

Gly Thr Leu Asp Ala Val Phe  His Leu Ala Phe Ala  Ala Leu Glu
    1175                1180                1185

Asp Ser Leu Leu Pro Gly Pro  Met Val Pro Thr Ile  Asp Glu
    1190                1195                1200

Leu Val Val Ala Ala Asp Thr  Pro Asn Thr Pro Gly  Thr Leu Leu
    1205                1210                1215
```

-continued

Arg Gly Val Ser Arg Ser Ser Pro His Gly Phe Arg Glu Leu Ile
1220            1225                1230

Ser Asp Ile Asp Met Leu Asp Asp Gln Ser Ser Arg Ala Leu Val
1235            1240                1245

Gln Ile Lys Gly Phe Arg Cys Ala Asp Val Ser Gly Gly Arg Met
1250            1255                1260

Thr Ser Ser Glu Ala Ala Ser Ala Glu Ser Arg Pro Ile Gly Phe
1265            1270                1275

Arg Leu Glu Trp Lys Pro Ala Ile Asp Leu Leu Thr Gly Glu Gln
1280            1285                1290

Leu Arg Thr His Leu Asp Arg Arg Val Lys Gln Glu Gly Ala Ser
1295            1300                1305

Asn Val Ala Arg Ala Thr Glu Leu Asn Asn His Val His His Leu
1310            1315                1320

Glu Glu Thr Leu Pro Arg Val Ala Val Asp Pro Ala Met Ala Asn
1325            1330                1335

Leu Ser Asp Trp Leu Ser Ala Lys Ser Ala Lys Leu Thr Asn Gly
1340            1345                1350

Thr Thr Ser Ser Ser Lys Arg Leu Ser Pro Gly Gly Asp Met Leu
1355            1360                1365

Ala Met Arg Asp Ala Leu Thr Ala Val Arg Ala Gly Ser Ile Pro
1370            1375                1380

Ser Pro Glu Gln Gln Asp Arg Met Leu Arg Glu Val Glu Gln Asn
1385            1390                1395

Gly Ala Leu Ser Ile Leu Phe Lys Pro Leu Asp Ala Tyr Ile Asp
1400            1405                1410

Leu Arg His His Ala Lys Pro Asn Leu Ser Ile Leu Glu Leu Ser
1415            1420                1425

Leu Asp Ser Val Pro Tyr Ser Val Phe Ala Ala Leu Pro Ser Arg
1430            1435                1440

His Lys Ile Leu Gln Thr Ala Gln Tyr Ala Ile Arg Val Ser Gln
1445            1450                1455

Glu Gly Val Ala Asp Arg Val Arg Ala Gln Phe Gly Ser Gln Ala
1460            1465                1470

Ser Asp Ile Asp Val Ser Val Thr Asp Phe Thr Lys Lys Leu Asp
1475            1480                1485

Glu Gly Leu Gly Lys His Asp Val Ile Leu Ile Phe Asp Pro Gly
1490            1495                1500

Phe Val His Ala Lys Leu Glu Val Val Leu Arg Asn Ala Arg Lys
1505            1510                1515

Leu Leu Asn Pro Gly Gly Arg Ile Val Val Ala Glu Val Ser Asp
1520            1525                1530

Pro Gly Leu Tyr Leu Gly Thr Ala Leu Gly Cys Leu Gln Trp Thr
1535            1540                1545

Arg Asn Leu Asp Val Ala Gln Ser Ser Ser Ser Trp Thr Ser Cys
1550            1555                1560

Leu Ala Arg Ser Gly Leu Thr Pro Ala Leu Lys Leu Ile Asp Met
1565            1570                1575

Asp Thr Glu Ser Ala Val His Gly His Phe Arg Leu Ser Leu Thr
1580            1585                1590

Gly Asn Ala Ala Glu Ser Thr Asn Ser Asp Asn Arg Gln Pro Gln
1595            1600                1605

-continued

```
Gln Val Thr Leu Ile Glu Ala Ala Asn Pro Ser Ala  Thr Ala Gln
1610                1615                1620

Asp Ile Ala Ala Val Ala Gln Asn Leu Asp Lys Ala  Ser Ile
1625                1630                1635

Pro Thr Lys Arg Ile Arg Trp Gly Ser Asp Val Ser  Gln Leu Lys
1640                1645                1650

Gly Gln Pro Cys Ile Val Leu Thr Asp Leu Glu Ser  Ala Leu Leu
1655                1660                1665

Lys Asp Pro Ala Pro Glu Asp Leu Ala Ala Leu Gln  Ser Leu Phe
1670                1675                1680

Ala His Ala Glu Ser Thr Leu Trp Val Ser Gly Pro  Leu Gly Pro
1685                1690                1695

Asp Ala Ala Leu Ile Thr Gly Leu Ser Arg Ser Val  Cys Asn Glu
1700                1705                1710

Ala Ala Asp Val His Ile Arg Thr Leu Glu Val Thr  Asp Leu Pro
1715                1720                1725

Gly Pro Gly Ala Asp Ser Tyr Ala Asp Leu Val Thr  Arg Val Phe
1730                1735                1740

Arg Tyr Ser Gly Pro Asp Thr Glu Phe Arg Trp His  Ser Asp Ala
1745                1750                1755

Leu Leu Val Ser Arg Leu Val Glu Asp Glu Ala Arg  Asn Lys Glu
1760                1765                1770

Ile Ala Gln Leu Leu Gly Gln Gly Glu Lys Ala Ala  Val Ala Thr
1775                1780                1785

Thr Leu Gln Glu Lys Pro Glu Gly Leu Lys Leu Cys  Met Arg Gln
1790                1795                1800

Ile Gly Met Leu Asp Ser Val Cys Phe Glu Pro Asp  Leu Leu Ala
1805                1810                1815

Leu Glu Pro Leu Glu Ala Gly Glu Val Glu Val Asp  Val Lys Ala
1820                1825                1830

Ser Gly Val Asn Phe Arg Asp Val Met Val Ala Leu  Gly Gln Ile
1835                1840                1845

Pro Asp Arg Ala Phe Gly Phe Glu Gly Ala Gly Val  Val Arg Arg
1850                1855                1860

Val His Ala Ser Glu Thr Arg Leu Arg Pro Gly Asp  Arg Val Val
1865                1870                1875

Phe Leu Ala His Gly Ala His Arg Thr Val His Arg  Val Arg Ala
1880                1885                1890

Asp Tyr Ala Met Pro Met Pro Asp Thr Met Ser Phe  Glu Glu Gly
1895                1900                1905

Ala Ala Ile Leu Leu Val His Thr Thr Ala Trp Tyr  Ala Leu Val
1910                1915                1920

Lys Ser Ala Arg Ala Thr Ala Gly Gln Ser Val Leu  Val His Ala
1925                1930                1935

Ala Ala Gly Gly Val Gly Gln Ala Val Leu Met Leu  Ala Arg His
1940                1945                1950

Leu Gly Leu Gln Val Phe Ala Thr Val Gly Ser Glu  Glu Lys Arg
1955                1960                1965

Lys Leu Val His Glu Thr Tyr Gly Val Pro His Asp  His Ile Phe
1970                1975                1980

Asn Ser Arg Asp Ala Ser Phe Ala Met Gly Val Lys  Arg Met Thr
1985                1990                1995

Lys Gly Arg Gly Val Asp Ile Val Val Asn Ser Leu  Ala Gly Glu
```

```
                2000                2005                2010
Ala Leu Arg Gln Thr Trp His Cys Leu Ala Pro Phe Gly Thr Phe
            2015                2020                2025

Val Glu Leu Gly Met Lys Asp Ile Leu Asp Asn Ala Arg Leu Asp
            2030                2035                2040

Met Lys Pro Phe Leu Gln Asp Ala Thr Phe Val Phe Phe Asn Leu
            2045                2050                2055

Asn Arg Val Gln Lys Glu Arg Pro Asp Leu Met Gly Glu Ala Leu
            2060                2065                2070

Arg Glu Thr Met Ala Leu Val Arg Ser Gly Ala Leu Lys Pro Ala
            2075                2080                2085

Thr Pro Leu Thr Ser Tyr Pro Ala Ser Gln Val Glu Ala Ala Phe
            2090                2095                2100

Arg Lys Ile Gln Thr Gly Gln His Leu Gly Lys Leu Val Leu Thr
            2105                2110                2115

Phe Gln Glu Gly Asp Val Val Pro Val Val Arg Pro Asp Leu Ser
            2120                2125                2130

Leu Ser Asp Ser Gly Thr Tyr Leu Leu Val Gly Gly Leu Gly Gly
            2135                2140                2145

Leu Gly Arg Ser Leu Ala Arg Leu Leu Val Gln Leu Gly Ala Arg
            2150                2155                2160

Arg Leu Cys Phe Leu Ser Arg Ser Gly Ala Ala Ser Ser Glu Ala
            2165                2170                2175

Arg Ala Leu Val Lys Glu Leu Glu Met Gln His Arg Val Arg Val
            2180                2185                2190

Leu Val Cys Lys Gly Asp Val Ser Asp Ala Asp Thr Val Ser Arg
            2195                2200                2205

Val Val Gln Gln Cys Arg Ala Ala Leu Gly Pro Ile Arg Gly Val
            2210                2215                2220

Ile Gln Cys Ala Met Val Leu Arg Asp Gly Leu Phe Glu Arg Met
            2225                2230                2235

Ala His Asp Gln Trp Thr Glu Ser Thr Arg Pro Lys Val Gln Gly
            2240                2245                2250

Thr Trp Asn Leu His Glu Gln Ile Pro Val Ser Asp Phe Phe Ile
            2255                2260                2265

Thr Leu Ser Ser Phe Ala Gly Val Phe Gly Ser Arg Gly Gln Ser
            2270                2275                2280

Asn Tyr Ala Ala Ala Gly Ala Tyr Glu Asp Ala Met Ala His His
            2285                2290                2295

Arg Glu Ser Leu Gly Gln Arg Ala Ile Thr Ile Asp Leu Gly Ile
            2300                2305                2310

Met Arg Asp Val Gly Val Leu Ala Glu Asn Gly Ile Thr Asp Tyr
            2315                2320                2325

Leu Arg Glu Trp Glu Glu Pro Phe Gly Ile Arg Glu Pro Glu Phe
            2330                2335                2340

His Ala Leu Ile Lys Ser Ala Ile Met Ser Thr Thr Gln Pro Leu
            2345                2350                2355

Thr Glu Arg Ser Val Val Gln Ile Pro Thr Gly Leu Ala Thr Ala
            2360                2365                2370

Arg Ser Ala Gln Ala Ala Gly Ile Ser Thr Pro Phe Tyr Phe Asp
            2375                2380                2385

Asp Ala Arg Phe Ser Ile Leu Ala Gln Thr Arg Ala Ser Ala Gly
            2390                2395                2400
```

```
Ala Ser Ser Ala Ala Gly Ser Gly Asp Ala Asp Ala Gly Lys Val
    2405                2410                2415

Ser Val Arg Thr Gln Leu Ser Gln Ala His Ser Val Ala Glu Ala
    2420                2425                2430

Ala Ala Ala Val Gln Thr Val Leu Leu Glu Arg Val Ala Arg Thr
    2435                2440                2445

Leu Gln Ser Ser Val Ala Glu Ile Asp Pro Ser Arg Pro Leu His
    2450                2455                2460

Ser Tyr Gly Val Asp Ser Leu Val Ala Val Glu Thr Val Lys Trp
    2465                2470                2475

Met Phe Lys Thr Leu Asp Ala Lys Met Thr Val Phe Asp Val Leu
    2480                2485                2490

Ser Asn Val Ser Ile Thr Ala Leu Cys Glu Lys Ile Ala Ser Met
    2495                2500                2505

Ser Thr Leu Val Lys Leu Asn
    2510                2515

<210> SEQ ID NO 3
<211> LENGTH: 5148
<212> TYPE: DNA
<213> ORGANISM: Metarhizium anisopliae
<220> FEATURE:
<221> NAME/KEY: CDS
<222> LOCATION: (1)..(5148)

<400> SEQUENCE: 3 atg aaa ctg cgt gtc gca aac ttc ctc ctc ttt ggg gat cag acc gta      48
Met Lys Leu Arg Val Ala Asn Phe Leu Leu Phe Gly Asp Gln Thr Val
1               5                   10                  15 gag aag ctc cca gcc att cgg cac ctg gtg agc cat ggc gcg tcc tca      96
Glu Lys Leu Pro Ala Ile Arg His Leu Val Ser His Gly Ala Ser Ser
                20                  25                  30 cct ctt gtc cag aga ttc ctg cgt caa gtg tgc gat gca gta cag ctc     144
Pro Leu Val Gln Arg Phe Leu Arg Gln Val Cys Asp Ala Val Gln Leu
            35                  40                  45 cag gtc agc aag ctg cct ctg cac tcg gag caa cgc agc aac att ggg     192
Gln Val Ser Lys Leu Pro Leu His Ser Glu Gln Arg Ser Asn Ile Gly
        50                  55                  60 aac ttc gac agt atc ctt cga cta gcc gag aac aat gcc cgg ctg gag     240
Asn Phe Asp Ser Ile Leu Arg Leu Ala Glu Asn Asn Ala Arg Leu Glu
65                  70                  75                  80 gag ccc aac gag atc att gcc acc gtc ttg atg aat atc gca cgt cta     288
Glu Pro Asn Glu Ile Ile Ala Thr Val Leu Met Asn Ile Ala Arg Leu
                85                  90                  95 gga gag ctc att cta tat gca gag caa gac cct acc gtt ctc gcc tcc     336
Gly Glu Leu Ile Leu Tyr Ala Glu Gln Asp Pro Thr Val Leu Ala Ser
                100                 105                 110 aaa ggc aac cgc aac tgt att ctg gga ttc tgc acc ggc gag gtg gcc     384
Lys Gly Asn Arg Asn Cys Ile Leu Gly Phe Cys Thr Gly Glu Val Ala
            115                 120                 125 gct gct gtg gcc gcc gtc gcg cag gac acc aac gaa ctc gtc gag ctg     432
Ala Ala Val Ala Ala Val Ala Gln Asp Thr Asn Glu Leu Val Glu Leu
        130                 135                 140 gga gtc gag gtg aca cac atc atc ttt cgc atg gcc cgc gaa ctc aat     480
Gly Val Glu Val Thr His Ile Ile Phe Arg Met Ala Arg Glu Leu Asn
145                 150                 155                 160 cgc cgg tct ctc atg gtt gac cgt acc aat ggc ccc tgg gcc cgg aca     528
Arg Arg Ser Leu Met Val Asp Arg Thr Asn Gly Pro Trp Ala Arg Thr
                165                 170                 175
```

```
ata ctg ggc att tca gtc gat cgc gtc cgg gaa atc cta caa gac ttc    576
Ile Leu Gly Ile Ser Val Asp Arg Val Arg Glu Ile Leu Gln Asp Phe
        180                 185                 190 cac gag aac cag tct att cct cgc gcg cga caa gtc tgc att ggc ttc    624
His Glu Asn Gln Ser Ile Pro Arg Ala Arg Gln Val Cys Ile Gly Phe
    195                 200                 205 gtc tca gat ggc tgg tta aca ctc ttt ggc ccg ccc aca act ctg caa    672
Val Ser Asp Gly Trp Leu Thr Leu Phe Gly Pro Pro Thr Thr Leu Gln
210                 215                 220 cgg ctt tta gaa tgg tcg gca gag ctg gaa gac gct ccg caa atc gac    720
Arg Leu Leu Glu Trp Ser Ala Glu Leu Glu Asp Ala Pro Gln Ile Asp
225                 230                 235                 240 acc gac gcc cgc gga ggc gtg cac atg gag acg ttg cca gaa gtt gac    768
Thr Asp Ala Arg Gly Gly Val His Met Glu Thr Leu Pro Glu Val Asp
                245                 250                 255 ccg gat cgg att ctt ggc tca tcg cca tgg ctg gac cgg gcc ccc gtg    816
Pro Asp Arg Ile Leu Gly Ser Ser Pro Trp Leu Asp Arg Ala Pro Val
            260                 265                 270 cac acg gcc acc ata atc tcg ccc tac acg tgc aaa ccg cgg cag cag    864
His Thr Ala Thr Ile Ile Ser Pro Tyr Thr Cys Lys Pro Arg Gln Gln
        275                 280                 285 aag acg ttg cgg ggg ctt ctg gag gaa ata att gca gat gtc ggg cag    912
Lys Thr Leu Arg Gly Leu Leu Glu Glu Ile Ile Ala Asp Val Gly Gln
    290                 295                 300 agg acg ttg aat ttg gcc acg tca atg aac gct gct gtt gag ctc gca    960
Arg Thr Leu Asn Leu Ala Thr Ser Met Asn Ala Ala Val Glu Leu Ala
305                 310                 315                 320 cag gca gac aag ctc cgt ctt gtt atg ccc ggc tac act agt cac gac   1008
Gln Ala Asp Lys Leu Arg Leu Val Met Pro Gly Tyr Thr Ser His Asp
                325                 330                 335 gtc tac ttt caa aga tta ctg caa aaa cgc ggc ata gag tat tcc gtc   1056
Val Tyr Phe Gln Arg Leu Leu Gln Lys Arg Gly Ile Glu Tyr Ser Val
            340                 345                 350 atg tca cat ggg gac cat ttg tcg tca ggt ccc agc cga cag ggt tca   1104
Met Ser His Gly Asp His Leu Ser Ser Gly Pro Ser Arg Gln Gly Ser
        355                 360                 365 gga ctt gtg gct gtc gtc ggc atg tct ggg agg ttc cca ggg agc ggc   1152
Gly Leu Val Ala Val Val Gly Met Ser Gly Arg Phe Pro Gly Ser Gly
    370                 375                 380 gac atc aac gca ttt tgg gag ggt ctt tta gag ggc aaa aga tat atc   1200
Asp Ile Asn Ala Phe Trp Glu Gly Leu Leu Glu Gly Lys Arg Tyr Ile
385                 390                 395                 400 caa gag att cca aat aca cga ttt gac ctg gag caa tgg tac gat gcc   1248
Gln Glu Ile Pro Asn Thr Arg Phe Asp Leu Glu Gln Trp Tyr Asp Ala
                405                 410                 415 acg gga aaa caa aag aat tct acc atg gcg cgg aca gga gcc ttc ctc   1296
Thr Gly Lys Gln Lys Asn Ser Thr Met Ala Arg Thr Gly Ala Phe Leu
            420                 425                 430 gac aag ccg ggc atg ttc gac aac cgc cta ttc gac atg tcg ccc agg   1344
Asp Lys Pro Gly Met Phe Asp Asn Arg Leu Phe Asp Met Ser Pro Arg
        435                 440                 445 gag gcc atg cag aca gac gtc cag cac cgg ctg ctc atg aca acc agc   1392
Glu Ala Met Gln Thr Asp Val Gln His Arg Leu Leu Met Thr Thr Ser
    450                 455                 460 tac gag gca ctg gag atg tcg ggc tac tat ccc gat ggc acg ctt tcg   1440
Tyr Glu Ala Leu Glu Met Ser Gly Tyr Tyr Pro Asp Gly Thr Leu Ser
465                 470                 475                 480 aca aac aag gac cgc gtc gcc tcc ttc ttt ggc cag acg tct gat gat   1488
Thr Asn Lys Asp Arg Val Ala Ser Phe Phe Gly Gln Thr Ser Asp Asp
```

-continued

|  |  |  | 485 |  |  |  | 490 |  |  |  | 495 |  |  |  |  |
|---|---|---|---|---|---|---|---|---|---|---|---|---|---|---|---|
| tgg | cga | gaa | gtg | gtg | gtc | cac | caa | ggg | gta | gac | atc | tac | ttc | gcc | acg | 1536 |
| Trp | Arg | Glu | Val | Val | Val | His | Gln | Gly | Val | Asp | Ile | Tyr | Phe | Ala | Thr |
|  |  | 500 |  |  |  | 505 |  |  |  | 510 |  |  |  |  |  |

| gga | agc | tgc | cgc | gct | ttc | gga | cca | ggc | agg | ctg | cac | cac | cac | ttc | aaa | 1584 |
| Gly | Ser | Cys | Arg | Ala | Phe | Gly | Pro | Gly | Arg | Leu | His | His | His | Phe | Lys |
|  | 515 |  |  |  |  | 520 |  |  |  | 525 |  |  |  |  |  |

| tgg | gga | ggt | ccg | tct | tat | agc | gtc | gac | tcg | gcc | tgc | tct | tcc | agc | atc | 1632 |
| Trp | Gly | Gly | Pro | Ser | Tyr | Ser | Val | Asp | Ser | Ala | Cys | Ser | Ser | Ser | Ile |
| 530 |  |  |  |  | 535 |  |  |  | 540 |  |  |  |  |  |  |

| gca | gcc | gtc | ggt | tta | gcg | tgc | tcg | gcg | ctc | ctc | ggc | cgc | gaa | tgc | gac | 1680 |
| Ala | Ala | Val | Gly | Leu | Ala | Cys | Ser | Ala | Leu | Leu | Gly | Arg | Glu | Cys | Asp |
| 545 |  |  |  | 550 |  |  |  | 555 |  |  |  | 560 |  |  |  |

| atg | gct | ctg | gct | ggt | gga | gga | tcc | ctc | ctc | ctc | tcc | cca | tca | ccc | ttc | 1728 |
| Met | Ala | Leu | Ala | Gly | Gly | Gly | Ser | Leu | Leu | Leu | Ser | Pro | Ser | Pro | Phe |
|  |  |  | 565 |  |  |  | 570 |  |  |  | 575 |  |  |  |  |

| tcg | ggg | tta | agc | cgt | ggc | ggt | ttc | ctg | tcc | gct | cat | gga | ggg | tgc | cag | 1776 |
| Ser | Gly | Leu | Ser | Arg | Gly | Gly | Phe | Leu | Ser | Ala | His | Gly | Gly | Cys | Gln |
|  |  | 580 |  |  |  |  | 585 |  |  |  | 590 |  |  |  |  |

| acg | ttc | cac | gac | aat | gcc | gac | ggt | tac | gtc | cgt | gga | gag | gga | gtt | ggc | 1824 |
| Thr | Phe | His | Asp | Asn | Ala | Asp | Gly | Tyr | Val | Arg | Gly | Glu | Gly | Val | Gly |
|  | 595 |  |  |  |  | 600 |  |  |  | 605 |  |  |  |  |  |

| gtg | gtc | gtt | ctc | aaa | cgg | ttg | gag | gac | gcg | ctg | gac | gac | caa | gac | aac | 1872 |
| Val | Val | Val | Leu | Lys | Arg | Leu | Glu | Asp | Ala | Leu | Asp | Asp | Gln | Asp | Asn |
|  |  | 610 |  |  |  | 615 |  |  |  | 620 |  |  |  |  |  |

| atc | ctc | ggc | gtc | gtc | cgg | gga | tcc | gga | cgc | aac | tac | agc | agt | gat | gct | 1920 |
| Ile | Leu | Gly | Val | Val | Arg | Gly | Ser | Gly | Arg | Asn | Tyr | Ser | Ser | Asp | Ala |
| 625 |  |  |  | 630 |  |  |  | 635 |  |  |  | 640 |  |  |  |

| tct | tcc | atg | atg | cat | ccc | tcg | gca | aat | gct | cag | aaa | aag | ctg | tac | tgc | 1968 |
| Ser | Ser | Met | Met | His | Pro | Ser | Ala | Asn | Ala | Gln | Lys | Lys | Leu | Tyr | Cys |
|  |  |  | 645 |  |  |  | 650 |  |  |  | 655 |  |  |  |  |

| gat | gtg | ctg | gag | caa | agc | ggt | gta | gac | gcc | aac | agc | atc | tcg | tac | gtg | 2016 |
| Asp | Val | Leu | Glu | Gln | Ser | Gly | Val | Asp | Ala | Asn | Ser | Ile | Ser | Tyr | Val |
|  |  | 660 |  |  |  | 665 |  |  |  | 670 |  |  |  |  |  |

| gag | atg | cat | gga | acc | ggg | aca | cag | gcg | gga | gac | ttt | atg | gaa | atg | tcc | 2064 |
| Glu | Met | His | Gly | Thr | Gly | Thr | Gln | Ala | Gly | Asp | Phe | Met | Glu | Met | Ser |
|  | 675 |  |  |  |  | 680 |  |  |  | 685 |  |  |  |  |  |

| tcg | gtc | ttg | tca | aca | ttt | gca | gaa | aag | cga | ggc | tcg | gat | aat | ccg | ctc | 2112 |
| Ser | Val | Leu | Ser | Thr | Phe | Ala | Glu | Lys | Arg | Gly | Ser | Asp | Asn | Pro | Leu |
|  |  | 690 |  |  |  | 695 |  |  |  | 700 |  |  |  |  |  |

| att | gtt | ggg | gcc | ctc | aaa | gca | aat | att | ggc | cac | ggg | gaa | gct | gcg | gcc | 2160 |
| Ile | Val | Gly | Ala | Leu | Lys | Ala | Asn | Ile | Gly | His | Gly | Glu | Ala | Ala | Ala |
| 705 |  |  |  | 710 |  |  |  | 715 |  |  |  | 720 |  |  |  |

| ggt | gtt | tgc | gct | ctt | atc | aaa | acc | ctc | atg | atg | ctc | cag | tct | cga | cag | 2208 |
| Gly | Val | Cys | Ala | Leu | Ile | Lys | Thr | Leu | Met | Met | Leu | Gln | Ser | Arg | Gln |
|  |  |  | 725 |  |  |  | 730 |  |  |  | 735 |  |  |  |  |

| att | ccc | ccc | cag | ccc | gat | ctt | cct | gga | cct | att | aac | cac | cgc | ttt | cct | 2256 |
| Ile | Pro | Pro | Gln | Pro | Asp | Leu | Pro | Gly | Pro | Ile | Asn | His | Arg | Phe | Pro |
|  |  | 740 |  |  |  |  | 745 |  |  |  | 750 |  |  |  |  |

| gat | cta | gca | gcg | cgt | aat | gta | tac | atc | gcg | gcc | cgc | aat | atg | aga | ctg | 2304 |
| Asp | Leu | Ala | Ala | Arg | Asn | Val | Tyr | Ile | Ala | Ala | Arg | Asn | Met | Arg | Leu |
|  | 755 |  |  |  |  | 760 |  |  |  | 765 |  |  |  |  |  |

| gag | gcc | agt | cca | gtg | gct | aag | ggc | acg | cta | cgc | gtc | ttt | ctc | aac | agc | 2352 |
| Glu | Ala | Ser | Pro | Val | Ala | Lys | Gly | Thr | Leu | Arg | Val | Phe | Leu | Asn | Ser |
| 770 |  |  |  | 775 |  |  |  | 780 |  |  |  |  |  |  |  |

| ttc | gac | gcc | tcg | gga | gga | aat | tcg | tgc | ttg | gtg | ctt | gaa | gaa | gct | ccg | 2400 |
| Phe | Asp | Ala | Ser | Gly | Gly | Asn | Ser | Cys | Leu | Val | Leu | Glu | Glu | Ala | Pro |
| 785 |  |  |  | 790 |  |  |  | 795 |  |  |  | 800 |  |  |  |

| cca | cgg | gcc | gtc | aag | gat | gca | gac | cct | cga | ggt | cac | cac | gtc | gtg | acg | 2448 |

```
                Pro Arg Ala Val Lys Asp Ala Asp Pro Arg Gly His His Val Val Thr
                                    805                 810                 815 cct tca gcc cgt tcc cag aag tca ctt att ggc atc aaa gag agg tat        2496
Leu Ser Ala Arg Ser Gln Lys Ser Leu Ile Gly Ile Lys Glu Arg Tyr
                820                 825                 830 ctc gct cat ctg cgc caa cat cct gac acc aaa ctg gcc gac ttg gcc        2544
Leu Ala His Leu Arg Gln His Pro Asp Thr Lys Leu Ala Asp Leu Ala
                835                 840                 845 tat acc aca agc gct cga cgc att cac ggg tta ttg cgg tac gcc att        2592
Tyr Thr Thr Ser Ala Arg Arg Ile His Gly Leu Leu Arg Tyr Ala Ile
        850                 855                 860 gcc gca tct tcc att gac gag gtc gtg caa tgc ctg gag acg gat ctc        2640
Ala Ala Ser Ser Ile Asp Glu Val Val Gln Cys Leu Glu Thr Asp Leu
865                 870                 875                 880 gcc cag ggg aaa aca cca cgt cag cct ccg gca aca cca acg gta gtc        2688
Ala Gln Gly Lys Thr Pro Arg Gln Pro Pro Ala Thr Pro Thr Val Val
                885                 890                 895 ttt aca ttt act ggc caa ggc gca cac tat atc ggc atg ggg gca aac        2736
Phe Thr Phe Thr Gly Gln Gly Ala His Tyr Ile Gly Met Gly Ala Asn
                900                 905                 910 ttg tgg gag acg tct gcc aca ttc cgc aat acg ctt cac gac tac cag        2784
Leu Trp Glu Thr Ser Ala Thr Phe Arg Asn Thr Leu His Asp Tyr Gln
                915                 920                 925 aca atg gcc agc gct caa ggc ctc ccc cat ttc ctg cat ctc atc acg        2832
Thr Met Ala Ser Ala Gln Gly Leu Pro His Phe Leu His Leu Ile Thr
        930                 935                 940 gac agc agc aca ccc gcg cca cag tcg ggc ccg gat acc gtg cag gta        2880
Asp Ser Ser Thr Pro Ala Pro Gln Ser Gly Pro Asp Thr Val Gln Val
945                 950                 955                 960 cag ctg gcc atg gta agc ttg gaa ctg gcc ctg gcc aag ctc tgg cgc        2928
Gln Leu Ala Met Val Ser Leu Glu Leu Ala Leu Ala Lys Leu Trp Arg
                965                 970                 975 tcc tgg ggc atc cag cca gcc atg gtc ttg ggc cac agc ctg ggc gaa        2976
Ser Trp Gly Ile Gln Pro Ala Met Val Leu Gly His Ser Leu Gly Glu
                980                 985                 990 tac gcg gcc ttg tgc gtg gcc gga  gtc ttg tcc gtg agc  gac act ctg      3024
Tyr Ala Ala Leu Cys Val Ala Gly  Val Leu Ser Val Ser  Asp Thr Leu
                995                 1000                1005 tac ctc gtc gcc aag cga gca  caa atc atg gct gga  gcc ctg acg          3069
Tyr Leu Val Ala Lys Arg Ala  Gln Ile Met Ala Gly  Ala Leu Thr
        1010            1015                1020 ccg cac gaa tac gga atg ctg  gct gtg aat cta agc  gtt gct gac          3114
Pro His Glu Tyr Gly Met Leu  Ala Val Asn Leu Ser  Val Ala Asp
        1025            1030                1035 acg cgg gaa gtg ctc tcg tct  ggc cag cat act tcc  tgc gcc gtg          3159
Thr Arg Glu Val Leu Ser Ser  Gly Gln His Thr Ser  Cys Ala Val
        1040            1045                1050 gct tgc atc aac gcg ccc aag  atg aca gtc gtg agc  ggc ttg cgc          3204
Ala Cys Ile Asn Ala Pro Lys  Met Thr Val Val Ser  Gly Leu Arg
        1055            1060                1065 tcg aag ctg gac gat ctc cag  gac caa ctc aag tcg  gac ggc acc          3249
Ser Lys Leu Asp Asp Leu Gln  Asp Gln Leu Lys Ser  Asp Gly Thr
        1070            1075                1080 cgg tgc act ccc cta tct gtt  ccc tat ggc ttc cac  tcc agc cag          3294
Arg Cys Thr Pro Leu Ser Val  Pro Tyr Gly Phe His  Ser Ser Gln
        1085            1090                1095 ctt gat ccc atc ttg ggc cag  ttc gaa gag gcc tgc  cag ggc gtg          3339
Leu Asp Pro Ile Leu Gly Gln  Phe Glu Glu Ala Cys  Gln Gly Val
        1100            1105                1110
```

| | | | | | | | | | | | | |
|---|---|---|---|---|---|---|---|---|---|---|---|---|
| acc | ttt | tcc | gcg | ccg | agt | gtc | ccg | gtc | gtt | tcc | acg | ctc ttg gct |
| Thr | Phe | Ser | Ala | Pro | Ser | Val | Pro | Val | Val | Ser | Thr | Leu Leu Ala |
| 1115 | | | | 1120 | | | | | 1125 | | | |

3384

| | | | | | | | | | | | | |
|---|---|---|---|---|---|---|---|---|---|---|---|---|
| acg | aca | gtc | cgg | gaa | gaa | gga | aca | ttc | tct | ccg | gag | tac ctg gca |
| Thr | Thr | Val | Arg | Glu | Glu | Gly | Thr | Phe | Ser | Pro | Glu | Tyr Leu Ala |
| 1130 | | | | 1135 | | | | | 1140 | | | |

3429

| | | | | | | | | | | | | |
|---|---|---|---|---|---|---|---|---|---|---|---|---|
| cga | cag | gcg | cgc | gaa | ccc | gtc | gac | ttt | gtc | ggg | gca | ttg ggc gcg |
| Arg | Gln | Ala | Arg | Glu | Pro | Val | Asp | Phe | Val | Gly | Ala | Leu Gly Ala |
| 1145 | | | | 1150 | | | | | 1155 | | | |

3474

| | | | | | | | | | | | | |
|---|---|---|---|---|---|---|---|---|---|---|---|---|
| gtg | cag | gag | cac | aag | ttt | ccc | ggc | ctg | acc | ttc | ctc | gag att ggg |
| Val | Gln | Glu | His | Lys | Phe | Pro | Gly | Leu | Thr | Phe | Leu | Glu Ile Gly |
| 1160 | | | | 1165 | | | | | 1170 | | | |

3519

| | | | | | | | | | | | | |
|---|---|---|---|---|---|---|---|---|---|---|---|---|
| ccc | gat | ccc | gtg | tgc | tcg | ggt | ctt | gtg | aat | gct | acg | cta ggt gcc |
| Pro | Asp | Pro | Val | Cys | Ser | Gly | Leu | Val | Asn | Ala | Thr | Leu Gly Ala |
| 1175 | | | | 1180 | | | | | 1185 | | | |

3564

| | | | | | | | | | | | | |
|---|---|---|---|---|---|---|---|---|---|---|---|---|
| gat | gag | gct | gca | ttg | cgc | tgc | gtt | gcc | tcg | atg | cac | cgc gga aag |
| Asp | Glu | Ala | Ala | Leu | Arg | Cys | Val | Ala | Ser | Met | His | Arg Gly Lys |
| 1190 | | | | 1195 | | | | | 1200 | | | |

3609

| | | | | | | | | | | | | |
|---|---|---|---|---|---|---|---|---|---|---|---|---|
| gcc | aac | tgg | gcg | tcg | ata | tcg | tgc | agc | ttg | agg | gat | ctc tat acg |
| Ala | Asn | Trp | Ala | Ser | Ile | Ser | Cys | Ser | Leu | Arg | Asp | Leu Tyr Thr |
| 1205 | | | | 1210 | | | | | 1215 | | | |

3654

| | | | | | | | | | | | | |
|---|---|---|---|---|---|---|---|---|---|---|---|---|
| gcg | ggt | gcc | gcc | att | gac | tgg | cca | gcc | cat | cac | cgg | gat ttc aaa |
| Ala | Gly | Ala | Ala | Ile | Asp | Trp | Pro | Ala | His | His | Arg | Asp Phe Lys |
| 1220 | | | | 1225 | | | | | 1230 | | | |

3699

| | | | | | | | | | | | | |
|---|---|---|---|---|---|---|---|---|---|---|---|---|
| tca | tcg | gta | tcc | ctg | ctg | gac | ctc | cca | aag | tac | tcg | ttt gac gag |
| Ser | Ser | Val | Ser | Leu | Leu | Asp | Leu | Pro | Lys | Tyr | Ser | Phe Asp Glu |
| 1235 | | | | 1240 | | | | | 1245 | | | |

3744

| | | | | | | | | | | | | |
|---|---|---|---|---|---|---|---|---|---|---|---|---|
| aag | gaa | ttc | tgg | gcg | tcg | ttc | ccc | gat | cga | gac | ctt | cag acc att |
| Lys | Glu | Phe | Trp | Ala | Ser | Phe | Pro | Asp | Arg | Asp | Leu | Gln Thr Ile |
| 1250 | | | | 1255 | | | | | 1260 | | | |

3789

| | | | | | | | | | | | | |
|---|---|---|---|---|---|---|---|---|---|---|---|---|
| gga | gac | gtc | gag | acc | aag | cac | agc | caa | ccg | cct | gcc | att gtt cct |
| Gly | Asp | Val | Glu | Thr | Lys | His | Ser | Gln | Pro | Pro | Ala | Ile Val Pro |
| 1265 | | | | 1270 | | | | | 1275 | | | |

3834

| | | | | | | | | | | | | |
|---|---|---|---|---|---|---|---|---|---|---|---|---|
| tcg | gta | caa | ggg | tat | tgc | aca | acg | act | ctg | cag | cgg | atc acg agg |
| Ser | Val | Gln | Gly | Tyr | Cys | Thr | Thr | Thr | Leu | Gln | Arg | Ile Thr Arg |
| 1280 | | | | 1285 | | | | | 1290 | | | |

3879

| | | | | | | | | | | | | |
|---|---|---|---|---|---|---|---|---|---|---|---|---|
| gaa | aca | atc | gag | ccc | gat | ggg | ttg | tcg | gtt | aca | ttc | tca tca gac |
| Glu | Thr | Ile | Glu | Pro | Asp | Gly | Leu | Ser | Val | Thr | Phe | Ser Ser Asp |
| 1295 | | | | 1300 | | | | | 1305 | | | |

3924

| | | | | | | | | | | | | |
|---|---|---|---|---|---|---|---|---|---|---|---|---|
| cta | gcc | gac | cag | cac | cta | cgg | gca | gcc | gtg | cga | ggc | cac gcc gtg |
| Leu | Ala | Asp | Gln | His | Leu | Arg | Ala | Ala | Val | Arg | Gly | His Ala Val |
| 1310 | | | | 1315 | | | | | 1320 | | | |

3969

| | | | | | | | | | | | | |
|---|---|---|---|---|---|---|---|---|---|---|---|---|
| gcc | gat | gtg | gaa | att | tgt | tcc | agc | agt | ctg | ctc | ttg | gac atg gcg |
| Ala | Asp | Val | Glu | Ile | Cys | Ser | Ser | Ser | Leu | Leu | Leu | Asp Met Ala |
| 1325 | | | | 1330 | | | | | 1335 | | | |

4014

| | | | | | | | | | | | | |
|---|---|---|---|---|---|---|---|---|---|---|---|---|
| ctc | tcc | gcg | gcc | caa | tat | gcc | tac | atg | aag | cat | tct | cct ggt cag |
| Leu | Ser | Ala | Ala | Gln | Tyr | Ala | Tyr | Met | Lys | His | Ser | Pro Gly Gln |
| 1340 | | | | 1345 | | | | | 1350 | | | |

4059

| | | | | | | | | | | | | |
|---|---|---|---|---|---|---|---|---|---|---|---|---|
| aag | atg | cca | gtg | cca | tta | acc | gtc | cgc | aac | tgc | tat | ttc cac cgg |
| Lys | Met | Pro | Val | Pro | Leu | Thr | Val | Arg | Asn | Cys | Tyr | Phe His Arg |
| 1355 | | | | 1360 | | | | | 1365 | | | |

4104

| | | | | | | | | | | | | |
|---|---|---|---|---|---|---|---|---|---|---|---|---|
| ggt | gtt | gtc | ttg | acg | gac | aag | gcc | cag | acg | gtg | gaa | gtc acc gtc |
| Gly | Val | Val | Leu | Thr | Asp | Lys | Ala | Gln | Thr | Val | Glu | Val Thr Val |
| 1370 | | | | 1375 | | | | | 1380 | | | |

4149

| | | | | | | | | | | | | |
|---|---|---|---|---|---|---|---|---|---|---|---|---|
| act | ctt | aca | tcc | tcg | gcc | aag | act | gcg | gat | atc | cgg | tac cac tgc |
| Thr | Leu | Thr | Ser | Ser | Ala | Lys | Thr | Ala | Asp | Ile | Arg | Tyr His Cys |
| 1385 | | | | 1390 | | | | | 1395 | | | |

4194

| | | | | | | | | | | | | |
|---|---|---|---|---|---|---|---|---|---|---|---|---|
| cgc | act | cct | gac | gag | tat | tac | gag | gtt | ggc | gcc | tgc | cag gtc gtc |
| Arg | Thr | Pro | Asp | Glu | Tyr | Tyr | Glu | Val | Gly | Ala | Cys | Gln Val Val |
| 1400 | | | | 1405 | | | | | 1410 | | | |

4239

-continued

| | | | | | | | | | | | | | | |
|---|---|---|---|---|---|---|---|---|---|---|---|---|---|---|
| ttg | aag | cca | gca | agc | aaa | ccg | gac | caa | gcc | ggc | ttc | ctg | gtt | cgg | 4284 |
| Leu | Lys | Pro | Ala | Ser | Lys | Pro | Asp | Gln | Ala | Gly | Phe | Leu | Val | Arg | |
| | 1415 | | | | 1420 | | | | | 1425 | | | | | | tcc cgc atg gct gct ctc aag gcg tcc gca agt cac cgg cta ggc    4329
Ser Arg Met Ala Ala Leu Lys Ala Ser Ala Ser His Arg Leu Gly
    1430                1435                1440 aga cgc gca gtc tat cga tta ttc gac aac gtt gtg cgt tat tcc    4374
Arg Arg Ala Val Tyr Arg Leu Phe Asp Asn Val Val Arg Tyr Ser
1445                1450                1455 gaa caa tac cag ggg cta gaa aat gtc cac ttg tca gag gac atg    4419
Glu Gln Tyr Gln Gly Leu Glu Asn Val His Leu Ser Glu Asp Met
         1460                1465                1470 cag gat gcc gtg gcg gaa atc aac atg gcc cac gtc cca gcc gca    4464
Gln Asp Ala Val Ala Glu Ile Asn Met Ala His Val Pro Ala Ala
1475                1480                1485 ggc ggc cat tac ctc cac cac cca ttc ttg ctc gac tcg att gtt    4509
Gly Gly His Tyr Leu His His Pro Phe Leu Leu Asp Ser Ile Val
    1490                1495                1500 cac ttg tcg ggg ttc ttg gtg aac aat ggg ctt cgc tat tcc agc    4554
His Leu Ser Gly Phe Leu Val Asn Asn Gly Leu Arg Tyr Ser Ser
         1505                1510                1515 gag tgg gct tgc ctt tcc acc ggc ttt gac gag tgg cac ctg ctc    4599
Glu Trp Ala Cys Leu Ser Thr Gly Phe Asp Glu Trp His Leu Leu
1520                1525                1530 aag ccg ctt gat ccc acc act gtg tac acc agc tac acc ttc atg    4644
Lys Pro Leu Asp Pro Thr Thr Val Tyr Thr Ser Tyr Thr Phe Met
    1535                1540                1545 gag gac tct cgg tcg acg agc aat ctg gta acg ggc gat gta tac    4689
Glu Asp Ser Arg Ser Thr Ser Asn Leu Val Thr Gly Asp Val Tyr
         1550                1555                1560 gtc tat gac gga gag gag ctg gtc tcg gtg ctg acg ggg ctg cag    4734
Val Tyr Asp Gly Glu Glu Leu Val Ser Val Leu Thr Gly Leu Gln
1565                1570                1575 ttc caa aag atg aag agg acg gca ctc act cat cta ctg agc ccc    4779
Phe Gln Lys Met Lys Arg Thr Ala Leu Thr His Leu Leu Ser Pro
    1580                1585                1590 ccg aca gtc ggt acc atg gcc gcc aag ccg agt aca tgt atg cca    4824
Pro Thr Val Gly Thr Met Ala Ala Lys Pro Ser Thr Cys Met Pro
         1595                1600                1605 act atg gga caa acg gag ccg ttg ccg gct caa gcc aga gtg gcc    4869
Thr Met Gly Gln Thr Glu Pro Leu Pro Ala Gln Ala Arg Val Ala
1610                1615                1620 ggc ttg ccg gtt ccc aca cca ccg gct aca gca agt gtt gat gat    4914
Gly Leu Pro Val Pro Thr Pro Pro Ala Thr Ala Ser Val Asp Asp
    1625                1630                1635 ggc gag ggg gag aag ttc gac ttg gtc aat aca ctc ttt tcc att    4959
Gly Glu Gly Glu Lys Phe Asp Leu Val Asn Thr Leu Phe Ser Ile
         1640                1645                1650 atc gca cgc gag gtg ggc gtg gag cca agc gat ttg gag ggc gac    5004
Ile Ala Arg Glu Val Gly Val Glu Pro Ser Asp Leu Glu Gly Asp
1655                1660                1665 gtc aac ctg gcg aat ttg ggc ata gac tcc ctg atg gcc att acc    5049
Val Asn Leu Ala Asn Leu Gly Ile Asp Ser Leu Met Ala Ile Thr
    1670                1675                1680 ata att tca gtc atg cag cag gaa aca ggt gtc gag ttg ccg ggg    5094
Ile Ile Ser Val Met Gln Gln Glu Thr Gly Val Glu Leu Pro Gly
         1685                1690                1695 acc ttt ttc ctc gac aat gcc act aca acg gca gtg att gcg gcg    5139
Thr Phe Phe Leu Asp Asn Ala Thr Thr Thr Ala Val Ile Ala Ala

```
                1700             1705             1710
   gta ggg tag                                                   5148
   Val Gly
       1715

<210> SEQ ID NO 4
<211> LENGTH: 1715
<212> TYPE: PRT
<213> ORGANISM: Metarhizium anisopliae

<400> SEQUENCE: 4

Met Lys Leu Arg Val Ala Asn Phe Leu Leu Phe Gly Asp Gln Thr Val
1               5                   10                  15

Glu Lys Leu Pro Ala Ile Arg His Leu Val Ser His Gly Ala Ser Ser
            20                  25                  30

Pro Leu Val Gln Arg Phe Leu Arg Gln Val Cys Asp Ala Val Gln Leu
        35                  40                  45

Gln Val Ser Lys Leu Pro Leu His Ser Glu Gln Arg Ser Asn Ile Gly
    50                  55                  60

Asn Phe Asp Ser Ile Leu Arg Leu Ala Glu Asn Asn Ala Arg Leu Glu
65                  70                  75                  80

Glu Pro Asn Glu Ile Ile Ala Thr Val Leu Met Asn Ile Ala Arg Leu
                85                  90                  95

Gly Glu Leu Ile Leu Tyr Ala Glu Gln Asp Pro Thr Val Leu Ala Ser
            100                 105                 110

Lys Gly Asn Arg Asn Cys Ile Leu Gly Phe Cys Thr Gly Glu Val Ala
        115                 120                 125

Ala Ala Val Ala Ala Val Ala Gln Asp Thr Asn Glu Leu Val Glu Leu
    130                 135                 140

Gly Val Glu Val Thr His Ile Ile Phe Arg Met Ala Arg Glu Leu Asn
145                 150                 155                 160

Arg Arg Ser Leu Met Val Asp Arg Thr Asn Gly Pro Trp Ala Arg Thr
                165                 170                 175

Ile Leu Gly Ile Ser Val Asp Arg Val Arg Glu Ile Leu Gln Asp Phe
            180                 185                 190

His Glu Asn Gln Ser Ile Pro Arg Ala Arg Gln Val Cys Ile Gly Phe
        195                 200                 205

Val Ser Asp Gly Trp Leu Thr Leu Phe Gly Pro Pro Thr Thr Leu Gln
    210                 215                 220

Arg Leu Leu Glu Trp Ser Ala Glu Leu Glu Asp Ala Pro Gln Ile Asp
225                 230                 235                 240

Thr Asp Ala Arg Gly Gly Val His Met Glu Thr Leu Pro Glu Val Asp
                245                 250                 255

Pro Asp Arg Ile Leu Gly Ser Ser Pro Trp Leu Asp Arg Ala Pro Val
            260                 265                 270

His Thr Ala Thr Ile Ile Ser Pro Tyr Thr Cys Lys Pro Arg Gln Gln
        275                 280                 285

Lys Thr Leu Arg Gly Leu Leu Glu Glu Ile Ile Ala Asp Val Gly Gln
    290                 295                 300

Arg Thr Leu Asn Leu Ala Thr Ser Met Asn Ala Ala Val Glu Leu Ala
305                 310                 315                 320

Gln Ala Asp Lys Leu Arg Leu Val Met Pro Gly Tyr Thr Ser His Asp
                325                 330                 335

Val Tyr Phe Gln Arg Leu Leu Gln Lys Arg Gly Ile Glu Tyr Ser Val
            340                 345                 350
```

```
Met Ser His Gly Asp His Leu Ser Ser Gly Pro Ser Arg Gln Gly Ser
        355                 360                 365

Gly Leu Val Ala Val Val Gly Met Ser Gly Arg Phe Pro Gly Ser Gly
        370                 375                 380

Asp Ile Asn Ala Phe Trp Glu Gly Leu Leu Glu Gly Lys Arg Tyr Ile
385                 390                 395                 400

Gln Glu Ile Pro Asn Thr Arg Phe Asp Leu Glu Gln Trp Tyr Asp Ala
                405                 410                 415

Thr Gly Lys Gln Lys Asn Ser Thr Met Ala Arg Thr Gly Ala Phe Leu
                420                 425                 430

Asp Lys Pro Gly Met Phe Asp Asn Arg Leu Phe Asp Met Ser Pro Arg
            435                 440                 445

Glu Ala Met Gln Thr Asp Val Gln His Arg Leu Leu Met Thr Thr Ser
450                 455                 460

Tyr Glu Ala Leu Glu Met Ser Gly Tyr Tyr Pro Asp Gly Thr Leu Ser
465                 470                 475                 480

Thr Asn Lys Asp Arg Val Ala Ser Phe Phe Gly Gln Thr Ser Asp Asp
                485                 490                 495

Trp Arg Glu Val Val His Gln Gly Val Asp Ile Tyr Phe Ala Thr
                500                 505                 510

Gly Ser Cys Arg Ala Phe Gly Pro Gly Arg Leu His His His Phe Lys
        515                 520                 525

Trp Gly Gly Pro Ser Tyr Ser Val Asp Ser Ala Cys Ser Ser Ser Ile
        530                 535                 540

Ala Ala Val Gly Leu Ala Cys Ser Ala Leu Leu Gly Arg Glu Cys Asp
545                 550                 555                 560

Met Ala Leu Ala Gly Gly Gly Ser Leu Leu Leu Ser Pro Ser Pro Phe
                565                 570                 575

Ser Gly Leu Ser Arg Gly Gly Phe Leu Ser Ala His Gly Gly Cys Gln
                580                 585                 590

Thr Phe His Asp Asn Ala Asp Gly Tyr Val Arg Gly Glu Gly Val Gly
        595                 600                 605

Val Val Val Leu Lys Arg Leu Glu Asp Ala Leu Asp Asp Gln Asp Asn
        610                 615                 620

Ile Leu Gly Val Val Arg Gly Ser Gly Arg Asn Tyr Ser Ser Asp Ala
625                 630                 635                 640

Ser Ser Met Met His Pro Ser Ala Asn Ala Gln Lys Lys Leu Tyr Cys
                645                 650                 655

Asp Val Leu Glu Gln Ser Gly Val Asp Ala Asn Ser Ile Ser Tyr Val
                660                 665                 670

Glu Met His Gly Thr Gly Thr Gln Ala Gly Asp Phe Met Glu Met Ser
            675                 680                 685

Ser Val Leu Ser Thr Phe Ala Glu Lys Arg Gly Ser Asp Asn Pro Leu
        690                 695                 700

Ile Val Gly Ala Leu Lys Ala Asn Ile Gly His Gly Glu Ala Ala Ala
705                 710                 715                 720

Gly Val Cys Ala Leu Ile Lys Thr Leu Met Met Leu Gln Ser Arg Gln
                725                 730                 735

Ile Pro Pro Gln Pro Asp Leu Pro Gly Pro Ile Asn His Arg Phe Pro
                740                 745                 750

Asp Leu Ala Ala Arg Asn Val Tyr Ile Ala Ala Arg Asn Met Arg Leu
            755                 760                 765
```

-continued

```
Glu Ala Ser Pro Val Ala Lys Gly Thr Leu Arg Val Phe Leu Asn Ser
770                 775                 780

Phe Asp Ala Ser Gly Gly Asn Ser Cys Leu Val Leu Glu Glu Ala Pro
785                 790                 795                 800

Pro Arg Ala Val Lys Asp Ala Asp Pro Arg Gly His His Val Thr
                805                 810                 815

Leu Ser Ala Arg Ser Gln Lys Ser Leu Ile Gly Ile Lys Glu Arg Tyr
                820                 825                 830

Leu Ala His Leu Arg Gln His Pro Asp Thr Lys Leu Ala Asp Leu Ala
                835                 840                 845

Tyr Thr Thr Ser Ala Arg Arg Ile His Gly Leu Leu Arg Tyr Ala Ile
850                 855                 860

Ala Ala Ser Ser Ile Asp Glu Val Val Gln Cys Leu Glu Thr Asp Leu
865                 870                 875                 880

Ala Gln Gly Lys Thr Pro Arg Gln Pro Pro Ala Thr Pro Thr Val Val
                885                 890                 895

Phe Thr Phe Thr Gly Gln Gly Ala His Tyr Ile Gly Met Gly Ala Asn
                900                 905                 910

Leu Trp Glu Thr Ser Ala Thr Phe Arg Asn Thr Leu His Asp Tyr Gln
                915                 920                 925

Thr Met Ala Ser Ala Gln Gly Leu Pro His Phe Leu His Leu Ile Thr
930                 935                 940

Asp Ser Ser Thr Pro Ala Pro Gln Ser Gly Pro Asp Thr Val Gln Val
945                 950                 955                 960

Gln Leu Ala Met Val Ser Leu Glu Leu Ala Leu Ala Lys Leu Trp Arg
                965                 970                 975

Ser Trp Gly Ile Gln Pro Ala Met Val Leu Gly His Ser Leu Gly Glu
                980                 985                 990

Tyr Ala Ala Leu Cys Val Ala Gly Val Leu Ser Val Ser Asp Thr Leu
        995                 1000                1005

Tyr Leu Val Ala Lys Arg Ala Gln Ile Met Ala Gly Ala Leu Thr
        1010                1015                1020

Pro His Glu Tyr Gly Met Leu Ala Val Asn Leu Ser Val Ala Asp
        1025                1030                1035

Thr Arg Glu Val Leu Ser Ser Gly Gln His Thr Ser Cys Ala Val
        1040                1045                1050

Ala Cys Ile Asn Ala Pro Lys Met Thr Val Val Ser Gly Leu Arg
        1055                1060                1065

Ser Lys Leu Asp Asp Leu Gln Asp Gln Leu Lys Ser Asp Gly Thr
        1070                1075                1080

Arg Cys Thr Pro Leu Ser Val Pro Tyr Gly Phe His Ser Ser Gln
        1085                1090                1095

Leu Asp Pro Ile Leu Gly Gln Phe Glu Glu Ala Cys Gln Gly Val
        1100                1105                1110

Thr Phe Ser Ala Pro Ser Val Pro Val Val Ser Thr Leu Leu Ala
        1115                1120                1125

Thr Thr Val Arg Glu Glu Gly Thr Phe Ser Pro Glu Tyr Leu Ala
        1130                1135                1140

Arg Gln Ala Arg Glu Pro Val Asp Phe Val Gly Ala Leu Gly Ala
        1145                1150                1155

Val Gln Glu His Lys Phe Pro Gly Leu Thr Phe Leu Glu Ile Gly
        1160                1165                1170

Pro Asp Pro Val Cys Ser Gly Leu Val Asn Ala Thr Leu Gly Ala
```

```
              1175                1180                1185

Asp Glu Ala Ala Leu Arg Cys Val Ala Ser Met His Arg Gly Lys
        1190                1195                1200

Ala Asn Trp Ala Ser Ile Ser Cys Ser Leu Arg Asp Leu Tyr Thr
        1205                1210                1215

Ala Gly Ala Ala Ile Asp Trp Pro Ala His His Arg Asp Phe Lys
        1220                1225                1230

Ser Ser Val Ser Leu Leu Asp Leu Pro Lys Tyr Ser Phe Asp Glu
        1235                1240                1245

Lys Glu Phe Trp Ala Ser Phe Pro Asp Arg Asp Leu Gln Thr Ile
        1250                1255                1260

Gly Asp Val Glu Thr Lys His Ser Gln Pro Pro Ala Ile Val Pro
        1265                1270                1275

Ser Val Gln Gly Tyr Cys Thr Thr Thr Leu Gln Arg Ile Thr Arg
        1280                1285                1290

Glu Thr Ile Glu Pro Asp Gly Leu Ser Val Thr Phe Ser Ser Asp
        1295                1300                1305

Leu Ala Asp Gln His Leu Arg Ala Ala Val Arg Gly His Ala Val
        1310                1315                1320

Ala Asp Val Glu Ile Cys Ser Ser Ser Leu Leu Leu Asp Met Ala
        1325                1330                1335

Leu Ser Ala Ala Gln Tyr Ala Tyr Met Lys His Ser Pro Gly Gln
        1340                1345                1350

Lys Met Pro Val Pro Leu Thr Val Arg Asn Cys Tyr Phe His Arg
        1355                1360                1365

Gly Val Val Leu Thr Asp Lys Ala Gln Thr Val Glu Val Thr Val
        1370                1375                1380

Thr Leu Thr Ser Ser Ala Lys Thr Ala Asp Ile Arg Tyr His Cys
        1385                1390                1395

Arg Thr Pro Asp Glu Tyr Tyr Glu Val Gly Ala Cys Gln Val Val
        1400                1405                1410

Leu Lys Pro Ala Ser Lys Pro Asp Gln Ala Gly Phe Leu Val Arg
        1415                1420                1425

Ser Arg Met Ala Ala Leu Lys Ala Ser Ala Ser His Arg Leu Gly
        1430                1435                1440

Arg Arg Ala Val Tyr Arg Leu Phe Asp Asn Val Val Arg Tyr Ser
        1445                1450                1455

Glu Gln Tyr Gln Gly Leu Glu Asn Val His Leu Ser Glu Asp Met
        1460                1465                1470

Gln Asp Ala Val Ala Glu Ile Asn Met Ala His Val Pro Ala Ala
        1475                1480                1485

Gly Gly His Tyr Leu His His Pro Phe Leu Leu Asp Ser Ile Val
        1490                1495                1500

His Leu Ser Gly Phe Leu Val Asn Asn Gly Leu Arg Tyr Ser Ser
        1505                1510                1515

Glu Trp Ala Cys Leu Ser Thr Gly Phe Asp Glu Trp His Leu Leu
        1520                1525                1530

Lys Pro Leu Asp Pro Thr Thr Val Tyr Thr Ser Tyr Thr Phe Met
        1535                1540                1545

Glu Asp Ser Arg Ser Thr Ser Asn Leu Val Thr Gly Asp Val Tyr
        1550                1555                1560

Val Tyr Asp Gly Glu Glu Leu Val Ser Val Leu Thr Gly Leu Gln
        1565                1570                1575
```

-continued

```
Phe Gln Lys Met Lys Arg Thr Ala Leu Thr His Leu Leu Ser Pro
    1580            1585                1590
Pro Thr Val Gly Thr Met Ala Ala Lys Pro Ser Thr Cys Met Pro
    1595                1600                1605
Thr Met Gly Gln Thr Glu Pro Leu Pro Ala Gln Ala Arg Val Ala
    1610                1615                1620
Gly Leu Pro Val Pro Thr Pro Pro Ala Thr Ala Ser Val Asp Asp
    1625                1630                1635
Gly Glu Gly Glu Lys Phe Asp Leu Val Asn Thr Leu Phe Ser Ile
    1640            1645                1650
Ile Ala Arg Glu Val Gly Val Glu Pro Ser Asp Leu Glu Gly Asp
    1655                1660                1665
Val Asn Leu Ala Asn Leu Gly Ile Asp Ser Leu Met Ala Ile Thr
    1670                1675                1680
Ile Ile Ser Val Met Gln Gln Glu Thr Gly Val Glu Leu Pro Gly
    1685                1690                1695
Thr Phe Phe Leu Asp Asn Ala Thr Thr Thr Ala Val Ile Ala Ala
    1700                1705                1710
Val Gly
    1715

<210> SEQ ID NO 5
<211> LENGTH: 1128
<212> TYPE: DNA
<213> ORGANISM: Metarhizium anisopliae
<220> FEATURE:
<221> NAME/KEY: CDS
<222> LOCATION: (1)..(1128)

<400> SEQUENCE: 5 atg gcc gtc acc gtg tgg caa gat gcg ctc aac atc att gcg cag gag      48
Met Ala Val Thr Val Trp Gln Asp Ala Leu Asn Ile Ile Ala Gln Glu
1               5                   10                  15 agc ggg ctg gag ccc gca gaa atc atc gag acg gac gac acg gcg ttt      96
Ser Gly Leu Glu Pro Ala Glu Ile Ile Glu Thr Asp Asp Thr Ala Phe
            20                  25                  30 ctc acg ctc ggc atc aat cag atc ctc gcc aca gcc atc ttg gcg cac     144
Leu Thr Leu Gly Ile Asn Gln Ile Leu Ala Thr Ala Ile Leu Ala His
        35                  40                  45 ctc aga ggg cct cgt gga gag cct ctc cca cga gac atc ttt gac cag     192
Leu Arg Gly Pro Arg Gly Glu Pro Leu Pro Arg Asp Ile Phe Asp Gln
    50                  55                  60 aag ccc acg gtt ggt gcg ttc cgc cgc ttc tat gag acc cct att cac     240
Lys Pro Thr Val Gly Ala Phe Arg Arg Phe Tyr Glu Thr Pro Ile His
65                  70                  75                  80 ctg gac att gct ccc gtc gcg gca ccg gcg ccg ccc aag ctg aag cgc     288
Leu Asp Ile Ala Pro Val Ala Ala Pro Ala Pro Pro Lys Leu Lys Arg
                85                  90                  95 gtg ccg tcg tct tct gtc ccg ctg tcc atc gtc ttg caa aac aac ccg     336
Val Pro Ser Ser Ser Val Pro Leu Ser Ile Val Leu Gln Asn Asn Pro
            100                 105                 110 gcg tcg agc cgg cac acg gtg ttc ctc ctc ccg gac ggc agc ggc tcg     384
Ala Ser Ser Arg His Thr Val Phe Leu Leu Pro Asp Gly Ser Gly Ser
        115                 120                 125 gcc atg gcc tac gcc aac ctc ccg ccc gtc cac ccg gcc gtc tgc atc     432
Ala Met Ala Tyr Ala Asn Leu Pro Pro Val His Pro Ala Val Cys Ile
    130                 135                 140 gtc ggc atg aac agc ccg tac ctg cgc gac gcc ggc tcg tac cgc tgc     480
```

```
Val Gly Met Asn Ser Pro Tyr Leu Arg Asp Ala Gly Ser Tyr Arg Cys
145                 150                 155                 160 tcc gtg gaa gac ctg gca tcg caa tgg gtc cgt gaa gtc tac cgc cgc      528
Ser Val Glu Asp Leu Ala Ser Gln Trp Val Arg Glu Val Tyr Arg Arg
                165                 170                 175 caa cca cgg ggg ccg tac att gtc ggc ggg tgg tca gcg gga ggc tac      576
Gln Pro Arg Gly Pro Tyr Ile Val Gly Gly Trp Ser Ala Gly Gly Tyr
            180                 185                 190 tac tcg tac gaa gtg gcc aag cgc ctc ctg cag gac gga cac gcc gtc      624
Tyr Ser Tyr Glu Val Ala Lys Arg Leu Leu Gln Asp Gly His Ala Val
        195                 200                 205 gcc aag ctg atc ctg atc gac tcg ccg tgc cgc acc gtc ttt gag tcc      672
Ala Lys Leu Ile Leu Ile Asp Ser Pro Cys Arg Thr Val Phe Glu Ser
    210                 215                 220 ctg tcc atg gac gtc gtc aac tac ctc tcc tct cga aac ctc atg ggc      720
Leu Ser Met Asp Val Val Asn Tyr Leu Ser Ser Arg Asn Leu Met Gly
225                 230                 235                 240 aac tgg ggc tct ccg gaa atg ccc gag tgg ctg gtg cag cat ttc cgc      768
Asn Trp Gly Ser Pro Glu Met Pro Glu Trp Leu Val Gln His Phe Arg
                245                 250                 255 tcg acg ctc gcc gcc gtg ggc aag tac cgc ccg cgg ccc atc gac tcg      816
Ser Thr Leu Ala Ala Val Gly Lys Tyr Arg Pro Arg Pro Ile Asp Ser
            260                 265                 270 gct ggc aag atg cag acg tac atc atc tgg agc cga gac ggc gtg ctg      864
Ala Gly Lys Met Gln Thr Tyr Ile Ile Trp Ser Arg Asp Gly Val Leu
        275                 280                 285 gac caa gac gcg ctg gcc agg tct gga ctc gac acg agc gtc aag gtg      912
Asp Gln Asp Ala Leu Ala Arg Ser Gly Leu Asp Thr Ser Val Lys Val
    290                 295                 300 tcg cga ttt ctg ctg cag ggc aag gat gac ctg ggg ccg aat gga tgg      960
Ser Arg Phe Leu Leu Gln Gly Lys Asp Asp Leu Gly Pro Asn Gly Trp
305                 310                 315                 320 gac gac ctg ctg ccc agc aag gac atg gct att gcg acg caa tcg ggg     1008
Asp Asp Leu Leu Pro Ser Lys Asp Met Ala Ile Ala Thr Gln Ser Gly
                325                 330                 335 acg cac ttc acc atg att aac aag cct cat gtg gcc cag atg agc gat     1056
Thr His Phe Thr Met Ile Asn Lys Pro His Val Ala Gln Met Ser Asp
            340                 345                 350 ctc ttg cgt gat gcc gtg att ggc atc ggc tct gac cga cag gcg cac     1104
Leu Leu Arg Asp Ala Val Ile Gly Ile Gly Ser Asp Arg Gln Ala His
        355                 360                 365 tgg cag cga gtg agc cag tca tga                                     1128
Trp Gln Arg Val Ser Gln Ser
    370                 375

<210> SEQ ID NO 6
<211> LENGTH: 375
<212> TYPE: PRT
<213> ORGANISM: Metarhizium anisopliae

<400> SEQUENCE: 6

Met Ala Val Thr Val Trp Gln Asp Ala Leu Asn Ile Ile Ala Gln Glu
1               5                   10                  15

Ser Gly Leu Glu Pro Ala Glu Ile Ile Glu Thr Asp Asp Thr Ala Phe
                20                  25                  30

Leu Thr Leu Gly Ile Asn Gln Ile Leu Ala Thr Ala Ile Leu Ala His
            35                  40                  45

Leu Arg Gly Pro Arg Gly Glu Pro Leu Pro Arg Asp Ile Phe Asp Gln
        50                  55                  60
```

```
Lys Pro Thr Val Gly Ala Phe Arg Arg Phe Tyr Glu Thr Pro Ile His
65                  70                  75                  80

Leu Asp Ile Ala Pro Val Ala Ala Pro Ala Pro Pro Lys Leu Lys Arg
                85                  90                  95

Val Pro Ser Ser Ser Val Pro Leu Ser Ile Val Leu Gln Asn Asn Pro
            100                 105                 110

Ala Ser Ser Arg His Thr Val Phe Leu Leu Pro Asp Gly Ser Gly Ser
        115                 120                 125

Ala Met Ala Tyr Ala Asn Leu Pro Pro Val His Pro Ala Val Cys Ile
    130                 135                 140

Val Gly Met Asn Ser Pro Tyr Leu Arg Asp Ala Gly Ser Tyr Arg Cys
145                 150                 155                 160

Ser Val Glu Asp Leu Ala Ser Gln Trp Val Arg Glu Val Tyr Arg Arg
                165                 170                 175

Gln Pro Arg Gly Pro Tyr Ile Val Gly Gly Trp Ser Ala Gly Gly Tyr
            180                 185                 190

Tyr Ser Tyr Glu Val Ala Lys Arg Leu Leu Gln Asp Gly His Ala Val
        195                 200                 205

Ala Lys Leu Ile Leu Ile Asp Ser Pro Cys Arg Thr Val Phe Glu Ser
    210                 215                 220

Leu Ser Met Asp Val Val Asn Tyr Leu Ser Ser Arg Asn Leu Met Gly
225                 230                 235                 240

Asn Trp Gly Ser Pro Glu Met Pro Glu Trp Leu Val Gln His Phe Arg
                245                 250                 255

Ser Thr Leu Ala Ala Val Gly Lys Tyr Arg Pro Arg Pro Ile Asp Ser
            260                 265                 270

Ala Gly Lys Met Gln Thr Tyr Ile Ile Trp Ser Arg Asp Gly Val Leu
        275                 280                 285

Asp Gln Asp Ala Leu Ala Arg Ser Gly Leu Asp Thr Ser Val Lys Val
    290                 295                 300

Ser Arg Phe Leu Leu Gln Gly Lys Asp Asp Leu Gly Pro Asn Gly Trp
305                 310                 315                 320

Asp Asp Leu Leu Pro Ser Lys Asp Met Ala Ile Ala Thr Gln Ser Gly
                325                 330                 335

Thr His Phe Thr Met Ile Asn Lys Pro His Val Ala Gln Met Ser Asp
            340                 345                 350

Leu Leu Arg Asp Ala Val Ile Gly Ile Gly Ser Asp Arg Gln Ala His
        355                 360                 365

Trp Gln Arg Val Ser Gln Ser
    370                 375

<210> SEQ ID NO 7
<211> LENGTH: 7533
<212> TYPE: DNA
<213> ORGANISM: Metarhizium rileyi
<220> FEATURE:
<221> NAME/KEY: CDS
<222> LOCATION: (1)..(7533)

<400> SEQUENCE: 7 atg gag gct tcg tca caa tca aga gac gac atc gcc gtc att ggg tta       48
Met Glu Ala Ser Ser Gln Ser Arg Asp Asp Ile Ala Val Ile Gly Leu
1               5                   10                  15 tcg tgc cgc ttc ccg ggt gaa gca gac aca gcc gag cac ttt tgg gac       96
Ser Cys Arg Phe Pro Gly Glu Ala Asp Thr Ala Glu His Phe Trp Asp
            20                  25                  30
```

-continued

| | |
|---|---|
| ttc att tgc aac gga cgc aat gca tac tct gaa aac ccg gat cgg tgg<br>Phe Ile Cys Asn Gly Arg Asn Ala Tyr Ser Glu Asn Pro Asp Arg Trp<br>35                        40                      45 | 144 |
| aat ccg gat gct ttc cac tac ggc gag aag aag ctc aac acc agc ttg<br>Asn Pro Asp Ala Phe His Tyr Gly Glu Lys Lys Leu Asn Thr Ser Leu<br>50                        55                      60 | 192 |
| ccc cgg gga gga cat ttc atg aag caa gat gtg gcc gcc ttt gat gcc<br>Pro Arg Gly Gly His Phe Met Lys Gln Asp Val Ala Ala Phe Asp Ala<br>65                        70                      75                      80 | 240 |
| aac ttc ttc aac ctc tcc aag gtc gag gcg gag tcc atg gac ccc cag<br>Asn Phe Phe Asn Leu Ser Lys Val Glu Ala Glu Ser Met Asp Pro Gln<br>                      85                      90                      95 | 288 |
| cag cgc atc gtc atg gag gtg acg tac gag tcc atg gag agc gca ggg<br>Gln Arg Ile Val Met Glu Val Thr Tyr Glu Ser Met Glu Ser Ala Gly<br>100                       105                     110 | 336 |
| ctc cgc gtc gac cgg ctc gct ggc tct cgc acc ggc gtc ttc atg gcc<br>Leu Arg Val Asp Arg Leu Ala Gly Ser Arg Thr Gly Val Phe Met Ala<br>               115                     120                     125 | 384 |
| agt ttc acc agc gac tac cga gaa atg ctc tat cgt gat gct gag acg<br>Ser Phe Thr Ser Asp Tyr Arg Glu Met Leu Tyr Arg Asp Ala Glu Thr<br>130                       135                     140 | 432 |
| gcg cct ctc tac acc gcg acg ggc act agc aac aca tca acc tcg aac<br>Ala Pro Leu Tyr Thr Ala Thr Gly Thr Ser Asn Thr Ser Thr Ser Asn<br>145                       150                     155                     160 | 480 |
| cgt gtc tcg tgg ttt ttc gac ttg cgc ggg cct agc ttt acc gtg aac<br>Arg Val Ser Trp Phe Phe Asp Leu Arg Gly Pro Ser Phe Thr Val Asn<br>                        165                     170                     175 | 528 |
| aca gcc tgc tcc tcc agt ctg gta gca tgc cat ctc gcc tgc cag agt<br>Thr Ala Cys Ser Ser Ser Leu Val Ala Cys His Leu Ala Cys Gln Ser<br>                         180                     185                     190 | 576 |
| ctg tgg aat ggc gag acg gag agc gcc atc gtc ggc ggc acc agc ctg<br>Leu Trp Asn Gly Glu Thr Glu Ser Ala Ile Val Gly Gly Thr Ser Leu<br>                       195                     200                     205 | 624 |
| ctg ctc aac ccc gac atg ttt ctg tac ctc tcc aac cag cgg ttc ctg<br>Leu Leu Asn Pro Asp Met Phe Leu Tyr Leu Ser Asn Gln Arg Phe Leu<br>210                       215                     220 | 672 |
| gcc ccc gac ggc cag tgc aaa agc ttc gac gag tcc ggc gac ggc tac<br>Ala Pro Asp Gly Gln Cys Lys Ser Phe Asp Glu Ser Gly Asp Gly Tyr<br>225                       230                     235                     240 | 720 |
| gcc aga ggt gat ggc atc ggc gtt gtc att ctg aag cgc gtt gct gac<br>Ala Arg Gly Asp Gly Ile Gly Val Val Ile Leu Lys Arg Val Ala Asp<br>                        245                     250                     255 | 768 |
| gcc gtt cgc gat ggc gat ccg atc cga gcc gtg atc cgt ggc agc gga<br>Ala Val Arg Asp Gly Asp Pro Ile Arg Ala Val Ile Arg Gly Ser Gly<br>                       260                     265                     270 | 816 |
| tgc aac caa gac ggc cac aca aag ggc ttc acc atc ccc agt gtt gag<br>Cys Asn Gln Asp Gly His Thr Lys Gly Phe Thr Ile Pro Ser Val Glu<br>275                       280                     285 | 864 |
| gcg caa gcc tct ctt atc gag gag acg tac cgc aaa gca ggt ctt tca<br>Ala Gln Ala Ser Leu Ile Glu Glu Thr Tyr Arg Lys Ala Gly Leu Ser<br>               290                     295                     300 | 912 |
| ctt gca gag acg cgt tac gta gag gcc cac ggg acc ggc acc cag gcg<br>Leu Ala Glu Thr Arg Tyr Val Glu Ala His Gly Thr Gly Thr Gln Ala<br>305                       310                     315                     320 | 960 |
| ggc gac acg tgt gag atg gag ggt atc gca cga aca ttc ggc cag cac<br>Gly Asp Thr Cys Glu Met Glu Gly Ile Ala Arg Thr Phe Gly Gln His<br>                        325                     330                     335 | 1008 |
| cgg ggc gac tca gat gat ctg cta gtc gga tct gtc aag tca aat att<br>Arg Gly Asp Ser Asp Asp Leu Leu Val Gly Ser Val Lys Ser Asn Ile<br>340                       345                     350 | 1056 |

| | | | | | | | | | | | | | | | | |
|---|---|---|---|---|---|---|---|---|---|---|---|---|---|---|---|---|
| gga | cat | ctc | gaa | gct | tgc | gct | gga | ctg | gcc | tcg | cta | aag | tgc | atc | | 1104 |
| Gly | His | Leu | Glu | Ala | Cys | Ala | Gly | Leu | Ala | Ser | Leu | Ile | Lys | Cys | Ile | |
| | | | 355 | | | | 360 | | | | 365 | | | | | |
| ttc | att | ctg | gaa | aca | ggc | gtg | ata | cca | ccg | acg | ccc | agt | gtc | cgc | gtt | 1152 |
| Phe | Ile | Leu | Glu | Thr | Gly | Val | Ile | Pro | Pro | Thr | Pro | Ser | Val | Arg | Val | |
| | | 370 | | | | | 375 | | | | | 380 | | | | |
| ctc | aac | ccc | aag | atc | cgc | tgg | gag | gaa | tgg | cat | ctc | aag | gtt | ccc | tcg | 1200 |
| Leu | Asn | Pro | Lys | Ile | Arg | Trp | Glu | Glu | Trp | His | Leu | Lys | Val | Pro | Ser | |
| 385 | | | | | 390 | | | | | 395 | | | | | 400 | |
| aaa | caa | act | cct | tgg | cca | acc | gac | ggc | cta | cgg | cga | gtg | agc | aca | cag | 1248 |
| Lys | Gln | Thr | Pro | Trp | Pro | Thr | Asp | Gly | Leu | Arg | Arg | Val | Ser | Thr | Gln | |
| | | | | 405 | | | | | 410 | | | | | 415 | | |
| ggt | ttc | gga | tac | ggt | ggt | aca | aac | gcc | cat | ctg | att | ctc | gac | gat | gca | 1296 |
| Gly | Phe | Gly | Tyr | Gly | Gly | Thr | Asn | Ala | His | Leu | Ile | Leu | Asp | Asp | Ala | |
| | | 420 | | | | | 425 | | | | | 430 | | | | |
| gcc | cac | tat | ctc | gag | ggg | cga | agt | ctc | agg | ggt | cat | cat | tac | act | cgc | 1344 |
| Ala | His | Tyr | Leu | Glu | Gly | Arg | Ser | Leu | Arg | Gly | His | His | Tyr | Thr | Arg | |
| | | 435 | | | | | 440 | | | | | 445 | | | | |
| aca | cat | cct | cag | gcg | cag | agg | ctt | ttg | acc | tct | gca | atc | cac | ggg | gct | 1392 |
| Thr | His | Pro | Gln | Ala | Gln | Arg | Leu | Leu | Thr | Ser | Ala | Ile | His | Gly | Ala | |
| | 450 | | | | | 455 | | | | | 460 | | | | | |
| tcg | cca | aag | gaa | cag | ctg | ccg | cgt | ttg | ttt | ctg | ttc | cgc | gcg | aat | gat | 1440 |
| Ser | Pro | Lys | Glu | Gln | Leu | Pro | Arg | Leu | Phe | Leu | Phe | Arg | Ala | Asn | Asp | |
| 465 | | | | | 470 | | | | | 475 | | | | | 480 | |
| cgt | gag | ggc | ctt | ggg | cgt | gtc | cgg | gcg | tct | ttg | gca | caa | cat | ctc | gac | 1488 |
| Arg | Glu | Gly | Leu | Gly | Arg | Val | Arg | Ala | Ser | Leu | Ala | Gln | His | Leu | Asp | |
| | | | | 485 | | | | | 490 | | | | | 495 | | |
| caa | ctc | ctg | ccc | tcg | tgg | tcc | cag | gac | tcg | agc | ggc | cgt | gat | gca | tac | 1536 |
| Gln | Leu | Leu | Pro | Ser | Trp | Ser | Gln | Asp | Ser | Ser | Gly | Arg | Asp | Ala | Tyr | |
| | | | 500 | | | | | 505 | | | | | 510 | | | |
| ctc | cag | aac | ttg | gcc | ttt | acc | ctc | gcc | agc | cga | cga | tcc | aat | ctc | aaa | 1584 |
| Leu | Gln | Asn | Leu | Ala | Phe | Thr | Leu | Ala | Ser | Arg | Arg | Ser | Asn | Leu | Lys | |
| | | 515 | | | | | 520 | | | | | 525 | | | | |
| tgg | cag | acg | tat | gcc | acg | gct | tct | acc | ccg | gac | gag | ttg | ctt | caa | gtg | 1632 |
| Trp | Gln | Thr | Tyr | Ala | Thr | Ala | Ser | Thr | Pro | Asp | Glu | Leu | Leu | Gln | Val | |
| | 530 | | | | | 535 | | | | | 540 | | | | | |
| ctc | aag | acc | aag | ggc | gac | gca | tgg | gcg | agt | ccc | gag | gct | cgc | ctt | gcc | 1680 |
| Leu | Lys | Thr | Lys | Gly | Asp | Ala | Trp | Ala | Ser | Pro | Glu | Ala | Arg | Leu | Ala | |
| 545 | | | | | 550 | | | | | 555 | | | | | 560 | |
| gcg | tca | tcc | ccc | cgt | ctt | ggc | ttt | att | ttc | acc | ggc | cag | ggc | gct | caa | 1728 |
| Ala | Ser | Ser | Pro | Arg | Leu | Gly | Phe | Ile | Phe | Thr | Gly | Gln | Gly | Ala | Gln | |
| | | | | 565 | | | | | 570 | | | | | 575 | | |
| tgg | gct | cgc | atg | ggt | gtt | gag | ctc | atg | gga | tat | ccc | gtg | ttt | cgc | caa | 1776 |
| Trp | Ala | Arg | Met | Gly | Val | Glu | Leu | Met | Gly | Tyr | Pro | Val | Phe | Arg | Gln | |
| | | | 580 | | | | | 585 | | | | | 590 | | | |
| agc | gtc | gag | gag | tcg | gag | cac | ttc | ctg | cgc | gag | act | ctc | ggc | tgt | ccc | 1824 |
| Ser | Val | Glu | Glu | Ser | Glu | His | Phe | Leu | Arg | Glu | Thr | Leu | Gly | Cys | Pro | |
| | | 595 | | | | | 600 | | | | | 605 | | | | |
| tgg | tct | gcc | atc | gat | gag | ctg | gcc | aag | ccg | cag | acc | acg | tcc | cgt | ctc | 1872 |
| Trp | Ser | Ala | Ile | Asp | Glu | Leu | Ala | Lys | Pro | Gln | Thr | Thr | Ser | Arg | Leu | |
| | 610 | | | | | 615 | | | | | 620 | | | | | |
| tcc | gag | gca | gcc | tac | agt | cag | acg | ctg | tgc | acc | gta | ctt | caa | att | gcc | 1920 |
| Ser | Glu | Ala | Ala | Tyr | Ser | Gln | Thr | Leu | Cys | Thr | Val | Leu | Gln | Ile | Ala | |
| 625 | | | | | 630 | | | | | 635 | | | | | 640 | |
| att | gta | gac | ttg | ctt | caa | gac | tgg | aat | gtc | tct | ccc | act | cgc | gtt | gcc | 1968 |
| Ile | Val | Asp | Leu | Leu | Gln | Asp | Trp | Asn | Val | Ser | Pro | Thr | Arg | Val | Ala | |
| | | | | 645 | | | | | 650 | | | | | 655 | | |
| ggg | cac | tca | agt | ggc | gaa | ata | gcg | gcg | gca | tat | tgc | cta | ggc | gcc | ctg | 2016 |
| Gly | His | Ser | Ser | Gly | Glu | Ile | Ala | Ala | Ala | Tyr | Cys | Leu | Gly | Ala | Leu | |

```
                660             665             670
acc aag cag gac agt ctg aga gtc gcc tac tac cga gga atc ctg tcg        2064
Thr Lys Gln Asp Ser Leu Arg Val Ala Tyr Tyr Arg Gly Ile Leu Ser
            675             680             685 tca gag atg caa gaa aca cac aag gac caa aag gga gcc atg atg gcc        2112
Ser Glu Met Gln Glu Thr His Lys Asp Gln Lys Gly Ala Met Met Ala
    690             695             700 atc ggg gcc tcc ccc gag acg gta gca cag tgg ttg gca cag ctg act        2160
Ile Gly Ala Ser Pro Glu Thr Val Ala Gln Trp Leu Ala Gln Leu Thr
705             710             715             720 cgg gga aaa gtc gtc gtt gcc tgc atc aac tcg ccg acg agt gtc acg        2208
Arg Gly Lys Val Val Val Ala Cys Ile Asn Ser Pro Thr Ser Val Thr
            725             730             735 gca tcc ggc gac gca gcg ggc atc gac gag ctc ctt tcc ata gta caa        2256
Ala Ser Gly Asp Ala Ala Gly Ile Asp Glu Leu Leu Ser Ile Val Gln
        740             745             750 gag gcg gga gtc ttt gga cgc aag ttg aaa gtg gac gtg gca tat cac        2304
Glu Ala Gly Val Phe Gly Arg Lys Leu Lys Val Asp Val Ala Tyr His
    755             760             765 tcg cat cat atg cag tcg gtt tct gcg gcc tac tct gcg ctc ctg aag        2352
Ser His His Met Gln Ser Val Ser Ala Ala Tyr Ser Ala Leu Leu Lys
770             775             780 gac ctc aag ccg ctg cca gcg cac gag ggc cgc acc atg cat tcg agc        2400
Asp Leu Lys Pro Leu Pro Ala His Glu Gly Arg Thr Met His Ser Ser
785             790             795             800 gta ttg ggt ggc ttg ata gac acc gca gag ctt ggt gcg tcc aac tgg        2448
Val Leu Gly Gly Leu Ile Asp Thr Ala Glu Leu Gly Ala Ser Asn Trp
            805             810             815 gtg cgg aac ctg att tca ccg gtg cgt ttc tct gaa gcc gtc tcg agc        2496
Val Arg Asn Leu Ile Ser Pro Val Arg Phe Ser Glu Ala Val Ser Ser
        820             825             830 ctc atc ttg gac ggg gac aag cca gcc gtc gat atg ctc atc gag atc        2544
Leu Ile Leu Asp Gly Asp Lys Pro Ala Val Asp Met Leu Ile Glu Ile
    835             840             845 ggg cca cac gct gcg ctc aag gga ccc gtc cag gaa aca cta gag gcc        2592
Gly Pro His Ala Ala Leu Lys Gly Pro Val Gln Glu Thr Leu Glu Ala
850             855             860 aag ggc gtc tcc gcg gtc aag tac acg agc gtc gtg tct cgg ggc cag        2640
Lys Gly Val Ser Ala Val Lys Tyr Thr Ser Val Val Ser Arg Gly Gln
865             870             875             880 aat gct gtc aag acg gct ttg gcc tgc gcg ggc gag ctc gtc aac tcg        2688
Asn Ala Val Lys Thr Ala Leu Ala Cys Ala Gly Glu Leu Val Asn Ser
            885             890             895 agc gtc ccc gtt gca atg gat cgt gta aat ctc gag tcg gag ctg caa        2736
Ser Val Pro Val Ala Met Asp Arg Val Asn Leu Glu Ser Glu Leu Gln
        900             905             910 ccg agc ccg ctg gtc gat ctt cca tca tac cca tgg aac cgc tcg acc        2784
Pro Ser Pro Leu Val Asp Leu Pro Ser Tyr Pro Trp Asn Arg Ser Thr
    915             920             925 cgg ttc tgg gcc gag tca cgt ctt tct caa gaa tat cgg ctt cgc aag        2832
Arg Phe Trp Ala Glu Ser Arg Leu Ser Gln Glu Tyr Arg Leu Arg Lys
930             935             940 cat gcc cgc ctg ccc ctg ctg gga agt ccg tgt ccc acg atg ggc gcc        2880
His Ala Arg Leu Pro Leu Leu Gly Ser Pro Cys Pro Thr Met Gly Ala
945             950             955             960 cgt gag aga tac tgg cgc ggc atg gtg agg ctg gac gag gag ccc tgg        2928
Arg Glu Arg Tyr Trp Arg Gly Met Val Arg Leu Asp Glu Glu Pro Trp
            965             970             975 atc cga gac cat gag atc caa ggg tct atc ctg tat cct ggt gcc ggt        2976
```

```
Ile Arg Asp His Glu Ile Gln Gly Ser Ile Leu Tyr Pro Gly Ala Gly
            980                 985                 990 ttc ctg atc atg gcc atc gaa gcc gct tct cag caa gca aac gaa cag    3024
Phe Leu Ile Met Ala Ile Glu Ala Ala Ser Gln Gln Ala Asn Glu Gln
            995                 1000                1005 cgc aaa gtg agc gcg ttt cgt ctg cgc gat gtg cac ctt gat gcc        3069
Arg Lys Val Ser Ala Phe Arg Leu Arg Asp Val His Leu Asp Ala
    1010                1015                1020 gcc ttg gtg gtc acg gac aac agc act gcc gag gca att cta caa        3114
Ala Leu Val Val Thr Asp Asn Ser Thr Ala Glu Ala Ile Leu Gln
    1025                1030                1035 ctt cgc ccg cat ctc ctc gcg ccg gga agc agc cag tcg tct tgg        3159
Leu Arg Pro His Leu Leu Ala Pro Gly Ser Ser Gln Ser Ser Trp
    1040                1045                1050 atg gag ttt acc gtc aac tca tcc att gat ggc ggt gcc ctg cgt        3204
Met Glu Phe Thr Val Asn Ser Ser Ile Asp Gly Gly Ala Leu Arg
    1055                1060                1065 cag aac tgc tcc ggc ctc atc atg atc gag tac gag gct gac gca        3249
Gln Asn Cys Ser Gly Leu Ile Met Ile Glu Tyr Glu Ala Asp Ala
    1070                1075                1080 gac tcg gcc atg gcc cgt gaa cgt agc ttg gag tca gac acg gtt        3294
Asp Ser Ala Met Ala Arg Glu Arg Ser Leu Glu Ser Asp Thr Val
    1085                1090                1095 tgt gat ttg tac aag aag acg tac att tcc tgc cgg cag tct gtc        3339
Cys Asp Leu Tyr Lys Lys Thr Tyr Ile Ser Cys Arg Gln Ser Val
    1100                1105                1110 gat gtg gcc aag ttc tac tcc cgt ctc gcc tct ctt ggc ctc acc        3384
Asp Val Ala Lys Phe Tyr Ser Arg Leu Ala Ser Leu Gly Leu Thr
    1115                1120                1125 tac ggg ccg gcg ttt gca aac ttg aca gag atc cgg agg acg ggc        3429
Tyr Gly Pro Ala Phe Ala Asn Leu Thr Glu Ile Arg Arg Thr Gly
    1130                1135                1140 aac ggc cag tgt acc ggc gcc gtt cgt gtt ccc gct gtc gaa agc        3474
Asn Gly Gln Cys Thr Gly Ala Val Arg Val Pro Ala Val Glu Ser
    1145                1150                1155 ctg gtg cct cca gca tac cgc agc cat cct cat gtc atc cat ccg        3519
Leu Val Pro Pro Ala Tyr Arg Ser His Pro His Val Ile His Pro
    1160                1165                1170 ggg acg ttg gac gcc atc ttc cat ctt gcc ttt gcg gcc ctc gag        3564
Gly Thr Leu Asp Ala Ile Phe His Leu Ala Phe Ala Ala Leu Glu
    1175                1180                1185 gac tct ctg ctt ccc ggt ccc atg gtc cca acg aca atc gat ggg        3609
Asp Ser Leu Leu Pro Gly Pro Met Val Pro Thr Thr Ile Asp Gly
    1190                1195                1200 cta gtc gtt gca gca aac act cca aac gag ccc ggc act ttg ctt        3654
Leu Val Val Ala Ala Asn Thr Pro Asn Glu Pro Gly Thr Leu Leu
    1205                1210                1215 cgc gga gtt tcg cag tct tct cca cat gga ttc agg gag ctc atc        3699
Arg Gly Val Ser Gln Ser Ser Pro His Gly Phe Arg Glu Leu Ile
    1220                1225                1230 tcc gac att gac gtg ctg gat gat cag agc agc aga gcc gtt gta        3744
Ser Asp Ile Asp Val Leu Asp Asp Gln Ser Ser Arg Ala Val Val
    1235                1240                1245 cag atc aag ggc ttc cgc tgc gcc gac gtc tcc gga ggc agc gcg        3789
Gln Ile Lys Gly Phe Arg Cys Ala Asp Val Ser Gly Gly Ser Ala
    1250                1255                1260 aat tcg tca gac gcg gag cct gca gag gct cgt ccg atc agc ttc        3834
Asn Ser Ser Asp Ala Glu Pro Ala Glu Ala Arg Pro Ile Ser Phe
    1265                1270                1275
```

| | | | | | | | | | | | | | | |
|---|---|---|---|---|---|---|---|---|---|---|---|---|---|---|
| cgt | ctc | aac | tgg | aag | cca | gca | atc | gac | ctg | ctt | tct | gct | gag | cag |
| Arg | Leu | Asn | Trp | Lys | Pro | Ala | Ile | Asp | Leu | Leu | Ser | Ala | Glu | Gln |
| 1280 | | | | 1285 | | | | | 1290 | | | | | |

3879

| | | | | | | | | | | | | | | |
|---|---|---|---|---|---|---|---|---|---|---|---|---|---|---|
| ctg | cgg | aaa | tat | gtt | ggt | cgt | gtt | gcc | aaa | caa | gca | gat | gct | tct |
| Leu | Arg | Lys | Tyr | Val | Gly | Arg | Val | Ala | Lys | Gln | Ala | Asp | Ala | Ser |
| 1295 | | | | 1300 | | | | | 1305 | | | | | |

3924

| | | | | | | | | | | | | | | |
|---|---|---|---|---|---|---|---|---|---|---|---|---|---|---|
| tcc | cat | ctc | att | cgt | gcc | acg | gaa | cta | aac | aac | cag | gtt | gga | aat |
| Ser | His | Leu | Ile | Arg | Ala | Thr | Glu | Leu | Asn | Asn | Gln | Val | Gly | Asn |
| 1310 | | | | 1315 | | | | | 1320 | | | | | |

3969

| | | | | | | | | | | | | | | |
|---|---|---|---|---|---|---|---|---|---|---|---|---|---|---|
| ctt | ccg | gaa | act | gca | cca | tca | gct | gca | ttg | gat | gcc | gtc | acg | gaa |
| Leu | Pro | Glu | Thr | Ala | Pro | Ser | Ala | Ala | Leu | Asp | Ala | Val | Thr | Glu |
| 1325 | | | | 1330 | | | | | 1335 | | | | | |

4014

| | | | | | | | | | | | | | | |
|---|---|---|---|---|---|---|---|---|---|---|---|---|---|---|
| aaa | gcc | act | cga | tgg | ttc | gct | gcc | aag | tct | gcg | aag | ctc | gtc | gac |
| Lys | Ala | Thr | Arg | Trp | Phe | Ala | Ala | Lys | Ser | Ala | Lys | Leu | Val | Asp |
| 1340 | | | | 1345 | | | | | 1350 | | | | | |

4059

| | | | | | | | | | | | | | | |
|---|---|---|---|---|---|---|---|---|---|---|---|---|---|---|
| ggt | gct | gcc | acg | gca | tcc | agc | gct | tca | tcc | tca | ggg | ggc | tac | gtc |
| Gly | Ala | Ala | Thr | Ala | Ser | Ser | Ala | Ser | Ser | Ser | Gly | Gly | Tyr | Val |
| 1355 | | | | 1360 | | | | | 1365 | | | | | |

4104

| | | | | | | | | | | | | | | |
|---|---|---|---|---|---|---|---|---|---|---|---|---|---|---|
| gac | gca | acg | aga | gac | gca | tgg | gca | gca | gtg | cga | gaa | ggc | cgt | atc |
| Asp | Ala | Thr | Arg | Asp | Ala | Trp | Ala | Ala | Val | Arg | Glu | Gly | Arg | Ile |
| 1370 | | | | 1375 | | | | | 1380 | | | | | |

4149

| | | | | | | | | | | | | | | |
|---|---|---|---|---|---|---|---|---|---|---|---|---|---|---|
| cca | tca | cca | gag | aaa | caa | gac | agg | gtg | ttg | aga | gag | gta | gag | aag |
| Pro | Ser | Pro | Glu | Lys | Gln | Asp | Arg | Val | Leu | Arg | Glu | Val | Glu | Lys |
| 1385 | | | | 1390 | | | | | 1395 | | | | | |

4194

| | | | | | | | | | | | | | | |
|---|---|---|---|---|---|---|---|---|---|---|---|---|---|---|
| aac | ggc | gca | ctg | tcc | acc | tta | ctg | ggg | gcg | ctc | gac | gcg | tac | atg |
| Asn | Gly | Ala | Leu | Ser | Thr | Leu | Leu | Gly | Ala | Leu | Asp | Ala | Tyr | Met |
| 1400 | | | | 1405 | | | | | 1410 | | | | | |

4239

| | | | | | | | | | | | | | | |
|---|---|---|---|---|---|---|---|---|---|---|---|---|---|---|
| gat | ctt | cgc | cat | cat | gcg | aag | ccc | aac | ttg | tca | gtt | ctc | gag | ctg |
| Asp | Leu | Arg | His | His | Ala | Lys | Pro | Asn | Leu | Ser | Val | Leu | Glu | Leu |
| 1415 | | | | 1420 | | | | | 1425 | | | | | |

4284

| | | | | | | | | | | | | | | |
|---|---|---|---|---|---|---|---|---|---|---|---|---|---|---|
| agc | tta | gac | gcg | gtg | ccg | tac | tct | att | ttc | gca | gcc | ctg | ccc | agt |
| Ser | Leu | Asp | Ala | Val | Pro | Tyr | Ser | Ile | Phe | Ala | Ala | Leu | Pro | Ser |
| 1430 | | | | 1435 | | | | | 1440 | | | | | |

4329

| | | | | | | | | | | | | | | |
|---|---|---|---|---|---|---|---|---|---|---|---|---|---|---|
| cgg | cag | agc | att | ctc | cag | aca | gcc | cag | tat | gct | att | cga | gta | tct |
| Arg | Gln | Ser | Ile | Leu | Gln | Thr | Ala | Gln | Tyr | Ala | Ile | Arg | Val | Ser |
| 1445 | | | | 1450 | | | | | 1455 | | | | | |

4374

| | | | | | | | | | | | | | | |
|---|---|---|---|---|---|---|---|---|---|---|---|---|---|---|
| caa | gac | ggc | gtc | cag | gat | cga | att | agg | agt | caa | ttc | ggg | tcc | caa |
| Gln | Asp | Gly | Val | Gln | Asp | Arg | Ile | Arg | Ser | Gln | Phe | Gly | Ser | Gln |
| 1460 | | | | 1465 | | | | | 1470 | | | | | |

4419

| | | | | | | | | | | | | | | |
|---|---|---|---|---|---|---|---|---|---|---|---|---|---|---|
| gga | tct | ggc | atc | gac | gtt | gcc | gtc | acg | gat | ttc | acc | caa | aag | atc |
| Gly | Ser | Gly | Ile | Asp | Val | Ala | Val | Thr | Asp | Phe | Thr | Gln | Lys | Ile |
| 1475 | | | | 1480 | | | | | 1485 | | | | | |

4464

| | | | | | | | | | | | | | | |
|---|---|---|---|---|---|---|---|---|---|---|---|---|---|---|
| gac | gag | aca | ttg | ggg | aag | cat | gat | gta | att | ctc | ata | ttt | gat | cct |
| Asp | Glu | Thr | Leu | Gly | Lys | His | Asp | Val | Ile | Leu | Ile | Phe | Asp | Pro |
| 1490 | | | | 1495 | | | | | 1500 | | | | | |

4509

| | | | | | | | | | | | | | | |
|---|---|---|---|---|---|---|---|---|---|---|---|---|---|---|
| ggc | ttc | tta | cac | gcc | aag | ctc | gag | gtc | gtc | ttg | cga | aac | gcc | cgc |
| Gly | Phe | Leu | His | Ala | Lys | Leu | Glu | Val | Val | Leu | Arg | Asn | Ala | Arg |
| 1505 | | | | 1510 | | | | | 1515 | | | | | |

4554

| | | | | | | | | | | | | | | |
|---|---|---|---|---|---|---|---|---|---|---|---|---|---|---|
| aag | ctg | ctg | aac | ccc | gga | ggc | aag | atc | atc | gtg | gca | gag | gtc | aac |
| Lys | Leu | Leu | Asn | Pro | Gly | Gly | Lys | Ile | Ile | Val | Ala | Glu | Val | Asn |
| 1520 | | | | 1525 | | | | | 1530 | | | | | |

4599

| | | | | | | | | | | | | | | |
|---|---|---|---|---|---|---|---|---|---|---|---|---|---|---|
| gag | ccc | gga | cta | tat | ctg | ggc | aca | gca | ctg | ggc | tgt | ctt | cac | tgg |
| Glu | Pro | Gly | Leu | Tyr | Leu | Gly | Thr | Ala | Leu | Gly | Cys | Leu | His | Trp |
| 1535 | | | | 1540 | | | | | 1545 | | | | | |

4644

| | | | | | | | | | | | | | | |
|---|---|---|---|---|---|---|---|---|---|---|---|---|---|---|
| aca | aga | aac | ctc | gac | gtc | tcg | cag | agt | agc | tgg | aca | tcg | tgc | ctc |
| Thr | Arg | Asn | Leu | Asp | Val | Ser | Gln | Ser | Ser | Trp | Thr | Ser | Cys | Leu |
| 1550 | | | | 1555 | | | | | 1560 | | | | | |

4689

| | | | | | | | | | | | | | | |
|---|---|---|---|---|---|---|---|---|---|---|---|---|---|---|
| tcg | cgc | ttc | gga | ctg | acg | cct | gcc | ctg | gaa | ctc | atc | gac | gca | aac |
| Ser | Arg | Phe | Gly | Leu | Thr | Pro | Ala | Leu | Glu | Leu | Ile | Asp | Ala | Asn |
| 1565 | | | | 1570 | | | | | 1575 | | | | | |

4734

```
aca gat gcc acc ggt cat ggg aag ttt cag ctc cgt ctt aca ggc    4779
Thr Asp Ala Thr Gly His Gly Lys Phe Gln Leu Arg Leu Thr Gly
    1580            1585                1590 agt gcc gcg gag tcg aat ggg agt agc agc cat cag ccg cag caa    4824
Ser Ala Ala Glu Ser Asn Gly Ser Ser Ser His Gln Pro Gln Gln
    1595            1600                1605 gtc acc ctc ata gaa tct gcc gat gca tct gag atg gcg caa ggc    4869
Val Thr Leu Ile Glu Ser Ala Asp Ala Ser Glu Met Ala Gln Gly
    1610            1615                1620 gtc gca gaa gcg gta gcc cag cgt ctt caa gag gct tct att ccc    4914
Val Ala Glu Ala Val Ala Gln Arg Leu Gln Glu Ala Ser Ile Pro
    1625            1630                1635 aca aag cgc gtc cat tgg ggc tgc gat gtc tcg caa ctc aag ggc    4959
Thr Lys Arg Val His Trp Gly Cys Asp Val Ser Gln Leu Lys Gly
    1640            1645                1650 cag ccc tgc atc gtc ctg acg gac ctg cag tct gcg ctg ctg aaa    5004
Gln Pro Cys Ile Val Leu Thr Asp Leu Gln Ser Ala Leu Leu Lys
    1655            1660                1665 gat ctg gca cca gag gac ctc gcg gcc ttg caa tca ctt ttc ttg    5049
Asp Leu Ala Pro Glu Asp Leu Ala Ala Leu Gln Ser Leu Phe Leu
    1670            1675                1680 cat gct gag agc act ctt tgg gtg acc ggt ccc ctt ggc cca gac    5094
His Ala Glu Ser Thr Leu Trp Val Thr Gly Pro Leu Gly Pro Asp
    1685            1690                1695 gcg gct ctg ata aca ggt ttg gct cgc agc gtt tgc aac gag gca    5139
Ala Ala Leu Ile Thr Gly Leu Ala Arg Ser Val Cys Asn Glu Ala
    1700            1705                1710 gct gga gtt cag atc cgc acg ctt gag gtg act gat ttg ccg ata    5184
Ala Gly Val Gln Ile Arg Thr Leu Glu Val Thr Asp Leu Pro Ile
    1715            1720                1725 tct gca gcc gcc ggc tat gcc gac atg gta gct cgt gtt ttc cgc    5229
Ser Ala Ala Ala Gly Tyr Ala Asp Met Val Ala Arg Val Phe Arg
    1730            1735                1740 tat cgt ggc tcg gat aca gag ttt cag tgg cat tca gac gct ctg    5274
Tyr Arg Gly Ser Asp Thr Glu Phe Gln Trp His Ser Asp Ala Leu
    1745            1750                1755 cta gtc agc cgg ctg act gag gat gag gac cga aac gag gag atc    5319
Leu Val Ser Arg Leu Thr Glu Asp Glu Asp Arg Asn Glu Glu Ile
    1760            1765                1770 gcg cag ctg ctg gga cag gga gaa acg gcc gcg gct gag act acg    5364
Ala Gln Leu Leu Gly Gln Gly Glu Thr Ala Ala Ala Glu Thr Thr
    1775            1780                1785 cta cag gag aca cca gag gga ctg aaa ctg tgc gtg agg caa ata    5409
Leu Gln Glu Thr Pro Glu Gly Leu Lys Leu Cys Val Arg Gln Ile
    1790            1795                1800 ggc atg ctc gac tct gcc tgc tac gag cca gat ccg ttg gca ttg    5454
Gly Met Leu Asp Ser Ala Cys Tyr Glu Pro Asp Pro Leu Ala Leu
    1805            1810                1815 gaa cca cta gag gcc ggc gag gtg gaa gtc gac gtg aag gct tca    5499
Glu Pro Leu Glu Ala Gly Glu Val Glu Val Asp Val Lys Ala Ser
    1820            1825                1830 ggg gtc aac ttc cga gat gtc atg gtc gcc ctg ggg cag atc cca    5544
Gly Val Asn Phe Arg Asp Val Met Val Ala Leu Gly Gln Ile Pro
    1835            1840                1845 gat cgg gct ttc gga ttc gag ggc gcc ggt gtc gtc cgc cgt gtc    5589
Asp Arg Ala Phe Gly Phe Glu Gly Ala Gly Val Val Arg Arg Val
    1850            1855                1860 cac gct gaa gag tcg cgg ctt cgc cct gga gat cga gtc gtc ttc    5634
His Ala Glu Glu Ser Arg Leu Arg Pro Gly Asp Arg Val Val Phe
```

```
                      1865                1870                1875
ctt gct cac gga gcg cac cgc act gtt cat cgt gta cgc gcg gac         5679
Leu Ala His Gly Ala His Arg Thr Val His Arg Val Arg Ala Asp
    1880                1885                1890 tat gcc atg cct atg ccc gat acc atg tcc ttt gaa gag ggc gcg         5724
Tyr Ala Met Pro Met Pro Asp Thr Met Ser Phe Glu Glu Gly Ala
    1895                1900                1905 gct gtt ctc ctt gtc cac aca aca gcc tgg tac gcc ctc gtc aaa         5769
Ala Val Leu Leu Val His Thr Thr Ala Trp Tyr Ala Leu Val Lys
    1910                1915                1920 tcg gca cgc gca aca gcc ggt cag tca gtc ctt gtt cat gcc gct         5814
Ser Ala Arg Ala Thr Ala Gly Gln Ser Val Leu Val His Ala Ala
    1925                1930                1935 gca ggc ggt gtt ggc cag gca gtc ctc atg ctt gcc cga cat ctg         5859
Ala Gly Gly Val Gly Gln Ala Val Leu Met Leu Ala Arg His Leu
    1940                1945                1950 ggc ctg gag gtt ttt gcg acg gtt ggc tcc gag gag aag agg aag         5904
Gly Leu Glu Val Phe Ala Thr Val Gly Ser Glu Glu Lys Arg Lys
    1955                1960                1965 ctt gta cac gaa acg tac ggg att cct cac gac cac atg ttc aac         5949
Leu Val His Glu Thr Tyr Gly Ile Pro His Asp His Met Phe Asn
    1970                1975                1980 tcg cgg gac tcc agc ttt gca atg ggc gtg aag cgg atg acc aac         5994
Ser Arg Asp Ser Ser Phe Ala Met Gly Val Lys Arg Met Thr Asn
    1985                1990                1995 ggc cgc gga gtt gac att gtt gtc aat tcg ctc gct ggg gaa gct         6039
Gly Arg Gly Val Asp Ile Val Val Asn Ser Leu Ala Gly Glu Ala
    2000                2005                2010 ctc cgg cag acg tgg cat tgc ctg gca ccg ttt ggc acc ttt gtc         6084
Leu Arg Gln Thr Trp His Cys Leu Ala Pro Phe Gly Thr Phe Val
    2015                2020                2025 gag ctc ggc atg aag gac ata ttg gac aac gca cgc tta gac atg         6129
Glu Leu Gly Met Lys Asp Ile Leu Asp Asn Ala Arg Leu Asp Met
    2030                2035                2040 aaa ccc ttc ctg cag gac gca acc ttt gtc ttc ttc aac ctg aac         6174
Lys Pro Phe Leu Gln Asp Ala Thr Phe Val Phe Phe Asn Leu Asn
    2045                2050                2055 cgg gtc caa aag gag cgg cca gat ctc atg aag gag gct ctc agg         6219
Arg Val Gln Lys Glu Arg Pro Asp Leu Met Lys Glu Ala Leu Arg
    2060                2065                2070 gaa acg atg gcc ctt gta tcc tct ggg gcg ctg aag cca gca acg         6264
Glu Thr Met Ala Leu Val Ser Ser Gly Ala Leu Lys Pro Ala Thr
    2075                2080                2085 ccg ctc acc gca tac gca gct tct caa gtg gaa aca gca ttc cgg         6309
Pro Leu Thr Ala Tyr Ala Ala Ser Gln Val Glu Thr Ala Phe Arg
    2090                2095                2100 aaa atc cag act ggg cag cac ctg ggt aag ctc gtg cta acg ttc         6354
Lys Ile Gln Thr Gly Gln His Leu Gly Lys Leu Val Leu Thr Phe
    2105                2110                2115 cag acc gga gac gtt ctc cgc gtc atc aga ccg gat ctc agc ctg         6399
Gln Thr Gly Asp Val Leu Arg Val Ile Arg Pro Asp Leu Ser Leu
    2120                2125                2130 ggc gac tcc ggc gcg tac ctc ctt gtt gga gga ctc ggc gga tta         6444
Gly Asp Ser Gly Ala Tyr Leu Leu Val Gly Gly Leu Gly Gly Leu
    2135                2140                2145 ggt cgt agt ctt gca cgg ctg ctg gta cat ctc ggt gcc cgc cgg         6489
Gly Arg Ser Leu Ala Arg Leu Leu Val His Leu Gly Ala Arg Arg
    2150                2155                2160 cta tgt ttc ttg tct cgg tct ggt gca aaa agc agc gag gca cag         6534
```

|                                                                                                          |      |
|----------------------------------------------------------------------------------------------------------|------|
| Leu Cys Phe Leu Ser Arg Ser Gly Ala Lys Ser Ser Glu Ala Gln<br>2165                2170                2175 |      |
| gcg ctc gtc cag gaa ctc gag ttg cag cac cga gtt cgc gtg ctt<br>Ala Leu Val Gln Glu Leu Glu Leu Gln His Arg Val Arg Val Leu<br>    2180                2185                2190 | 6579 |
| gtc tgc caa ggg gat gtg tcc gac agc gac acg gtg gct cgc gtc<br>Val Cys Gln Gly Asp Val Ser Asp Ser Asp Thr Val Ala Arg Val<br>2195                2200                2205 | 6624 |
| gtt cag caa tgc acc acg acc ctc ggg ccc atc cgt ggc gtc gtc<br>Val Gln Gln Cys Thr Thr Thr Leu Gly Pro Ile Arg Gly Val Val<br>    2210                2215                2220 | 6669 |
| cag tgt gcc atg att ctc cgg gat ggc ctg ttt gag aga atg aca<br>Gln Cys Ala Met Ile Leu Arg Asp Gly Leu Phe Glu Arg Met Thr<br>2225                2230                2235 | 6714 |
| cac gag cag tgg acc gag agc acg cgg ccg aag gtg cag ggc acg<br>His Glu Gln Trp Thr Glu Ser Thr Arg Pro Lys Val Gln Gly Thr<br>    2240                2245                2250 | 6759 |
| tgg aac ttg cat gag cag atc cca tcg gcc gac ttc ttc atc acg<br>Trp Asn Leu His Glu Gln Ile Pro Ser Ala Asp Phe Phe Ile Thr<br>2255                2260                2265 | 6804 |
| ctg agc tcc ttt gca ggc gtg ttt gga agc cgc ggg cag agc aac<br>Leu Ser Ser Phe Ala Gly Val Phe Gly Ser Arg Gly Gln Ser Asn<br>    2270                2275                2280 | 6849 |
| tac gcc gct gcg ggt gcg tac gag gat gcc ttg gca cat ttc cga<br>Tyr Ala Ala Ala Gly Ala Tyr Glu Asp Ala Leu Ala His Phe Arg<br>2285                2290                2295 | 6894 |
| acg tct ctg gga cag agg gct atc acc atc gac ttg ggc atc atg<br>Thr Ser Leu Gly Gln Arg Ala Ile Thr Ile Asp Leu Gly Ile Met<br>    2300                2305                2310 | 6939 |
| cgt gac gtg ggc gtc ctc gcc gag cag ggc atc acg gac tac ctc<br>Arg Asp Val Gly Val Leu Ala Glu Gln Gly Ile Thr Asp Tyr Leu<br>2315                2320                2325 | 6984 |
| cgg gag tgg gag gag ccc ttt gga ata cga gag cat gag ttt cat<br>Arg Glu Trp Glu Glu Pro Phe Gly Ile Arg Glu His Glu Phe His<br>    2330                2335                2340 | 7029 |
| gcc ctc atc aag tcg gcc atc atg tcg gcc acg gaa ccg ccg act<br>Ala Leu Ile Lys Ser Ala Ile Met Ser Ala Thr Glu Pro Pro Thr<br>2345                2350                2355 | 7074 |
| gag cgc tcc gtg gtg cag atc cct acc ggc ttg gcc acc gcc cgt<br>Glu Arg Ser Val Val Gln Ile Pro Thr Gly Leu Ala Thr Ala Arg<br>    2360                2365                2370 | 7119 |
| tcc gcg caa gca gcc ggt ata agc aca cca ttc tac ttt gac gac<br>Ser Ala Gln Ala Ala Gly Ile Ser Thr Pro Phe Tyr Phe Asp Asp<br>2375                2380                2385 | 7164 |
| gcc cgt ttc tcg atc ctc gcc cag aca cgc acc gcg gcc ggt gcg<br>Ala Arg Phe Ser Ile Leu Ala Gln Thr Arg Thr Ala Ala Gly Ala<br>    2390                2395                2400 | 7209 |
| tcg tcg gcg aac gct gat gat ggc aag gtt tcc atc cga aca cag<br>Ser Ser Ala Asn Ala Asp Asp Gly Lys Val Ser Ile Arg Thr Gln<br>2405                2410                2415 | 7254 |
| ctc tct cag gcc cag tcg gtg gct gaa gca gcc tcc gcc gtt cag<br>Leu Ser Gln Ala Gln Ser Val Ala Glu Ala Ala Ser Ala Val Gln<br>    2420                2425                2430 | 7299 |
| acg gtg ctg ctt gag cgg gta gca aag acg ctc cag agc tct gta<br>Thr Val Leu Leu Glu Arg Val Ala Lys Thr Leu Gln Ser Ser Val<br>2435                2440                2445 | 7344 |
| tcg gaa ata gat cca tct cag cca ctg cat tcg tat ggt gtc gat<br>Ser Glu Ile Asp Pro Ser Gln Pro Leu His Ser Tyr Gly Val Asp<br>    2450                2455                2460 | 7389 |

| tcc Ser | ctg Leu | gtc Val | gcc Ala | gtg Val | gaa Glu | acg Thr | gtc Val | aag Lys | tgg Trp | atg Met | ttt Phe | aaa Lys | acg Thr | cta Leu | 7434 |
| | | 2465 | | | | 2470 | | | | 2475 | | | | | |
| gag Glu | gct Ala | aag Lys | ctg Leu | acg Thr | gtg Val | ttt Phe | gat Asp | gtt Val | ctc Leu | tcc Ser | aac Asn | gtg Val | tct Ser | att Ile | 7479 |
| | 2480 | | | | | 2485 | | | | | 2490 | | | | |
| gtt Val | gta Val | tta Leu | tgc Cys | gag Glu | aag Lys | att Ile | gct Ala | acc Thr | acg Thr | tct Ser | act Thr | cta Leu | gta Val | aag Lys | 7524 |
| | 2495 | | | | | 2500 | | | | | 2505 | | | | |
| ttg Leu | agc Ser | tag | | | | | | | | | | | | | 7533 |
| | 2510 | | | | | | | | | | | | | | |

<210> SEQ ID NO 8
<211> LENGTH: 2510
<212> TYPE: PRT
<213> ORGANISM: Metarhizium rileyi

<400> SEQUENCE: 8

Met Glu Ala Ser Ser Gln Ser Arg Asp Asp Ile Ala Val Ile Gly Leu
1               5                   10                  15

Ser Cys Arg Phe Pro Gly Glu Ala Asp Thr Ala Glu His Phe Trp Asp
                20                  25                  30

Phe Ile Cys Asn Gly Arg Asn Ala Tyr Ser Glu Asn Pro Asp Arg Trp
            35                  40                  45

Asn Pro Asp Ala Phe His Tyr Gly Glu Lys Lys Leu Asn Thr Ser Leu
        50                  55                  60

Pro Arg Gly Gly His Phe Met Lys Gln Asp Val Ala Ala Phe Asp Ala
65                  70                  75                  80

Asn Phe Phe Asn Leu Ser Lys Val Glu Ala Glu Ser Met Asp Pro Gln
                85                  90                  95

Gln Arg Ile Val Met Glu Val Thr Tyr Glu Ser Met Glu Ser Ala Gly
                100                 105                 110

Leu Arg Val Asp Arg Leu Ala Gly Ser Arg Thr Gly Val Phe Met Ala
            115                 120                 125

Ser Phe Thr Ser Asp Tyr Arg Glu Met Leu Tyr Arg Asp Ala Glu Thr
        130                 135                 140

Ala Pro Leu Tyr Thr Ala Thr Gly Thr Ser Asn Thr Ser Thr Ser Asn
145                 150                 155                 160

Arg Val Ser Trp Phe Phe Asp Leu Arg Gly Pro Ser Phe Thr Val Asn
                165                 170                 175

Thr Ala Cys Ser Ser Ser Leu Val Ala Cys His Leu Ala Cys Gln Ser
            180                 185                 190

Leu Trp Asn Gly Glu Thr Glu Ser Ala Ile Val Gly Gly Thr Ser Leu
        195                 200                 205

Leu Leu Asn Pro Asp Met Phe Leu Tyr Leu Ser Asn Gln Arg Phe Leu
    210                 215                 220

Ala Pro Asp Gly Gln Cys Lys Ser Phe Asp Glu Ser Gly Asp Gly Tyr
225                 230                 235                 240

Ala Arg Gly Asp Gly Ile Gly Val Val Ile Leu Lys Arg Val Ala Asp
                245                 250                 255

Ala Val Arg Asp Gly Asp Pro Ile Arg Ala Val Ile Arg Gly Ser Gly
            260                 265                 270

Cys Asn Gln Asp Gly His Thr Lys Gly Phe Thr Ile Pro Ser Val Glu
        275                 280                 285

Ala Gln Ala Ser Leu Ile Glu Glu Thr Tyr Arg Lys Ala Gly Leu Ser

```
            290                 295                 300
Leu Ala Glu Thr Arg Tyr Val Glu Ala His Gly Thr Gly Thr Gln Ala
305                 310                 315                 320

Gly Asp Thr Cys Glu Met Gly Ile Ala Arg Thr Phe Gly Gln His
                325                 330                 335

Arg Gly Asp Ser Asp Asp Leu Leu Val Gly Ser Val Lys Ser Asn Ile
                340                 345                 350

Gly His Leu Glu Ala Cys Ala Gly Leu Ala Ser Leu Ile Lys Cys Ile
            355                 360                 365

Phe Ile Leu Glu Thr Gly Val Ile Pro Pro Thr Pro Ser Val Arg Val
            370                 375                 380

Leu Asn Pro Lys Ile Arg Trp Glu Trp His Leu Lys Val Pro Ser
385                 390                 395                 400

Lys Gln Thr Pro Trp Pro Thr Asp Gly Leu Arg Arg Val Ser Thr Gln
                405                 410                 415

Gly Phe Gly Tyr Gly Gly Thr Asn Ala His Leu Ile Leu Asp Asp Ala
                420                 425                 430

Ala His Tyr Leu Glu Gly Arg Ser Leu Arg Gly His His Tyr Thr Arg
            435                 440                 445

Thr His Pro Gln Ala Gln Arg Leu Leu Thr Ser Ala Ile His Gly Ala
        450                 455                 460

Ser Pro Lys Glu Gln Leu Pro Arg Leu Phe Leu Phe Arg Ala Asn Asp
465                 470                 475                 480

Arg Glu Gly Leu Gly Arg Val Arg Ala Ser Leu Ala Gln His Leu Asp
                485                 490                 495

Gln Leu Leu Pro Ser Trp Ser Gln Asp Ser Ser Gly Arg Asp Ala Tyr
                500                 505                 510

Leu Gln Asn Leu Ala Phe Thr Leu Ala Ser Arg Arg Ser Asn Leu Lys
            515                 520                 525

Trp Gln Thr Tyr Ala Thr Ala Ser Thr Pro Asp Glu Leu Leu Gln Val
        530                 535                 540

Leu Lys Thr Lys Gly Asp Ala Trp Ala Ser Pro Glu Ala Arg Leu Ala
545                 550                 555                 560

Ala Ser Ser Pro Arg Leu Gly Phe Ile Phe Thr Gly Gln Gly Ala Gln
                565                 570                 575

Trp Ala Arg Met Gly Val Glu Leu Met Gly Tyr Pro Val Phe Arg Gln
                580                 585                 590

Ser Val Glu Glu Ser Glu His Phe Leu Arg Glu Thr Leu Gly Cys Pro
            595                 600                 605

Trp Ser Ala Ile Asp Glu Leu Ala Lys Pro Gln Thr Thr Ser Arg Leu
        610                 615                 620

Ser Glu Ala Ala Tyr Ser Gln Thr Leu Cys Thr Val Leu Gln Ile Ala
625                 630                 635                 640

Ile Val Asp Leu Leu Gln Asp Trp Asn Val Ser Pro Thr Arg Val Ala
                645                 650                 655

Gly His Ser Ser Gly Glu Ile Ala Ala Ala Tyr Cys Leu Gly Ala Leu
            660                 665                 670

Thr Lys Gln Asp Ser Leu Arg Val Ala Tyr Tyr Arg Gly Ile Leu Ser
        675                 680                 685

Ser Glu Met Gln Glu Thr His Lys Asp Gln Lys Gly Ala Met Met Ala
    690                 695                 700

Ile Gly Ala Ser Pro Glu Thr Val Ala Gln Trp Leu Ala Gln Leu Thr
705                 710                 715                 720
```

-continued

```
Arg Gly Lys Val Val Ala Cys Ile Asn Ser Pro Thr Ser Val Thr
            725                 730                 735

Ala Ser Gly Asp Ala Ala Gly Ile Asp Glu Leu Leu Ser Ile Val Gln
            740                 745                 750

Glu Ala Gly Val Phe Gly Arg Lys Leu Lys Val Asp Val Ala Tyr His
            755                 760                 765

Ser His His Met Gln Ser Val Ser Ala Ala Tyr Ser Ala Leu Leu Lys
    770                 775                 780

Asp Leu Lys Pro Leu Pro Ala His Glu Gly Arg Thr Met His Ser Ser
785                 790                 795                 800

Val Leu Gly Gly Leu Ile Asp Thr Ala Glu Leu Gly Ala Ser Asn Trp
            805                 810                 815

Val Arg Asn Leu Ile Ser Pro Val Arg Phe Ser Glu Ala Val Ser Ser
            820                 825                 830

Leu Ile Leu Asp Gly Asp Lys Pro Ala Val Asp Met Leu Ile Glu Ile
            835                 840                 845

Gly Pro His Ala Ala Leu Lys Gly Pro Val Gln Glu Thr Leu Glu Ala
            850                 855                 860

Lys Gly Val Ser Ala Val Lys Tyr Thr Ser Val Val Ser Arg Gly Gln
865                 870                 875                 880

Asn Ala Val Lys Thr Ala Leu Ala Cys Ala Gly Glu Leu Val Asn Ser
                885                 890                 895

Ser Val Pro Val Ala Met Asp Arg Val Asn Leu Glu Ser Glu Leu Gln
            900                 905                 910

Pro Ser Pro Leu Val Asp Leu Pro Ser Tyr Pro Trp Asn Arg Ser Thr
            915                 920                 925

Arg Phe Trp Ala Glu Ser Arg Leu Ser Gln Glu Tyr Arg Leu Arg Lys
            930                 935                 940

His Ala Arg Leu Pro Leu Leu Gly Ser Pro Cys Pro Thr Met Gly Ala
945                 950                 955                 960

Arg Glu Arg Tyr Trp Arg Gly Met Val Arg Leu Asp Glu Glu Pro Trp
                965                 970                 975

Ile Arg Asp His Glu Ile Gln Gly Ser Ile Leu Tyr Pro Gly Ala Gly
            980                 985                 990

Phe Leu Ile Met Ala Ile Glu Ala  Ala Ser Gln Gln Ala  Asn Glu Gln
            995                 1000                1005

Arg Lys  Val Ser Ala Phe Arg  Leu Arg Asp Val His  Leu Asp Ala
    1010                1015                1020

Ala Leu  Val Val Thr Asp Asn  Ser Thr Ala Glu Ala  Ile Leu Gln
    1025                1030                1035

Leu Arg  Pro His Leu Leu Ala  Pro Gly Ser Ser Gln  Ser Ser Trp
    1040                1045                1050

Met Glu  Phe Thr Val Asn Ser  Ile Asp Gly Gly  Ala Leu Arg
    1055                1060                1065

Gln Asn  Cys Ser Gly Leu Ile  Met Ile Glu Tyr Glu  Ala Asp Ala
    1070                1075                1080

Asp Ser  Ala Met Ala Arg Glu  Arg Ser Leu Glu Ser  Asp Thr Val
    1085                1090                1095

Cys Asp  Leu Tyr Lys Lys Thr  Tyr Ile Ser Cys Arg  Gln Ser Val
    1100                1105                1110

Asp Val  Ala Lys Phe Tyr Ser  Arg Leu Ala Ser Leu  Gly Leu Thr
    1115                1120                1125
```

```
Tyr Gly Pro Ala Phe Ala Asn Leu Thr Glu Ile Arg Arg Thr Gly
    1130            1135                1140

Asn Gly Gln Cys Thr Gly Ala Val Arg Val Pro Ala Val Glu Ser
    1145            1150                1155

Leu Val Pro Pro Ala Tyr Arg Ser His Pro His Val Ile His Pro
    1160            1165                1170

Gly Thr Leu Asp Ala Ile Phe His Leu Ala Phe Ala Ala Leu Glu
    1175            1180                1185

Asp Ser Leu Leu Pro Gly Pro Met Val Pro Thr Thr Ile Asp Gly
    1190            1195                1200

Leu Val Val Ala Ala Asn Thr Pro Asn Glu Pro Gly Thr Leu Leu
    1205            1210                1215

Arg Gly Val Ser Gln Ser Ser Pro His Gly Phe Arg Glu Leu Ile
    1220            1225                1230

Ser Asp Ile Asp Val Leu Asp Asp Gln Ser Ser Arg Ala Val Val
    1235            1240                1245

Gln Ile Lys Gly Phe Arg Cys Ala Asp Val Ser Gly Gly Ser Ala
    1250            1255                1260

Asn Ser Ser Asp Ala Glu Pro Ala Glu Ala Arg Pro Ile Ser Phe
    1265            1270                1275

Arg Leu Asn Trp Lys Pro Ala Ile Asp Leu Leu Ser Ala Glu Gln
    1280            1285                1290

Leu Arg Lys Tyr Val Gly Arg Val Ala Lys Gln Ala Asp Ala Ser
    1295            1300                1305

Ser His Leu Ile Arg Ala Thr Glu Leu Asn Asn Gln Val Gly Asn
    1310            1315                1320

Leu Pro Glu Thr Ala Pro Ser Ala Ala Leu Asp Ala Val Thr Glu
    1325            1330                1335

Lys Ala Thr Arg Trp Phe Ala Ala Lys Ser Ala Lys Leu Val Asp
    1340            1345                1350

Gly Ala Ala Thr Ala Ser Ser Ala Ser Ser Ser Gly Gly Tyr Val
    1355            1360                1365

Asp Ala Thr Arg Asp Ala Trp Ala Ala Val Arg Glu Gly Arg Ile
    1370            1375                1380

Pro Ser Pro Glu Lys Gln Asp Arg Val Leu Arg Glu Val Glu Lys
    1385            1390                1395

Asn Gly Ala Leu Ser Thr Leu Leu Gly Ala Leu Asp Ala Tyr Met
    1400            1405                1410

Asp Leu Arg His His Ala Lys Pro Asn Leu Ser Val Leu Glu Leu
    1415            1420                1425

Ser Leu Asp Ala Val Pro Tyr Ser Ile Phe Ala Ala Leu Pro Ser
    1430            1435                1440

Arg Gln Ser Ile Leu Gln Thr Ala Gln Tyr Ala Ile Arg Val Ser
    1445            1450                1455

Gln Asp Gly Val Gln Asp Arg Ile Arg Ser Gln Phe Gly Ser Gln
    1460            1465                1470

Gly Ser Gly Ile Asp Val Ala Val Thr Asp Phe Thr Gln Lys Ile
    1475            1480                1485

Asp Glu Thr Leu Gly Lys His Asp Val Ile Leu Ile Phe Asp Pro
    1490            1495                1500

Gly Phe Leu His Ala Lys Leu Glu Val Val Leu Arg Asn Ala Arg
    1505            1510                1515

Lys Leu Leu Asn Pro Gly Gly Lys Ile Ile Val Ala Glu Val Asn
```

-continued

```
            1520                1525                1530

Glu Pro Gly Leu Tyr Leu Gly Thr Ala Leu Gly Cys Leu His Trp
    1535                1540                1545

Thr Arg Asn Leu Asp Val Ser Gln Ser Ser Trp Thr Ser Cys Leu
    1550                1555                1560

Ser Arg Phe Gly Leu Thr Pro Ala Leu Glu Leu Ile Asp Ala Asn
    1565                1570                1575

Thr Asp Ala Thr Gly His Gly Lys Phe Gln Leu Arg Leu Thr Gly
    1580                1585                1590

Ser Ala Ala Glu Ser Asn Gly Ser Ser Ser His Gln Pro Gln Gln
    1595                1600                1605

Val Thr Leu Ile Glu Ser Ala Asp Ala Ser Glu Met Ala Gln Gly
    1610                1615                1620

Val Ala Glu Ala Val Ala Gln Arg Leu Gln Glu Ala Ser Ile Pro
    1625                1630                1635

Thr Lys Arg Val His Trp Gly Cys Asp Val Ser Gln Leu Lys Gly
    1640                1645                1650

Gln Pro Cys Ile Val Leu Thr Asp Leu Gln Ser Ala Leu Leu Lys
    1655                1660                1665

Asp Leu Ala Pro Glu Asp Leu Ala Ala Leu Gln Ser Leu Phe Leu
    1670                1675                1680

His Ala Glu Ser Thr Leu Trp Val Thr Gly Pro Leu Gly Pro Asp
    1685                1690                1695

Ala Ala Leu Ile Thr Gly Leu Ala Arg Ser Val Cys Asn Glu Ala
    1700                1705                1710

Ala Gly Val Gln Ile Arg Thr Leu Glu Val Thr Asp Leu Pro Ile
    1715                1720                1725

Ser Ala Ala Ala Gly Tyr Ala Asp Met Val Ala Arg Val Phe Arg
    1730                1735                1740

Tyr Arg Gly Ser Asp Thr Glu Phe Gln Trp His Ser Asp Ala Leu
    1745                1750                1755

Leu Val Ser Arg Leu Thr Glu Asp Glu Asp Arg Asn Glu Glu Ile
    1760                1765                1770

Ala Gln Leu Leu Gly Gln Gly Glu Thr Ala Ala Glu Thr Thr
    1775                1780                1785

Leu Gln Glu Thr Pro Glu Gly Leu Lys Leu Cys Val Arg Gln Ile
    1790                1795                1800

Gly Met Leu Asp Ser Ala Cys Tyr Glu Pro Asp Pro Leu Ala Leu
    1805                1810                1815

Glu Pro Leu Glu Ala Gly Glu Val Glu Val Asp Val Lys Ala Ser
    1820                1825                1830

Gly Val Asn Phe Arg Asp Val Met Val Ala Leu Gly Gln Ile Pro
    1835                1840                1845

Asp Arg Ala Phe Gly Phe Glu Gly Ala Gly Val Val Arg Arg Val
    1850                1855                1860

His Ala Glu Glu Ser Arg Leu Arg Pro Gly Asp Arg Val Val Phe
    1865                1870                1875

Leu Ala His Gly Ala His Arg Thr Val His Arg Val Arg Ala Asp
    1880                1885                1890

Tyr Ala Met Pro Met Pro Asp Thr Met Ser Phe Glu Glu Gly Ala
    1895                1900                1905

Ala Val Leu Leu Val His Thr Thr Ala Trp Tyr Ala Leu Val Lys
    1910                1915                1920
```

```
Ser Ala Arg Ala Thr Ala Gly Gln Ser Val Leu Val His Ala Ala
    1925            1930                1935

Ala Gly Gly Val Gly Gln Ala Val Leu Met Leu Ala Arg His Leu
    1940            1945                1950

Gly Leu Glu Val Phe Ala Thr Val Gly Ser Glu Glu Lys Arg Lys
    1955            1960                1965

Leu Val His Glu Thr Tyr Gly Ile Pro His Asp His Met Phe Asn
    1970            1975                1980

Ser Arg Asp Ser Ser Phe Ala Met Gly Val Lys Arg Met Thr Asn
    1985            1990                1995

Gly Arg Gly Val Asp Ile Val Val Asn Ser Leu Ala Gly Glu Ala
    2000            2005                2010

Leu Arg Gln Thr Trp His Cys Leu Ala Pro Phe Gly Thr Phe Val
    2015            2020                2025

Glu Leu Gly Met Lys Asp Ile Leu Asp Asn Ala Arg Leu Asp Met
    2030            2035                2040

Lys Pro Phe Leu Gln Asp Ala Thr Phe Val Phe Phe Asn Leu Asn
    2045            2050                2055

Arg Val Gln Lys Glu Arg Pro Asp Leu Met Lys Glu Ala Leu Arg
    2060            2065                2070

Glu Thr Met Ala Leu Val Ser Ser Gly Ala Leu Lys Pro Ala Thr
    2075            2080                2085

Pro Leu Thr Ala Tyr Ala Ala Ser Gln Val Glu Thr Ala Phe Arg
    2090            2095                2100

Lys Ile Gln Thr Gly Gln His Leu Gly Lys Leu Val Leu Thr Phe
    2105            2110                2115

Gln Thr Gly Asp Val Leu Arg Val Ile Arg Pro Asp Leu Ser Leu
    2120            2125                2130

Gly Asp Ser Gly Ala Tyr Leu Leu Val Gly Gly Leu Gly Gly Leu
    2135            2140                2145

Gly Arg Ser Leu Ala Arg Leu Leu Val His Leu Gly Ala Arg Arg
    2150            2155                2160

Leu Cys Phe Leu Ser Arg Ser Gly Ala Lys Ser Ser Glu Ala Gln
    2165            2170                2175

Ala Leu Val Gln Glu Leu Glu Leu Gln His Arg Val Arg Val Leu
    2180            2185                2190

Val Cys Gln Gly Asp Val Ser Asp Ser Asp Thr Val Ala Arg Val
    2195            2200                2205

Val Gln Gln Cys Thr Thr Thr Leu Gly Pro Ile Arg Gly Val Val
    2210            2215                2220

Gln Cys Ala Met Ile Leu Arg Asp Gly Leu Phe Glu Arg Met Thr
    2225            2230                2235

His Glu Gln Trp Thr Glu Ser Thr Arg Pro Lys Val Gln Gly Thr
    2240            2245                2250

Trp Asn Leu His Glu Gln Ile Pro Ser Ala Asp Phe Phe Ile Thr
    2255            2260                2265

Leu Ser Ser Phe Ala Gly Val Phe Gly Ser Arg Gly Gln Ser Asn
    2270            2275                2280

Tyr Ala Ala Ala Gly Ala Tyr Glu Asp Ala Leu Ala His Phe Arg
    2285            2290                2295

Thr Ser Leu Gly Gln Arg Ala Ile Thr Ile Asp Leu Gly Ile Met
    2300            2305                2310
```

| | | | | | | | | | | | |
|---|---|---|---|---|---|---|---|---|---|---|---|
| Arg | Asp | Val | Gly | Val | Leu | Ala | Glu | Gln | Gly | Ile | Thr | Asp | Tyr | Leu |
| | 2315 | | | | 2320 | | | | | 2325 | | | | |
| Arg | Glu | Trp | Glu | Pro | Phe | Gly | Ile | Arg | Glu | His | Glu | Phe | His |
| 2330 | | | | | 2335 | | | | 2340 | | | | |
| Ala | Leu | Ile | Lys | Ser | Ala | Ile | Met | Ser | Ala | Thr | Glu | Pro | Pro | Thr |
| 2345 | | | | | 2350 | | | | | 2355 | | | | |
| Glu | Arg | Ser | Val | Val | Gln | Ile | Pro | Thr | Gly | Leu | Ala | Thr | Ala | Arg |
| 2360 | | | | | 2365 | | | | | 2370 | | | | |
| Ser | Ala | Gln | Ala | Ala | Gly | Ile | Ser | Thr | Pro | Phe | Tyr | Phe | Asp | Asp |
| 2375 | | | | | 2380 | | | | | 2385 | | | | |
| Ala | Arg | Phe | Ser | Ile | Leu | Ala | Gln | Thr | Arg | Thr | Ala | Ala | Gly | Ala |
| 2390 | | | | | 2395 | | | | | 2400 | | | | |
| Ser | Ser | Ala | Asn | Ala | Asp | Asp | Gly | Lys | Val | Ser | Ile | Arg | Thr | Gln |
| 2405 | | | | | 2410 | | | | | 2415 | | | | |
| Leu | Ser | Gln | Ala | Gln | Ser | Val | Ala | Glu | Ala | Ala | Ser | Ala | Val | Gln |
| 2420 | | | | | 2425 | | | | | 2430 | | | | |
| Thr | Val | Leu | Leu | Glu | Arg | Val | Ala | Lys | Thr | Leu | Gln | Ser | Ser | Val |
| 2435 | | | | | 2440 | | | | | 2445 | | | | |
| Ser | Glu | Ile | Asp | Pro | Ser | Gln | Pro | Leu | His | Ser | Tyr | Gly | Val | Asp |
| 2450 | | | | | 2455 | | | | | 2460 | | | | |
| Ser | Leu | Val | Ala | Val | Glu | Thr | Val | Lys | Trp | Met | Phe | Lys | Thr | Leu |
| 2465 | | | | | 2470 | | | | | 2475 | | | | |
| Glu | Ala | Lys | Leu | Thr | Val | Phe | Asp | Val | Leu | Ser | Asn | Val | Ser | Ile |
| 2480 | | | | | 2485 | | | | | 2490 | | | | |
| Val | Val | Leu | Cys | Glu | Lys | Ile | Ala | Thr | Thr | Ser | Thr | Leu | Val | Lys |
| 2495 | | | | | 2500 | | | | | 2505 | | | | |
| Leu | Ser | | | | | | | | | | | | | |
| 2510 | | | | | | | | | | | | | | |

<210> SEQ ID NO 9
<211> LENGTH: 5166
<212> TYPE: DNA
<213> ORGANISM: Metarhizium rileyi
<220> FEATURE:
<221> NAME/KEY: CDS
<222> LOCATION: (1)..(5166)

<400> SEQUENCE: 9

```
atg aaa atc cgg gct aca aac ttc ctc ctt ttt gga gat cag act gta      48
Met Lys Ile Arg Ala Thr Asn Phe Leu Leu Phe Gly Asp Gln Thr Val
1               5                   10                  15 gag aag ctt cca gcc att cgg cag ctg gta ggg cac gct gcg tcc tca      96
Glu Lys Leu Pro Ala Ile Arg Gln Leu Val Gly His Ala Ala Ser Ser
            20                  25                  30 gct ctg ctt cag agg ttt ctg cgt caa gtt tgc gat gcg gtg cag ctc     144
Ala Leu Leu Gln Arg Phe Leu Arg Gln Val Cys Asp Ala Val Gln Leu
        35                  40                  45 gaa gtc gcc aag ttg cct atg cac tcg gag caa cgc agc aac att gac     192
Glu Val Ala Lys Leu Pro Met His Ser Glu Gln Arg Ser Asn Ile Asp
    50                  55                  60 aag ttt gac agc atc att cga cta gcc gaa aac aat gcc cgg ctg gac     240
Lys Phe Asp Ser Ile Ile Arg Leu Ala Glu Asn Asn Ala Arg Leu Asp
65                  70                  75                  80 gag ccc aat gag atc gtt gcc acc gtc ttg atg aat atc gcc cgg ata     288
Glu Pro Asn Glu Ile Val Ala Thr Val Leu Met Asn Ile Ala Arg Ile
                85                  90                  95 ggc gag ctc att ctg tat gca gaa gaa gac cct acc gtc ctc gtc tcc     336
Gly Glu Leu Ile Leu Tyr Ala Glu Glu Asp Pro Thr Val Leu Val Ser
```

```
                   100              105                 110
aaa ggc aac cgc aac tgt att ctg gga ttc tgc act ggc gag gtg gct       384
Lys Gly Asn Arg Asn Cys Ile Leu Gly Phe Cys Thr Gly Glu Val Ala
            115                 120                 125 gct gcc gcg gcc act atc gcg cag gac tcc aat gag ctg gtt gag ctg       432
Ala Ala Ala Ala Thr Ile Ala Gln Asp Ser Asn Glu Leu Val Glu Leu
130                 135                 140 ggc gtg gag atg act cac atc atc ttt cgc atg gcc cga gag cta aat       480
Gly Val Glu Met Thr His Ile Ile Phe Arg Met Ala Arg Glu Leu Asn
145                 150                 155                 160 cac cgg tct ctc atg gtt gac cgt acc aac ggc ccc tgg gca aag aca       528
His Arg Ser Leu Met Val Asp Arg Thr Asn Gly Pro Trp Ala Lys Thr
                165                 170                 175 atc ttg ggc att tca gtt gag cgc gtc cag gag att cta cat gag ttc       576
Ile Leu Gly Ile Ser Val Glu Arg Val Gln Glu Ile Leu His Glu Phe
            180                 185                 190 cac gag agc gag tca att cct cgt gtc cga cga gtc tgc gtc ggg ttc       624
His Glu Ser Glu Ser Ile Pro Arg Val Arg Arg Val Cys Val Gly Phe
        195                 200                 205 atc gca gaa ggc tgg ttg acg ctc ttc ggt ccc ccg aca acc ctg caa       672
Ile Ala Glu Gly Trp Leu Thr Leu Phe Gly Pro Pro Thr Thr Leu Gln
210                 215                 220 cga ctt ttc gaa tgg tca gta gag ctg gaa gac gct cca cag att gcc       720
Arg Leu Phe Glu Trp Ser Val Glu Leu Glu Asp Ala Pro Gln Ile Ala
225                 230                 235                 240 aca gac gct cgt gga ggt gtg cac atg aag acg atg ccc gac gtt gac       768
Thr Asp Ala Arg Gly Gly Val His Met Lys Thr Met Pro Asp Val Asp
                245                 250                 255 gtg gac tgg att ctt ggc tcg tcc gta tgg ctc gac cga acc ccc gtt       816
Val Asp Trp Ile Leu Gly Ser Ser Val Trp Leu Asp Arg Thr Pro Val
            260                 265                 270 cac aca gct acc atc ttc tct ccc tat acg tgt cag cct cgg cag caa       864
His Thr Ala Thr Ile Phe Ser Pro Tyr Thr Cys Gln Pro Arg Gln Gln
        275                 280                 285 cag act ctg cga ggg ctt ctg agg gaa atc att acc gac gtt gcg cag       912
Gln Thr Leu Arg Gly Leu Leu Arg Glu Ile Ile Thr Asp Val Ala Gln
290                 295                 300 cgg acg ttg tat ttg gcc aag gca atg aac gcg gct ctt gag ttt acc       960
Arg Thr Leu Tyr Leu Ala Lys Ala Met Asn Ala Ala Leu Glu Phe Thr
305                 310                 315                 320 aag gca gac gag ctg cga gtc gtc atg ccc ggt cac acg agc cac gac      1008
Lys Ala Asp Glu Leu Arg Val Val Met Pro Gly His Thr Ser His Asp
                325                 330                 335 gtc tat ttc ctc aag tcg ctt cag aaa cgt ggc ata gag tac tca gtc      1056
Val Tyr Phe Leu Lys Ser Leu Gln Lys Arg Gly Ile Glu Tyr Ser Val
            340                 345                 350 atg tca cat ggc gat agc cca ccg tca gct ccg ggt agg caa ggt tca      1104
Met Ser His Gly Asp Ser Pro Pro Ser Ala Pro Gly Arg Gln Gly Ser
        355                 360                 365 ggc ctt gtt gct gtc gtc ggc atg tcc ggc agg ttc ccg gga agc ggc      1152
Gly Leu Val Ala Val Val Gly Met Ser Gly Arg Phe Pro Gly Ser Gly
370                 375                 380 gac atc aat gcc ttc tgg gag ggt ctt ttg gag ggg aaa aga tat att      1200
Asp Ile Asn Ala Phe Trp Glu Gly Leu Leu Glu Gly Lys Arg Tyr Ile
385                 390                 395                 400 caa gag att cca aat acc cga ttc gat ctg gag aag tgg tat gac gcg      1248
Gln Glu Ile Pro Asn Thr Arg Phe Asp Leu Glu Lys Trp Tyr Asp Ala
                405                 410                 415 acg ggc aaa gta aag aac tcg aca att gcg cga acg gga gcc ttc ctt      1296
```

-continued

| | | |
|---|---|---|
| Thr Gly Lys Val Lys Asn Ser Thr Ile Ala Arg Thr Gly Ala Phe Leu<br>420               425               430 | | |

```
gat aag cca ggt atg ttc gac aac cgc ctg ttc gac atg tcg cca agg    1344
Asp Lys Pro Gly Met Phe Asp Asn Arg Leu Phe Asp Met Ser Pro Arg
        435                 440                 445 gag gcc atg cag acg gac gtc cag cac cga cta ctc atg aca acc ggc    1392
Glu Ala Met Gln Thr Asp Val Gln His Arg Leu Leu Met Thr Thr Gly
450                 455                 460 tac gag gca ctg gag atg tcg gga tac tcc ccc gac ggg act ccc tca    1440
Tyr Glu Ala Leu Glu Met Ser Gly Tyr Ser Pro Asp Gly Thr Pro Ser
465                 470                 475                 480 act gac acg agt cgc atc gca tca tac ttt gga cag acg tca gac gat    1488
Thr Asp Thr Ser Arg Ile Ala Ser Tyr Phe Gly Gln Thr Ser Asp Asp
                485                 490                 495 tgg cgg gaa gtg gtg gtc cat cag ggg gtc gac atc tac ttc gcc acg    1536
Trp Arg Glu Val Val Val His Gln Gly Val Asp Ile Tyr Phe Ala Thr
            500                 505                 510 gga agt tgc cgt gcc ttc ggg cca ggc aga ctg cat cac cat ttc aaa    1584
Gly Ser Cys Arg Ala Phe Gly Pro Gly Arg Leu His His His Phe Lys
        515                 520                 525 tgg gga ggc ccg tct tac agt gtc gac tcg gca tgc tcc tcg agc atc    1632
Trp Gly Gly Pro Ser Tyr Ser Val Asp Ser Ala Cys Ser Ser Ser Ile
530                 535                 540 gca gcc gtc ggt ctg gca tgc tca gcg ctc ctc ggg cgc gaa tgc gac    1680
Ala Ala Val Gly Leu Ala Cys Ser Ala Leu Leu Gly Arg Glu Cys Asp
545                 550                 555                 560 atg gcc ctg gct ggc gga gga tct cta ctt ctc tcc ccg tcg ccc ttc    1728
Met Ala Leu Ala Gly Gly Gly Ser Leu Leu Leu Ser Pro Ser Pro Phe
                565                 570                 575 tca ggc ttg agc cgt ggt ggt ttc tta tcc gcc caa gga ggg tgc cag    1776
Ser Gly Leu Ser Arg Gly Gly Phe Leu Ser Ala Gln Gly Gly Cys Gln
            580                 585                 590 aca ttc cac gac aac gcc gat ggc tac gtc cga gga gag ggc gtc gga    1824
Thr Phe His Asp Asn Ala Asp Gly Tyr Val Arg Gly Glu Gly Val Gly
        595                 600                 605 gtg gtt gtt ctc aag cgc tta gaa gat gcg ctg gac gac cag gac aac    1872
Val Val Val Leu Lys Arg Leu Glu Asp Ala Leu Asp Asp Gln Asp Asn
610                 615                 620 ata ctc ggc gtt gtc cgc ggg tcc gga cgc aac tac agc agc gat gcc    1920
Ile Leu Gly Val Val Arg Gly Ser Gly Arg Asn Tyr Ser Ser Asp Ala
625                 630                 635                 640 tct tcg atg atg cac ccc tcg gca aac gcc cag aaa cag ctg tac cgt    1968
Ser Ser Met Met His Pro Ser Ala Asn Ala Gln Lys Gln Leu Tyr Arg
                645                 650                 655 gat gtt ctg gag cag agt ggt gta gag gcc aac agc atc tcc tac gtg    2016
Asp Val Leu Glu Gln Ser Gly Val Glu Ala Asn Ser Ile Ser Tyr Val
            660                 665                 670 gaa atg cac ggg aca ggc acg cag gcc ggg gac ttt atg gaa atg tct    2064
Glu Met His Gly Thr Gly Thr Gln Ala Gly Asp Phe Met Glu Met Ser
        675                 680                 685 tcc gtc ctg tca acg ttt gcg gag aag cga ggc gcg gat aat ccg ctc    2112
Ser Val Leu Ser Thr Phe Ala Glu Lys Arg Gly Ala Asp Asn Pro Leu
690                 695                 700 att gta gga gcc ctc aaa gca agt att ggc cac gga gaa gca gcg gcc    2160
Ile Val Gly Ala Leu Lys Ala Ser Ile Gly His Gly Glu Ala Ala Ala
705                 710                 715                 720 ggc gtc tgc gct ctc atc aaa acc ctg atg atg ctt cag tgt cga cgg    2208
Gly Val Cys Ala Leu Ile Lys Thr Leu Met Met Leu Gln Cys Arg Arg
                725                 730                 735
```

-continued

| | | |
|---|---|---|
| att cca cct caa ccc gac ctt cct ggg cct atc aac cat cga ttc cct<br>Ile Pro Pro Gln Pro Asp Leu Pro Gly Pro Ile Asn His Arg Phe Pro<br>                740                        745                        750 | | 2256 |
| gat ctt gca gcc cgc aat gtg tac att gcg gcc cgc aac ttg aag ttg<br>Asp Leu Ala Ala Arg Asn Val Tyr Ile Ala Ala Arg Asn Leu Lys Leu<br>                755                        760                        765 | | 2304 |
| gag gcc agc ccg atg gcc aaa ggg gtt ctt cgg atg ttt ctg aac agc<br>Glu Ala Ser Pro Met Ala Lys Gly Val Leu Arg Met Phe Leu Asn Ser<br>                770                        775                        780 | | 2352 |
| ttc gat gct tcg ggt gga aat tcg tgt ttg ctg ctt gaa gaa gct ccg<br>Phe Asp Ala Ser Gly Gly Asn Ser Cys Leu Leu Leu Glu Glu Ala Pro<br>785                        790                        795                        800 | | 2400 |
| ccg cgg gcc gtc aag gac gaa gac gct cga agt cat cat gtt gtg acc<br>Pro Arg Ala Val Lys Asp Glu Asp Ala Arg Ser His His Val Val Thr<br>                      805                        810                        815 | | 2448 |
| ctt tca gcc cgc tct cag aag tca ctc atc gga atc aaa gag aag tac<br>Leu Ser Ala Arg Ser Gln Lys Ser Leu Ile Gly Ile Lys Glu Lys Tyr<br>                    820                        825                        830 | | 2496 |
| ctg gcc cat ctg agt caa aat ccg ggc atc aag ctg gcg gac ctg gca<br>Leu Ala His Leu Ser Gln Asn Pro Gly Ile Lys Leu Ala Asp Leu Ala<br>                835                        840                        845 | | 2544 |
| tac tcg aca act gct cgg cga atg cat gga ctg ttg cgg tat gcc atc<br>Tyr Ser Thr Thr Ala Arg Arg Met His Gly Leu Leu Arg Tyr Ala Ile<br>850                        855                        860 | | 2592 |
| gcc gca tcc tcc gtt gac gag gtc atg aac tct ctg gag acg gat ctc<br>Ala Ala Ser Ser Val Asp Glu Val Met Asn Ser Leu Glu Thr Asp Leu<br>865                        870                        875                        880 | | 2640 |
| gcc cag ggg aaa aca cct cgt cag cct ccg gta gcg ccg agt ata gtt<br>Ala Gln Gly Lys Thr Pro Arg Gln Pro Pro Val Ala Pro Ser Ile Val<br>                    885                        890                        895 | | 2688 |
| ttc att ttt aca ggc cag ggc gca cat tac ctc ggt atg ggc tcg gaa<br>Phe Ile Phe Thr Gly Gln Gly Ala His Tyr Leu Gly Met Gly Ser Glu<br>                900                        905                        910 | | 2736 |
| ctg tgg aag aca tct gcc atg ttc cgc aac acg ctt caa aag tac cag<br>Leu Trp Lys Thr Ser Ala Met Phe Arg Asn Thr Leu Gln Lys Tyr Gln<br>                915                        920                        925 | | 2784 |
| acg atg gcc agt gcc gaa ggc ctc ccc tac ttc ctc gat ctc atc gta<br>Thr Met Ala Ser Ala Glu Gly Leu Pro Tyr Phe Leu Asp Leu Ile Val<br>                930                        935                        940 | | 2832 |
| gga aac agc acg tcc acg caa cag tca ggg ccg gat act gta cag gta<br>Gly Asn Ser Thr Ser Thr Gln Gln Ser Gly Pro Asp Thr Val Gln Val<br>945                        950                        955                        960 | | 2880 |
| cag ctg gcc atg gtc agc ttg gaa cta gcc ctc gct gag ctt tgg cgt<br>Gln Leu Ala Met Val Ser Leu Glu Leu Ala Leu Ala Glu Leu Trp Arg<br>                965                        970                        975 | | 2928 |
| tcc tgg ggc atc cag cct gcc atg gtc ttg ggc cac agc cta ggc gaa<br>Ser Trp Gly Ile Gln Pro Ala Met Val Leu Gly His Ser Leu Gly Glu<br>                980                        985                        990 | | 2976 |
| tac gcc gcc ctg tgc gtg gcc gga gtg ctc tcg gtg agc gat gct ctg<br>Tyr Ala Ala Leu Cys Val Ala Gly Val Leu Ser Val Ser Asp Ala Leu<br>                995                      1000                  1005 | | 3024 |
| tac ctc gtg tac agg cga gct caa atc atg act gag gcc ctg act<br>Tyr Leu Val Tyr Arg Arg Ala Gln Ile Met Thr Glu Ala Leu Thr<br>   1010                     1015                    1020 | | 3069 |
| gct agc gag tac ggc atg ttg gcc gtc aat cta agc gtc tgt gac<br>Ala Ser Glu Tyr Gly Met Leu Ala Val Asn Leu Ser Val Cys Asp<br>   1025                     1030                    1035 | | 3114 |
| acg cgg gag gtg ctg tcg tct ggc cag cat gcc tca tgt gcc gtg<br>Thr Arg Glu Val Leu Ser Ser Gly Gln His Ala Ser Cys Ala Val<br>   1040                     1045                    1050 | | 3159 |

```
gct tgc atc aat gcc ccg aag atg acg gtg gtg agc ggt ccg ctg      3204
Ala Cys Ile Asn Ala Pro Lys Met Thr Val Val Ser Gly Pro Leu
    1055                1060                1065 ccg aag ctt gaa gag ctc cag aat caa ctc aag tcg gac ggc act      3249
Pro Lys Leu Glu Glu Leu Gln Asn Gln Leu Lys Ser Asp Gly Thr
1070                1075                1080 cga tgt acg cct ctt tct gtt ccc tac ggc ttt cac tcg agt caa      3294
Arg Cys Thr Pro Leu Ser Val Pro Tyr Gly Phe His Ser Ser Gln
        1085                1090                1095 ctt gac ccc atc ctg gac cag ttc gaa gct gcc tgc caa ggc gtc      3339
Leu Asp Pro Ile Leu Asp Gln Phe Glu Ala Ala Cys Gln Gly Val
            1100                1105                1110 acc ttc tct gca ccg aaa gtc ccc gtg gtc tct acg ctc ttg gct      3384
Thr Phe Ser Ala Pro Lys Val Pro Val Val Ser Thr Leu Leu Ala
                1115                1120                1125 act gtg gtc cga gaa gaa ggg act ttc tct ccg ggg tat ctg gcc      3429
Thr Val Val Arg Glu Glu Gly Thr Phe Ser Pro Gly Tyr Leu Ala
    1130                1135                1140 cgg cag gcc cgc gaa cca gtc gac ttt gtc gga gct ttg ggc atg      3474
Arg Gln Ala Arg Glu Pro Val Asp Phe Val Gly Ala Leu Gly Met
1145                1150                1155 gtg cag gag cag agt ctt gcc tcc ctg gtg ttt ctc gaa gtt gga      3519
Val Gln Glu Gln Ser Leu Ala Ser Leu Val Phe Leu Glu Val Gly
        1160                1165                1170 cct gaa cct gta tgt tcc ggt ctt gtg aac gcc acg cta agt gcc      3564
Pro Glu Pro Val Cys Ser Gly Leu Val Asn Ala Thr Leu Ser Ala
            1175                1180                1185 ggg gag acc aag gca cgc tgc ttt gct tcg atg cat cgg ggt cat      3609
Gly Glu Thr Lys Ala Arg Cys Phe Ala Ser Met His Arg Gly His
                1190                1195                1200 gaa aac tgg gcg tcg ata tca tca agc ttg aga gat ctc tac atg      3654
Glu Asn Trp Ala Ser Ile Ser Ser Ser Leu Arg Asp Leu Tyr Met
    1205                1210                1215 gcg ggt gct ccc atc gac tgg cca gcc ttc cac cac gac ttc aag      3699
Ala Gly Ala Pro Ile Asp Trp Pro Ala Phe His His Asp Phe Lys
1220                1225                1230 tcg tcc gtc tcc ctt ctt gac ctt ccc aag tac tct ttc gac gag      3744
Ser Ser Val Ser Leu Leu Asp Leu Pro Lys Tyr Ser Phe Asp Glu
        1235                1240                1245 aag gag ttc tgg gcg tca ttc cct aac aga gac atg cag ggc acg      3789
Lys Glu Phe Trp Ala Ser Phe Pro Asn Arg Asp Met Gln Gly Thr
            1250                1255                1260 gga gag gtc gag ccc aag caa agc caa ccg ccc gtc atc gtt ccg      3834
Gly Glu Val Glu Pro Lys Gln Ser Gln Pro Pro Val Ile Val Pro
                1265                1270                1275 tct gtg caa gga tac tgc acg acg act ctg cag cga atc gta aaa      3879
Ser Val Gln Gly Tyr Cys Thr Thr Thr Leu Gln Arg Ile Val Lys
    1280                1285                1290 gaa acc gac cag ccg gac ggg cta tcg gtc acg ttt aca tcc gac      3924
Glu Thr Asp Gln Pro Asp Gly Leu Ser Val Thr Phe Thr Ser Asp
1295                1300                1305 ctg gca gaa cag cac cta cgt gcg gct gta cga ggt cat gcc gtg      3969
Leu Ala Glu Gln His Leu Arg Ala Ala Val Arg Gly His Ala Val
        1310                1315                1320 gcc gac ata gaa atc tgt tcc agc agc ctg ctc ctg gac atg gca      4014
Ala Asp Ile Glu Ile Cys Ser Ser Ser Leu Leu Leu Asp Met Ala
            1325                1330                1335 ctt tct gca gcc caa tat gcc tat ctg aaa cat tcc ccc ggc cag      4059
Leu Ser Ala Ala Gln Tyr Ala Tyr Leu Lys His Ser Pro Gly Gln
```

-continued

|     |     |     |     |     |     |     |     |     |     |     |     |     |     |     |      |
|-----|-----|-----|-----|-----|-----|-----|-----|-----|-----|-----|-----|-----|-----|-----|------|
|     |     | 1340 |     |     |     | 1345 |     |     |     | 1350 |     |     |     |     |      |
| aag | atg | cct | gtt | cca | ttg | acc | gtc | cgc | aac | tgc | ttc | ttc | cac | cgg | 4104 |
| Lys | Met | Pro | Val | Pro | Leu | Thr | Val | Arg | Asn | Cys | Phe | Phe | His | Arg |      |
|     | 1355 |     |     |     | 1360 |     |     |     |     | 1365 |     |     |     |     |      |
| gct | gtc | gtc | ttg | acc | gag | gaa | gcg | cag | acc | gtg | gaa | gtc | acc | gtc | 4149 |
| Ala | Val | Val | Leu | Thr | Glu | Glu | Ala | Gln | Thr | Val | Glu | Val | Thr | Val |      |
| 1370 |     |     |     |     | 1375 |     |     |     |     | 1380 |     |     |     |     |      |
| aca | ttc | agg | tcc | tcg | acc | aag | act | gcg | gat | att | cag | tac | tac | tgc | 4194 |
| Thr | Phe | Arg | Ser | Ser | Thr | Lys | Thr | Ala | Asp | Ile | Gln | Tyr | Tyr | Cys |      |
| 1385 |     |     |     |     | 1390 |     |     |     |     | 1395 |     |     |     |     |      |
| cga | act | tcc | gac | gag | tac | tac | gag | ttc | gga | tcc | tgc | cag | gtg | acg | 4239 |
| Arg | Thr | Ser | Asp | Glu | Tyr | Tyr | Glu | Phe | Gly | Ser | Cys | Gln | Val | Thr |      |
| 1400 |     |     |     |     | 1405 |     |     |     |     | 1410 |     |     |     |     |      |
| ttg | gaa | gca | cca | aga | aaa | cca | gac | cag | gct | gga | ttt | ctg | gtt | cgg | 4284 |
| Leu | Glu | Ala | Pro | Arg | Lys | Pro | Asp | Gln | Ala | Gly | Phe | Leu | Val | Arg |      |
| 1415 |     |     |     |     | 1420 |     |     |     |     | 1425 |     |     |     |     |      |
| tcc | cgt | att | gct | gca | ctc | aag | gag | tcg | gca | agt | cac | cgg | cta | ggc | 4329 |
| Ser | Arg | Ile | Ala | Ala | Leu | Lys | Glu | Ser | Ala | Ser | His | Arg | Leu | Gly |      |
| 1430 |     |     |     |     | 1435 |     |     |     |     | 1440 |     |     |     |     |      |
| aag | cac | gca | gtt | tac | cgg | ttg | ttt | gac | aac | att | gtg | cgg | tat | tca | 4374 |
| Lys | His | Ala | Val | Tyr | Arg | Leu | Phe | Asp | Asn | Ile | Val | Arg | Tyr | Ser |      |
| 1445 |     |     |     |     | 1450 |     |     |     |     | 1455 |     |     |     |     |      |
| gag | caa | tac | cag | ggg | cta | aag | aac | gtc | cat | ctt | tcg | gaa | gac | atg | 4419 |
| Glu | Gln | Tyr | Gln | Gly | Leu | Lys | Asn | Val | His | Leu | Ser | Glu | Asp | Met |      |
| 1460 |     |     |     |     | 1465 |     |     |     |     | 1470 |     |     |     |     |      |
| cgc | gac | gct | gtg | gcg | gag | atc | aac | atg | acg | caa | gtc | cca | gcg | gca | 4464 |
| Arg | Asp | Ala | Val | Ala | Glu | Ile | Asn | Met | Thr | Gln | Val | Pro | Ala | Ala |      |
| 1475 |     |     |     |     | 1480 |     |     |     |     | 1485 |     |     |     |     |      |
| ggc | ggt | cat | tat | ctt | cac | cac | ccg | ttt | ttg | atg | gac | tcg | att | gtt | 4509 |
| Gly | Gly | His | Tyr | Leu | His | His | Pro | Phe | Leu | Met | Asp | Ser | Ile | Val |      |
| 1490 |     |     |     |     | 1495 |     |     |     |     | 1500 |     |     |     |     |      |
| cat | ctt | tca | gga | ttc | ttg | gtg | aac | aac | ggc | ctc | cgt | tac | tcc | agc | 4554 |
| His | Leu | Ser | Gly | Phe | Leu | Val | Asn | Asn | Gly | Leu | Arg | Tyr | Ser | Ser |      |
| 1505 |     |     |     |     | 1510 |     |     |     |     | 1515 |     |     |     |     |      |
| gaa | tgg | gct | tgt | ctt | tcc | acc | ggt | ttc | gag | gag | ctt | cac | ctg | ctc | 4599 |
| Glu | Trp | Ala | Cys | Leu | Ser | Thr | Gly | Phe | Glu | Glu | Leu | His | Leu | Leu |      |
| 1520 |     |     |     |     | 1525 |     |     |     |     | 1530 |     |     |     |     |      |
| aag | ccg | cta | gat | cct | gcc | act | gta | tac | acc | agc | tat | act | ttt | atg | 4644 |
| Lys | Pro | Leu | Asp | Pro | Ala | Thr | Val | Tyr | Thr | Ser | Tyr | Thr | Phe | Met |      |
| 1535 |     |     |     |     | 1540 |     |     |     |     | 1545 |     |     |     |     |      |
| gaa | gat | tcc | ccg | acg | acg | agc | aat | gtc | att | ggc | gat | gtg | tac | gtc | 4689 |
| Glu | Asp | Ser | Pro | Thr | Thr | Ser | Asn | Val | Ile | Gly | Asp | Val | Tyr | Val |      |
| 1550 |     |     |     |     | 1555 |     |     |     |     | 1560 |     |     |     |     |      |
| tac | gat | ggg | gca | gag | tta | gtc | tcc | gtg | gtg | aca | gga | ttg | cag | ttt | 4734 |
| Tyr | Asp | Gly | Ala | Glu | Leu | Val | Ser | Val | Val | Thr | Gly | Leu | Gln | Phe |      |
| 1565 |     |     |     |     | 1570 |     |     |     |     | 1575 |     |     |     |     |      |
| caa | aag | atg | aag | agg | aca | gca | ctc | act | cat | ctg | ctg | agt | ccc | gcg | 4779 |
| Gln | Lys | Met | Lys | Arg | Thr | Ala | Leu | Thr | His | Leu | Leu | Ser | Pro | Ala |      |
| 1580 |     |     |     |     | 1585 |     |     |     |     | 1590 |     |     |     |     |      |
| acg | gcg | cgc | aac | acg | gcg | gcc | aag | acg | atc | cct | cat | aga | ccg | acg | 4824 |
| Thr | Ala | Arg | Asn | Thr | Ala | Ala | Lys | Thr | Ile | Pro | His | Arg | Pro | Thr |      |
| 1595 |     |     |     |     | 1600 |     |     |     |     | 1605 |     |     |     |     |      |
| acg | gcc | ccg | gcg | aag | gcg | ctt | tct | gac | caa | cag | ccc | atc | act | acc | 4869 |
| Thr | Ala | Pro | Ala | Lys | Ala | Leu | Ser | Asp | Gln | Gln | Pro | Ile | Thr | Thr |      |
| 1610 |     |     |     |     | 1615 |     |     |     |     | 1620 |     |     |     |     |      |
| att | caa | gcc | gaa | gca | gct | gtc | ccg | cag | gct | agt | act | cct | tcg | acc | 4914 |
| Ile | Gln | Ala | Glu | Ala | Ala | Val | Pro | Gln | Ala | Ser | Thr | Pro | Ser | Thr |      |
| 1625 |     |     |     |     | 1630 |     |     |     |     | 1635 |     |     |     |     |      |
| gcg | gca | agt | gtc | aat | ggt | ggt | gag | ggg | gag | aag | ttt | gac | ctg | gtg | 4959 |

```
Ala Ala Ser Val Asn Gly Gly Glu Gly Glu Lys Phe Asp Leu Val
    1640            1645                1650 gaa acg ctg ttt tcc atc atc gca cgc gag gtc ggc gtc gac tcg      5004
Glu Thr Leu Phe Ser Ile Ile Ala Arg Glu Val Gly Val Asp Ser
    1655                1660                1665 agc gat ttg aag ggc gac gtg aac ctg gcg aat ctg ggc ata gac      5049
Ser Asp Leu Lys Gly Asp Val Asn Leu Ala Asn Leu Gly Ile Asp
    1670                1675                1680 tcc ctc atg gcc atc aca atc atc tcg gtc atg cag cag gaa aca      5094
Ser Leu Met Ala Ile Thr Ile Ile Ser Val Met Gln Gln Glu Thr
    1685                1690                1695 gga att gag ttg ccc ggg acg ttt ttc ctc gac aat tcc acg acg      5139
Gly Ile Glu Leu Pro Gly Thr Phe Phe Leu Asp Asn Ser Thr Thr
    1700                1705                1710 acg gca gta atc gcg gca gtg gga tag                              5166
Thr Ala Val Ile Ala Ala Val Gly
    1715                1720

<210> SEQ ID NO 10
<211> LENGTH: 1721
<212> TYPE: PRT
<213> ORGANISM: Metarhizium rileyi

<400> SEQUENCE: 10

Met Lys Ile Arg Ala Thr Asn Phe Leu Leu Phe Gly Asp Gln Thr Val
1               5                   10                  15

Glu Lys Leu Pro Ala Ile Arg Gln Leu Val Gly His Ala Ala Ser Ser
                20                  25                  30

Ala Leu Leu Gln Arg Phe Leu Arg Gln Val Cys Asp Ala Val Gln Leu
            35                  40                  45

Glu Val Ala Lys Leu Pro Met His Ser Glu Gln Arg Ser Asn Ile Asp
        50                  55                  60

Lys Phe Asp Ser Ile Ile Arg Leu Ala Glu Asn Asn Ala Arg Leu Asp
65                  70                  75                  80

Glu Pro Asn Glu Ile Val Ala Thr Val Leu Met Asn Ile Ala Arg Ile
                85                  90                  95

Gly Glu Leu Ile Leu Tyr Ala Glu Glu Asp Pro Thr Val Leu Val Ser
            100                 105                 110

Lys Gly Asn Arg Asn Cys Ile Leu Gly Phe Cys Thr Gly Glu Val Ala
        115                 120                 125

Ala Ala Ala Ala Thr Ile Ala Gln Asp Ser Asn Glu Leu Val Glu Leu
    130                 135                 140

Gly Val Glu Met Thr His Ile Ile Phe Arg Met Ala Arg Glu Leu Asn
145                 150                 155                 160

His Arg Ser Leu Met Val Asp Arg Thr Asn Gly Pro Trp Ala Lys Thr
                165                 170                 175

Ile Leu Gly Ile Ser Val Glu Arg Val Gln Glu Ile Leu His Glu Phe
            180                 185                 190

His Glu Ser Glu Ser Ile Pro Arg Val Arg Arg Val Cys Val Gly Phe
        195                 200                 205

Ile Ala Glu Gly Trp Leu Thr Leu Phe Gly Pro Pro Thr Thr Leu Gln
    210                 215                 220

Arg Leu Phe Glu Trp Ser Val Glu Leu Glu Asp Ala Pro Gln Ile Ala
225                 230                 235                 240

Thr Asp Ala Arg Gly Gly Val His Met Lys Thr Met Pro Asp Val Asp
                245                 250                 255
```

```
Val Asp Trp Ile Leu Gly Ser Ser Val Trp Leu Asp Arg Thr Pro Val
            260                 265                 270

His Thr Ala Thr Ile Phe Ser Pro Tyr Thr Cys Gln Pro Arg Gln Gln
            275                 280                 285

Gln Thr Leu Arg Gly Leu Leu Arg Glu Ile Ile Thr Asp Val Ala Gln
        290                 295                 300

Arg Thr Leu Tyr Leu Ala Lys Ala Met Asn Ala Ala Leu Glu Phe Thr
305                 310                 315                 320

Lys Ala Asp Glu Leu Arg Val Val Met Pro Gly His Thr Ser His Asp
                325                 330                 335

Val Tyr Phe Leu Lys Ser Leu Gln Lys Arg Gly Ile Glu Tyr Ser Val
            340                 345                 350

Met Ser His Gly Asp Ser Pro Pro Ser Ala Pro Gly Arg Gln Gly Ser
        355                 360                 365

Gly Leu Val Ala Val Val Gly Met Ser Gly Arg Phe Pro Gly Ser Gly
        370                 375                 380

Asp Ile Asn Ala Phe Trp Glu Gly Leu Leu Glu Gly Lys Arg Tyr Ile
385                 390                 395                 400

Gln Glu Ile Pro Asn Thr Arg Phe Asp Leu Glu Lys Trp Tyr Asp Ala
                405                 410                 415

Thr Gly Lys Val Lys Asn Ser Thr Ile Ala Arg Thr Gly Ala Phe Leu
            420                 425                 430

Asp Lys Pro Gly Met Phe Asp Asn Arg Leu Phe Asp Met Ser Pro Arg
        435                 440                 445

Glu Ala Met Gln Thr Asp Val Gln His Arg Leu Leu Met Thr Thr Gly
450                 455                 460

Tyr Glu Ala Leu Glu Met Ser Gly Tyr Ser Pro Asp Gly Thr Pro Ser
465                 470                 475                 480

Thr Asp Thr Ser Arg Ile Ala Ser Tyr Phe Gln Thr Ser Asp Asp
                485                 490                 495

Trp Arg Glu Val Val His Gln Gly Val Asp Ile Tyr Phe Ala Thr
            500                 505                 510

Gly Ser Cys Arg Ala Phe Gly Pro Gly Arg Leu His His His Phe Lys
        515                 520                 525

Trp Gly Gly Pro Ser Tyr Ser Val Asp Ser Ala Cys Ser Ser Ser Ile
        530                 535                 540

Ala Ala Val Gly Leu Ala Cys Ser Ala Leu Leu Gly Arg Glu Cys Asp
545                 550                 555                 560

Met Ala Leu Ala Gly Gly Gly Ser Leu Leu Leu Ser Pro Ser Pro Phe
                565                 570                 575

Ser Gly Leu Ser Arg Gly Gly Phe Leu Ser Ala Gln Gly Gly Cys Gln
            580                 585                 590

Thr Phe His Asp Asn Ala Asp Gly Tyr Val Arg Gly Glu Gly Val Gly
        595                 600                 605

Val Val Val Leu Lys Arg Leu Glu Asp Ala Leu Asp Asp Gln Asp Asn
        610                 615                 620

Ile Leu Gly Val Val Arg Gly Ser Gly Arg Asn Tyr Ser Ser Asp Ala
625                 630                 635                 640

Ser Ser Met Met His Pro Ser Ala Asn Ala Gln Lys Gln Leu Tyr Arg
                645                 650                 655

Asp Val Leu Glu Gln Ser Gly Val Glu Ala Asn Ser Ile Ser Tyr Val
            660                 665                 670

Glu Met His Gly Thr Gly Thr Gln Ala Gly Asp Phe Met Glu Met Ser
```

```
                675                 680                 685
Ser Val Leu Ser Thr Phe Ala Glu Lys Arg Gly Ala Asp Asn Pro Leu
    690                 695                 700
Ile Val Gly Ala Leu Lys Ala Ser Ile Gly His Gly Glu Ala Ala Ala
705                 710                 715                 720
Gly Val Cys Ala Leu Ile Lys Thr Leu Met Met Leu Gln Cys Arg Arg
                725                 730                 735
Ile Pro Pro Gln Pro Asp Leu Pro Gly Pro Ile Asn His Arg Phe Pro
            740                 745                 750
Asp Leu Ala Ala Arg Asn Val Tyr Ile Ala Ala Arg Asn Leu Lys Leu
        755                 760                 765
Glu Ala Ser Pro Met Ala Lys Gly Val Leu Arg Met Phe Leu Asn Ser
    770                 775                 780
Phe Asp Ala Ser Gly Gly Asn Ser Cys Leu Leu Leu Glu Glu Ala Pro
785                 790                 795                 800
Pro Arg Ala Val Lys Asp Glu Asp Ala Arg Ser His His Val Val Thr
                805                 810                 815
Leu Ser Ala Arg Ser Gln Lys Ser Leu Ile Gly Ile Lys Glu Lys Tyr
            820                 825                 830
Leu Ala His Leu Ser Gln Asn Pro Gly Ile Lys Leu Ala Asp Leu Ala
        835                 840                 845
Tyr Ser Thr Thr Ala Arg Arg Met His Gly Leu Leu Arg Tyr Ala Ile
    850                 855                 860
Ala Ala Ser Ser Val Asp Glu Val Met Asn Ser Leu Glu Thr Asp Leu
865                 870                 875                 880
Ala Gln Gly Lys Thr Pro Arg Gln Pro Pro Val Ala Pro Ser Ile Val
                885                 890                 895
Phe Ile Phe Thr Gly Gln Gly Ala His Tyr Leu Gly Met Gly Ser Glu
            900                 905                 910
Leu Trp Lys Thr Ser Ala Met Phe Arg Asn Thr Leu Gln Lys Tyr Gln
        915                 920                 925
Thr Met Ala Ser Ala Glu Gly Leu Pro Tyr Phe Leu Asp Leu Ile Val
    930                 935                 940
Gly Asn Ser Thr Ser Thr Gln Gln Ser Gly Pro Asp Thr Val Gln Val
945                 950                 955                 960
Gln Leu Ala Met Val Ser Leu Glu Leu Ala Leu Ala Glu Leu Trp Arg
                965                 970                 975
Ser Trp Gly Ile Gln Pro Ala Met Val Leu Gly His Ser Leu Gly Glu
            980                 985                 990
Tyr Ala Ala Leu Cys Val Ala Gly Val Leu Ser Val Ser Asp Ala Leu
        995                 1000                1005
Tyr Leu Val Tyr Arg Arg Ala Gln Ile Met Thr Glu Ala Leu Thr
    1010                1015                1020
Ala Ser Glu Tyr Gly Met Leu Ala Val Asn Leu Ser Val Cys Asp
    1025                1030                1035
Thr Arg Glu Val Leu Ser Ser Gly Gln His Ala Ser Cys Ala Val
    1040                1045                1050
Ala Cys Ile Asn Ala Pro Lys Met Thr Val Val Ser Gly Pro Leu
    1055                1060                1065
Pro Lys Leu Glu Glu Leu Gln Asn Gln Leu Lys Ser Asp Gly Thr
    1070                1075                1080
Arg Cys Thr Pro Leu Ser Val Pro Tyr Gly Phe His Ser Ser Gln
    1085                1090                1095
```

```
Leu Asp Pro Ile Leu Asp Gln Phe Glu Ala Ala Cys Gln Gly Val
    1100            1105            1110

Thr Phe Ser Ala Pro Lys Val Pro Val Val Ser Thr Leu Leu Ala
    1115            1120            1125

Thr Val Val Arg Glu Glu Gly Thr Phe Ser Pro Gly Tyr Leu Ala
    1130            1135            1140

Arg Gln Ala Arg Glu Pro Val Asp Phe Val Gly Ala Leu Gly Met
    1145            1150            1155

Val Gln Glu Gln Ser Leu Ala Ser Leu Val Phe Leu Glu Val Gly
    1160            1165            1170

Pro Glu Pro Val Cys Ser Gly Leu Val Asn Ala Thr Leu Ser Ala
    1175            1180            1185

Gly Glu Thr Lys Ala Arg Cys Phe Ala Ser Met His Arg Gly His
    1190            1195            1200

Glu Asn Trp Ala Ser Ile Ser Ser Ser Leu Arg Asp Leu Tyr Met
    1205            1210            1215

Ala Gly Ala Pro Ile Asp Trp Pro Ala Phe His His Asp Phe Lys
    1220            1225            1230

Ser Ser Val Ser Leu Leu Asp Leu Pro Lys Tyr Ser Phe Asp Glu
    1235            1240            1245

Lys Glu Phe Trp Ala Ser Phe Pro Asn Arg Asp Met Gln Gly Thr
    1250            1255            1260

Gly Glu Val Glu Pro Lys Gln Ser Gln Pro Pro Val Ile Val Pro
    1265            1270            1275

Ser Val Gln Gly Tyr Cys Thr Thr Thr Leu Gln Arg Ile Val Lys
    1280            1285            1290

Glu Thr Asp Gln Pro Asp Gly Leu Ser Val Thr Phe Thr Ser Asp
    1295            1300            1305

Leu Ala Glu Gln His Leu Arg Ala Ala Val Arg Gly His Ala Val
    1310            1315            1320

Ala Asp Ile Glu Ile Cys Ser Ser Ser Leu Leu Leu Asp Met Ala
    1325            1330            1335

Leu Ser Ala Ala Gln Tyr Ala Tyr Leu Lys His Ser Pro Gly Gln
    1340            1345            1350

Lys Met Pro Val Pro Leu Thr Val Arg Asn Cys Phe Phe His Arg
    1355            1360            1365

Ala Val Val Leu Thr Glu Glu Ala Gln Thr Val Glu Val Thr Val
    1370            1375            1380

Thr Phe Arg Ser Ser Thr Lys Thr Ala Asp Ile Gln Tyr Tyr Cys
    1385            1390            1395

Arg Thr Ser Asp Glu Tyr Tyr Glu Phe Gly Ser Cys Gln Val Thr
    1400            1405            1410

Leu Glu Ala Pro Arg Lys Pro Asp Gln Ala Gly Phe Leu Val Arg
    1415            1420            1425

Ser Arg Ile Ala Ala Leu Lys Glu Ser Ala Ser His Arg Leu Gly
    1430            1435            1440

Lys His Ala Val Tyr Arg Leu Phe Asp Asn Ile Val Arg Tyr Ser
    1445            1450            1455

Glu Gln Tyr Gln Gly Leu Lys Asn Val His Leu Ser Glu Asp Met
    1460            1465            1470

Arg Asp Ala Val Ala Glu Ile Asn Met Thr Gln Val Pro Ala Ala
    1475            1480            1485
```

```
Gly Gly His Tyr Leu His His Pro Phe Leu Met Asp Ser Ile Val
    1490              1495              1500

His Leu Ser Gly Phe Leu Val Asn Asn Gly Leu Arg Tyr Ser Ser
    1505              1510              1515

Glu Trp Ala Cys Leu Ser Thr Gly Phe Glu Glu Leu His Leu Leu
    1520              1525              1530

Lys Pro Leu Asp Pro Ala Thr Val Tyr Thr Ser Tyr Thr Phe Met
    1535              1540              1545

Glu Asp Ser Pro Thr Thr Ser Asn Val Ile Gly Asp Val Tyr Val
    1550              1555              1560

Tyr Asp Gly Ala Glu Leu Val Ser Val Val Thr Gly Leu Gln Phe
    1565              1570              1575

Gln Lys Met Lys Arg Thr Ala Leu Thr His Leu Leu Ser Pro Ala
    1580              1585              1590

Thr Ala Arg Asn Thr Ala Ala Lys Thr Ile Pro His Arg Pro Thr
    1595              1600              1605

Thr Ala Pro Ala Lys Ala Leu Ser Asp Gln Gln Pro Ile Thr Thr
    1610              1615              1620

Ile Gln Ala Glu Ala Ala Val Pro Gln Ala Ser Thr Pro Ser Thr
    1625              1630              1635

Ala Ala Ser Val Asn Gly Gly Glu Gly Glu Lys Phe Asp Leu Val
    1640              1645              1650

Glu Thr Leu Phe Ser Ile Ile Ala Arg Glu Val Gly Val Asp Ser
    1655              1660              1665

Ser Asp Leu Lys Gly Asp Val Asn Leu Ala Asn Leu Gly Ile Asp
    1670              1675              1680

Ser Leu Met Ala Ile Thr Ile Ile Ser Val Met Gln Gln Glu Thr
    1685              1690              1695

Gly Ile Glu Leu Pro Gly Thr Phe Phe Leu Asp Asn Ser Thr Thr
    1700              1705              1710

Thr Ala Val Ile Ala Ala Val Gly
    1715              1720

<210> SEQ ID NO 11
<211> LENGTH: 1149
<212> TYPE: DNA
<213> ORGANISM: Metarhizium rileyi
<220> FEATURE:
<221> NAME/KEY: CDS
<222> LOCATION: (1)..(1149)

<400> SEQUENCE: 11 atg gct gtc act gtg tgg caa gat gcg ctc gag atc atc gct cag gag      48
Met Ala Val Thr Val Trp Gln Asp Ala Leu Glu Ile Ile Ala Gln Glu
1               5                  10                  15 agc ggg ctg gaa ccc gca gag atc atc gag acg gac gac atg gag ttc      96
Ser Gly Leu Glu Pro Ala Glu Ile Ile Glu Thr Asp Asp Met Glu Phe
            20                  25                  30 gcc aga ctt ggc atc aat cat att ctc gcc acg gcc atc ttg tcg cac     144
Ala Arg Leu Gly Ile Asn His Ile Leu Ala Thr Ala Ile Leu Ser His
        35                  40                  45 ctc aga ggg cct cgc gga gag cct ctc cca cga gac att ttt gat cag     192
Leu Arg Gly Pro Arg Gly Glu Pro Leu Pro Arg Asp Ile Phe Asp Gln
    50                  55                  60 aag cgc aca gtt gga gct ttc cgg cgt ttc tac gag acg tct att cac     240
Lys Arg Thr Val Gly Ala Phe Arg Arg Phe Tyr Glu Thr Ser Ile His
65                  70                  75                  80
```

```
ctt gag act tct ccc atc acc ccc atc ctc gca ccc aag cga gct cag      288
Leu Glu Thr Ser Pro Ile Thr Pro Ile Leu Ala Pro Lys Arg Ala Gln
            85                  90                  95 ctg aag cgt gag aag tcg ttt act gtt ccg ctc tcc atc gtc ttg cag      336
Leu Lys Arg Glu Lys Ser Phe Thr Val Pro Leu Ser Ile Val Leu Gln
            100                 105                 110 aat agc ccg gct tcg agc cgg cac acc gta ttc ctc ctc cca gac ggc      384
Asn Ser Pro Ala Ser Ser Arg His Thr Val Phe Leu Leu Pro Asp Gly
            115                 120                 125 agc ggc tct gcc atg gcg tac gca aac ctg cca cca gtc cac cca acc      432
Ser Gly Ser Ala Met Ala Tyr Ala Asn Leu Pro Pro Val His Pro Thr
    130                 135                 140 gtc tgt gtc gtt ggg atg aac agt ccc tac ctc cgt gac gcc aac tca      480
Val Cys Val Val Gly Met Asn Ser Pro Tyr Leu Arg Asp Ala Asn Ser
145                 150                 155                 160 tat cgc tgc tct gtc gag aat ctg gcg tcg caa tgg gtc cag gaa atc      528
Tyr Arg Cys Ser Val Glu Asn Leu Ala Ser Gln Trp Val Gln Glu Ile
                165                 170                 175 tat cgc cgc cag cca cgc gga cct tat atc gtc ggt gga tgg tcg gcg      576
Tyr Arg Arg Gln Pro Arg Gly Pro Tyr Ile Val Gly Gly Trp Ser Ala
                180                 185                 190 gga ggt tac tac tcg tac gaa gtg gcc caa cgc ctc ctg caa gat ggt      624
Gly Gly Tyr Tyr Ser Tyr Glu Val Ala Gln Arg Leu Leu Gln Asp Gly
            195                 200                 205 cac gtc gtg gac aag ctg att ctg ata gac tcg cct tgc cgc act gtc      672
His Val Val Asp Lys Leu Ile Leu Ile Asp Ser Pro Cys Arg Thr Val
    210                 215                 220 ttc gag tct ctc tcg atg gaa gtc gtc aac tat ctc tca aag cat aac      720
Phe Glu Ser Leu Ser Met Glu Val Val Asn Tyr Leu Ser Lys His Asn
225                 230                 235                 240 cta atg ggc aac tgg ggc tcc caa gga ctt ccg gac tgg cta gtc cag      768
Leu Met Gly Asn Trp Gly Ser Gln Gly Leu Pro Asp Trp Leu Val Gln
                245                 250                 255 cat ttc cgc tcc acg ctc gcc gcc gtg ggc aag tat cgt cca agg cca      816
His Phe Arg Ser Thr Leu Ala Ala Val Gly Lys Tyr Arg Pro Arg Pro
                260                 265                 270 ctg cat tcg gtt ggg gaa atg gag acg tac atc atc tgg agt cgc gat      864
Leu His Ser Val Gly Glu Met Glu Thr Tyr Ile Ile Trp Ser Arg Asp
            275                 280                 285 ggt gtg ctg gaa cac gat gct ttg gtc gag tct ggt ctc gac atg agc      912
Gly Val Leu Glu His Asp Ala Leu Val Glu Ser Gly Leu Asp Met Ser
    290                 295                 300 atc aag gta tcc agg ttt ctg ctc gaa ggc aag gac gat ctg gga ccc      960
Ile Lys Val Ser Arg Phe Leu Leu Glu Gly Lys Asp Asp Leu Gly Pro
305                 310                 315                 320 aac gga tgg gat gag ctg ctg ccc agc aag gat att gcg att gcc act     1008
Asn Gly Trp Asp Glu Leu Leu Pro Ser Lys Asp Ile Ala Ile Ala Thr
                325                 330                 335 cag tcg ggg acg cat ttc acc atg atc aac aag cct cac gtg gca cag     1056
Gln Ser Gly Thr His Phe Thr Met Ile Asn Lys Pro His Val Ala Gln
                340                 345                 350 atg agc gat ctt tta cgc gat gcg gtg act ggc atc act acc gac aga     1104
Met Ser Asp Leu Leu Arg Asp Ala Val Thr Gly Ile Thr Thr Asp Arg
            355                 360                 365 cta tcg cag tgg cag aga gta aga aag gac gag cag gga aag tag         1149
Leu Ser Gln Trp Gln Arg Val Arg Lys Asp Glu Gln Gly Lys
    370                 375                 380

<210> SEQ ID NO 12
<211> LENGTH: 382
```

<212> TYPE: PRT
<213> ORGANISM: Metarhizium rileyi

<400> SEQUENCE: 12

Met Ala Val Thr Val Trp Gln Asp Ala Leu Glu Ile Ile Ala Gln Glu
1               5                   10                  15

Ser Gly Leu Glu Pro Ala Glu Ile Ile Glu Thr Asp Asp Met Glu Phe
            20                  25                  30

Ala Arg Leu Gly Ile Asn His Ile Leu Ala Thr Ala Ile Leu Ser His
        35                  40                  45

Leu Arg Gly Pro Arg Gly Glu Pro Leu Pro Arg Asp Ile Phe Asp Gln
    50                  55                  60

Lys Arg Thr Val Gly Ala Phe Arg Arg Phe Tyr Glu Thr Ser Ile His
65                  70                  75                  80

Leu Glu Thr Ser Pro Ile Thr Pro Ile Leu Ala Pro Lys Arg Ala Gln
                85                  90                  95

Leu Lys Arg Glu Lys Ser Phe Thr Val Pro Leu Ser Ile Val Leu Gln
            100                 105                 110

Asn Ser Pro Ala Ser Ser Arg His Thr Val Phe Leu Leu Pro Asp Gly
        115                 120                 125

Ser Gly Ser Ala Met Ala Tyr Ala Asn Leu Pro Pro Val His Pro Thr
    130                 135                 140

Val Cys Val Val Gly Met Asn Ser Pro Tyr Leu Arg Asp Ala Asn Ser
145                 150                 155                 160

Tyr Arg Cys Ser Val Glu Asn Leu Ala Ser Gln Trp Val Gln Glu Ile
                165                 170                 175

Tyr Arg Arg Gln Pro Arg Gly Pro Tyr Ile Val Gly Gly Trp Ser Ala
            180                 185                 190

Gly Gly Tyr Tyr Ser Tyr Glu Val Ala Gln Arg Leu Leu Gln Asp Gly
        195                 200                 205

His Val Val Asp Lys Leu Ile Leu Ile Asp Ser Pro Cys Arg Thr Val
    210                 215                 220

Phe Glu Ser Leu Ser Met Glu Val Val Asn Tyr Leu Ser Lys His Asn
225                 230                 235                 240

Leu Met Gly Asn Trp Gly Ser Gln Gly Leu Pro Asp Trp Leu Val Gln
                245                 250                 255

His Phe Arg Ser Thr Leu Ala Ala Val Gly Lys Tyr Arg Pro Arg Pro
            260                 265                 270

Leu His Ser Val Gly Glu Met Glu Thr Tyr Ile Ile Trp Ser Arg Asp
        275                 280                 285

Gly Val Leu Glu His Asp Ala Leu Val Glu Ser Gly Leu Asp Met Ser
    290                 295                 300

Ile Lys Val Ser Arg Phe Leu Leu Glu Gly Lys Asp Asp Leu Gly Pro
305                 310                 315                 320

Asn Gly Trp Asp Glu Leu Leu Pro Ser Lys Asp Ile Ala Ile Ala Thr
                325                 330                 335

Gln Ser Gly Thr His Phe Thr Met Ile Asn Lys Pro His Val Ala Gln
            340                 345                 350

Met Ser Asp Leu Leu Arg Asp Ala Val Thr Gly Ile Thr Thr Asp Arg
        355                 360                 365

Leu Ser Gln Trp Gln Arg Val Arg Lys Asp Glu Gln Gly Lys
    370                 375                 380

<210> SEQ ID NO 13

```
<211> LENGTH: 7524
<212> TYPE: DNA
<213> ORGANISM: Talaromyces islandicus
<220> FEATURE:
<221> NAME/KEY: CDS
<222> LOCATION: (1)..(7524)

<400> SEQUENCE: 13 atg gcg aca acg aat gaa gtc cgg tgg gct caa gat att gcc att gtt      48
Met Ala Thr Thr Asn Glu Val Arg Trp Ala Gln Asp Ile Ala Ile Val
1               5                   10                  15 ggc atg tcc tgc cga ttc gcc gat gac gcg gat tca ttc cct cgg ttc      96
Gly Met Ser Cys Arg Phe Ala Asp Asp Ala Asp Ser Phe Pro Arg Phe
            20                  25                  30 tgg gat ttc att tgc aat gga aga tat gcg ttc cac tac cct gga aaa     144
Trp Asp Phe Ile Cys Asn Gly Arg Tyr Ala Phe His Tyr Pro Gly Lys
        35                  40                  45 aaa aca aac aca agt ttg cct cgc ggt gca cat ttc ttc aaa gat gac     192
Lys Thr Asn Thr Ser Leu Pro Arg Gly Ala His Phe Phe Lys Asp Asp
    50                  55                  60 atc gca gag ttc gat gcc aat ttc ttc aac atc tcc aaa gtc gag gcc     240
Ile Ala Glu Phe Asp Ala Asn Phe Phe Asn Ile Ser Lys Val Glu Ala
65                  70                  75                  80 gaa tcg att gat ccg caa cag cgc atg gtg atg gaa aca acg ttc gaa     288
Glu Ser Ile Asp Pro Gln Gln Arg Met Val Met Glu Thr Thr Phe Glu
                85                  90                  95 gcc cta gaa aat gct gga att act ata gac aaa gtg gca gga acc cgc     336
Ala Leu Glu Asn Ala Gly Ile Thr Ile Asp Lys Val Ala Gly Thr Arg
            100                 105                 110 gct ggt gtc tgg atg gcc aat ttt act agc gat tat cgt gag atg cta     384
Ala Gly Val Trp Met Ala Asn Phe Thr Ser Asp Tyr Arg Glu Met Leu
        115                 120                 125 tac cga gat tca gag aca gca ccg atg tat acc ctg tca ggc gcc agc     432
Tyr Arg Asp Ser Glu Thr Ala Pro Met Tyr Thr Leu Ser Gly Ala Ser
    130                 135                 140 aac aca tcc acg tca aac cgt gta tca tgg ttc ttt gat ctc aaa ggc     480
Asn Thr Ser Thr Ser Asn Arg Val Ser Trp Phe Phe Asp Leu Lys Gly
145                 150                 155                 160 cca agc ttt acc ttg aac act gca tgc tct tca agt atg gtg gct acc     528
Pro Ser Phe Thr Leu Asn Thr Ala Cys Ser Ser Ser Met Val Ala Thr
                165                 170                 175 cat cta gct tgc cag agc ctt gct ctg ggt gaa tcc agc agt gcg ata     576
His Leu Ala Cys Gln Ser Leu Ala Leu Gly Glu Ser Ser Ser Ala Ile
            180                 185                 190 gtt ggc ggg aca agt ctc ctc ttg aat cca gac cta ttc ctc ttt ttg     624
Val Gly Gly Thr Ser Leu Leu Leu Asn Pro Asp Leu Phe Leu Phe Leu
        195                 200                 205 tcg aat cag cat ttc tta gca gct gat ggt aaa tct aaa gcc ttt gat     672
Ser Asn Gln His Phe Leu Ala Ala Asp Gly Lys Ser Lys Ala Phe Asp
    210                 215                 220 gcc agt ggt gat gga tac ggc cgg ggt gaa ggc gtt gct gtt gtt gtc     720
Ala Ser Gly Asp Gly Tyr Gly Arg Gly Glu Gly Val Ala Val Val Val
225                 230                 235                 240 tta aag cgt gtt gcg gac gcc atc gct gat ggt gat ccc att cga gca     768
Leu Lys Arg Val Ala Asp Ala Ile Ala Asp Gly Asp Pro Ile Arg Ala
                245                 250                 255 gtg atc cgt ggg act gcc atc aat caa gat gga agg aca aag gga atg     816
Val Ile Arg Gly Thr Ala Ile Asn Gln Asp Gly Arg Thr Lys Gly Met
            260                 265                 270 aca tta cct agt gta gat gct caa gaa caa ttg atc aag gat gcc tat     864
Thr Leu Pro Ser Val Asp Ala Gln Glu Gln Leu Ile Lys Asp Ala Tyr
```

-continued

```
                275                 280                 285
cgc aat gca gga ctg tcc atg aag gac act cga tat gtc gaa gct cac    912
Arg Asn Ala Gly Leu Ser Met Lys Asp Thr Arg Tyr Val Glu Ala His
    290                 295                 300 gga aca gga act caa gct ggt gac aag tgt gag acg gag gca tta tct    960
Gly Thr Gly Thr Gln Ala Gly Asp Lys Cys Glu Thr Glu Ala Leu Ser
305                 310                 315                 320 cga act ttt agc cca tac cgt act gca tcc gaa cga ctc att ctt ggg   1008
Arg Thr Phe Ser Pro Tyr Arg Thr Ala Ser Glu Arg Leu Ile Leu Gly
                325                 330                 335 tct gtc aag acc aac att ggg cat ttg gag gca tgt gcc ggt tta gcg   1056
Ser Val Lys Thr Asn Ile Gly His Leu Glu Ala Cys Ala Gly Leu Ala
            340                 345                 350 tcc atg ata aaa tgc gtt ggt att ctt gaa gcc gga gtg att cct cca   1104
Ser Met Ile Lys Cys Val Gly Ile Leu Glu Ala Gly Val Ile Pro Pro
        355                 360                 365 aat cca tta tac aaa aaa ggt aac ccg gga ata aaa ttc gac gac tgg   1152
Asn Pro Leu Tyr Lys Lys Gly Asn Pro Gly Ile Lys Phe Asp Asp Trp
    370                 375                 380 aaa ctc cat gta cct act agc tca ata caa tgg ccg acc agt ggc ctg   1200
Lys Leu His Val Pro Thr Ser Ser Ile Gln Trp Pro Thr Ser Gly Leu
385                 390                 395                 400 cgg cgc atc agc acc caa gga ttt ggg tat gga gga acc aat gcg cat   1248
Arg Arg Ile Ser Thr Gln Gly Phe Gly Tyr Gly Gly Thr Asn Ala His
                405                 410                 415 atc atc atg gac gac gct cac aac tat ctg gta tct cgt gac ata act   1296
Ile Ile Met Asp Asp Ala His Asn Tyr Leu Val Ser Arg Asp Ile Thr
            420                 425                 430 gcg ata cac aat aca tgc ctg ctc aat ctg aca aat gga acc act tat   1344
Ala Ile His Asn Thr Cys Leu Leu Asn Leu Thr Asn Gly Thr Thr Tyr
        435                 440                 445 ata gag cat aaa gag gct cct cgg cca agg att ttc cat ttt agt gcc   1392
Ile Glu His Lys Glu Ala Pro Arg Pro Arg Ile Phe His Phe Ser Ala
    450                 455                 460 cag gac aag gac ggg cta ggg agg gta cga gac gcc act tgc cag tat   1440
Gln Asp Lys Asp Gly Leu Gly Arg Val Arg Asp Ala Thr Cys Gln Tyr
465                 470                 475                 480 ctc aag tca ggt gca tta gag gct ggg aaa atg cgc cag aat gaa gat   1488
Leu Lys Ser Gly Ala Leu Glu Ala Gly Lys Met Arg Gln Asn Glu Asp
                485                 490                 495 aaa tac ctt aga gat cta gct tat aca ctg tca gag aga cgt tct cgg   1536
Lys Tyr Leu Arg Asp Leu Ala Tyr Thr Leu Ser Glu Arg Arg Ser Arg
            500                 505                 510 ttg caa tgg cag aca ttt gcg gtg gcc tca tct gtc gaa gga ttg att   1584
Leu Gln Trp Gln Thr Phe Ala Val Ala Ser Ser Val Glu Gly Leu Ile
        515                 520                 525 gaa aca tta cag acc aag cca tgg gcc agt cca gag aca cgc tca gcg   1632
Glu Thr Leu Gln Thr Lys Pro Trp Ala Ser Pro Glu Thr Arg Ser Ala
    530                 535                 540 tca aaa gta cct cgc ata ggc ttc ata ttt act ggt caa ggg gct cag   1680
Ser Lys Val Pro Arg Ile Gly Phe Ile Phe Thr Gly Gln Gly Ala Gln
545                 550                 555                 560 tgg cca cgg atg gga atc gag ctg atg gaa tat gac att ttc cga aaa   1728
Trp Pro Arg Met Gly Ile Glu Leu Met Glu Tyr Asp Ile Phe Arg Lys
                565                 570                 575 agc gtg gaa aga tca gat gtt tac ttg cgc gag gga ttg gac tgc tcc   1776
Ser Val Glu Arg Ser Asp Val Tyr Leu Arg Glu Gly Leu Asp Cys Ser
            580                 585                 590 tgg tct gcc atc gaa gaa ctt gct aaa cct gat tcc tcg tct aac ctg   1824
Trp Ser Ala Ile Glu Glu Leu Ala Lys Pro Asp Ser Ser Ser Asn Leu
```

-continued

```
            Trp Ser Ala Ile Glu Glu Leu Ala Lys Pro Asp Ser Ser Asn Leu
                    595                 600                 605 ggc gca gcg gaa tac agc caa gca ctc tgt tcc gtt ctt cag att gcc       1872
Gly Ala Glu Tyr Ser Gln Ala Leu Cys Ser Val Leu Gln Ile Ala
610                 615                 620 cta ata gac ctg ctc gat agc tgg aac atc aga cca agc gca gta gcc       1920
Leu Ile Asp Leu Leu Asp Ser Trp Asn Ile Arg Pro Ser Ala Val Ala
625                 630                 635                 640 ggc cat tct agt gga gaa ata gcg gcg gcc tac tgc ctt ggg gtt ctc       1968
Gly His Ser Ser Gly Glu Ile Ala Ala Ala Tyr Cys Leu Gly Val Leu
                    645                 650                 655 tct tgg gag gat gcc cta aaa gta gct tac ttt cga ggg tcg cta tcg       2016
Ser Trp Glu Asp Ala Leu Lys Val Ala Tyr Phe Arg Gly Ser Leu Ser
                660                 665                 670 gca gag atg aag gga aat gac agc tcg ctc aat gga gca atg atg gct       2064
Ala Glu Met Lys Gly Asn Asp Ser Ser Leu Asn Gly Ala Met Met Ala
            675                 680                 685 gtc ggc tct tca cca gcg gat att gaa aag tgg ctc gac aaa gtt act       2112
Val Gly Ser Ser Pro Ala Asp Ile Glu Lys Trp Leu Asp Lys Val Thr
        690                 695                 700 gca ggg gag gtt gta gtt gca tgc gtg aac tcc cct gcc agc att act       2160
Ala Gly Glu Val Val Val Ala Cys Val Asn Ser Pro Ala Ser Ile Thr
705                 710                 715                 720 ttg tct ggt gat gct gcc ggt atc aac gaa ttg gag tcc atg ttg aaa       2208
Leu Ser Gly Asp Ala Ala Gly Ile Asn Glu Leu Glu Ser Met Leu Lys
                    725                 730                 735 gaa gca ggg ata ttt gca agg aaa cta aag gtg gac acg gca tac cac       2256
Glu Ala Gly Ile Phe Ala Arg Lys Leu Lys Val Asp Thr Ala Tyr His
                740                 745                 750 tct cca cat atg cag acc att gcc ggc caa tac ttt gaa gcc att gcc       2304
Ser Pro His Met Gln Thr Ile Ala Gly Gln Tyr Phe Glu Ala Ile Ala
            755                 760                 765 gac att tct ata tta ccg gtg agg aat ggg tgc caa atg cat tct agc       2352
Asp Ile Ser Ile Leu Pro Val Arg Asn Gly Cys Gln Met His Ser Ser
        770                 775                 780 gtg cga ggt ggc tac att gat ccg aat gaa ctc ggt gcc gcg aat tgg       2400
Val Arg Gly Gly Tyr Ile Asp Pro Asn Glu Leu Gly Ala Ala Asn Trp
785                 790                 795                 800 gta cgg aat ttg gta tcg act gtt cag ttt gct gat gct gtt cac gat       2448
Val Arg Asn Leu Val Ser Thr Val Gln Phe Ala Asp Ala Val His Asp
                    805                 810                 815 ctt ctt cga cca tta gtt tat ggt gag cgt gca gcg cac aat gct gtg       2496
Leu Leu Arg Pro Leu Val Tyr Gly Glu Arg Ala Ala His Asn Ala Val
                820                 825                 830 gac att ctg gtt gaa gtc ggg ccg cat tct gct tta cag gga ccg gta       2544
Asp Ile Leu Val Glu Val Gly Pro His Ser Ala Leu Gln Gly Pro Val
            835                 840                 845 aac cag aca atg aag gcc cat gga atc aat agt atc aat tat tgt aca       2592
Asn Gln Thr Met Lys Ala His Gly Ile Asn Ser Ile Asn Tyr Cys Thr
850                 855                 860 atg ctc tca cgt ggg aaa aat gcc atc aat acg gct cta tca tgt gcc       2640
Met Leu Ser Arg Gly Lys Asn Ala Ile Asn Thr Ala Leu Ser Cys Ala
865                 870                 875                 880 gcc act ttg tat gtg gaa ggc ctc gca gtc gat ctt cgc agg gcc aac       2688
Ala Thr Leu Tyr Val Glu Gly Leu Ala Val Asp Leu Arg Arg Ala Asn
                    885                 890                 895 cag gat gaa agc ttt gcg gtt gag cct atc ttc gat atg cct tcg tac       2736
Gln Asp Glu Ser Phe Ala Val Glu Pro Ile Phe Asp Met Pro Ser Tyr
                900                 905                 910
```

-continued

| | |
|---|---|
| cct tgg aac cac tca att cga tat tgg gcc gaa tct cgt gtg gaa aag<br>Pro Trp Asn His Ser Ile Arg Tyr Trp Ala Glu Ser Arg Val Glu Lys<br>            915                  920                925 | 2784 |
| gaa tat cga cag cgg aag tat ccc cgt aca cct tta ctc ggt gct cct<br>Glu Tyr Arg Gln Arg Lys Tyr Pro Arg Thr Pro Leu Leu Gly Ala Pro<br>    930                  935                  940 | 2832 |
| tgt ccg tct atg aat gcg ggt gag aag gtc tgg aga ggc ttt att cga<br>Cys Pro Ser Met Asn Ala Gly Glu Lys Val Trp Arg Gly Phe Ile Arg<br>945                  950                  955                  960 | 2880 |
| cct agt gag gag ccg tgg gtt cgc gat cat gtt att caa ggc tcc att<br>Pro Ser Glu Glu Pro Trp Val Arg Asp His Val Ile Gln Gly Ser Ile<br>                965                  970                  975 | 2928 |
| tta tat cca gct gcc gga ttc tta gca atg gcc att gaa gct gca agg<br>Leu Tyr Pro Ala Ala Gly Phe Leu Ala Met Ala Ile Glu Ala Ala Arg<br>    980                  985                  990 | 2976 |
| cag ggg act gag acg gga agg tca att gac ggt ttc aga ctt cgt gat<br>Gln Gly Thr Glu Thr Gly Arg Ser Ile Asp Gly Phe Arg Leu Arg Asp<br>            995                  1000               1005 | 3024 |
| gtc cag att aat gct gcc ctg gtt att gag gaa aat gtc gaa cca<br>Val Gln Ile Asn Ala Ala Leu Val Ile Glu Glu Asn Val Glu Pro<br>1010                    1015                  1020 | 3069 |
| gaa gtg ata ttg agg ttg cag cca cac aga atg ggc acc ctg gat<br>Glu Val Ile Leu Arg Leu Gln Pro His Arg Met Gly Thr Leu Asp<br>1025                    1030                  1035 | 3114 |
| gcg ggt tca gta tcc tgg cag gaa ttc act gtt tca tct tca aca<br>Ala Gly Ser Val Ser Trp Gln Glu Phe Thr Val Ser Ser Ser Thr<br>1040                    1045                  1050 | 3159 |
| gat gga aca gat cta cga caa aat tgt tca gga ctg ctt gcc atc<br>Asp Gly Thr Asp Leu Arg Gln Asn Cys Ser Gly Leu Leu Ala Ile<br>1055                    1060                  1065 | 3204 |
| gat tat gaa ccc gct gag gga tct tct atg cac atc gag aaa atc<br>Asp Tyr Glu Pro Ala Glu Gly Ser Ser Met His Ile Glu Lys Ile<br>1070                    1075                  1080 | 3249 |
| aag gag gtc gag act atc aaa gga aaa ttg gtc aag gcg aag gaa<br>Lys Glu Val Glu Thr Ile Lys Gly Lys Leu Val Lys Ala Lys Glu<br>1085                    1090                  1095 | 3294 |
| cag tgt aga gct gct atc aat gtc gat gaa ttt tat gcc cat ctt<br>Gln Cys Arg Ala Ala Ile Asn Val Asp Glu Phe Tyr Ala His Leu<br>1100                    1105                  1110 | 3339 |
| gac acc gtt ggc cta aca tat ggc gag act ttc gct aac ctg acc<br>Asp Thr Val Gly Leu Thr Tyr Gly Glu Thr Phe Ala Asn Leu Thr<br>1115                    1120                  1125 | 3384 |
| gag gtt cac acc aat gca gca aca gga gaa tgt aca ggt cgt ttg<br>Glu Val His Thr Asn Ala Ala Thr Gly Glu Cys Thr Gly Arg Leu<br>1130                    1135                  1140 | 3429 |
| ctc gta cct gat gtt gag tca gcc atc cct ccg cat atg agg gaa<br>Leu Val Pro Asp Val Glu Ser Ala Ile Pro Pro His Met Arg Glu<br>1145                    1150                  1155 | 3474 |
| cgg cca cac atc ata cac cca aca acc tta gat gcc att ttt cac<br>Arg Pro His Ile Ile His Pro Thr Thr Leu Asp Ala Ile Phe His<br>1160                    1165                  1170 | 3519 |
| tta gca ttt gct gca atc agc gaa cat cca ttc tca ctc aag agt<br>Leu Ala Phe Ala Ala Ile Ser Glu His Pro Phe Ser Leu Lys Ser<br>1175                    1180                  1185 | 3564 |
| gcc atg gtt cct att tcg ata aca gag gta gtc att tca aac gaa<br>Ala Met Val Pro Ile Ser Ile Thr Glu Val Val Ile Ser Asn Glu<br>1190                    1195                  1200 | 3609 |
| gtg ccc cac aga aag gga tcc cag ctc gaa gga ttc gct cag tct<br>Val Pro His Arg Lys Gly Ser Gln Leu Glu Gly Phe Ala Gln Ser<br>1205                    1210                  1215 | 3654 |

```
tct cgg ttt gga ttt cga gaa ttg gtc acc aat atc aac att ttt      3699
Ser Arg Phe Gly Phe Arg Glu Leu Val Thr Asn Ile Asn Ile Phe
    1220             1225                 1230 gac gag caa ctc aca gat gcc gtt gtc aag atc agc gga ttt aga      3744
Asp Glu Gln Leu Thr Asp Ala Val Val Lys Ile Ser Gly Phe Arg
1235                 1240                 1245 tgt gca gat gtg tct ggt tca agc caa agt acg agc agc ggt gag      3789
Cys Ala Asp Val Ser Gly Ser Ser Gln Ser Thr Ser Ser Gly Glu
    1250             1255                 1260 gca gcc aag cca att acg ttt aaa gaa atc cat cga cct gct ctg      3834
Ala Ala Lys Pro Ile Thr Phe Lys Glu Ile His Arg Pro Ala Leu
1265                 1270                 1275 gag ctt ctt gac tat gag gat ctc caa aga gct gtc aac gca aat      3879
Glu Leu Leu Asp Tyr Glu Asp Leu Gln Arg Ala Val Asn Ala Asn
    1280             1285                 1290 gcg gac gaa att gct agt gga ata ttt gaa cag gat acc tct ctc      3924
Ala Asp Glu Ile Ala Ser Gly Ile Phe Glu Gln Asp Thr Ser Leu
1295                 1300                 1305 gac aaa tcc gcc ctc gcc att gtt aag cgg aca ctg tct aac gtt      3969
Asp Lys Ser Ala Leu Ala Ile Val Lys Arg Thr Leu Ser Asn Val
    1310             1315                 1320 cca cgg tca tct gta cat aaa gat ttg ctc ggt ttc tac gat tgg      4014
Pro Arg Ser Ser Val His Lys Asp Leu Leu Gly Phe Tyr Asp Trp
1325                 1330                 1335 atg cag agg caa gtt tca tcg gca gac aaa gca tca ggt gct ggt      4059
Met Gln Arg Gln Val Ser Ser Ala Asp Lys Ala Ser Gly Ala Gly
    1340             1345                 1350 caa aga gac agc acg ggc tat aca aat ata tct gtg aag gac cta      4104
Gln Arg Asp Ser Thr Gly Tyr Thr Asn Ile Ser Val Lys Asp Leu
1355                 1360                 1365 gaa ggt att ctg tct ggt gaa aaa att gct gca cag gcc atg gat      4149
Glu Gly Ile Leu Ser Gly Glu Lys Ile Ala Ala Gln Ala Met Asp
    1370             1375                 1380 gag aac gtc att ctt atg cct gct ctc act agc tct gcg aac ttc      4194
Glu Asn Val Ile Leu Met Pro Ala Leu Thr Ser Ser Ala Asn Phe
1385                 1390                 1395 caa caa ata atg aaa aaa ttg agc cag tat tta ctt att ctg cag      4239
Gln Gln Ile Met Lys Lys Leu Ser Gln Tyr Leu Leu Ile Leu Gln
    1400             1405                 1410 cac aca tac cca gaa ctc tcc gtt ctc gag atc att cat tcg gcg      4284
His Thr Tyr Pro Glu Leu Ser Val Leu Glu Ile Ile His Ser Ala
1415                 1420                 1425 gaa aat tca act act gga tct att tta ccc cag ttg caa tct gct      4329
Glu Asn Ser Thr Thr Gly Ser Ile Leu Pro Gln Leu Gln Ser Ala
    1430             1435                 1440 gaa gtt att ctt gat aca agc aaa tac act gtg ctt gtg caa aat      4374
Glu Val Ile Leu Asp Thr Ser Lys Tyr Thr Val Leu Val Gln Asn
1445                 1450                 1455 gag aag gct gcc aaa aca gtg gaa agc cag cta ggt acc ctg acg      4419
Glu Lys Ala Ala Lys Thr Val Glu Ser Gln Leu Gly Thr Leu Thr
    1460             1465                 1470 gat ctt ata tcg ctt gaa gtg agc gcc aca gac aat agt gta caa      4464
Asp Leu Ile Ser Leu Glu Val Ser Ala Thr Asp Asn Ser Val Gln
1475                 1480                 1485 gac cat gga cgc cag tat gat ctt gct ctt gtg gta aac att gct      4509
Asp His Gly Arg Gln Tyr Asp Leu Ala Leu Val Val Asn Ile Ala
    1490             1495                 1500 cat aaa gac cct gat gta ctc ctc tgc gaa gca aaa tca tcc ctg      4554
His Lys Asp Pro Asp Val Leu Leu Cys Glu Ala Lys Ser Ser Leu
```

```
                                                    -continued
       1505                1510                1515 aaa gaa ggg ggc cgt gtt tgc att atc gaa ata ggc gag cct ctc           4599
Lys Glu Gly Gly Arg Val Cys Ile Ile Glu Ile Gly Glu Pro Leu
    1520                1525                1530 ttg aat ctt gga ata ggg ttg gcc gct tta cag cac act cat ttc           4644
Leu Asn Leu Gly Ile Gly Leu Ala Ala Leu Gln His Thr His Phe
        1535                1540                1545 att att agt agc caa aac aca gac gag tct cac ttg aat cgt gct           4689
Ile Ile Ser Ser Gln Asn Thr Asp Glu Ser His Leu Asn Arg Ala
    1550                1555                1560 ggg ttt acg aaa gag ctt ctt ctt gga gat gcc tta cca ccc aag           4734
Gly Phe Thr Lys Glu Leu Leu Leu Gly Asp Ala Leu Pro Pro Lys
1565                1570                1575 aac gag ttc cgg ctc ata gcc gga aat aca tcg aag cga tta gca           4779
Asn Glu Phe Arg Leu Ile Ala Gly Asn Thr Ser Lys Arg Leu Ala
        1580                1585                1590 gtt act att caa gga gag ata gtc att gta cag gcg cct gag ccg           4824
Val Thr Ile Gln Gly Glu Ile Val Ile Val Gln Ala Pro Glu Pro
    1595                1600                1605 tca aaa tct gct caa aat gtt gct gat gcc ctt act gaa gtg ctt           4869
Ser Lys Ser Ala Gln Asn Val Ala Asp Ala Leu Thr Glu Val Leu
1610                1615                1620 gag aaa caa tgt gtg cgc gcc att cgt gtt gat tgg agc tta ccc           4914
Glu Lys Gln Cys Val Arg Ala Ile Arg Val Asp Trp Ser Leu Pro
        1625                1630                1635 gag tat att tcg gtc ata gaa ggc aag gaa tgt atc gtc ttg gct           4959
Glu Tyr Ile Ser Val Ile Glu Gly Lys Glu Cys Ile Val Leu Ala
    1640                1645                1650 gat ctg gag aag tca cac cta cta gaa gca tct cag gag gaa ttc           5004
Asp Leu Glu Lys Ser His Leu Leu Glu Ala Ser Gln Glu Glu Phe
1655                1660                1665 cca ata ata caa cag acc atc ctg aag gct gga ggc atc ctt tgg           5049
Pro Ile Ile Gln Gln Thr Ile Leu Lys Ala Gly Gly Ile Leu Trp
        1670                1675                1680 gtt agt ggc tct atc gga cca gac gcg gca tta gtc act gga ttg           5094
Val Ser Gly Ser Ile Gly Pro Asp Ala Ala Leu Val Thr Gly Leu
    1685                1690                1695 gct cga aca att cgc aac gag ata cca ggc agc aag ctg cga gtt           5139
Ala Arg Thr Ile Arg Asn Glu Ile Pro Gly Ser Lys Leu Arg Val
1700                1705                1710 ctt cag aca aat gag ctc tcg tta gct tca ccg acc acg tgg tca           5184
Leu Gln Thr Asn Glu Leu Ser Leu Ala Ser Pro Thr Thr Trp Ser
        1715                1720                1725 aat tat att ttg cga ttg cta caa tca cca acg cta gat agt gag           5229
Asn Tyr Ile Leu Arg Leu Leu Gln Ser Pro Thr Leu Asp Ser Glu
    1730                1735                1740 ttc acc atc aaa gat ggt ttt ctc caa atc agt cgc gtc gta gaa           5274
Phe Thr Ile Lys Asp Gly Phe Leu Gln Ile Ser Arg Val Val Glu
1745                1750                1755 tat tac act cga aac gac gct ttg gcg gtt tct ctc ggg cgg cag           5319
Tyr Tyr Thr Arg Asn Asp Ala Leu Ala Val Ser Leu Gly Arg Gln
        1760                1765                1770 gag cct aaa acg gtg cat atg cct ctt agt gaa act tca agc cca           5364
Glu Pro Lys Thr Val His Met Pro Leu Ser Glu Thr Ser Ser Pro
    1775                1780                1785 gtc aaa ctg tgt atc aag aat cct ggg atg ctt gat tca cta tat           5409
Val Lys Leu Cys Ile Lys Asn Pro Gly Met Leu Asp Ser Leu Tyr
1790                1795                1800 ttt gaa ccg gat gat atc ctt aat agt cct cta gcc tcc ggg caa           5454
```

-continued

| | | | | | | | | | | | | | | |
|---|---|---|---|---|---|---|---|---|---|---|---|---|---|---|
| Phe | Glu | Pro | Asp | Asp | Ile | Leu | Asn | Ser | Pro | Leu | Ala | Ser | Gly | Gln |
| | 1805 | | | | 1810 | | | | 1815 | | | | | |

| gtc | gaa | ata | gaa | gtg | aaa | gca | tcg | ggt | gtc | aat | ttc | cgc | gat | gtc | 5499 |
|---|---|---|---|---|---|---|---|---|---|---|---|---|---|---|---|
| Val | Glu | Ile | Glu | Val | Lys | Ala | Ser | Gly | Val | Asn | Phe | Arg | Asp | Val | |
| | 1820 | | | | 1825 | | | | 1830 | | | | | | |

| atg | gtt | tgt | atg | ggt | cag | att | cca | gat | agt | ttg | cta | ggc | ttc | gag | 5544 |
|---|---|---|---|---|---|---|---|---|---|---|---|---|---|---|---|
| Met | Val | Cys | Met | Gly | Gln | Ile | Pro | Asp | Ser | Leu | Leu | Gly | Phe | Glu | |
| | 1835 | | | | 1840 | | | | 1845 | | | | | | |

| gca | gct | gga | ata | gtt | cgt | cga | gtt | ggt | gag | aat | gtt | caa | aac | atc | 5589 |
|---|---|---|---|---|---|---|---|---|---|---|---|---|---|---|---|
| Ala | Ala | Gly | Ile | Val | Arg | Arg | Val | Gly | Glu | Asn | Val | Gln | Asn | Ile | |
| | 1850 | | | | 1855 | | | | 1860 | | | | | | |

| aaa | gca | ggt | gat | cga | gtt | tgt | ttt | atc | gca | cac | ggt | tct | cat | cga | 5634 |
|---|---|---|---|---|---|---|---|---|---|---|---|---|---|---|---|
| Lys | Ala | Gly | Asp | Arg | Val | Cys | Phe | Ile | Ala | His | Gly | Ser | His | Arg | |
| | 1865 | | | | 1870 | | | | 1875 | | | | | | |

| act | gtc | cat | cgt | gtg | aga | aat | gag | tat | gtg | gta | cac | atc | cca | gat | 5679 |
|---|---|---|---|---|---|---|---|---|---|---|---|---|---|---|---|
| Thr | Val | His | Arg | Val | Arg | Asn | Glu | Tyr | Val | Val | His | Ile | Pro | Asp | |
| | 1880 | | | | 1885 | | | | 1890 | | | | | | |

| gaa | atg | tcc | ttc | gca | gag | gct | tct | ggc | gtg | ctt | ctt | gtt | cat | ggc | 5724 |
|---|---|---|---|---|---|---|---|---|---|---|---|---|---|---|---|
| Glu | Met | Ser | Phe | Ala | Glu | Ala | Ser | Gly | Val | Leu | Leu | Val | His | Gly | |
| | 1895 | | | | 1900 | | | | 1905 | | | | | | |

| acg | gcg | tgg | tat | ggt | ctg | gtc | aag | att | gcc | cag | atc | aaa | gca | ggg | 5769 |
|---|---|---|---|---|---|---|---|---|---|---|---|---|---|---|---|
| Thr | Ala | Trp | Tyr | Gly | Leu | Val | Lys | Ile | Ala | Gln | Ile | Lys | Ala | Gly | |
| | 1910 | | | | 1915 | | | | 1920 | | | | | | |

| caa | acg | att | ctc | atc | cat | gcc | gct | gcg | ggt | ggt | gtt | gga | caa | gca | 5814 |
|---|---|---|---|---|---|---|---|---|---|---|---|---|---|---|---|
| Gln | Thr | Ile | Leu | Ile | His | Ala | Ala | Ala | Gly | Gly | Val | Gly | Gln | Ala | |
| | 1925 | | | | 1930 | | | | 1935 | | | | | | |

| gca | gtg | atg | ttg | gcc | cag | cat | ttt | ggt | ctc | gag | ata | ttt | gca | aca | 5859 |
|---|---|---|---|---|---|---|---|---|---|---|---|---|---|---|---|
| Ala | Val | Met | Leu | Ala | Gln | His | Phe | Gly | Leu | Glu | Ile | Phe | Ala | Thr | |
| | 1940 | | | | 1945 | | | | 1950 | | | | | | |

| gtt | ggc | tcc | gat | gac | aaa | agg | caa | ctc | atc | cag | gac | ctt | tat | aag | 5904 |
|---|---|---|---|---|---|---|---|---|---|---|---|---|---|---|---|
| Val | Gly | Ser | Asp | Asp | Lys | Arg | Gln | Leu | Ile | Gln | Asp | Leu | Tyr | Lys | |
| | 1955 | | | | 1960 | | | | 1965 | | | | | | |

| atc | cca | gaa | gac | cac | att | ttc | aat | tct | cgt | gac | ctg | agt | ttt | gcc | 5949 |
|---|---|---|---|---|---|---|---|---|---|---|---|---|---|---|---|
| Ile | Pro | Glu | Asp | His | Ile | Phe | Asn | Ser | Arg | Asp | Leu | Ser | Phe | Ala | |
| | 1970 | | | | 1975 | | | | 1980 | | | | | | |

| aag | gga | gtg | ctg | cgt | atg | aca | aat | ggt | cgt | ggt | gtg | gat | gtt | atc | 5994 |
|---|---|---|---|---|---|---|---|---|---|---|---|---|---|---|---|
| Lys | Gly | Val | Leu | Arg | Met | Thr | Asn | Gly | Arg | Gly | Val | Asp | Val | Ile | |
| | 1985 | | | | 1990 | | | | 1995 | | | | | | |

| ctt | aat | tct | cta | tct | ggg | gag | act | ctt | cgc | caa | aca | tgg | cac | tgc | 6039 |
|---|---|---|---|---|---|---|---|---|---|---|---|---|---|---|---|
| Leu | Asn | Ser | Leu | Ser | Gly | Glu | Thr | Leu | Arg | Gln | Thr | Trp | His | Cys | |
| | 2000 | | | | 2005 | | | | 2010 | | | | | | |

| gtc | gct | cca | ttt | gga | aca | ttc | atc | gaa | atc | ggt | att | aaa | gat | atc | 6084 |
|---|---|---|---|---|---|---|---|---|---|---|---|---|---|---|---|
| Val | Ala | Pro | Phe | Gly | Thr | Phe | Ile | Glu | Ile | Gly | Ile | Lys | Asp | Ile | |
| | 2015 | | | | 2020 | | | | 2025 | | | | | | |

| ctc | agc | aat | acc | cga | cta | gac | atg | cgc | cct | ttc | ctt | caa | gat | gcc | 6129 |
|---|---|---|---|---|---|---|---|---|---|---|---|---|---|---|---|
| Leu | Ser | Asn | Thr | Arg | Leu | Asp | Met | Arg | Pro | Phe | Leu | Gln | Asp | Ala | |
| | 2030 | | | | 2035 | | | | 2040 | | | | | | |

| cga | ttt | gcc | ttt | ttt | aat | ttg | aac | cgt | atc | gag | aac | gag | cga | cca | 6174 |
|---|---|---|---|---|---|---|---|---|---|---|---|---|---|---|---|
| Arg | Phe | Ala | Phe | Phe | Asn | Leu | Asn | Arg | Ile | Glu | Asn | Glu | Arg | Pro | |
| | 2045 | | | | 2050 | | | | 2055 | | | | | | |

| gac | ttg | atg | agc | gag | gca | tta | aat | gaa | agt | atg | gct | ttc | atc | agc | 6219 |
|---|---|---|---|---|---|---|---|---|---|---|---|---|---|---|---|
| Asp | Leu | Met | Ser | Glu | Ala | Leu | Asn | Glu | Ser | Met | Ala | Phe | Ile | Ser | |
| | 2060 | | | | 2065 | | | | 2070 | | | | | | |

| tcg | ggt | gct | aca | cga | cct | gtt | tca | ccc | ctg | atg | aac | ttc | cct | gtc | 6264 |
|---|---|---|---|---|---|---|---|---|---|---|---|---|---|---|---|
| Ser | Gly | Ala | Thr | Arg | Pro | Val | Ser | Pro | Leu | Met | Asn | Phe | Pro | Val | |
| | 2075 | | | | 2080 | | | | 2085 | | | | | | |

| tcg | cag | gta | gaa | gat | gcc | ttc | cgt | ctc | atg | cag | acg | ggc | aag | cac | 6309 |
|---|---|---|---|---|---|---|---|---|---|---|---|---|---|---|---|
| Ser | Gln | Val | Glu | Asp | Ala | Phe | Arg | Leu | Met | Gln | Thr | Gly | Lys | His | |
| | 2090 | | | | 2095 | | | | 2100 | | | | | | |

-continued

| | | | | | | | | | | | | | | |
|---|---|---|---|---|---|---|---|---|---|---|---|---|---|---|
| cgg | ggg | aaa | cta | tcc | ctg | aca | tac | tca | tct | tct | gac | gta | gta | ccc | 6354 |
| Arg | Gly | Lys | Leu | Ser | Leu | Thr | Tyr | Ser | Ser | Ser | Asp | Val | Val | Pro | |
| | 2105 | | | | 2110 | | | | | 2115 | | | | | |
| att | cag | agc | cga | cct | act | cgc | tct | att | cgt | ctg | gat | gaa | act | agt | 6399 |
| Ile | Gln | Ser | Arg | Pro | Thr | Arg | Ser | Ile | Arg | Leu | Asp | Glu | Thr | Ser | |
| | 2120 | | | | 2125 | | | | | 2130 | | | | | |
| gcc | tat | gtt | ctc | gta | ggt | ggt | ctt | ggt | ggg | ctt | ggg | cgc | agt | ctt | 6444 |
| Ala | Tyr | Val | Leu | Val | Gly | Gly | Leu | Gly | Gly | Leu | Gly | Arg | Ser | Leu | |
| | 2135 | | | | 2140 | | | | | 2145 | | | | | |
| gca | caa | ctt | ttt | gtc | cga | ctc | ggg | tgc | aag | aaa | cta | tgc | ttt | ctt | 6489 |
| Ala | Gln | Leu | Phe | Val | Arg | Leu | Gly | Cys | Lys | Lys | Leu | Cys | Phe | Leu | |
| | 2150 | | | | 2155 | | | | | 2160 | | | | | |
| tct | cga | tca | gga | ggg | gca | agt | gaa | aag | gca | cag | aag | ctc | ctc | aaa | 6534 |
| Ser | Arg | Ser | Gly | Gly | Ala | Ser | Glu | Lys | Ala | Gln | Lys | Leu | Leu | Lys | |
| | 2165 | | | | 2170 | | | | | 2175 | | | | | |
| gac | ctt | cag | cag | caa | ggg | gtc | aaa | act | ctt | gct | ctt | aga | tgc | gac | 6579 |
| Asp | Leu | Gln | Gln | Gln | Gly | Val | Lys | Thr | Leu | Ala | Leu | Arg | Cys | Asp | |
| | 2180 | | | | 2185 | | | | | 2190 | | | | | |
| gtt | tct | gat | gca | cag | tct | gtc | aaa | gcg | gct | att | aat | gaa | tgc | gcg | 6624 |
| Val | Ser | Asp | Ala | Gln | Ser | Val | Lys | Ala | Ala | Ile | Asn | Glu | Cys | Ala | |
| | 2195 | | | | 2200 | | | | | 2205 | | | | | |
| act | cgc | ttg | gga | cct | gtc | ctg | ggt | gtg | gta | cag | tgt | gca | atg | gtg | 6669 |
| Thr | Arg | Leu | Gly | Pro | Val | Leu | Gly | Val | Val | Gln | Cys | Ala | Met | Val | |
| | 2210 | | | | 2215 | | | | | 2220 | | | | | |
| ctt | cga | gat | ggc | cta | ttc | gag | aag | atg | acc | cac | caa | cag | tgg | gtt | 6714 |
| Leu | Arg | Asp | Gly | Leu | Phe | Glu | Lys | Met | Thr | His | Gln | Gln | Trp | Val | |
| | 2225 | | | | 2230 | | | | | 2235 | | | | | |
| gag | ggt | act | cgg | ccc | aag | gtc | cag | ggg | tct | tgg | aac | cta | cat | gtg | 6759 |
| Glu | Gly | Thr | Arg | Pro | Lys | Val | Gln | Gly | Ser | Trp | Asn | Leu | His | Val | |
| | 2240 | | | | 2245 | | | | | 2250 | | | | | |
| aac | cta | cca | aat | gtt | gat | ttc | ttt | att | att | ctc | agt | tcc | ttt | gct | 6804 |
| Asn | Leu | Pro | Asn | Val | Asp | Phe | Phe | Ile | Ile | Leu | Ser | Ser | Phe | Ala | |
| | 2255 | | | | 2260 | | | | | 2265 | | | | | |
| gga | att | ttt | gga | agc | cga | ggc | caa | agc | aac | tat | acc | gca | gcg | gga | 6849 |
| Gly | Ile | Phe | Gly | Ser | Arg | Gly | Gln | Ser | Asn | Tyr | Thr | Ala | Ala | Gly | |
| | 2270 | | | | 2275 | | | | | 2280 | | | | | |
| gcg | tat | gag | gat | gcg | ctt | gca | aat | tat | cga | cga | tcg | ctg | ggt | ctc | 6894 |
| Ala | Tyr | Glu | Asp | Ala | Leu | Ala | Asn | Tyr | Arg | Arg | Ser | Leu | Gly | Leu | |
| | 2285 | | | | 2290 | | | | | 2295 | | | | | |
| aaa | gcg | gtg | aca | gtt | gac | ttg | ggt | att | atg | cgc | gat | gtg | ggc | gtt | 6939 |
| Lys | Ala | Val | Thr | Val | Asp | Leu | Gly | Ile | Met | Arg | Asp | Val | Gly | Val | |
| | 2300 | | | | 2305 | | | | | 2310 | | | | | |
| ctt | gcc | gag | caa | ggt | ata | aca | gat | tat | ctg | cga | gag | tgg | gag | gag | 6984 |
| Leu | Ala | Glu | Gln | Gly | Ile | Thr | Asp | Tyr | Leu | Arg | Glu | Trp | Glu | Glu | |
| | 2315 | | | | 2320 | | | | | 2325 | | | | | |
| cca | tgc | ggt | att | cga | gaa | gct | gaa | ttc | cat | gcg | ctt | atg | gaa | aat | 7029 |
| Pro | Cys | Gly | Ile | Arg | Glu | Ala | Glu | Phe | His | Ala | Leu | Met | Glu | Asn | |
| | 2330 | | | | 2335 | | | | | 2340 | | | | | |
| gtc | ttg | act | agt | gaa | gtt | ctt | gga | gat | cag | gag | cct | cta | ccg | gca | 7074 |
| Val | Leu | Thr | Ser | Glu | Val | Leu | Gly | Asp | Gln | Glu | Pro | Leu | Pro | Ala | |
| | 2345 | | | | 2350 | | | | | 2355 | | | | | |
| cac | att | ccg | acg | ggc | ttt | gct | acc | gca | aag | aca | gtt | caa | caa | ttt | 7119 |
| His | Ile | Pro | Thr | Gly | Phe | Ala | Thr | Ala | Lys | Thr | Val | Gln | Gln | Phe | |
| | 2360 | | | | 2365 | | | | | 2370 | | | | | |
| ggt | atc | acc | acg | cca | ttt | tac | ttt | gat | gat | cct | cgg | ttt | tca | att | 7164 |
| Gly | Ile | Thr | Thr | Pro | Phe | Tyr | Phe | Asp | Asp | Pro | Arg | Phe | Ser | Ile | |
| | 2375 | | | | 2380 | | | | | 2385 | | | | | |
| cta | tcc | gcc | gcc | ggc | tct | agt | aag | aca | gga | gct | ggt | gat | agc | acg | 7209 |
| Leu | Ser | Ala | Ala | Gly | Ser | Ser | Lys | Thr | Gly | Ala | Gly | Asp | Ser | Thr | |
| | 2390 | | | | 2395 | | | | | 2400 | | | | | |

-continued

```
gat tct aac aag gcc atc tca gtg caa aat caa att gcg cag tct         7254
Asp Ser Asn Lys Ala Ile Ser Val Gln Asn Gln Ile Ala Gln Ser
    2405                2410                2415 ata tct att tca gag gca gca tca gcc gtc acc aat gct ctt gtt         7299
Ile Ser Ile Ser Glu Ala Ala Ser Ala Val Thr Asn Ala Leu Val
    2420                2425                2430 gca cgc gtg gcc aaa tcg ctt caa agc gct ttg tcc gac atc gac         7344
Ala Arg Val Ala Lys Ser Leu Gln Ser Ala Leu Ser Asp Ile Asp
    2435                2440                2445 cca tcc cgg ccg ctg cat gcc ttc ggt gtg gat tct ctt gtc gcc         7389
Pro Ser Arg Pro Leu His Ala Phe Gly Val Asp Ser Leu Val Ala
    2450                2455                2460 gtc gaa gtg gtg aac tgg gtg ttc aaa gaa atc aag gcc aaa gtt         7434
Val Glu Val Val Asn Trp Val Phe Lys Glu Ile Lys Ala Lys Val
    2465                2470                2475 acc gta ttt gac gtt ctt tct agt att cct att aca tct ctt gcc         7479
Thr Val Phe Asp Val Leu Ser Ser Ile Pro Ile Thr Ser Leu Ala
    2480                2485                2490 gag aag att gcg ctg aag tct agt ctt ttg ccg caa ttg act tga         7524
Glu Lys Ile Ala Leu Lys Ser Ser Leu Leu Pro Gln Leu Thr
    2495                2500                2505
```

<210> SEQ ID NO 14
<211> LENGTH: 2507
<212> TYPE: PRT
<213> ORGANISM: Talaromyces islandicus

<400> SEQUENCE: 14

```
Met Ala Thr Thr Asn Glu Val Arg Trp Ala Gln Asp Ile Ala Ile Val
1               5                   10                  15

Gly Met Ser Cys Arg Phe Ala Asp Asp Ala Asp Ser Phe Pro Arg Phe
            20                  25                  30

Trp Asp Phe Ile Cys Asn Gly Arg Tyr Ala Phe His Tyr Pro Gly Lys
        35                  40                  45

Lys Thr Asn Thr Ser Leu Pro Arg Gly Ala His Phe Phe Lys Asp Asp
    50                  55                  60

Ile Ala Glu Phe Asp Ala Asn Phe Phe Asn Ile Ser Lys Val Glu Ala
65                  70                  75                  80

Glu Ser Ile Asp Pro Gln Gln Arg Met Val Met Glu Thr Thr Phe Glu
                85                  90                  95

Ala Leu Glu Asn Ala Gly Ile Thr Ile Asp Lys Val Ala Gly Thr Arg
            100                 105                 110

Ala Gly Val Trp Met Ala Asn Phe Thr Ser Asp Tyr Arg Glu Met Leu
        115                 120                 125

Tyr Arg Asp Ser Glu Thr Ala Pro Met Tyr Thr Leu Ser Gly Ala Ser
    130                 135                 140

Asn Thr Ser Thr Ser Asn Arg Val Ser Trp Phe Phe Asp Leu Lys Gly
145                 150                 155                 160

Pro Ser Phe Thr Leu Asn Thr Ala Cys Ser Ser Ser Met Val Ala Thr
                165                 170                 175

His Leu Ala Cys Gln Ser Leu Ala Leu Gly Glu Ser Ser Ala Ile
            180                 185                 190

Val Gly Gly Thr Ser Leu Leu Leu Asn Pro Asp Leu Phe Leu Phe Leu
        195                 200                 205

Ser Asn Gln His Phe Leu Ala Ala Asp Gly Lys Ser Lys Ala Phe Asp
    210                 215                 220
```

```
Ala Ser Gly Asp Gly Tyr Gly Arg Gly Glu Gly Val Ala Val Val Val
225                 230                 235                 240

Leu Lys Arg Val Ala Asp Ala Ile Ala Asp Gly Asp Pro Ile Arg Ala
            245                 250                 255

Val Ile Arg Gly Thr Ala Ile Asn Gln Asp Gly Arg Thr Lys Gly Met
        260                 265                 270

Thr Leu Pro Ser Val Asp Ala Gln Glu Gln Leu Ile Lys Asp Ala Tyr
    275                 280                 285

Arg Asn Ala Gly Leu Ser Met Lys Asp Thr Arg Tyr Val Glu Ala His
    290                 295                 300

Gly Thr Gly Thr Gln Ala Gly Asp Lys Cys Glu Thr Ala Leu Ser
305                 310                 315                 320

Arg Thr Phe Ser Pro Tyr Arg Thr Ala Ser Glu Arg Leu Ile Leu Gly
                325                 330                 335

Ser Val Lys Thr Asn Ile Gly His Leu Glu Ala Cys Ala Gly Leu Ala
            340                 345                 350

Ser Met Ile Lys Cys Val Gly Ile Leu Glu Ala Gly Val Ile Pro Pro
        355                 360                 365

Asn Pro Leu Tyr Lys Lys Gly Asn Pro Gly Ile Lys Phe Asp Asp Trp
    370                 375                 380

Lys Leu His Val Pro Thr Ser Ser Ile Gln Trp Pro Thr Ser Gly Leu
385                 390                 395                 400

Arg Arg Ile Ser Thr Gln Gly Phe Gly Tyr Gly Gly Thr Asn Ala His
                405                 410                 415

Ile Ile Met Asp Asp Ala His Asn Tyr Leu Val Ser Arg Asp Ile Thr
            420                 425                 430

Ala Ile His Asn Thr Cys Leu Leu Asn Leu Thr Asn Gly Thr Thr Tyr
        435                 440                 445

Ile Glu His Lys Glu Ala Pro Arg Pro Arg Ile Phe His Phe Ser Ala
    450                 455                 460

Gln Asp Lys Asp Gly Leu Gly Arg Val Arg Asp Ala Thr Cys Gln Tyr
465                 470                 475                 480

Leu Lys Ser Gly Ala Leu Glu Ala Gly Lys Met Arg Gln Asn Glu Asp
                485                 490                 495

Lys Tyr Leu Arg Asp Leu Ala Tyr Thr Leu Ser Glu Arg Arg Ser Arg
            500                 505                 510

Leu Gln Trp Gln Thr Phe Ala Val Ala Ser Ser Val Glu Gly Leu Ile
        515                 520                 525

Glu Thr Leu Gln Thr Lys Pro Trp Ala Ser Pro Glu Thr Arg Ser Ala
    530                 535                 540

Ser Lys Val Pro Arg Ile Gly Phe Ile Phe Thr Gly Gln Gly Ala Gln
545                 550                 555                 560

Trp Pro Arg Met Gly Ile Glu Leu Met Glu Tyr Asp Ile Phe Arg Lys
                565                 570                 575

Ser Val Glu Arg Ser Asp Val Tyr Leu Arg Glu Gly Leu Asp Cys Ser
            580                 585                 590

Trp Ser Ala Ile Glu Glu Leu Ala Lys Pro Asp Ser Ser Asn Leu
        595                 600                 605

Gly Ala Ala Glu Tyr Ser Gln Ala Leu Cys Ser Val Leu Gln Ile Ala
    610                 615                 620

Leu Ile Asp Leu Leu Asp Ser Trp Asn Ile Arg Pro Ser Ala Val Ala
625                 630                 635                 640

Gly His Ser Ser Gly Glu Ile Ala Ala Ala Tyr Cys Leu Gly Val Leu
```

-continued

```
                645                 650                 655
Ser Trp Glu Asp Ala Leu Lys Val Ala Tyr Phe Arg Gly Ser Leu Ser
                660                 665                 670

Ala Glu Met Lys Gly Asn Asp Ser Ser Leu Asn Gly Ala Met Met Ala
                675                 680                 685

Val Gly Ser Ser Pro Ala Asp Ile Glu Lys Trp Leu Asp Lys Val Thr
            690                 695                 700

Ala Gly Glu Val Val Ala Cys Val Asn Ser Pro Ala Ser Ile Thr
705                 710                 715                 720

Leu Ser Gly Asp Ala Ala Gly Ile Asn Glu Leu Glu Ser Met Leu Lys
                725                 730                 735

Glu Ala Gly Ile Phe Ala Arg Lys Leu Lys Val Asp Thr Ala Tyr His
                740                 745                 750

Ser Pro His Met Gln Thr Ile Ala Gly Gln Tyr Phe Glu Ala Ile Ala
            755                 760                 765

Asp Ile Ser Ile Leu Pro Val Arg Asn Gly Cys Gln Met His Ser Ser
770                 775                 780

Val Arg Gly Gly Tyr Ile Asp Pro Asn Glu Leu Gly Ala Ala Asn Trp
785                 790                 795                 800

Val Arg Asn Leu Val Ser Thr Val Gln Phe Ala Asp Ala Val His Asp
                805                 810                 815

Leu Leu Arg Pro Leu Val Tyr Gly Glu Arg Ala Ala His Asn Ala Val
                820                 825                 830

Asp Ile Leu Val Glu Val Gly Pro His Ser Ala Leu Gln Gly Pro Val
                835                 840                 845

Asn Gln Thr Met Lys Ala His Gly Ile Asn Ser Ile Asn Tyr Cys Thr
850                 855                 860

Met Leu Ser Arg Gly Lys Asn Ala Ile Asn Thr Ala Leu Ser Cys Ala
865                 870                 875                 880

Ala Thr Leu Tyr Val Glu Gly Leu Ala Val Asp Leu Arg Arg Ala Asn
                885                 890                 895

Gln Asp Glu Ser Phe Ala Val Glu Pro Ile Phe Asp Met Pro Ser Tyr
                900                 905                 910

Pro Trp Asn His Ser Ile Arg Tyr Trp Ala Glu Ser Arg Val Glu Lys
            915                 920                 925

Glu Tyr Arg Gln Arg Lys Tyr Pro Arg Thr Pro Leu Leu Gly Ala Pro
            930                 935                 940

Cys Pro Ser Met Asn Ala Gly Glu Lys Val Trp Arg Gly Phe Ile Arg
945                 950                 955                 960

Pro Ser Glu Glu Pro Trp Val Arg Asp His Val Ile Gln Gly Ser Ile
                965                 970                 975

Leu Tyr Pro Ala Ala Gly Phe Leu Met Ala Ile Glu Ala Ala Arg
            980                 985                 990

Gln Gly Thr Glu Thr Gly Arg Ser Ile Asp Gly Phe Arg Leu Arg Asp
            995                 1000                1005

Val Gln Ile Asn Ala Ala Leu Val Ile Glu Glu Asn Val Glu Pro
        1010                1015                1020

Glu Val Ile Leu Arg Leu Gln Pro His Arg Met Gly Thr Leu Asp
        1025                1030                1035

Ala Gly Ser Val Ser Trp Gln Glu Phe Thr Val Ser Ser Ser Thr
        1040                1045                1050

Asp Gly Thr Asp Leu Arg Gln Asn Cys Ser Gly Leu Leu Ala Ile
        1055                1060                1065
```

-continued

```
Asp Tyr Glu Pro Ala Glu Gly Ser Ser Met His Ile Glu Lys Ile
    1070                1075                1080

Lys Glu Val Glu Thr Ile Lys Gly Lys Leu Val Lys Ala Lys Glu
    1085                1090                1095

Gln Cys Arg Ala Ala Ile Asn Val Asp Glu Phe Tyr Ala His Leu
    1100                1105                1110

Asp Thr Val Gly Leu Thr Tyr Gly Glu Thr Phe Ala Asn Leu Thr
    1115                1120                1125

Glu Val His Thr Asn Ala Ala Thr Gly Glu Cys Thr Gly Arg Leu
    1130                1135                1140

Leu Val Pro Asp Val Glu Ser Ala Ile Pro Pro His Met Arg Glu
    1145                1150                1155

Arg Pro His Ile Ile His Pro Thr Thr Leu Asp Ala Ile Phe His
    1160                1165                1170

Leu Ala Phe Ala Ala Ile Ser Glu His Pro Phe Ser Leu Lys Ser
    1175                1180                1185

Ala Met Val Pro Ile Ser Ile Thr Glu Val Val Ile Ser Asn Glu
    1190                1195                1200

Val Pro His Arg Lys Gly Ser Gln Leu Glu Gly Phe Ala Gln Ser
    1205                1210                1215

Ser Arg Phe Gly Phe Arg Glu Leu Val Thr Asn Ile Asn Ile Phe
    1220                1225                1230

Asp Glu Gln Leu Thr Asp Ala Val Val Lys Ile Ser Gly Phe Arg
    1235                1240                1245

Cys Ala Asp Val Ser Gly Ser Ser Gln Ser Thr Ser Ser Gly Glu
    1250                1255                1260

Ala Ala Lys Pro Ile Thr Phe Lys Glu Ile His Arg Pro Ala Leu
    1265                1270                1275

Glu Leu Leu Asp Tyr Glu Asp Leu Gln Arg Ala Val Asn Ala Asn
    1280                1285                1290

Ala Asp Glu Ile Ala Ser Gly Ile Phe Glu Gln Asp Thr Ser Leu
    1295                1300                1305

Asp Lys Ser Ala Leu Ala Ile Val Lys Arg Thr Leu Ser Asn Val
    1310                1315                1320

Pro Arg Ser Ser Val His Lys Asp Leu Leu Gly Phe Tyr Asp Trp
    1325                1330                1335

Met Gln Arg Gln Val Ser Ser Ala Asp Lys Ala Ser Gly Ala Gly
    1340                1345                1350

Gln Arg Asp Ser Thr Gly Tyr Thr Asn Ile Ser Val Lys Asp Leu
    1355                1360                1365

Glu Gly Ile Leu Ser Gly Glu Lys Ile Ala Ala Gln Ala Met Asp
    1370                1375                1380

Glu Asn Val Ile Leu Met Pro Ala Leu Thr Ser Ser Ala Asn Phe
    1385                1390                1395

Gln Gln Ile Met Lys Lys Leu Ser Gln Tyr Leu Leu Ile Leu Gln
    1400                1405                1410

His Thr Tyr Pro Glu Leu Ser Val Leu Glu Ile Ile His Ser Ala
    1415                1420                1425

Glu Asn Ser Thr Thr Gly Ser Ile Leu Pro Gln Leu Gln Ser Ala
    1430                1435                1440

Glu Val Ile Leu Asp Thr Ser Lys Tyr Thr Val Leu Val Gln Asn
    1445                1450                1455
```

```
Glu Lys Ala Ala Lys Thr Val Glu Ser Gln Leu Gly Thr Leu Thr
    1460                1465                1470

Asp Leu Ile Ser Leu Glu Val Ser Ala Thr Asp Asn Ser Val Gln
    1475                1480                1485

Asp His Gly Arg Gln Tyr Asp Leu Ala Leu Val Val Asn Ile Ala
    1490                1495                1500

His Lys Asp Pro Asp Val Leu Leu Cys Glu Ala Lys Ser Ser Leu
    1505                1510                1515

Lys Glu Gly Gly Arg Val Cys Ile Ile Glu Ile Gly Glu Pro Leu
    1520                1525                1530

Leu Asn Leu Gly Ile Gly Leu Ala Ala Leu Gln His Thr His Phe
    1535                1540                1545

Ile Ile Ser Ser Gln Asn Thr Asp Glu Ser His Leu Asn Arg Ala
    1550                1555                1560

Gly Phe Thr Lys Glu Leu Leu Leu Gly Asp Ala Leu Pro Pro Lys
    1565                1570                1575

Asn Glu Phe Arg Leu Ile Ala Gly Asn Thr Ser Lys Arg Leu Ala
    1580                1585                1590

Val Thr Ile Gln Gly Glu Ile Val Ile Val Gln Ala Pro Glu Pro
    1595                1600                1605

Ser Lys Ser Ala Gln Asn Val Ala Asp Ala Leu Thr Glu Val Leu
    1610                1615                1620

Glu Lys Gln Cys Val Arg Ala Ile Arg Val Asp Trp Ser Leu Pro
    1625                1630                1635

Glu Tyr Ile Ser Val Ile Glu Gly Lys Glu Cys Ile Val Leu Ala
    1640                1645                1650

Asp Leu Glu Lys Ser His Leu Leu Glu Ala Ser Gln Glu Glu Phe
    1655                1660                1665

Pro Ile Ile Gln Gln Thr Ile Leu Lys Ala Gly Gly Ile Leu Trp
    1670                1675                1680

Val Ser Gly Ser Ile Gly Pro Asp Ala Ala Leu Val Thr Gly Leu
    1685                1690                1695

Ala Arg Thr Ile Arg Asn Glu Ile Pro Gly Ser Lys Leu Arg Val
    1700                1705                1710

Leu Gln Thr Asn Glu Leu Ser Leu Ala Ser Pro Thr Thr Trp Ser
    1715                1720                1725

Asn Tyr Ile Leu Arg Leu Leu Gln Ser Pro Thr Leu Asp Ser Glu
    1730                1735                1740

Phe Thr Ile Lys Asp Gly Phe Leu Gln Ile Ser Arg Val Val Glu
    1745                1750                1755

Tyr Tyr Thr Arg Asn Asp Ala Leu Ala Val Ser Leu Gly Arg Gln
    1760                1765                1770

Glu Pro Lys Thr Val His Met Pro Leu Ser Glu Thr Ser Ser Pro
    1775                1780                1785

Val Lys Leu Cys Ile Lys Asn Pro Gly Met Leu Asp Ser Leu Tyr
    1790                1795                1800

Phe Glu Pro Asp Asp Ile Leu Asn Ser Pro Leu Ala Ser Gly Gln
    1805                1810                1815

Val Glu Ile Glu Val Lys Ala Ser Gly Val Asn Phe Arg Asp Val
    1820                1825                1830

Met Val Cys Met Gly Gln Ile Pro Asp Ser Leu Leu Gly Phe Glu
    1835                1840                1845

Ala Ala Gly Ile Val Arg Arg Val Gly Glu Asn Val Gln Asn Ile
```

-continued

```
            1850                1855                1860
Lys Ala Gly Asp Arg Val Cys Phe Ile Ala His Gly Ser His Arg
            1865                1870                1875

Thr Val His Arg Val Arg Asn Glu Tyr Val Val His Ile Pro Asp
            1880                1885                1890

Glu Met Ser Phe Ala Glu Ala Ser Gly Val Leu Leu Val His Gly
            1895                1900                1905

Thr Ala Trp Tyr Gly Leu Val Lys Ile Ala Gln Ile Lys Ala Gly
            1910                1915                1920

Gln Thr Ile Leu Ile His Ala Ala Ala Gly Gly Val Gly Gln Ala
            1925                1930                1935

Ala Val Met Leu Ala Gln His Phe Gly Leu Glu Ile Phe Ala Thr
            1940                1945                1950

Val Gly Ser Asp Asp Lys Arg Gln Leu Ile Gln Asp Leu Tyr Lys
            1955                1960                1965

Ile Pro Glu Asp His Ile Phe Asn Ser Arg Asp Leu Ser Phe Ala
            1970                1975                1980

Lys Gly Val Leu Arg Met Thr Asn Gly Arg Gly Val Asp Val Ile
            1985                1990                1995

Leu Asn Ser Leu Ser Gly Glu Thr Leu Arg Gln Thr Trp His Cys
            2000                2005                2010

Val Ala Pro Phe Gly Thr Phe Ile Glu Ile Gly Ile Lys Asp Ile
            2015                2020                2025

Leu Ser Asn Thr Arg Leu Asp Met Arg Pro Phe Leu Gln Asp Ala
            2030                2035                2040

Arg Phe Ala Phe Phe Asn Leu Asn Arg Ile Glu Asn Glu Arg Pro
            2045                2050                2055

Asp Leu Met Ser Glu Ala Leu Asn Glu Ser Met Ala Phe Ile Ser
            2060                2065                2070

Ser Gly Ala Thr Arg Pro Val Ser Pro Leu Met Asn Phe Pro Val
            2075                2080                2085

Ser Gln Val Glu Asp Ala Phe Arg Leu Met Gln Thr Gly Lys His
            2090                2095                2100

Arg Gly Lys Leu Ser Leu Thr Tyr Ser Ser Ser Asp Val Val Pro
            2105                2110                2115

Ile Gln Ser Arg Pro Thr Arg Ser Ile Arg Leu Asp Glu Thr Ser
            2120                2125                2130

Ala Tyr Val Leu Val Gly Gly Leu Gly Gly Leu Gly Arg Ser Leu
            2135                2140                2145

Ala Gln Leu Phe Val Arg Leu Gly Cys Lys Lys Leu Cys Phe Leu
            2150                2155                2160

Ser Arg Ser Gly Gly Ala Ser Glu Lys Ala Gln Lys Leu Leu Lys
            2165                2170                2175

Asp Leu Gln Gln Gln Gly Val Lys Thr Leu Ala Leu Arg Cys Asp
            2180                2185                2190

Val Ser Asp Ala Gln Ser Val Lys Ala Ala Ile Asn Glu Cys Ala
            2195                2200                2205

Thr Arg Leu Gly Pro Val Leu Gly Val Val Gln Cys Ala Met Val
            2210                2215                2220

Leu Arg Asp Gly Leu Phe Glu Lys Met Thr His Gln Gln Trp Val
            2225                2230                2235

Glu Gly Thr Arg Pro Lys Val Gln Gly Ser Trp Asn Leu His Val
            2240                2245                2250
```

```
Asn Leu Pro Asn Val Asp Phe Phe Ile Ile Leu Ser   Ser Phe Ala
    2255                2260                2265

Gly Ile Phe Gly Ser Arg Gly Gln Ser Asn Tyr Thr   Ala Ala Gly
    2270                2275                2280

Ala Tyr Glu Asp Ala Leu Ala Asn Tyr Arg Arg Ser   Leu Gly Leu
    2285                2290                2295

Lys Ala Val Thr Val Asp Leu Gly Ile Met Arg Asp   Val Gly Val
    2300                2305                2310

Leu Ala Glu Gln Gly Ile Thr Asp Tyr Leu Arg Glu   Trp Glu Glu
    2315                2320                2325

Pro Cys Gly Ile Arg Glu Ala Glu Phe His Ala Leu   Met Glu Asn
    2330                2335                2340

Val Leu Thr Ser Glu Val Leu Gly Asp Gln Glu Pro   Leu Pro Ala
    2345                2350                2355

His Ile Pro Thr Gly Phe Ala Thr Ala Lys Thr Val   Gln Gln Phe
    2360                2365                2370

Gly Ile Thr Thr Pro Phe Tyr Phe Asp Asp Pro Arg   Phe Ser Ile
    2375                2380                2385

Leu Ser Ala Ala Gly Ser Ser Lys Thr Gly Ala Gly   Asp Ser Thr
    2390                2395                2400

Asp Ser Asn Lys Ala Ile Ser Val Gln Asn Gln Ile   Ala Gln Ser
    2405                2410                2415

Ile Ser Ile Ser Glu Ala Ala Ser Ala Val Thr Asn   Ala Leu Val
    2420                2425                2430

Ala Arg Val Ala Lys Ser Leu Gln Ser Ala Leu Ser   Asp Ile Asp
    2435                2440                2445

Pro Ser Arg Pro Leu His Ala Phe Gly Val Asp Ser   Leu Val Ala
    2450                2455                2460

Val Glu Val Val Asn Trp Val Phe Lys Glu Ile Lys   Ala Lys Val
    2465                2470                2475

Thr Val Phe Asp Val Leu Ser Ser Ile Pro Ile Thr   Ser Leu Ala
    2480                2485                2490

Glu Lys Ile Ala Leu Lys Ser Ser Leu Leu Pro Gln   Leu Thr
    2495                2500                2505

<210> SEQ ID NO 15
<211> LENGTH: 7809
<212> TYPE: DNA
<213> ORGANISM: Talaromyces islandicus
<220> FEATURE:
<221> NAME/KEY: CDS
<222> LOCATION: (1)..(7809)

<400> SEQUENCE: 15 atg gct ttg gat ttc gac tac atc att gtc ggc ggg ggc act gca gga      48
Met Ala Leu Asp Phe Asp Tyr Ile Ile Val Gly Gly Gly Thr Ala Gly
1               5                   10                  15 tgt gtt ctc gca agc cgc ctt tct gaa tac cta ccg gac gcc tct att      96
Cys Val Leu Ala Ser Arg Leu Ser Glu Tyr Leu Pro Asp Ala Ser Ile
                20                  25                  30 cta ttg atc gaa gcc ggt atc gag cat gac cct cgc gtg aaa cca acc     144
Leu Leu Ile Glu Ala Gly Ile Glu His Asp Pro Arg Val Lys Pro Thr
            35                  40                  45 ctt ggg ttg act ggc caa gca gcg aac gaa att aaa tgg aac ata cag     192
Leu Gly Leu Thr Gly Gln Ala Ala Asn Glu Ile Lys Trp Asn Ile Gln
        50                  55                  60
```

-continued

| | | | | | | | | | | | | | | | | |
|---|---|---|---|---|---|---|---|---|---|---|---|---|---|---|---|---|
| agt | gct | cct | caa | tct | gct | gtt | ggc | aac | aag | act | atc | gat | cta | gtg | cag | 240 |
| Ser | Ala | Pro | Gln | Ser | Ala | Val | Gly | Asn | Lys | Thr | Ile | Asp | Leu | Val | Gln | |
| 65 | | | | 70 | | | | | 75 | | | | | 80 | | |
| ggt | aaa | gtg | ctc | ggg | ggc | acc | tcc | ggt | att | aac | cac | caa | gta | tgg | tcc | 288 |
| Gly | Lys | Val | Leu | Gly | Gly | Thr | Ser | Gly | Ile | Asn | His | Gln | Val | Trp | Ser | |
| | | | | 85 | | | | | 90 | | | | | 95 | | |
| cgc | ggt | gca | gct | gga | gac | ttc | aat | cgc | tgg | gca | gca | gaa | gtt | ggc | gac | 336 |
| Arg | Gly | Ala | Ala | Gly | Asp | Phe | Asn | Arg | Trp | Ala | Ala | Glu | Val | Gly | Asp | |
| | | | | 100 | | | | | 105 | | | | | 110 | | |
| ccg | cga | tgg | tca | tgg | aat | gga | cag | ctc | ccc | ttc | ttc | aag | aac | acc | gag | 384 |
| Pro | Arg | Trp | Ser | Trp | Asn | Gly | Gln | Leu | Pro | Phe | Phe | Lys | Asn | Thr | Glu | |
| | | 115 | | | | | 120 | | | | | 125 | | | | |
| aca | ttc | cat | cca | ggg | gct | gac | cta | cag | ggc | aaa | gat | tta | agc | gcc | ctt | 432 |
| Thr | Phe | His | Pro | Gly | Ala | Asp | Leu | Gln | Gly | Lys | Asp | Leu | Ser | Ala | Leu | |
| | | 130 | | | | | 135 | | | | | 140 | | | | |
| cat | ggc | ttc | gat | ggt | cct | atc | aag | gtg | tct | caa | act | tca | tcc | tgt | gga | 480 |
| His | Gly | Phe | Asp | Gly | Pro | Ile | Lys | Val | Ser | Gln | Thr | Ser | Ser | Cys | Gly | |
| 145 | | | | 150 | | | | | 155 | | | | | 160 | | |
| cgc | ccg | cgc | aac | tac | cca | ctg | aaa | gga | gcc | att | gct | tcc | atg | tac | aag | 528 |
| Arg | Pro | Arg | Asn | Tyr | Pro | Leu | Lys | Gly | Ala | Ile | Ala | Ser | Met | Tyr | Lys | |
| | | | | 165 | | | | | 170 | | | | | 175 | | |
| agt | gcc | ggc | gta | tcc | caa | ggt | gaa | gat | ttg | aat | tct | gga | aat | att | ctt | 576 |
| Ser | Ala | Gly | Val | Ser | Gln | Gly | Glu | Asp | Leu | Asn | Ser | Gly | Asn | Ile | Leu | |
| | | | | 180 | | | | | 185 | | | | | 190 | | |
| ggc | ttc | agt | gaa | gca | acg | gcc | ggg | tcc | tac | gac | ggt | atc | cgg | caa | tgg | 624 |
| Gly | Phe | Ser | Glu | Ala | Thr | Ala | Gly | Ser | Tyr | Asp | Gly | Ile | Arg | Gln | Trp | |
| | | 195 | | | | | 200 | | | | | 205 | | | | |
| gcg | gga | gga | aac | tac | aaa | ttt | ggt | ccc | aac | gtg | act | ttg | tgg | acg | gaa | 672 |
| Ala | Gly | Gly | Asn | Tyr | Lys | Phe | Gly | Pro | Asn | Val | Thr | Leu | Trp | Thr | Glu | |
| | | 210 | | | | | 215 | | | | | 220 | | | | |
| acc | cat | gta | tca | aaa | atc | atc | tca | cag | ggt | tct | cga | gcc | acg | gga | gtc | 720 |
| Thr | His | Val | Ser | Lys | Ile | Ile | Ser | Gln | Gly | Ser | Arg | Ala | Thr | Gly | Val | |
| 225 | | | | 230 | | | | | 235 | | | | | 240 | | |
| gag | tac | ttg | cgg | cct | gac | aga | agc | act | agt | tcc | tca | gta | tca | gct | aaa | 768 |
| Glu | Tyr | Leu | Arg | Pro | Asp | Arg | Ser | Thr | Ser | Ser | Ser | Val | Ser | Ala | Lys | |
| | | | | 245 | | | | | 250 | | | | | 255 | | |
| aaa | gaa | gtc | atc | gtc | tca | agc | ggt | gct | cag | ggc | tca | ccc | aag | cta | cta | 816 |
| Lys | Glu | Val | Ile | Val | Ser | Ser | Gly | Ala | Gln | Gly | Ser | Pro | Lys | Leu | Leu | |
| | | | | 260 | | | | | 265 | | | | | 270 | | |
| ctg | tta | agt | gga | att | gga | ccc | tcg | gca | gag | cta | caa | aag | cat | agc | att | 864 |
| Leu | Leu | Ser | Gly | Ile | Gly | Pro | Ser | Ala | Glu | Leu | Gln | Lys | His | Ser | Ile | |
| | | 275 | | | | | 280 | | | | | 285 | | | | |
| cag | caa | gta | gtc | gaa | ctc | cct | gtg | ggg | gaa | aac | tac | agc | gac | cac | ccc | 912 |
| Gln | Gln | Val | Val | Glu | Leu | Pro | Val | Gly | Glu | Asn | Tyr | Ser | Asp | His | Pro | |
| | | 290 | | | | | 295 | | | | | 300 | | | | |
| atg | atg | gca | aca | tac | tgg | aac | cta | gaa | aag | cgc | ggt | ctg | gct | ctt | ggt | 960 |
| Met | Met | Ala | Thr | Tyr | Trp | Asn | Leu | Glu | Lys | Arg | Gly | Leu | Ala | Leu | Gly | |
| 305 | | | | 310 | | | | | 315 | | | | | 320 | | |
| gat | gtt | gaa | atg | cgt | tca | gct | gaa | tgc | gat | tgg | act | tct | ggg | ttg | ccg | 1008 |
| Asp | Val | Glu | Met | Arg | Ser | Ala | Glu | Cys | Asp | Trp | Thr | Ser | Gly | Leu | Pro | |
| | | | | 325 | | | | | 330 | | | | | 335 | | |
| gtt | gac | tgg | ttg | gca | ttc | cac | cgt | cac | gat | caa | gac | cca | acc | att | gct | 1056 |
| Val | Asp | Trp | Leu | Ala | Phe | His | Arg | His | Asp | Gln | Asp | Pro | Thr | Ile | Ala | |
| | | | | 340 | | | | | 345 | | | | | 350 | | |
| gca | ttg | gct | gag | agc | cag | tta | agc | tca | aat | gaa | ttg | gaa | cgc | ttt | cag | 1104 |
| Ala | Leu | Ala | Glu | Ser | Gln | Leu | Ser | Ser | Asn | Glu | Leu | Glu | Arg | Phe | Gln | |
| | | 355 | | | | | 360 | | | | | 365 | | | | |
| gag | caa | aat | agg | gct | cac | act | gag | tct | gtg | gtc | tta | tac | ggt | cat | att | 1152 |
| Glu | Gln | Asn | Arg | Ala | His | Thr | Glu | Ser | Val | Val | Leu | Tyr | Gly | His | Ile | |
| | | 370 | | | | | 375 | | | | | 380 | | | | |

```
gac ttc tcg ggc aag gcg ggc cct cca cct cca gga tct aac gtg tgt    1200
Asp Phe Ser Gly Lys Ala Gly Pro Pro Pro Pro Gly Ser Asn Val Cys
385                 390                 395                 400 gta atg aac att cta gtc act cca tcg tct cgg gga aca gtg acg ctc    1248
Val Met Asn Ile Leu Val Thr Pro Ser Ser Arg Gly Thr Val Thr Leu
                405                 410                 415 aaa tcc acc aat cca ttc gat gca cct gtg tgt gac ccg aac atg tta    1296
Lys Ser Thr Asn Pro Phe Asp Ala Pro Val Cys Asp Pro Asn Met Leu
            420                 425                 430 tcc aac gaa ctc gat aag caa ctt ctt tgg tct gtg acc cgt ttg aca    1344
Ser Asn Glu Leu Asp Lys Gln Leu Leu Trp Ser Val Thr Arg Leu Thr
        435                 440                 445 agc caa ggt ctt gag cga act att tct cca gag tac gga ctt tct gag    1392
Ser Gln Gly Leu Glu Arg Thr Ile Ser Pro Glu Tyr Gly Leu Ser Glu
    450                 455                 460 tat gcc att gat gac gat tta cgc ggt gac tac ggc gat gag gcc atg    1440
Tyr Ala Ile Asp Asp Asp Leu Arg Gly Asp Tyr Gly Asp Glu Ala Met
465                 470                 475                 480 atg cga cgt gct gtc cga att gtt cgc acc gtg aat cat gga agt ggt    1488
Met Arg Arg Ala Val Arg Ile Val Arg Thr Val Asn His Gly Ser Gly
                485                 490                 495 aca tgc tca atg ggc act gtc gtt gac aca gag tgt cga gta aag ggc    1536
Thr Cys Ser Met Gly Thr Val Val Asp Thr Glu Cys Arg Val Lys Gly
            500                 505                 510 gtt gag ggc ttg cga gta gtc gac tcc agc gtc att cct ctt cca ctc    1584
Val Glu Gly Leu Arg Val Val Asp Ser Ser Val Ile Pro Leu Pro Leu
        515                 520                 525 tgc gcg cac tac cag gcg tct gtg tac gca ttg gcg gaa cag gat cag    1632
Cys Ala His Tyr Gln Ala Ser Val Tyr Ala Leu Ala Glu Gln Asp Gln
    530                 535                 540 aca gag cag ttc ctc ctc cta tat gga gat cag acg gta gag aag ctg    1680
Thr Glu Gln Phe Leu Leu Leu Tyr Gly Asp Gln Thr Val Glu Lys Leu
545                 550                 555                 560 cct gct gtt cgg gct ctt gta gaa cat gcc cag agg tcg ccg gct ggt    1728
Pro Ala Val Arg Ala Leu Val Glu His Ala Gln Arg Ser Pro Ala Gly
                565                 570                 575 cgt cgt ttt ctc cgc gat gcg tgc gat atc att caa ata gaa ata ttc    1776
Arg Arg Phe Leu Arg Asp Ala Cys Asp Ile Ile Gln Ile Glu Ile Phe
            580                 585                 590 agc ctt gat aca gat gag aga gct cac gtc ggg cat ttt gat act ctg    1824
Ser Leu Asp Thr Asp Glu Arg Ala His Val Gly His Phe Asp Thr Leu
        595                 600                 605 ttg cag ctg gca gaa agt aat gcc cag gct gac cag ccc agt gag atc    1872
Leu Gln Leu Ala Glu Ser Asn Ala Gln Ala Asp Gln Pro Ser Glu Ile
    610                 615                 620 gtg gct aca att ctc atg aac gtg acc cga ctg gga gag ttt att ctt    1920
Val Ala Thr Ile Leu Met Asn Val Thr Arg Leu Gly Glu Phe Ile Leu
625                 630                 635                 640 tac gca gaa gaa cac cca aac gtc tta ggc tct ata gag caa ccg aca    1968
Tyr Ala Glu Glu His Pro Asn Val Leu Gly Ser Ile Glu Gln Pro Thr
                645                 650                 655 cat att gtt gct ttt tgc aca gga gaa att ccg gca gct gtg gca gca    2016
His Ile Val Ala Phe Cys Thr Gly Glu Ile Pro Ala Ala Val Ala Ala
            660                 665                 670 gcc gcg cgc gat agc atc gaa tta tat aat ttg tca atc gag aca gtc    2064
Ala Ala Arg Asp Ser Ile Glu Leu Tyr Asn Leu Ser Ile Glu Thr Val
        675                 680                 685 cgc ata ata tgt cgt ttt gcg cgg aac atc atc cgt cgg tcg gtc cta    2112
Arg Ile Ile Cys Arg Phe Ala Arg Asn Ile Ile Arg Arg Ser Val Leu
```

-continued

| | | |
|---|---|---|
| gta gac agg act aat ggt agc tgg gcg acc acc atc gtt ggt gtt tcg<br>Val Asp Arg Thr Asn Gly Ser Trp Ala Thr Thr Ile Val Gly Val Ser<br>705                        710                      715                   720 | 2160 |
| ccc gga cga gtt cag acc ata ctt gac act ttt cac cag agt cag aat<br>Pro Gly Arg Val Gln Thr Ile Leu Asp Thr Phe His Gln Ser Gln Asn<br>                  725                     730                     735 | 2208 |
| att gct cct aca aga caa atc aac atc ggc atc atg gca gca ggt tgg<br>Ile Ala Pro Thr Arg Gln Ile Asn Ile Gly Ile Met Ala Ala Gly Trp<br>             740                     745                     750 | 2256 |
| cta aca ctt ttc ggg cct cct atc act aca gaa caa ctt ttt aac tgg<br>Leu Thr Leu Phe Gly Pro Pro Ile Thr Thr Glu Gln Leu Phe Asn Trp<br>          755                     760                     765 | 2304 |
| tct aag gag ctt gat ggg gca tct cgc atc aag aca gat gct ggc ggt<br>Ser Lys Glu Leu Asp Gly Ala Ser Arg Ile Lys Thr Asp Ala Gly Gly<br>770                        775                      780 | 2352 |
| ggt gtt cat ctt ccc aat ctc ccc gag cta gac ttg gat gag gtc gta<br>Gly Val His Leu Pro Asn Leu Pro Glu Leu Asp Leu Asp Glu Val Val<br>785                        790                     795                   800 | 2400 |
| gga tta tca ccg ctt tta gat gtc cct att acc ccc aag gcg agg ctt<br>Gly Leu Ser Pro Leu Leu Asp Val Pro Ile Thr Pro Lys Ala Arg Leu<br>                  805                     810                     815 | 2448 |
| tgg tca ccg tac agt tgc gag att cgc aat gca gca acc ctc aga gat<br>Trp Ser Pro Tyr Ser Cys Glu Ile Arg Asn Ala Ala Thr Leu Arg Asp<br>             820                     825                     830 | 2496 |
| tta atc cgt cag gtc atc cca gat atc acc caa tac tca cta cga tta<br>Leu Ile Arg Gln Val Ile Pro Asp Ile Thr Gln Tyr Ser Leu Arg Leu<br>          835                     840                     845 | 2544 |
| agt gat acc ata gag acg gcc gtt aaa ggg cta agc aat gga tca gtc<br>Ser Asp Thr Ile Glu Thr Ala Val Lys Gly Leu Ser Asn Gly Ser Val<br>850                        855                      860 | 2592 |
| aag gtt gtc tgc gtt ggt tat act gct cac ctg ata tct ctg cag aaa<br>Lys Val Val Cys Val Gly Tyr Thr Ala His Leu Ile Ser Leu Gln Lys<br>865                        870                     875                   880 | 2640 |
| tca ctg cag cgc gaa aga cgc gag gcc act gtc tta caa cat tcc agc<br>Ser Leu Gln Arg Glu Arg Arg Glu Ala Thr Val Leu Gln His Ser Ser<br>                  885                     890                     895 | 2688 |
| gca ggt tca aca ttt ttc aca tcg ccg cgc gga ggc tcg gag tcc att<br>Ala Gly Ser Thr Phe Phe Thr Ser Pro Arg Gly Gly Ser Glu Ser Ile<br>             900                     905                     910 | 2736 |
| gct att gta gga atg tct gga aga ttt cct ggt agc gac aat ata caa<br>Ala Ile Val Gly Met Ser Gly Arg Phe Pro Gly Ser Asp Asn Ile Gln<br>          915                     920                     925 | 2784 |
| gag tat tgg caa tcc ctg ttg gat gga gaa agg cat att aaa gag atc<br>Glu Tyr Trp Gln Ser Leu Leu Asp Gly Glu Arg His Ile Lys Glu Ile<br>930                        935                     940 | 2832 |
| cct aaa aac cgg ttc gac ttg agc aaa tgg tac gat gag acc gga aaa<br>Pro Lys Asn Arg Phe Asp Leu Ser Lys Trp Tyr Asp Glu Thr Gly Lys<br>945                        950                     955                   960 | 2880 |
| cag aaa aac gcc acg atg aat cgc tcg ggc gcg ttt tta gat cga ccc<br>Gln Lys Asn Ala Thr Met Asn Arg Ser Gly Ala Phe Leu Asp Arg Pro<br>                  965                     970                     975 | 2928 |
| ggt tac ttt gac aac cgg ttg ttc aat atg tca ccc cgg gaa gcc ctt<br>Gly Tyr Phe Asp Asn Arg Leu Phe Asn Met Ser Pro Arg Glu Ala Leu<br>             980                     985                     990 | 2976 |
| cag acc gat cct ctt cat cgt atg  ttc ctc acc gtg agc  tat gag gct<br>Gln Thr Asp Pro Leu His Arg Met  Phe Leu Thr Val Ser  Tyr Glu Ala<br>          995                     1000                   1005 | 3024 |
| ctc gag  atg gca ggc tat tct  cca gag gca aca ttg  gca aca aac | 3069 |

| | | | | | | | | | | | | |
|---|---|---|---|---|---|---|---|---|---|---|---|---|
| Leu | Glu | Met | Ala | Gly | Tyr | Ser | Pro | Glu | Ala | Thr | Leu | Ala | Thr | Asn |
| | 1010 | | | | | 1015 | | | | 1020 | | | | |

| agt | aac | cgc | atc | gca | acc | tat | ttt | ggt | caa | aca | tca | gat | gac | tgg | 3114 |
|---|---|---|---|---|---|---|---|---|---|---|---|---|---|---|---|
| Ser | Asn | Arg | Ile | Ala | Thr | Tyr | Phe | Gly | Gln | Thr | Ser | Asp | Asp | Trp | |
| 1025 | | | | | 1030 | | | | | 1035 | | | | | |

| aga | gac | att | gtg | ctt | acc | cag | ggc | gtg | gat | ata | tac | tac | gct | ccg | 3159 |
| Arg | Asp | Ile | Val | Leu | Thr | Gln | Gly | Val | Asp | Ile | Tyr | Tyr | Ala | Pro | |
| 1040 | | | | | 1045 | | | | | 1050 | | | | | |

| ggt | att | tgc | cgt | gcc | ttt | gca | cct | ggt | cgt | ctc | aac | tat | cac | ttt | 3204 |
| Gly | Ile | Cys | Arg | Ala | Phe | Ala | Pro | Gly | Arg | Leu | Asn | Tyr | His | Phe | |
| 1055 | | | | | 1060 | | | | | 1065 | | | | | |

| aag | tgg | gga | ggg | cca | tcg | tat | agt | gtt | gat | gca | gct | tgc | gca | tcg | 3249 |
| Lys | Trp | Gly | Gly | Pro | Ser | Tyr | Ser | Val | Asp | Ala | Ala | Cys | Ala | Ser | |
| 1070 | | | | | 1075 | | | | | 1080 | | | | | |

| agc | atc | gcc | aca | att | tcc | ctg | gct | tgt | tct | gcc | ttg | ctg | gct | cgc | 3294 |
| Ser | Ile | Ala | Thr | Ile | Ser | Leu | Ala | Cys | Ser | Ala | Leu | Leu | Ala | Arg | |
| 1085 | | | | | 1090 | | | | | 1095 | | | | | |

| gaa | tgc | gac | acc | gct | ctc | gca | ggt | gga | ggc | tcc | att | ctt | gac | tct | 3339 |
| Glu | Cys | Asp | Thr | Ala | Leu | Ala | Gly | Gly | Gly | Ser | Ile | Leu | Asp | Ser | |
| 1100 | | | | | 1105 | | | | | 1110 | | | | | |

| cct | gca | cca | ttt | gct | ggt | tta | agc | cga | ggt | ggc | ttt | ctc | tcc | ccg | 3384 |
| Pro | Ala | Pro | Phe | Ala | Gly | Leu | Ser | Arg | Gly | Gly | Phe | Leu | Ser | Pro | |
| 1115 | | | | | 1120 | | | | | 1125 | | | | | |

| gag | aaa | ggt | tgt | gaa | act | ttc | cat | gac | gat | gct | gat | ggt | tac | gtg | 3429 |
| Glu | Lys | Gly | Cys | Glu | Thr | Phe | His | Asp | Asp | Ala | Asp | Gly | Tyr | Val | |
| 1130 | | | | | 1135 | | | | | 1140 | | | | | |

| cgt | ggc | gaa | ggc | gtg | ggt | gtc | gtt | gtt | ctt | aag | cgg | ctc | gaa | gat | 3474 |
| Arg | Gly | Glu | Gly | Val | Gly | Val | Val | Val | Leu | Lys | Arg | Leu | Glu | Asp | |
| 1145 | | | | | 1150 | | | | | 1155 | | | | | |

| gct | gtt | gcg | gat | aac | gac | aac | atc | cta | ggt | gtc | atc | cgc | gga | tca | 3519 |
| Ala | Val | Ala | Asp | Asn | Asp | Asn | Ile | Leu | Gly | Val | Ile | Arg | Gly | Ser | |
| 1160 | | | | | 1165 | | | | | 1170 | | | | | |

| gcg | aga | aac | tat | agc | aag | gga | gct | tct | tct | att | aca | cat | cca | tct | 3564 |
| Ala | Arg | Asn | Tyr | Ser | Lys | Gly | Ala | Ser | Ser | Ile | Thr | His | Pro | Ser | |
| 1175 | | | | | 1180 | | | | | 1185 | | | | | |

| tcg | gaa | gcg | cag | cag | cgt | ctc | tat | cgg | cag | gtc | ttg | aat | cag | aat | 3609 |
| Ser | Glu | Ala | Gln | Gln | Arg | Leu | Tyr | Arg | Gln | Val | Leu | Asn | Gln | Asn | |
| 1190 | | | | | 1195 | | | | | 1200 | | | | | |

| gcc | ata | gac | gcg | gcg | agt | gtt | tcc | tat | gtg | gaa | atg | cac | ggc | acc | 3654 |
| Ala | Ile | Asp | Ala | Ala | Ser | Val | Ser | Tyr | Val | Glu | Met | His | Gly | Thr | |
| 1205 | | | | | 1210 | | | | | 1215 | | | | | |

| gga | aca | caa | gcc | ggt | gac | tct | aca | gag | atg | tcc | tca | gta | ttg | tct | 3699 |
| Gly | Thr | Gln | Ala | Gly | Asp | Ser | Thr | Glu | Met | Ser | Ser | Val | Leu | Ser | |
| 1220 | | | | | 1225 | | | | | 1230 | | | | | |

| aca | ttt | ggt | caa | tct | cgt | tcc | aaa | gat | aac | cca | ctg | gtt | gtc | ggc | 3744 |
| Thr | Phe | Gly | Gln | Ser | Arg | Ser | Lys | Asp | Asn | Pro | Leu | Val | Val | Gly | |
| 1235 | | | | | 1240 | | | | | 1245 | | | | | |

| gct | gtt | aag | gca | aat | att | ggt | cat | gga | gaa | gcc | gct | gct | ggt | gtt | 3789 |
| Ala | Val | Lys | Ala | Asn | Ile | Gly | His | Gly | Glu | Ala | Ala | Ala | Gly | Val | |
| 1250 | | | | | 1255 | | | | | 1260 | | | | | |

| tgt | gcc | ctc | atc | aag | acc | ttg | atg | atg | ttt | cag | aag | cat | acc | atc | 3834 |
| Cys | Ala | Leu | Ile | Lys | Thr | Leu | Met | Met | Phe | Gln | Lys | His | Thr | Ile | |
| 1265 | | | | | 1270 | | | | | 1275 | | | | | |

| cca | ccg | caa | cct | gga | atg | cct | ttt | aaa | ctt | aat | cat | cat | ttc | ccc | 3879 |
| Pro | Pro | Gln | Pro | Gly | Met | Pro | Phe | Lys | Leu | Asn | His | His | Phe | Pro | |
| 1280 | | | | | 1285 | | | | | 1290 | | | | | |

| gat | ctg | gag | aag | atg | aac | gtg | cat | ata | cca | gca | act | gca | att | ccg | 3924 |
| Asp | Leu | Glu | Lys | Met | Asn | Val | His | Ile | Pro | Ala | Thr | Ala | Ile | Pro | |
| 1295 | | | | | 1300 | | | | | 1305 | | | | | |

```
cta acg agt gct agt aac gcc gcc aaa cga agg atc ttt ctc aac      3969
Leu Thr Ser Ala Ser Asn Ala Ala Lys Arg Arg Ile Phe Leu Asn
1310                1315                    1320 agc ttc gat gcc tct ggg ggg aac tct tgc ctt cta tta gag gag      4014
Ser Phe Asp Ala Ser Gly Gly Asn Ser Cys Leu Leu Leu Glu Glu
    1325                1330                    1335 gcg cct cta aag cac tcc aag gct agt gat ccc cga aat cac cac      4059
Ala Pro Leu Lys His Ser Lys Ala Ser Asp Pro Arg Asn His His
1340                1345                    1350 gtc gtg acc ttt tct gct cga act ccc ttc tct ctt cga gca att      4104
Val Val Thr Phe Ser Ala Arg Thr Pro Phe Ser Leu Arg Ala Ile
    1355                1360                    1365 aaa gaa aaa tac ctt caa tat att cgg ctc aac ccg aat aca tcg      4149
Lys Glu Lys Tyr Leu Gln Tyr Ile Arg Leu Asn Pro Asn Thr Ser
1370                1375                    1380 ctg gct gat ctt gcc tac acc acg act gca cgc cgc atg cac caa      4194
Leu Ala Asp Leu Ala Tyr Thr Thr Thr Ala Arg Arg Met His Gln
    1385                1390                    1395 agc tcg gcc cgg tca aca ttt acc gct acg agt atc gaa gat ttt      4239
Ser Ser Ala Arg Ser Thr Phe Thr Ala Thr Ser Ile Glu Asp Phe
1400                1405                    1410 gcc aat aag ctt gaa act gac ttg aag aaa gaa gat tcc cct gtc      4284
Ala Asn Lys Leu Glu Thr Asp Leu Lys Lys Glu Asp Ser Pro Val
    1415                1420                    1425 aaa aag agt aag ggg gct tct agt ggg cct aac gtt gta ttt gct      4329
Lys Lys Ser Lys Gly Ala Ser Ser Gly Pro Asn Val Val Phe Ala
1430                1435                    1440 ttt acc ggt cag ggg tcc cag tat gca ggg atg gct cat caa ctc      4374
Phe Thr Gly Gln Gly Ser Gln Tyr Ala Gly Met Ala His Gln Leu
    1445                1450                    1455 tgg cac gac agt gcg gta ttc cgg cgg cta ata gac tcg atc caa      4419
Trp His Asp Ser Ala Val Phe Arg Arg Leu Ile Asp Ser Ile Gln
1460                1465                    1470 tcc ata gcg act gct ttg gat ttg cct aag ttt gtt gac ctg att      4464
Ser Ile Ala Thr Ala Leu Asp Leu Pro Lys Phe Val Asp Leu Ile
    1475                1480                    1485 gct tcc caa agc ttc gat ttg tct aaa gcc agc cca att cag aca      4509
Ala Ser Gln Ser Phe Asp Leu Ser Lys Ala Ser Pro Ile Gln Thr
1490                1495                    1500 caa cta gct ata gtg gcg ctt gaa att ggc ctg gct cag cta tgg      4554
Gln Leu Ala Ile Val Ala Leu Glu Ile Gly Leu Ala Gln Leu Trp
    1505                1510                    1515 gca tca tgg gga gtg cag cca agc ctt gtc att ggc cac agc ttg      4599
Ala Ser Trp Gly Val Gln Pro Ser Leu Val Ile Gly His Ser Leu
1520                1525                    1530 gga gag tat gct gca tta tgc ata tca ggg gtt ctg acg gtc agc      4644
Gly Glu Tyr Ala Ala Leu Cys Ile Ser Gly Val Leu Thr Val Ser
    1535                1540                    1545 gat act ctc tat cta gtc gga aag agg gca atg atg tta gtt gag      4689
Asp Thr Leu Tyr Leu Val Gly Lys Arg Ala Met Met Leu Val Glu
1550                1555                    1560 tct gtt gcg caa aac gaa tac gcc atg ctg gca atc aat gat gaa      4734
Ser Val Ala Gln Asn Glu Tyr Ala Met Leu Ala Ile Asn Asp Glu
    1565                1570                    1575 gtt gat atc att cgt cag cgc ctc gca aca gac gca tat aat aca      4779
Val Asp Ile Ile Arg Gln Arg Leu Ala Thr Asp Ala Tyr Asn Thr
1580                1585                    1590 tgt gag atc gca tgc atc aac gca ccc aaa tcg acc gtg gta agt      4824
Cys Glu Ile Ala Cys Ile Asn Ala Pro Lys Ser Thr Val Val Ser
    1595                1600                    1605
```

```
ggc gct cta tca gaa atc aaa atc atg caa aag gag tta gag gaa    4869
Gly Ala Leu Ser Glu Ile Lys Ile Met Gln Lys Glu Leu Glu Glu
1610            1615                1620 caa ggg tat cgg tcc act ctt ctc cat gta cca ttc gga ttc cac    4914
Gln Gly Tyr Arg Ser Thr Leu Leu His Val Pro Phe Gly Phe His
1625            1630                1635 tcg aag caa atg gac cca atc cta gat tcg tac gag tcg tgt gta    4959
Ser Lys Gln Met Asp Pro Ile Leu Asp Ser Tyr Glu Ser Cys Val
1640            1645                1650 cag gga gtt ggt att tca tcc cct cgg gtt cca ata gca tcc act    5004
Gln Gly Val Gly Ile Ser Ser Pro Arg Val Pro Ile Ala Ser Thr
1655            1660                1665 ctc cta ggt gat att att cag gac aag tca acg gtt tct tct gtc    5049
Leu Leu Gly Asp Ile Ile Gln Asp Lys Ser Thr Val Ser Ser Val
1670            1675                1680 tac ctt aga cga cag acc cga gaa tct gtt aat ttt gtc gga gct    5094
Tyr Leu Arg Arg Gln Thr Arg Glu Ser Val Asn Phe Val Gly Ala
1685            1690                1695 cta caa gcg gca cag gtc tcc aat ttc ctg cgg gat gac aca ctc    5139
Leu Gln Ala Ala Gln Val Ser Asn Phe Leu Arg Asp Asp Thr Leu
1700            1705                1710 ttt ctc gag atg ggg ccc gat cca gtt tgt atg tcg ttg gtt cgc    5184
Phe Leu Glu Met Gly Pro Asp Pro Val Cys Met Ser Leu Val Arg
1715            1720                1725 tca act ctg ggg aca att gca acg cct cga ctt cta cct gcc ctt    5229
Ser Thr Leu Gly Thr Ile Ala Thr Pro Arg Leu Leu Pro Ala Leu
1730            1735                1740 cgc cgg aac gaa aac aat tgg ttg acc acg tca aat aca cta gca    5274
Arg Arg Asn Glu Asn Asn Trp Leu Thr Thr Ser Asn Thr Leu Ala
1745            1750                1755 gca gtc cac cag gcc ggt gtg ccc gtc aac tgg cca gac tat cac    5319
Ala Val His Gln Ala Gly Val Pro Val Asn Trp Pro Asp Tyr His
1760            1765                1770 cgg gag ttt aca aac tgt ctc aca ctg cta gat ttg ccc aca tat    5364
Arg Glu Phe Thr Asn Cys Leu Thr Leu Leu Asp Leu Pro Thr Tyr
1775            1780                1785 gtg ttt gat gaa aag gag ttc tgg aca tca tac ccg gac ccc gag    5409
Val Phe Asp Glu Lys Glu Phe Trp Thr Ser Tyr Pro Asp Pro Glu
1790            1795                1800 cag cta agt ggt gtt gag caa aag cat ttg tca cca cca cca gtt    5454
Gln Leu Ser Gly Val Glu Gln Lys His Leu Ser Pro Pro Pro Val
1805            1810                1815 cct gca gta cag gga ttc ccc aca aca act ctt caa agg cta acc    5499
Pro Ala Val Gln Gly Phe Pro Thr Thr Thr Leu Gln Arg Leu Thr
1820            1825                1830 caa gaa gca ttc gag gac ggt aaa atc tcg gtc act ttc gag tcc    5544
Gln Glu Ala Phe Glu Asp Gly Lys Ile Ser Val Thr Phe Glu Ser
1835            1840                1845 agc aca tct gat cct cac ctt ttt gaa gcg ata atg ggc cat gct    5589
Ser Thr Ser Asp Pro His Leu Phe Glu Ala Ile Met Gly His Ala
1850            1855                1860 gtg gcc gga gtc acg att tgt tcc agt agt atc ttc agc gac atg    5634
Val Ala Gly Val Thr Ile Cys Ser Ser Ser Ile Phe Ser Asp Met
1865            1870                1875 gca tta tcg gcc gct cgg tac acg tgc gaa cgg cta cag cca ggc    5679
Ala Leu Ser Ala Ala Arg Tyr Thr Cys Glu Arg Leu Gln Pro Gly
1880            1885                1890 agg tgg tct gaa gag cta ctt acc atc agc ggc ctg gat att cag    5724
Arg Trp Ser Glu Glu Leu Leu Thr Ile Ser Gly Leu Asp Ile Gln
```

|  |  |  |  |  |  |  |  |  |  |  |  |  |
|---|---|---|---|---|---|---|---|---|---|---|---|---|
| | 1895 | | | | 1900 | | | | | 1905 | | |
| cgg | cca | ata | gtg | gtc | ctt | gat | cga | aaa | gac | tca | cat | atc att cag | 5769 |
| Arg | Pro | Ile | Val | Val | Leu | Asp | Arg | Lys | Asp | Ser | His | Ile Ile Gln |
| | 1910 | | | | 1915 | | | | | 1920 | | |
| atc | aac | gct | aaa | ctt | gat | gca | aaa | acc | gaa | gag | gtt | tat atc agc | 5814 |
| Ile | Asn | Ala | Lys | Leu | Asp | Ala | Lys | Thr | Glu | Glu | Val | Tyr Ile Ser |
| | 1925 | | | | 1930 | | | | | 1935 | | |
| ttt | caa | gac | cag | gtt | ggg | aaa | ccc | ata | ggg | tcc | tgc | aag atc tca | 5859 |
| Phe | Gln | Asp | Gln | Val | Gly | Lys | Pro | Ile | Gly | Ser | Cys | Lys Ile Ser |
| | 1940 | | | | 1945 | | | | | 1950 | | |
| ttt | cac | gac | gct | gcg | agc | tgg | aag | cag | aac | atc | tcg | cgt att ctg | 5904 |
| Phe | His | Asp | Ala | Ala | Ser | Trp | Lys | Gln | Asn | Ile | Ser | Arg Ile Leu |
| | 1955 | | | | 1960 | | | | | 1965 | | |
| tat | ctt | gtc | tct | ttc | agg | att | gat | gta | cta | aaa | gag | gca act atc | 5949 |
| Tyr | Leu | Val | Ser | Phe | Arg | Ile | Asp | Val | Leu | Lys | Glu | Ala Thr Ile |
| | 1970 | | | | 1975 | | | | | 1980 | | |
| act | ggt | caa | gga | cat | cga | ttc | ttg | cgg | cca | gtg | atc | tac cga ctc | 5994 |
| Thr | Gly | Gln | Gly | His | Arg | Phe | Leu | Arg | Pro | Val | Ile | Tyr Arg Leu |
| | 1985 | | | | 1990 | | | | | 1995 | | |
| ttc | tcc | aat | gtc | gtg | aat | tat | ggg | gaa | cgt | ttt | caa | ggg tta gaa | 6039 |
| Phe | Ser | Asn | Val | Val | Asn | Tyr | Gly | Glu | Arg | Phe | Gln | Gly Leu Glu |
| | 2000 | | | | 2005 | | | | | 2010 | | |
| gag | gtt | ttc | ctc | gat | tcc | gag | tgt | aac | gat | gtt | gtt | ggt caa gtt | 6084 |
| Glu | Val | Phe | Leu | Asp | Ser | Glu | Cys | Asn | Asp | Val | Val | Gly Gln Val |
| | 2015 | | | | 2020 | | | | | 2025 | | |
| aga | ctt | ccg | gac | ttg | cca | tcc | agt | aaa | tca | gga | cat | ttc cta tat | 6129 |
| Arg | Leu | Pro | Asp | Leu | Pro | Ser | Ser | Lys | Ser | Gly | His | Phe Leu Tyr |
| | 2030 | | | | 2035 | | | | | 2040 | | |
| agc | ccc | tat | tta | ctt | gat | gcc | gtt | gta | cat | gtt | gcc | ggc ttc ctg | 6174 |
| Ser | Pro | Tyr | Leu | Leu | Asp | Ala | Val | Val | His | Val | Ala | Gly Phe Leu |
| | 2045 | | | | 2050 | | | | | 2055 | | |
| gtc | aac | tgc | ggc | ttg | aaa | tat | ccc | gag | gat | ata | ggg | ttc ctg gct | 6219 |
| Val | Asn | Cys | Gly | Leu | Lys | Tyr | Pro | Glu | Asp | Ile | Gly | Phe Leu Ala |
| | 2060 | | | | 2065 | | | | | 2070 | | |
| tcc | agc | ttc | gaa | tcc | tgg | cac | ata | ttg | aag | cct | atc | tta cct aat | 6264 |
| Ser | Ser | Phe | Glu | Ser | Trp | His | Ile | Leu | Lys | Pro | Ile | Leu Pro Asn |
| | 2075 | | | | 2080 | | | | | 2085 | | |
| aaa | act | tac | act | agc | tat | tcc | cac | atg | gaa | gaa | tca | tct aac gga | 6309 |
| Lys | Thr | Tyr | Thr | Ser | Tyr | Ser | His | Met | Glu | Glu | Ser | Ser Asn Gly |
| | 2090 | | | | 2095 | | | | | 2100 | | |
| tcc | tct | ttg | ttg | gga | gac | gtg | tac | gtc | ttt | gat | ggg | aaa gat ctg | 6354 |
| Ser | Ser | Leu | Leu | Gly | Asp | Val | Tyr | Val | Phe | Asp | Gly | Lys Asp Leu |
| | 2105 | | | | 2110 | | | | | 2115 | | |
| gtc | ggc | tca | cta | act | gga | ctc | cgc | ttt | caa | aag | atg | aaa aag att | 6399 |
| Val | Gly | Ser | Leu | Thr | Gly | Leu | Arg | Phe | Gln | Lys | Met | Lys Lys Ile |
| | 2120 | | | | 2125 | | | | | 2130 | | |
| gct | ctc | aca | aga | att | ttg | caa | tcg | gca | gcc | cct | cac | tct tct atg | 6444 |
| Ala | Leu | Thr | Arg | Ile | Leu | Gln | Ser | Ala | Ala | Pro | His | Ser Ser Met |
| | 2135 | | | | 2140 | | | | | 2145 | | |
| aaa | ata | ggc | gca | gga | gtc | ttt | cga | cca | gat | ctt | ctt | ggg tca agt | 6489 |
| Lys | Ile | Gly | Ala | Gly | Val | Phe | Arg | Pro | Asp | Leu | Leu | Gly Ser Ser |
| | 2150 | | | | 2155 | | | | | 2160 | | |
| gaa | aaa | cag | tct | tca | aga | aat | aag | cag | ttg | gct | agg | gat gtt gat | 6534 |
| Glu | Lys | Gln | Ser | Ser | Arg | Asn | Lys | Gln | Leu | Ala | Arg | Asp Val Asp |
| | 2165 | | | | 2170 | | | | | 2175 | | |
| ttc | gat | aca | cta | cct | tca | tcg | gtc | gag | ccg | tct | gct | ttc acc act | 6579 |
| Phe | Asp | Thr | Leu | Pro | Ser | Ser | Val | Glu | Pro | Ser | Ala | Phe Thr Thr |
| | 2180 | | | | 2185 | | | | | 2190 | | |
| ccc | aaa | cct | tcg | tca | tct | gtc | acc | tct | atc | ata | ggt | cat gat gaa | 6624 |

-continued

|     |     |     |     |     |     |     |     |     |     |     |     |     |
|---|---|---|---|---|---|---|---|---|---|---|---|---|
| Pro | Lys | Pro | Ser | Ser | Ser | Val | Thr | Ser | Ile | Ile | Gly | His | Asp | Glu |
|     | 2195 |     |     |     | 2200 |     |     |     | 2205 |     |     |     |

```
ccc ggg gtt gga gat aag ttt ctt gct gcc gtt gca gca gag gta      6669
Pro Gly Val Gly Asp Lys Phe Leu Ala Ala Val Ala Ala Glu Val
    2210            2215                2220 ggc tgc gaa atc tcc gac ttg gaa ccc gac aca gta ttt gga gat      6714
Gly Cys Glu Ile Ser Asp Leu Glu Pro Asp Thr Val Phe Gly Asp
    2225            2230                2235 cta ggg gta gac tcg ttg atg gca att acg gtt att gcc tca atc      6759
Leu Gly Val Asp Ser Leu Met Ala Ile Thr Val Ile Ala Ser Ile
    2240            2245                2250 aga aat gac act gga gtc gaa ttg cca ggg tcg ttt ttc ctc gac      6804
Arg Asn Asp Thr Gly Val Glu Leu Pro Gly Ser Phe Phe Leu Asp
    2255            2260                2265 aac ccg acc gtt gca gaa gct aca aaa gca ttg cgt ggg gat agc      6849
Asn Pro Thr Val Ala Glu Ala Thr Lys Ala Leu Arg Gly Asp Ser
    2270            2275                2280 gac gct ggc atc tcc acg cct cag tct tct cct ccg aat ctt tcc      6894
Asp Ala Gly Ile Ser Thr Pro Gln Ser Ser Pro Pro Asn Leu Ser
    2285            2290                2295 ccc aaa att cgt ggt gaa gaa gtg aac ggt gag tct tcg gtt cct      6939
Pro Lys Ile Arg Gly Glu Glu Val Asn Gly Glu Ser Ser Val Pro
    2300            2305                2310 ttt gag ccg tta gag aca aca cca tct att acc aca gac ttc gaa      6984
Phe Glu Pro Leu Glu Thr Thr Pro Ser Ile Thr Thr Asp Phe Glu
    2315            2320                2325 gtt gga agg gcg acg gaa aca ccg ttg tta ata gat aaa cca gct      7029
Val Gly Arg Ala Thr Glu Thr Pro Leu Leu Ile Asp Lys Pro Ala
    2330            2335                2340 gct acc ctg tta ttg cag ggg tct gtg gct tca acg gag ccc cct      7074
Ala Thr Leu Leu Leu Gln Gly Ser Val Ala Ser Thr Glu Pro Pro
    2345            2350                2355 ctt ttc ctc cta gct gat ggc acc ggt tca gtt tct tcc tac ata      7119
Leu Phe Leu Leu Ala Asp Gly Thr Gly Ser Val Ser Ser Tyr Ile
    2360            2365                2370 cag ctt cct gcg ctt tca ggc ggt cgt cga atc tat ggg gtg gag      7164
Gln Leu Pro Ala Leu Ser Gly Gly Arg Arg Ile Tyr Gly Val Glu
    2375            2380                2385 tct cca ttt gct cgc gat ccg tcg gcc ttc gtt gat atc agc gtg      7209
Ser Pro Phe Ala Arg Asp Pro Ser Ala Phe Val Asp Ile Ser Val
    2390            2395                2400 ggt gat tta gca gac gct ttt att ttc tcc ata cgc aaa gtt cag      7254
Gly Asp Leu Ala Asp Ala Phe Ile Phe Ser Ile Arg Lys Val Gln
    2405            2410                2415 cct gtt ggt cca tat gtt att gga ggt tcc tcg ttg ggt gct att      7299
Pro Val Gly Pro Tyr Val Ile Gly Gly Ser Ser Leu Gly Ala Ile
    2420            2425                2430 cat gcg ttt gag gtt agc cat cgt tta ctc aat gct ggt gag act      7344
His Ala Phe Glu Val Ser His Arg Leu Leu Asn Ala Gly Glu Thr
    2435            2440                2445 gtc tct gag ttg ctt ctc atc gca aat gca gca cca att cct gcc      7389
Val Ser Glu Leu Leu Leu Ile Ala Asn Ala Ala Pro Ile Pro Ala
    2450            2455                2460 cca gct cat ctg aga cat ttg gaa att tcc acc gaa atg att gag      7434
Pro Ala His Leu Arg His Leu Glu Ile Ser Thr Glu Met Ile Glu
    2465            2470                2475 aaa agt gga att gct tat ggc acc ggc cgg aag aag tta tcc acc      7479
Lys Ser Gly Ile Ala Tyr Gly Thr Gly Arg Lys Lys Leu Ser Thr
    2480            2485                2490
```

| | | | | | | | | | | | | | | |
|---|---|---|---|---|---|---|---|---|---|---|---|---|---|---|
| cta | tct | gca | aga | caa | aaa | cag | cat | ctt | acg | gct | tct | gtt | cga | tct |
| Leu | Ser | Ala | Arg | Gln | Lys | Gln | His | Leu | Thr | Ala | Ser | Val | Arg | Ser |
| | 2495 | | | | 2500 | | | | | 2505 | | | | |

7524

| | | | | | | | | | | | | | | |
|---|---|---|---|---|---|---|---|---|---|---|---|---|---|---|
| cac | gta | ctc | tac | gag | ccc | cag | gcc | ttt | acc | gaa | acc | cat | cgg | cca |
| His | Val | Leu | Tyr | Glu | Pro | Gln | Ala | Phe | Thr | Glu | Thr | His | Arg | Pro |
| | 2510 | | | | 2515 | | | | | 2520 | | | | |

7569

| | | | | | | | | | | | | | | |
|---|---|---|---|---|---|---|---|---|---|---|---|---|---|---|
| gta | cat | aca | acg | ttg | atc | gtt | gcc | tca | aag | ggt | ctt | ggg | ggt | ggg |
| Val | His | Thr | Thr | Leu | Ile | Val | Ala | Ser | Lys | Gly | Leu | Gly | Gly | Gly |
| | 2525 | | | | 2530 | | | | | 2535 | | | | |

7614

| | | | | | | | | | | | | | | |
|---|---|---|---|---|---|---|---|---|---|---|---|---|---|---|
| aca | agc | tcg | cca | gaa | tgt | cca | tta | act | ccc | tgg | ata | cag | gct | aat |
| Thr | Ser | Ser | Pro | Glu | Cys | Pro | Leu | Thr | Pro | Trp | Ile | Gln | Ala | Asn |
| | 2540 | | | | 2545 | | | | | 2550 | | | | |

7659

| | | | | | | | | | | | | | | |
|---|---|---|---|---|---|---|---|---|---|---|---|---|---|---|
| tgg | gga | tcg | tcg | gag | act | ctg | ggg | tgg | gat | ggc | ctg | gtc | ggc | gag |
| Trp | Gly | Ser | Ser | Glu | Thr | Leu | Gly | Trp | Asp | Gly | Leu | Val | Gly | Glu |
| | 2555 | | | | 2560 | | | | | 2565 | | | | |

7704

| | | | | | | | | | | | | | | |
|---|---|---|---|---|---|---|---|---|---|---|---|---|---|---|
| att | cac | tct | att | cac | cgc | gaa | gac | act | gac | agt | ttc | tca | tta | ctg |
| Ile | His | Ser | Ile | His | Arg | Glu | Asp | Thr | Asp | Ser | Phe | Ser | Leu | Leu |
| | 2570 | | | | 2575 | | | | | 2580 | | | | |

7749

| | | | | | | | | | | | | | | |
|---|---|---|---|---|---|---|---|---|---|---|---|---|---|---|
| aag | tat | cct | aac | att | acc | aag | tta | ggc | caa | att | atc | aat | gac | cgc |
| Lys | Tyr | Pro | Asn | Ile | Thr | Lys | Leu | Gly | Gln | Ile | Ile | Asn | Asp | Arg |
| | 2585 | | | | 2590 | | | | | 2595 | | | | |

7794

| | | | |
|---|---|---|---|
| gtt | tgt | cat | gca tag |
| Val | Cys | His | Ala |
| | 2600 | | |

7809

<210> SEQ ID NO 16
<211> LENGTH: 2602
<212> TYPE: PRT
<213> ORGANISM: Talaromyces islandicus

<400> SEQUENCE: 16

Met Ala Leu Asp Phe Asp Tyr Ile Ile Val Gly Gly Gly Thr Ala Gly
1               5                   10                  15

Cys Val Leu Ala Ser Arg Leu Ser Glu Tyr Leu Pro Asp Ala Ser Ile
            20                  25                  30

Leu Leu Ile Glu Ala Gly Ile Glu His Asp Pro Arg Val Lys Pro Thr
        35                  40                  45

Leu Gly Leu Thr Gly Gln Ala Ala Asn Glu Ile Lys Trp Asn Ile Gln
    50                  55                  60

Ser Ala Pro Gln Ser Ala Val Gly Asn Lys Thr Ile Asp Leu Val Gln
65                  70                  75                  80

Gly Lys Val Leu Gly Gly Thr Ser Gly Ile Asn His Gln Val Trp Ser
                85                  90                  95

Arg Gly Ala Ala Gly Asp Phe Asn Arg Trp Ala Ala Glu Val Gly Asp
            100                 105                 110

Pro Arg Trp Ser Trp Asn Gly Gln Leu Pro Phe Phe Lys Asn Thr Glu
        115                 120                 125

Thr Phe His Pro Gly Ala Asp Leu Gln Gly Lys Asp Leu Ser Ala Leu
    130                 135                 140

His Gly Phe Asp Gly Pro Ile Lys Val Ser Gln Thr Ser Ser Cys Gly
145                 150                 155                 160

Arg Pro Arg Asn Tyr Pro Leu Lys Gly Ala Ile Ala Ser Met Tyr Lys
                165                 170                 175

Ser Ala Gly Val Ser Gln Gly Glu Asp Leu Asn Ser Gly Asn Ile Leu
            180                 185                 190

Gly Phe Ser Glu Ala Thr Ala Gly Ser Tyr Asp Gly Ile Arg Gln Trp
        195                 200                 205

```
Ala Gly Gly Asn Tyr Lys Phe Gly Pro Asn Val Thr Leu Trp Thr Glu
    210                 215                 220

Thr His Val Ser Lys Ile Ile Ser Gln Gly Ser Arg Ala Thr Gly Val
225                 230                 235                 240

Glu Tyr Leu Arg Pro Asp Arg Ser Thr Ser Ser Ser Val Ser Ala Lys
                245                 250                 255

Lys Glu Val Ile Val Ser Ser Gly Ala Gln Gly Ser Pro Lys Leu Leu
                260                 265                 270

Leu Leu Ser Gly Ile Gly Pro Ser Ala Glu Leu Gln Lys His Ser Ile
        275                 280                 285

Gln Gln Val Val Glu Leu Pro Val Gly Glu Asn Tyr Ser Asp His Pro
    290                 295                 300

Met Met Ala Thr Tyr Trp Asn Leu Glu Lys Arg Gly Leu Ala Leu Gly
305                 310                 315                 320

Asp Val Glu Met Arg Ser Ala Glu Cys Asp Trp Ser Gly Leu Pro
                325                 330                 335

Val Asp Trp Leu Ala Phe His Arg His Asp Gln Asp Pro Thr Ile Ala
                340                 345                 350

Ala Leu Ala Glu Ser Gln Leu Ser Ser Asn Glu Leu Glu Arg Phe Gln
        355                 360                 365

Glu Gln Asn Arg Ala His Thr Glu Ser Val Val Leu Tyr Gly His Ile
    370                 375                 380

Asp Phe Ser Gly Lys Ala Gly Pro Pro Pro Gly Ser Asn Val Cys
385                 390                 395                 400

Val Met Asn Ile Leu Val Thr Pro Ser Ser Arg Gly Thr Val Thr Leu
                405                 410                 415

Lys Ser Thr Asn Pro Phe Asp Ala Pro Val Cys Asp Pro Asn Met Leu
                420                 425                 430

Ser Asn Glu Leu Asp Lys Gln Leu Leu Trp Ser Val Thr Arg Leu Thr
        435                 440                 445

Ser Gln Gly Leu Glu Arg Thr Ile Ser Pro Glu Tyr Gly Leu Ser Glu
    450                 455                 460

Tyr Ala Ile Asp Asp Asp Leu Arg Gly Asp Tyr Gly Asp Glu Ala Met
465                 470                 475                 480

Met Arg Arg Ala Val Arg Ile Val Arg Thr Val Asn His Gly Ser Gly
                485                 490                 495

Thr Cys Ser Met Gly Thr Val Val Asp Thr Glu Cys Arg Val Lys Gly
                500                 505                 510

Val Glu Gly Leu Arg Val Val Asp Ser Ser Val Ile Pro Leu Pro Leu
        515                 520                 525

Cys Ala His Tyr Gln Ala Ser Val Tyr Ala Leu Ala Glu Gln Asp Gln
    530                 535                 540

Thr Glu Gln Phe Leu Leu Leu Tyr Gly Asp Gln Thr Val Glu Lys Leu
545                 550                 555                 560

Pro Ala Val Arg Ala Leu Val Glu His Ala Gln Arg Ser Pro Ala Gly
                565                 570                 575

Arg Arg Phe Leu Arg Asp Ala Cys Asp Ile Ile Gln Ile Glu Ile Phe
                580                 585                 590

Ser Leu Asp Thr Asp Glu Arg Ala His Val Gly His Phe Asp Thr Leu
        595                 600                 605

Leu Gln Leu Ala Glu Ser Asn Ala Gln Ala Asp Gln Pro Ser Glu Ile
    610                 615                 620

Val Ala Thr Ile Leu Met Asn Val Thr Arg Leu Gly Glu Phe Ile Leu
```

```
            625                 630                 635                 640
Tyr Ala Glu Glu His Pro Asn Val Leu Gly Ser Ile Glu Gln Pro Thr
                    645                 650                 655

His Ile Val Ala Phe Cys Thr Gly Glu Ile Pro Ala Ala Val Ala Ala
                    660                 665                 670

Ala Ala Arg Asp Ser Ile Glu Leu Tyr Asn Leu Ser Ile Glu Thr Val
                    675                 680                 685

Arg Ile Ile Cys Arg Phe Ala Arg Asn Ile Ile Arg Arg Ser Val Leu
                    690                 695                 700

Val Asp Arg Thr Asn Gly Ser Trp Ala Thr Thr Ile Val Gly Val Ser
705                 710                 715                 720

Pro Gly Arg Val Gln Thr Ile Leu Asp Thr Phe His Gln Ser Gln Asn
                    725                 730                 735

Ile Ala Pro Thr Arg Gln Ile Asn Ile Gly Ile Met Ala Ala Gly Trp
                    740                 745                 750

Leu Thr Leu Phe Gly Pro Pro Ile Thr Thr Glu Gln Leu Phe Asn Trp
                    755                 760                 765

Ser Lys Glu Leu Asp Gly Ala Ser Arg Ile Lys Thr Asp Ala Gly Gly
                    770                 775                 780

Gly Val His Leu Pro Asn Leu Pro Glu Leu Asp Leu Asp Glu Val Val
785                 790                 795                 800

Gly Leu Ser Pro Leu Leu Asp Val Pro Ile Thr Pro Lys Ala Arg Leu
                    805                 810                 815

Trp Ser Pro Tyr Ser Cys Glu Ile Arg Asn Ala Ala Thr Leu Arg Asp
                    820                 825                 830

Leu Ile Arg Gln Val Ile Pro Asp Ile Thr Gln Tyr Ser Leu Arg Leu
                    835                 840                 845

Ser Asp Thr Ile Glu Thr Ala Val Lys Gly Leu Ser Asn Gly Ser Val
                    850                 855                 860

Lys Val Val Cys Val Gly Tyr Thr Ala His Leu Ile Ser Leu Gln Lys
865                 870                 875                 880

Ser Leu Gln Arg Glu Arg Arg Glu Ala Thr Val Leu Gln His Ser Ser
                    885                 890                 895

Ala Gly Ser Thr Phe Phe Thr Ser Pro Arg Gly Gly Ser Glu Ser Ile
                    900                 905                 910

Ala Ile Val Gly Met Ser Gly Arg Phe Pro Gly Ser Asp Asn Ile Gln
                    915                 920                 925

Glu Tyr Trp Gln Ser Leu Leu Asp Gly Glu Arg His Ile Lys Glu Ile
                    930                 935                 940

Pro Lys Asn Arg Phe Asp Leu Ser Lys Trp Tyr Asp Glu Thr Gly Lys
945                 950                 955                 960

Gln Lys Asn Ala Thr Met Asn Arg Ser Gly Ala Phe Leu Asp Arg Pro
                    965                 970                 975

Gly Tyr Phe Asp Asn Arg Leu Phe Asn Met Ser Pro Arg Glu Ala Leu
                    980                 985                 990

Gln Thr Asp Pro Leu His Arg Met Phe Leu Thr Val Ser Tyr Glu Ala
                    995                 1000                1005

Leu Glu Met Ala Gly Tyr Ser Pro Glu Ala Thr Leu Ala Thr Asn
                    1010                1015                1020

Ser Asn Arg Ile Ala Thr Tyr Phe Gly Gln Thr Ser Asp Asp Trp
                    1025                1030                1035

Arg Asp Ile Val Leu Thr Gln Gly Val Asp Ile Tyr Tyr Ala Pro
                    1040                1045                1050
```

```
Gly Ile Cys Arg Ala Phe Ala Pro Gly Arg Leu Asn Tyr His Phe
1055                1060                1065

Lys Trp Gly Gly Pro Ser Tyr Ser Val Asp Ala Ala Cys Ala Ser
1070                1075                1080

Ser Ile Ala Thr Ile Ser Leu Ala Cys Ser Ala Leu Leu Ala Arg
1085                1090                1095

Glu Cys Asp Thr Ala Leu Ala Gly Gly Ser Ile Leu Asp Ser
1100                1105                1110

Pro Ala Pro Phe Ala Gly Leu Ser Arg Gly Gly Phe Leu Ser Pro
1115                1120                1125

Glu Lys Gly Cys Glu Thr Phe His Asp Asp Ala Asp Gly Tyr Val
1130                1135                1140

Arg Gly Glu Gly Val Gly Val Val Val Leu Lys Arg Leu Glu Asp
1145                1150                1155

Ala Val Ala Asp Asn Asp Asn Ile Leu Gly Val Ile Arg Gly Ser
1160                1165                1170

Ala Arg Asn Tyr Ser Lys Gly Ala Ser Ser Ile Thr His Pro Ser
1175                1180                1185

Ser Glu Ala Gln Gln Arg Leu Tyr Arg Gln Val Leu Asn Gln Asn
1190                1195                1200

Ala Ile Asp Ala Ala Ser Val Ser Tyr Val Glu Met His Gly Thr
1205                1210                1215

Gly Thr Gln Ala Gly Asp Ser Thr Glu Met Ser Ser Val Leu Ser
1220                1225                1230

Thr Phe Gly Gln Ser Arg Ser Lys Asp Asn Pro Leu Val Val Gly
1235                1240                1245

Ala Val Lys Ala Asn Ile Gly His Gly Glu Ala Ala Ala Gly Val
1250                1255                1260

Cys Ala Leu Ile Lys Thr Leu Met Met Phe Gln Lys His Thr Ile
1265                1270                1275

Pro Pro Gln Pro Gly Met Pro Phe Lys Leu Asn His His Phe Pro
1280                1285                1290

Asp Leu Glu Lys Met Asn Val His Ile Pro Ala Thr Ala Ile Pro
1295                1300                1305

Leu Thr Ser Ala Ser Asn Ala Ala Lys Arg Arg Ile Phe Leu Asn
1310                1315                1320

Ser Phe Asp Ala Ser Gly Gly Asn Ser Cys Leu Leu Leu Glu Glu
1325                1330                1335

Ala Pro Leu Lys His Ser Lys Ala Ser Asp Pro Arg Asn His His
1340                1345                1350

Val Val Thr Phe Ser Ala Arg Thr Pro Phe Ser Leu Arg Ala Ile
1355                1360                1365

Lys Glu Lys Tyr Leu Gln Tyr Ile Arg Leu Asn Pro Asn Thr Ser
1370                1375                1380

Leu Ala Asp Leu Ala Tyr Thr Thr Ala Arg Arg Met His Gln
1385                1390                1395

Ser Ser Ala Arg Ser Thr Phe Thr Ala Thr Ser Ile Glu Asp Phe
1400                1405                1410

Ala Asn Lys Leu Glu Thr Asp Leu Lys Lys Glu Asp Ser Pro Val
1415                1420                1425

Lys Lys Ser Lys Gly Ala Ser Ser Gly Pro Asn Val Val Phe Ala
1430                1435                1440
```

```
Phe Thr Gly Gln Gly Ser Gln Tyr Ala Gly Met Ala His Gln Leu
1445                1450                1455

Trp His Asp Ser Ala Val Phe Arg Arg Leu Ile Asp Ser Ile Gln
1460                1465                1470

Ser Ile Ala Thr Ala Leu Asp Leu Pro Lys Phe Val Asp Leu Ile
1475                1480                1485

Ala Ser Gln Ser Phe Asp Leu Ser Lys Ala Ser Pro Ile Gln Thr
1490                1495                1500

Gln Leu Ala Ile Val Ala Leu Glu Ile Gly Leu Ala Gln Leu Trp
1505                1510                1515

Ala Ser Trp Gly Val Gln Pro Ser Leu Val Ile Gly His Ser Leu
1520                1525                1530

Gly Glu Tyr Ala Ala Leu Cys Ile Ser Gly Val Leu Thr Val Ser
1535                1540                1545

Asp Thr Leu Tyr Leu Val Gly Lys Arg Ala Met Met Leu Val Glu
1550                1555                1560

Ser Val Ala Gln Asn Glu Tyr Ala Met Leu Ala Ile Asn Asp Glu
1565                1570                1575

Val Asp Ile Ile Arg Gln Arg Leu Ala Thr Asp Ala Tyr Asn Thr
1580                1585                1590

Cys Glu Ile Ala Cys Ile Asn Ala Pro Lys Ser Thr Val Val Ser
1595                1600                1605

Gly Ala Leu Ser Glu Ile Lys Ile Met Gln Lys Glu Leu Glu Glu
1610                1615                1620

Gln Gly Tyr Arg Ser Thr Leu Leu His Val Pro Phe Gly Phe His
1625                1630                1635

Ser Lys Gln Met Asp Pro Ile Leu Asp Ser Tyr Glu Ser Cys Val
1640                1645                1650

Gln Gly Val Gly Ile Ser Ser Pro Arg Val Pro Ile Ala Ser Thr
1655                1660                1665

Leu Leu Gly Asp Ile Ile Gln Asp Lys Ser Thr Val Ser Ser Val
1670                1675                1680

Tyr Leu Arg Arg Gln Thr Arg Glu Ser Val Asn Phe Val Gly Ala
1685                1690                1695

Leu Gln Ala Ala Gln Val Ser Asn Phe Leu Arg Asp Asp Thr Leu
1700                1705                1710

Phe Leu Glu Met Gly Pro Asp Pro Val Cys Met Ser Leu Val Arg
1715                1720                1725

Ser Thr Leu Gly Thr Ile Ala Thr Pro Arg Leu Leu Pro Ala Leu
1730                1735                1740

Arg Arg Asn Glu Asn Asn Trp Leu Thr Thr Ser Asn Thr Leu Ala
1745                1750                1755

Ala Val His Gln Ala Gly Val Pro Val Asn Trp Pro Asp Tyr His
1760                1765                1770

Arg Glu Phe Thr Asn Cys Leu Thr Leu Leu Asp Leu Pro Thr Tyr
1775                1780                1785

Val Phe Asp Glu Lys Glu Phe Trp Thr Ser Tyr Pro Asp Pro Glu
1790                1795                1800

Gln Leu Ser Gly Val Glu Gln Lys His Leu Ser Pro Pro Pro Val
1805                1810                1815

Pro Ala Val Gln Gly Phe Pro Thr Thr Thr Leu Gln Arg Leu Thr
1820                1825                1830

Gln Glu Ala Phe Glu Asp Gly Lys Ile Ser Val Thr Phe Glu Ser
```

```
            1835                1840                1845

Ser Thr Ser Asp Pro His Leu Phe Glu Ala Ile Met Gly His Ala
            1850                1855                1860

Val Ala Gly Val Thr Ile Cys Ser Ser Ser Ile Phe Ser Asp Met
            1865                1870                1875

Ala Leu Ser Ala Ala Arg Tyr Thr Cys Glu Arg Leu Gln Pro Gly
            1880                1885                1890

Arg Trp Ser Glu Glu Leu Leu Thr Ile Ser Gly Leu Asp Ile Gln
            1895                1900                1905

Arg Pro Ile Val Val Leu Asp Arg Lys Asp Ser His Ile Ile Gln
            1910                1915                1920

Ile Asn Ala Lys Leu Asp Ala Lys Thr Glu Glu Val Tyr Ile Ser
            1925                1930                1935

Phe Gln Asp Gln Val Gly Lys Pro Ile Gly Ser Cys Lys Ile Ser
            1940                1945                1950

Phe His Asp Ala Ala Ser Trp Lys Gln Asn Ile Ser Arg Ile Leu
            1955                1960                1965

Tyr Leu Val Ser Phe Arg Ile Asp Val Leu Lys Glu Ala Thr Ile
            1970                1975                1980

Thr Gly Gln Gly His Arg Phe Leu Arg Pro Val Ile Tyr Arg Leu
            1985                1990                1995

Phe Ser Asn Val Val Asn Tyr Gly Glu Arg Phe Gln Gly Leu Glu
            2000                2005                2010

Glu Val Phe Leu Asp Ser Glu Cys Asn Asp Val Val Gly Gln Val
            2015                2020                2025

Arg Leu Pro Asp Leu Pro Ser Ser Lys Ser Gly His Phe Leu Tyr
            2030                2035                2040

Ser Pro Tyr Leu Leu Asp Ala Val Val His Val Ala Gly Phe Leu
            2045                2050                2055

Val Asn Cys Gly Leu Lys Tyr Pro Glu Asp Ile Gly Phe Leu Ala
            2060                2065                2070

Ser Ser Phe Glu Ser Trp His Ile Leu Lys Pro Ile Leu Pro Asn
            2075                2080                2085

Lys Thr Tyr Thr Ser Tyr Ser His Met Glu Glu Ser Ser Asn Gly
            2090                2095                2100

Ser Ser Leu Leu Gly Asp Val Tyr Val Phe Asp Gly Lys Asp Leu
            2105                2110                2115

Val Gly Ser Leu Thr Gly Leu Arg Phe Gln Lys Met Lys Lys Ile
            2120                2125                2130

Ala Leu Thr Arg Ile Leu Gln Ser Ala Ala Pro His Ser Ser Met
            2135                2140                2145

Lys Ile Gly Ala Gly Val Phe Arg Pro Asp Leu Leu Gly Ser Ser
            2150                2155                2160

Glu Lys Gln Ser Ser Arg Asn Lys Gln Leu Ala Arg Asp Val Asp
            2165                2170                2175

Phe Asp Thr Leu Pro Ser Ser Val Glu Pro Ser Ala Phe Thr Thr
            2180                2185                2190

Pro Lys Pro Ser Ser Ser Val Thr Ser Ile Ile Gly His Asp Glu
            2195                2200                2205

Pro Gly Val Gly Asp Lys Phe Leu Ala Ala Val Ala Ala Glu Val
            2210                2215                2220

Gly Cys Glu Ile Ser Asp Leu Glu Pro Asp Thr Val Phe Gly Asp
            2225                2230                2235
```

```
Leu Gly Val Asp Ser Leu Met Ala Ile Thr Val Ile Ala Ser Ile
        2240                2245                2250

Arg Asn Asp Thr Gly Val Glu Leu Pro Gly Ser Phe Phe Leu Asp
        2255                2260                2265

Asn Pro Thr Val Ala Glu Ala Thr Lys Ala Leu Arg Gly Asp Ser
        2270                2275                2280

Asp Ala Gly Ile Ser Thr Pro Gln Ser Ser Pro Asn Leu Ser
        2285                2290                2295

Pro Lys Ile Arg Gly Glu Glu Val Asn Gly Glu Ser Ser Val Pro
        2300                2305                2310

Phe Glu Pro Leu Glu Thr Thr Pro Ser Ile Thr Thr Asp Phe Glu
        2315                2320                2325

Val Gly Arg Ala Thr Glu Thr Pro Leu Leu Ile Asp Lys Pro Ala
        2330                2335                2340

Ala Thr Leu Leu Leu Gln Gly Ser Val Ala Ser Thr Glu Pro Pro
        2345                2350                2355

Leu Phe Leu Leu Ala Asp Gly Thr Gly Ser Val Ser Ser Tyr Ile
        2360                2365                2370

Gln Leu Pro Ala Leu Ser Gly Gly Arg Arg Ile Tyr Gly Val Glu
        2375                2380                2385

Ser Pro Phe Ala Arg Asp Pro Ser Ala Phe Val Asp Ile Ser Val
        2390                2395                2400

Gly Asp Leu Ala Asp Ala Phe Ile Phe Ser Ile Arg Lys Val Gln
        2405                2410                2415

Pro Val Gly Pro Tyr Val Ile Gly Gly Ser Ser Leu Gly Ala Ile
        2420                2425                2430

His Ala Phe Glu Val Ser His Arg Leu Leu Asn Ala Gly Glu Thr
        2435                2440                2445

Val Ser Glu Leu Leu Leu Ile Ala Asn Ala Ala Pro Ile Pro Ala
        2450                2455                2460

Pro Ala His Leu Arg His Leu Glu Ile Ser Thr Glu Met Ile Glu
        2465                2470                2475

Lys Ser Gly Ile Ala Tyr Gly Thr Gly Arg Lys Lys Leu Ser Thr
        2480                2485                2490

Leu Ser Ala Arg Gln Lys Gln His Leu Thr Ala Ser Val Arg Ser
        2495                2500                2505

His Val Leu Tyr Glu Pro Gln Ala Phe Thr Glu Thr His Arg Pro
        2510                2515                2520

Val His Thr Thr Leu Ile Val Ala Ser Lys Gly Leu Gly Gly Gly
        2525                2530                2535

Thr Ser Ser Pro Glu Cys Pro Leu Thr Pro Trp Ile Gln Ala Asn
        2540                2545                2550

Trp Gly Ser Ser Glu Thr Leu Gly Trp Asp Gly Leu Val Gly Glu
        2555                2560                2565

Ile His Ser Ile His Arg Glu Asp Thr Asp Ser Phe Ser Leu Leu
        2570                2575                2580

Lys Tyr Pro Asn Ile Thr Lys Leu Gly Gln Ile Ile Asn Asp Arg
        2585                2590                2595

Val Cys His Ala
        2600

<210> SEQ ID NO 17
<211> LENGTH: 1143
```

```
<212> TYPE: DNA
<213> ORGANISM: Talaromyces islandicus
<220> FEATURE:
<221> NAME/KEY: CDS
<222> LOCATION: (1)..(1143)

<400> SEQUENCE: 17 atg tct gcg agc gta gaa aca gcg tgg tcg cag tgt ctg cga ata att    48
Met Ser Ala Ser Val Glu Thr Ala Trp Ser Gln Cys Leu Arg Ile Ile
1               5                   10                  15 gca aag gag aca ggg ttt agt atc gac gat atc gat gac gag gat gaa    96
Ala Lys Glu Thr Gly Phe Ser Ile Asp Asp Ile Asp Asp Glu Asp Glu
            20                  25                  30 ttc acc aca gat ctc ggt gtc aac ccg att gtc gca cgg tca att ata   144
Phe Thr Thr Asp Leu Gly Val Asn Pro Ile Val Ala Arg Ser Ile Ile
        35                  40                  45 cgt tct ttc gaa agc gtc ttg aaa aga gac att ccc tcg act gta ttt   192
Arg Ser Phe Glu Ser Val Leu Lys Arg Asp Ile Pro Ser Thr Val Phe
50                  55                  60 acc cag tgt cca act atc aaa gaa ttt cgc ggc gga tac ttt cag tca   240
Thr Gln Cys Pro Thr Ile Lys Glu Phe Arg Gly Gly Tyr Phe Gln Ser
65                  70                  75                  80 tgc att gat agt atc acg gag cca aag gac gac ctg gca gta aag aaa   288
Cys Ile Asp Ser Ile Thr Glu Pro Lys Asp Asp Leu Ala Val Lys Lys
                85                  90                  95 gct gca aca gcg cac gga gga aat aaa aaa tca act acg aac act act   336
Ala Ala Thr Ala His Gly Gly Asn Lys Lys Ser Thr Thr Asn Thr Thr
            100                 105                 110 cgt acg cga gct cgc gtc ccg atc tcc att gtg ctc caa ggc aag cca   384
Arg Thr Arg Ala Arg Val Pro Ile Ser Ile Val Leu Gln Gly Lys Pro
        115                 120                 125 acg atg gat tgt gcc gag aag acc aac atc ttc ctt cta cct gac ggc   432
Thr Met Asp Cys Ala Glu Lys Thr Asn Ile Phe Leu Leu Pro Asp Gly
130                 135                 140 agt ggt tcc ggg atg gct tat gtg gaa atg cca ctt atc gat cct tct   480
Ser Gly Ser Gly Met Ala Tyr Val Glu Met Pro Leu Ile Asp Pro Ser
145                 150                 155                 160 act gtc tgt ctt gtt gcg ttg aat agt ccc tat ctc aac cgc gcc tcg   528
Thr Val Cys Leu Val Ala Leu Asn Ser Pro Tyr Leu Asn Arg Ala Ser
                165                 170                 175 gag tac tgt tgt tca atc gaa gaa att gca aga gag tac gtg caa gag   576
Glu Tyr Cys Cys Ser Ile Glu Glu Ile Ala Arg Glu Tyr Val Gln Glu
            180                 185                 190 att cgt aaa cgc caa cct cac gga cct tac gtg ctt ggg ggc tgg tct   624
Ile Arg Lys Arg Gln Pro His Gly Pro Tyr Val Leu Gly Gly Trp Ser
        195                 200                 205 gcc ggt ggt tat tac tca tat gaa gtg gcg tgt gaa ctc atc cgt caa   672
Ala Gly Gly Tyr Tyr Ser Tyr Glu Val Ala Cys Glu Leu Ile Arg Gln
210                 215                 220 ggt gaa cgt gtg aaa aag ctc att ttg ctc gat tct cct tgt cgg cca   720
Gly Glu Arg Val Lys Lys Leu Ile Leu Leu Asp Ser Pro Cys Arg Pro
225                 230                 235                 240 gat ttt gag gag ctt cca atg gaa gtg gtg cag tat tta tcc aaa aag   768
Asp Phe Glu Glu Leu Pro Met Glu Val Val Gln Tyr Leu Ser Lys Lys
                245                 250                 255 aac ctt atg ggc aac tgg gac cgc agt gct cga cat aca agt gtt cct   816
Asn Leu Met Gly Asn Trp Asp Arg Ser Ala Arg His Thr Ser Val Pro
            260                 265                 270 tct tgg gtc atc gag cat ttc cgc tcg act ctt cgg gcg gta cgt gag   864
Ser Trp Val Ile Glu His Phe Arg Ser Thr Leu Arg Ala Val Arg Glu
        275                 280                 285
```

```
tat gtg cca gtg ccg atg gac gct gct gat gct cca gac gaa gtt tgc    912
Tyr Val Pro Val Pro Met Asp Ala Ala Asp Ala Pro Asp Glu Val Cys
        290                 295                 300 atc atc tgg agt cga gaa ggt gta atg cca gca aac cag ctt cga aga    960
Ile Ile Trp Ser Arg Glu Gly Val Met Pro Ala Asn Gln Leu Arg Arg
305                 310                 315                 320 acg ggt ttg gat ctc cgc gtc cgc gtc gca cgt ttt ctt ctc gaa gga   1008
Thr Gly Leu Asp Leu Arg Val Arg Val Ala Arg Phe Leu Leu Glu Gly
                325                 330                 335 aaa cct gat ctc acc agt gca tac ggg tgg gac cgg ctt ttc ccc gga   1056
Lys Pro Asp Leu Thr Ser Ala Tyr Gly Trp Asp Arg Leu Phe Pro Gly
            340                 345                 350 gcg cac atc agc att tcg tct atc tcg ggc aat cac ttc acc ctg atc   1104
Ala His Ile Ser Ile Ser Ser Ile Ser Gly Asn His Phe Thr Leu Ile
        355                 360                 365 aac aaa ccc aac gta agc gtc tgt tcc ttt ccc gag tag               1143
Asn Lys Pro Asn Val Ser Val Cys Ser Phe Pro Glu
370                 375                 380

<210> SEQ ID NO 18
<211> LENGTH: 380
<212> TYPE: PRT
<213> ORGANISM: Talaromyces islandicus

<400> SEQUENCE: 18

Met Ser Ala Ser Val Glu Thr Ala Trp Ser Gln Cys Leu Arg Ile Ile
1               5                   10                  15

Ala Lys Glu Thr Gly Phe Ser Ile Asp Asp Ile Asp Asp Glu Asp Glu
            20                  25                  30

Phe Thr Thr Asp Leu Gly Val Asn Pro Ile Val Ala Arg Ser Ile Ile
        35                  40                  45

Arg Ser Phe Glu Ser Val Leu Lys Arg Asp Ile Pro Ser Thr Val Phe
    50                  55                  60

Thr Gln Cys Pro Thr Ile Lys Glu Phe Arg Gly Gly Tyr Phe Gln Ser
65                  70                  75                  80

Cys Ile Asp Ser Ile Thr Glu Pro Lys Asp Asp Leu Ala Val Lys Lys
                85                  90                  95

Ala Ala Thr Ala His Gly Gly Asn Lys Lys Ser Thr Thr Asn Thr Thr
            100                 105                 110

Arg Thr Arg Ala Arg Val Pro Ile Ser Ile Val Leu Gln Gly Lys Pro
        115                 120                 125

Thr Met Asp Cys Ala Glu Lys Thr Asn Ile Phe Leu Leu Pro Asp Gly
    130                 135                 140

Ser Gly Ser Gly Met Ala Tyr Val Glu Met Pro Leu Ile Asp Pro Ser
145                 150                 155                 160

Thr Val Cys Leu Val Ala Leu Asn Ser Pro Tyr Leu Asn Arg Ala Ser
                165                 170                 175

Glu Tyr Cys Cys Ser Ile Glu Glu Ile Ala Arg Glu Tyr Val Gln Glu
            180                 185                 190

Ile Arg Lys Arg Gln Pro His Gly Pro Tyr Val Leu Gly Gly Trp Ser
        195                 200                 205

Ala Gly Gly Tyr Tyr Ser Tyr Glu Val Ala Cys Glu Leu Ile Arg Gln
    210                 215                 220

Gly Glu Arg Val Lys Lys Leu Ile Leu Leu Asp Ser Pro Cys Arg Pro
225                 230                 235                 240

Asp Phe Glu Glu Leu Pro Met Glu Val Val Gln Tyr Leu Ser Lys Lys
```

```
                245                 250                 255

Asn Leu Met Gly Asn Trp Asp Arg Ser Ala Arg His Thr Ser Val Pro
            260                 265                 270

Ser Trp Val Ile Glu His Phe Arg Ser Thr Leu Arg Ala Val Arg Glu
        275                 280                 285

Tyr Val Pro Val Pro Met Asp Ala Ala Asp Ala Pro Asp Glu Val Cys
        290                 295                 300

Ile Ile Trp Ser Arg Glu Gly Val Met Pro Ala Asn Gln Leu Arg Arg
305                 310                 315                 320

Thr Gly Leu Asp Leu Arg Val Arg Val Ala Arg Phe Leu Leu Glu Gly
                325                 330                 335

Lys Pro Asp Leu Thr Ser Ala Tyr Gly Trp Asp Arg Leu Phe Pro Gly
            340                 345                 350

Ala His Ile Ser Ile Ser Ser Ile Ser Gly Asn His Phe Thr Leu Ile
            355                 360                 365

Asn Lys Pro Asn Val Ser Val Cys Ser Phe Pro Glu
        370                 375                 380
```